(12) United States Patent
Kaminsky et al.

(10) Patent No.: US 8,146,664 B2
(45) Date of Patent: Apr. 3, 2012

(54) UTILIZATION OF LOW BTU GAS GENERATED DURING IN SITU HEATING OF ORGANIC-RICH ROCK

(75) Inventors: Robert D. Kaminsky, Houston, TX (US); C. Stan Speed, Kerens, TX (US); Todd S. Griffith, Spring, TX (US); Loren K. Starcher, Sugar Land, TX (US); William A. Symington, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 783 days.

(21) Appl. No.: 12/154,256

(22) Filed: May 21, 2008

(65) Prior Publication Data

US 2008/0289819 A1    Nov. 27, 2008

Related U.S. Application Data

(60) Provisional application No. 60/931,820, filed on May 25, 2007.

(51) Int. Cl.
*E21B 43/24* (2006.01)
*E21B 36/00* (2006.01)

(52) U.S. Cl. ........................ 166/302; 166/369
(58) Field of Classification Search ........................ None
See application file for complete search history.

(56) References Cited

U.S. PATENT DOCUMENTS

| | | |
|---|---|---|
| 363,419 A | 5/1887 | Poetsch |
| 895,612 A | 8/1908 | Baker |
| 1,342,780 A | 6/1920 | Vedder |
| 1,422,204 A | 7/1922 | Hoover et al. |
| 1,666,488 A | 4/1928 | Crawshaw |
| 1,701,884 A | 2/1929 | Hogle |
| 1,872,906 A | 8/1932 | Doherty |

(Continued)

FOREIGN PATENT DOCUMENTS

CA    994694    8/1976

(Continued)

OTHER PUBLICATIONS

"Wobbe Index" retrieved May 7, 2011 from http://en.wikipedia.org/wiki/Wobbe_index.*

(Continued)

*Primary Examiner* — Angela M DiTrani
(74) *Attorney, Agent, or Firm* — ExxonMobil Upstream Research Company Law Department

(57) ABSTRACT

A method for utilizing gas produced from an in situ conversion process includes heating an organic-rich rock formation, for example an oil shale formation. The method may include producing a production fluid from the organic-rich rock formation where the production fluid has been at least partially generated as a result of pyrolysis of formation hydrocarbons located in the organic-rich rock formation. The method may include obtaining a gas stream from the production fluid, where the gas stream comprises combustible hydrocarbon fluids. The method may include separating the gas stream into a first composition gas stream and a second composition gas stream, where the composition of the first composition gas stream is a low BTU gas stream maintained in a substantially constant condition and passing the first composition gas stream through a gas turbine to form a gas turbine exhaust stream, where the gas turbine is connected to an electrical generator.

47 Claims, 33 Drawing Sheets

U.S. PATENT DOCUMENTS

| | | | |
|---|---|---|---|
| 2,033,560 A | 3/1936 | Wells | |
| 2,033,561 A | 3/1936 | Wells | |
| 2,534,737 A | 12/1950 | Rose | |
| 2,584,605 A | 2/1952 | Merriam et al. | |
| 2,634,961 A | 4/1953 | Ljungstrom | |
| 2,732,195 A | 1/1956 | Ljungstrom | 262/3 |
| 2,777,679 A | 1/1957 | Ljungstrom | |
| 2,780,450 A | 2/1957 | Ljungstrom | |
| 2,795,279 A | 6/1957 | Sarapuu | |
| 2,812,160 A | 11/1957 | West et al. | |
| 2,813,583 A | 11/1957 | Marx et al. | |
| 2,847,071 A | 8/1958 | De Priester et al. | 166/39 |
| 2,887,160 A | 5/1959 | De Priester | 166/59 |
| 2,895,555 A | 7/1959 | De Priester | 166/59 |
| 2,923,535 A | 2/1960 | Ljungstrom | |
| 2,944,803 A | 7/1960 | Hanson | |
| 2,952,450 A | 9/1960 | Purre | 262/3 |
| 2,974,937 A | 3/1961 | Kiel | |
| 3,004,601 A | 10/1961 | Bodine | |
| 3,013,609 A | 12/1961 | Brink | |
| 3,095,031 A | 6/1963 | Eurenius et al. | 158/99 |
| 3,106,244 A | 10/1963 | Parker | |
| 3,109,482 A | 11/1963 | O'Brien | 158/115 |
| 3,127,936 A | 4/1964 | Eurenius | 166/39 |
| 3,137,347 A | 6/1964 | Parker | |
| 3,149,672 A | 9/1964 | Orkiszewski et al. | |
| 3,170,815 A | 2/1965 | White | |
| 3,180,411 A | 4/1965 | Parker | |
| 3,183,675 A | 5/1965 | Schroeder | |
| 3,183,971 A | 5/1965 | McEver et al. | |
| 3,194,315 A | 7/1965 | Rogers | |
| 3,205,942 A | 9/1965 | Sandberg | |
| 3,225,829 A | 12/1965 | Chown et al. | 166/59 |
| 3,228,869 A | 1/1966 | Irish | |
| 3,241,611 A | 3/1966 | Dougan | 166/7 |
| 3,241,615 A | 3/1966 | Brandt et al. | 166/59 |
| 3,254,721 A | 6/1966 | Smith | 166/59 |
| 3,256,935 A | 6/1966 | Nabor et al. | |
| 3,263,211 A | 7/1966 | Heidman | |
| 3,267,680 A | 8/1966 | Schlumberger | |
| 3,271,962 A | 9/1966 | Dahms et al. | |
| 3,284,281 A | 11/1966 | Thomas | 166/2 |
| 3,285,335 A | 11/1966 | Reistle, Jr. | |
| 3,288,648 A | 11/1966 | Jones | |
| 3,294,167 A | 12/1966 | Vogel | |
| 3,295,328 A | 1/1967 | Bishop | |
| 3,323,840 A | 6/1967 | Mason et al. | |
| 3,358,756 A | 12/1967 | Vogel | |
| 3,372,550 A | 3/1968 | Schroeder | |
| 3,376,403 A | 4/1968 | Mircea | 219/10.49 |
| 3,382,922 A | 5/1968 | Needham | |
| 3,400,762 A | 9/1968 | Peacock et al. | 166/11 |
| 3,436,919 A | 4/1969 | Shock et al. | |
| 3,439,744 A | 4/1969 | Bradley | |
| 3,468,376 A | 9/1969 | Slusser et al. | 166/272 |
| 3,500,913 A | 3/1970 | Nordgren et al. | |
| 3,501,201 A | 3/1970 | Closmann et al. | |
| 3,502,372 A | 3/1970 | Prats | |
| 3,513,914 A | 5/1970 | Vogel | 166/271 |
| 3,515,213 A | 6/1970 | Prats | |
| 3,516,495 A | 6/1970 | Patton | |
| 3,521,709 A | 7/1970 | Needham | |
| 3,528,252 A | 9/1970 | Gail | 61/36 |
| 3,528,501 A | 9/1970 | Parker | |
| 3,547,193 A | 12/1970 | Gill | |
| 3,559,737 A | 2/1971 | Ralstin | |
| 3,572,838 A | 3/1971 | Templeton | |
| 3,599,714 A | 8/1971 | Messman | |
| 3,602,310 A | 8/1971 | Halbert | |
| 3,613,785 A | 10/1971 | Closmann et al. | |
| 3,620,300 A | 11/1971 | Crowson | |
| 3,642,066 A | 2/1972 | Gill | |
| 3,661,423 A | 5/1972 | Garret | |
| 3,692,111 A | 9/1972 | Breithaupt et al. | |
| 3,695,354 A | 10/1972 | Dilgren et al. | |
| 3,700,280 A | 10/1972 | Papadopoulos et al. | |
| 3,724,225 A | 4/1973 | Mancini et al. | 62/12 |
| 3,729,965 A | 5/1973 | Gartner | 70/395 |
| 3,730,270 A | 5/1973 | Allred | |
| 3,739,851 A | 6/1973 | Beard | |
| 3,741,306 A | 6/1973 | Papadopoulos | |
| 3,759,328 A | 9/1973 | Ueber et al. | |
| 3,759,329 A | 9/1973 | Ross | |
| 3,759,574 A | 9/1973 | Beard | |
| 3,779,601 A | 12/1973 | Beard | |
| 3,880,238 A | 4/1975 | Tham et al. | |
| 3,882,937 A | 5/1975 | Robinson | |
| 3,882,941 A | 5/1975 | Pelofsky | |
| 3,888,307 A | 6/1975 | Closmann | |
| 3,924,680 A | 12/1975 | Terry | |
| 3,943,722 A | 3/1976 | Ross | 61/36 A |
| 3,950,029 A | 4/1976 | Timmins | |
| 3,958,636 A | 5/1976 | Perkins | |
| 3,967,853 A | 7/1976 | Closmann et al. | |
| 3,978,920 A | 9/1976 | Bandyopadhyay | |
| 3,999,607 A | 12/1976 | Pennington et al. | 166/259 |
| 4,003,432 A | 1/1977 | Paull et al. | |
| 4,005,750 A | 2/1977 | Shuck | |
| 4,007,786 A | 2/1977 | Schlinger | 166/266 |
| 4,008,762 A | 2/1977 | Fisher et al. | 166/248 |
| 4,008,769 A | 2/1977 | Chang | 166/274 |
| 4,014,575 A | 3/1977 | French et al. | 299/2 |
| 4,030,549 A | 6/1977 | Bouck | |
| 4,037,655 A | 7/1977 | Carpenter | |
| 4,043,393 A | 8/1977 | Fisher et al. | 166/248 |
| 4,047,760 A | 9/1977 | Ridley | |
| 4,057,510 A | 11/1977 | Crouch et al. | |
| 4,065,183 A | 12/1977 | Hill et al. | |
| 4,067,390 A | 1/1978 | Camacho et al. | |
| 4,069,868 A | 1/1978 | Terry | 166/258 |
| 4,071,278 A | 1/1978 | Carpenter et al. | |
| 4,093,025 A | 6/1978 | Terry | 166/251 |
| 4,096,034 A | 6/1978 | Anthony | |
| 4,125,159 A | 11/1978 | Vann | |
| 4,140,180 A | 2/1979 | Bridges et al. | 166/248 |
| 4,149,595 A | 4/1979 | Cha | |
| 4,160,479 A | 7/1979 | Richardson et al. | 166/267 |
| 4,163,475 A | 8/1979 | Cha et al. | |
| 4,167,291 A | 9/1979 | Ridley | |
| 4,169,506 A | 10/1979 | Berry | 166/256 |
| 4,185,693 A | 1/1980 | Crumb et al. | |
| 4,186,801 A | 2/1980 | Madgavkar et al. | 166/256 |
| 4,202,168 A | 5/1980 | Acheson et al. | 60/39.06 |
| 4,239,283 A | 12/1980 | Ridley | |
| 4,246,966 A | 1/1981 | Stoddard et al. | 166/267 |
| 4,250,230 A | 2/1981 | Terry | 429/12 |
| 4,265,310 A | 5/1981 | Britton et al. | |
| 4,271,905 A | 6/1981 | Redford et al. | |
| 4,272,127 A | 6/1981 | Hutchins | |
| 4,285,401 A | 8/1981 | Erickson | 166/303 |
| 4,318,723 A | 3/1982 | Holmes et al. | 62/20 |
| 4,319,635 A | 3/1982 | Jones | |
| 4,320,801 A | 3/1982 | Rowland et al. | |
| 4,324,291 A | 4/1982 | Wong et al. | |
| 4,340,934 A | 7/1982 | Segesman | |
| 4,344,485 A | 8/1982 | Butler | |
| 4,358,222 A | 11/1982 | Landau | 405/130 |
| 4,362,213 A | 12/1982 | Tabor | |
| 4,368,921 A | 1/1983 | Hutchins | |
| 4,369,842 A | 1/1983 | Cha | |
| 4,372,615 A | 2/1983 | Ricketts | |
| 4,375,302 A | 3/1983 | Kalmar | |
| 4,384,614 A | 5/1983 | Justheim | |
| 4,397,502 A | 8/1983 | Hines | |
| 4,401,162 A | 8/1983 | Osborne | |
| 4,412,585 A | 11/1983 | Bouck | |
| 4,417,449 A | 11/1983 | Hegarty et al. | 62/28 |
| 4,473,114 A | 9/1984 | Bell et al. | |
| 4,474,238 A | 10/1984 | Gentry et al. | |
| 4,483,398 A | 11/1984 | Peters et al. | |
| 4,485,869 A | 12/1984 | Sresty et al. | |
| 4,487,257 A | 12/1984 | Dauphine | |
| 4,487,260 A | 12/1984 | Pittman et al. | |
| 4,511,382 A | 4/1985 | Valencia et al. | 62/20 |
| 4,533,372 A | 8/1985 | Valencia et al. | 62/12 |
| 4,537,067 A | 8/1985 | Sharp et al. | |
| 4,545,435 A | 10/1985 | Bridges et al. | |

| Patent No. | Date | Inventor | Class |
|---|---|---|---|
| 4,546,829 A | 10/1985 | Martin et al. | 166/267 |
| 4,550,779 A | 11/1985 | Zakiewicz | |
| 4,567,945 A | 2/1986 | Segalman | |
| 4,589,491 A | 5/1986 | Perkins | |
| 4,589,973 A | 5/1986 | Minden | 208/410 |
| 4,602,144 A | 7/1986 | Vogel | |
| 4,607,488 A | 8/1986 | Karinthi et al. | 62/42 |
| 4,626,665 A | 12/1986 | Fort, III | 219/534 |
| 4,633,948 A | 1/1987 | Closmann | |
| 4,634,315 A | 1/1987 | Owen et al. | |
| 4,637,464 A | 1/1987 | Forgac et al. | |
| 4,640,352 A | 2/1987 | Vanmeurs et al. | |
| 4,671,863 A | 6/1987 | Tejeda | |
| 4,694,907 A | 9/1987 | Stahl et al. | 166/303 |
| 4,704,514 A | 11/1987 | Van Egmond et al. | 219/278 |
| 4,705,108 A | 11/1987 | Little et al. | |
| 4,706,751 A | 11/1987 | Gonduin | |
| 4,730,671 A | 3/1988 | Perkins | |
| 4,737,267 A | 4/1988 | Pao et al. | |
| 4,747,642 A | 5/1988 | Gash et al. | |
| 4,754,808 A | 7/1988 | Harmon et al. | |
| 4,776,638 A | 10/1988 | Hahn | 299/5 |
| 4,779,680 A | 10/1988 | Sydansk | |
| 4,815,790 A | 3/1989 | Rosar et al. | |
| 4,817,711 A | 4/1989 | Jeambey | |
| 4,828,031 A | 5/1989 | Davis | |
| 4,860,544 A | 8/1989 | Krieg et al. | |
| 4,886,118 A | 12/1989 | Van Meurs et al. | 166/245 |
| 4,923,493 A | 5/1990 | Valencia et al. | 62/13 |
| 4,926,941 A | 5/1990 | Glandt et al. | |
| 4,928,765 A | 5/1990 | Nielson | |
| 4,929,341 A | 5/1990 | Thirumalachar et al. | |
| 4,974,425 A | 12/1990 | Krieg et al. | |
| 5,016,709 A | 5/1991 | Combe et al. | |
| 5,036,918 A | 8/1991 | Jennings et al. | |
| 5,050,386 A | 9/1991 | Krieg et al. | |
| 5,055,030 A | 10/1991 | Schirmer | |
| 5,055,180 A | 10/1991 | Klaila | 208/402 |
| 5,082,055 A | 1/1992 | Hemsath | |
| 5,085,276 A | 2/1992 | Rivas et al. | |
| 5,117,908 A | 6/1992 | Hofmann | 166/267 |
| 5,120,338 A | 6/1992 | Potts, Jr. et al. | 62/12 |
| 5,217,076 A | 6/1993 | Masek | 166/303 |
| 5,236,039 A | 8/1993 | Edelstein | |
| 5,255,742 A | 10/1993 | Mikus | 166/303 |
| 5,275,063 A | 1/1994 | Steiger et al. | |
| 5,297,626 A | 3/1994 | Vinegar et al. | |
| 5,305,829 A | 4/1994 | Kumar | |
| 5,372,708 A | 12/1994 | Gewertz | 208/434 |
| 5,377,756 A | 1/1995 | Northrop et al. | |
| 5,392,854 A | 2/1995 | Vinegar et al. | |
| 5,411,089 A | 5/1995 | Vinegar et al. | |
| 5,416,257 A | 5/1995 | Peters | |
| 5,620,049 A | 4/1997 | Gipson et al. | |
| 5,621,844 A | 4/1997 | Bridges | |
| 5,661,977 A | 9/1997 | Shnell | |
| 5,730,550 A | 3/1998 | Andersland et al. | |
| 5,838,634 A | 11/1998 | Jones et al. | |
| 5,844,799 A | 12/1998 | Joseph et al. | |
| 5,868,202 A | 2/1999 | Hsu | |
| 5,899,269 A | 5/1999 | Wellington et al. | 166/58 |
| 5,905,657 A | 5/1999 | Celniker | |
| 5,907,662 A | 5/1999 | Buettner | |
| 5,956,971 A | 9/1999 | Cole et al. | 62/623 |
| 6,015,015 A | 1/2000 | Luft et al. | |
| 6,016,867 A | 1/2000 | Gregoli et al. | |
| 6,023,554 A | 2/2000 | Vinegar et al. | 392/301 |
| 6,055,803 A | 5/2000 | Mastronarde et al. | |
| 6,056,057 A | 5/2000 | Vinegar et al. | |
| 6,079,499 A | 6/2000 | Mikus et al. | |
| 6,148,911 A | 11/2000 | Gipson et al. | |
| 6,158,517 A | 12/2000 | Hsu | |
| 6,246,963 B1 | 6/2001 | Cross et al. | |
| 6,247,358 B1 | 6/2001 | Dos Santos | |
| 6,328,104 B1 | 12/2001 | Graue | |
| 6,434,435 B1 | 8/2002 | Tubel et al. | |
| 6,480,790 B1 | 11/2002 | Calvert et al. | |
| 6,540,018 B1 | 4/2003 | Vinegar et al. | |
| 6,581,684 B2 | 6/2003 | Wellington et al. | 166/245 |
| 6,585,046 B2 | 7/2003 | Neuroth et al. | |
| 6,589,303 B1 | 7/2003 | Lokhandwale et al. | |
| 6,591,906 B2 | 7/2003 | Wellington et al. | 166/250 |
| 6,607,036 B2 | 8/2003 | Ranson et al. | |
| 6,609,761 B1 | 8/2003 | Ramey et al. | |
| 6,668,922 B2 | 12/2003 | Ziauddin et al. | |
| 6,684,644 B2 | 2/2004 | Mittricker et al. | 60/772 |
| 6,684,948 B1 | 2/2004 | Savage | |
| 6,708,758 B2 | 3/2004 | de Rouffignac et al. | |
| 6,709,573 B2 | 3/2004 | Smith | 208/390 |
| 6,712,136 B2 | 3/2004 | de Rouffignac et al. | |
| 6,715,546 B2 | 4/2004 | Vinegar et al. | |
| 6,722,429 B2 | 4/2004 | de Rouffignac et al. | |
| 6,742,588 B2 | 6/2004 | Wellington et al. | 166/245 |
| 6,745,831 B2 | 6/2004 | De Rouffignac et al. | |
| 6,745,832 B2 | 6/2004 | Wellington et al. | |
| 6,752,210 B2 | 6/2004 | de Rouffignac et al. | |
| 6,754,588 B2 | 6/2004 | Cross et al. | |
| 6,764,108 B2 | 7/2004 | Ernst et al. | |
| 6,782,947 B2 | 8/2004 | de Rouffignac et al. | 166/245 |
| 6,796,139 B2 | 9/2004 | Briley et al. | |
| 6,820,689 B2 | 11/2004 | Sarada | 166/266 |
| 6,832,485 B2 | 12/2004 | Sugarmen et al. | 60/780 |
| 6,854,929 B2 | 2/2005 | Vinegar et al. | |
| 6,858,049 B2 | 2/2005 | Mittricker | 48/127.7 |
| 6,877,555 B2 | 4/2005 | Karanikas et al. | |
| 6,880,633 B2 | 4/2005 | Wellington et al. | 166/245 |
| 6,887,369 B2 | 5/2005 | Moulton et al. | |
| 6,896,053 B2 | 5/2005 | Berchenko et al. | |
| 6,896,707 B2 | 5/2005 | O'Rear et al. | |
| 6,913,078 B2 | 7/2005 | Shahin et al. | |
| 6,918,444 B2 | 7/2005 | Passey et al. | |
| 6,923,258 B2 | 8/2005 | Wellington et al. | |
| 6,932,155 B2 | 8/2005 | Vinegar et al. | 166/245 |
| 6,948,562 B2 | 9/2005 | Wellington et al. | 166/272.1 |
| 6,951,247 B2 | 10/2005 | De Rouffignac et al. | |
| 6,953,087 B2 | 10/2005 | de Rouffignac et al. | |
| 6,964,300 B2 | 11/2005 | Vinegar et al. | 166/245 |
| 6,969,123 B2 | 11/2005 | Vinegar et al. | 299/3 |
| 6,988,549 B1 | 1/2006 | Babcock | 166/267 |
| 6,994,160 B2 | 2/2006 | Wellington et al. | |
| 6,997,518 B2 | 2/2006 | Vinegar et al. | |
| 7,001,519 B2 | 2/2006 | Linden et al. | |
| 7,004,247 B2 | 2/2006 | Cole et al. | 166/60 |
| 7,004,251 B2 | 2/2006 | Ward et al. | |
| 7,011,154 B2 | 3/2006 | Maher et al. | 166/245 |
| 7,032,660 B2 | 4/2006 | Vinegar et al. | 166/245 |
| 7,036,583 B2 | 5/2006 | de Rouffignac et al. | |
| 7,048,051 B2 | 5/2006 | McQueen | |
| 7,051,807 B2 | 5/2006 | Vinegar et al. | |
| 7,055,600 B2 | 6/2006 | Messier et al. | |
| 7,063,145 B2 | 6/2006 | Veenstra et al. | 166/250 |
| 7,066,254 B2 | 6/2006 | Vinegar et al. | 166/245 |
| 7,073,578 B2 | 7/2006 | Vinegar et al. | 166/245 |
| 7,077,198 B2 | 7/2006 | Vinegar et al. | |
| 7,077,199 B2 | 7/2006 | Vinegar et al. | |
| 7,093,655 B2 | 8/2006 | Atkinson | |
| 7,096,942 B1 | 8/2006 | de Rouffignac et al. | |
| 7,096,953 B2 | 8/2006 | de Rouffignac et al. | |
| 7,100,994 B2 | 9/2006 | Vinegar et al. | |
| 7,104,319 B2 | 9/2006 | Vinegar et al. | 166/245 |
| 7,121,342 B2 | 10/2006 | Vinegar et al. | 166/302 |
| 7,124,029 B2 | 10/2006 | Jammes et al. | |
| 7,165,615 B2 | 1/2007 | Vinegar et al. | |
| 7,181,380 B2 | 2/2007 | Dusterhoft et al. | |
| 7,198,107 B2 | 4/2007 | Maguire | |
| 7,219,734 B2 | 5/2007 | Bai et al. | |
| 7,225,866 B2 | 6/2007 | Berchenko et al. | |
| 7,243,618 B2 | 7/2007 | Gurevich | |
| 7,322,415 B2 | 1/2008 | de St. Remey | |
| 7,331,385 B2 | 2/2008 | Symington et al. | |
| 7,353,872 B2 | 4/2008 | Sandberg | 166/302 |
| 7,357,180 B2 | 4/2008 | Vinegar et al. | |
| 7,441,603 B2 | 10/2008 | Kaminsky et al. | |
| 7,461,691 B2 | 12/2008 | Vinegar et al. | |
| 7,484,561 B2 | 2/2009 | Bridges | |
| 7,516,785 B2 | 4/2009 | Kaminsky | |
| 7,516,786 B2 | 4/2009 | Dallas et al. | |
| 7,516,787 B2 | 4/2009 | Kaminsky | |

| | | |
|---|---|---|
| 7,546,873 B2 | 6/2009 | Kim et al. |
| 7,549,470 B2 | 6/2009 | Vinegar et al. |
| 7,556,095 B2 | 7/2009 | Vinegar |
| 7,617,869 B2 | 11/2009 | Carney |
| 7,631,691 B2 | 12/2009 | Symington et al. |
| 7,644,993 B2 | 1/2010 | Kaminsky et al. |
| 7,647,971 B2 | 1/2010 | Kaminsky |
| 7,647,972 B2 | 1/2010 | Kaminsky |
| 7,654,320 B2 * | 2/2010 | Payton .......................... 166/257 |
| 7,669,657 B2 | 3/2010 | Symington et al. |
| 7,743,826 B2 | 6/2010 | Harris et al. |
| 7,798,221 B2 | 9/2010 | Vinegar et al. |
| 7,857,056 B2 | 12/2010 | Kaminsky et al. |
| 7,860,377 B2 | 12/2010 | Vinegar et al. |
| 7,905,288 B2 | 3/2011 | Kinkead |
| 2001/0049342 A1 | 12/2001 | Passey et al. |
| 2002/0013687 A1 | 1/2002 | Ortoleva |
| 2002/0023751 A1 | 2/2002 | Neuroth et al. |
| 2002/0029882 A1 | 3/2002 | Rouffignac et al. |
| 2002/0049360 A1 * | 4/2002 | Wellington et al. .......... 585/943 |
| 2002/0077515 A1 | 6/2002 | Wellington et al. |
| 2002/0099504 A1 | 7/2002 | Cross et al. |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0178195 A1 | 9/2003 | Agee et al. .................... 166/248 |
| 2003/0183390 A1 | 10/2003 | Veenstra et al. |
| 2003/0192691 A1 | 10/2003 | Vinegar et al. |
| 2003/0196788 A1 | 10/2003 | Vinegar et al. |
| 2003/0196789 A1 | 10/2003 | Wellington |
| 2003/0209348 A1 | 11/2003 | Ward et al. |
| 2003/0213594 A1 | 11/2003 | Wellington et al. ........ 166/272.1 |
| 2004/0020642 A1 | 2/2004 | Vinegar et al. |
| 2004/0140095 A1 | 7/2004 | Vinegar et al. |
| 2004/0198611 A1 | 10/2004 | Atkinson |
| 2004/0211557 A1 | 10/2004 | Cole et al. |
| 2005/0051327 A1 | 3/2005 | Vinegar et al. |
| 2005/0252656 A1 | 11/2005 | Maguire |
| 2005/0252832 A1 | 11/2005 | Doyle et al. .................. 208/390 |
| 2005/0252833 A1 | 11/2005 | Doyle et al. .................. 208/390 |
| 2005/0269077 A1 | 12/2005 | Sandberg |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0213657 A1 | 9/2006 | Berchenko et al. |
| 2007/0000662 A1 | 1/2007 | Symington et al. |
| 2007/0023186 A1 | 2/2007 | Kaminsky et al. |
| 2007/0045265 A1 | 3/2007 | McKinzie ..................... 219/207 |
| 2007/0045267 A1 | 3/2007 | Vinegar et al. |
| 2007/0084418 A1 | 4/2007 | Gurevich |
| 2007/0095537 A1 | 5/2007 | Vinegar |
| 2007/0102359 A1 | 5/2007 | Lombardi et al. |
| 2007/0131415 A1 | 6/2007 | Vinegar et al. |
| 2007/0144732 A1 | 6/2007 | Kim et al. |
| 2007/0209799 A1 | 9/2007 | Vinegar et al. |
| 2007/0246994 A1 | 10/2007 | Kaminsky et al. ................. 299/3 |
| 2008/0087420 A1 | 4/2008 | Kaminsky et al. |
| 2008/0087421 A1 | 4/2008 | Kaminsky |
| 2008/0087426 A1 | 4/2008 | Kaminsky |
| 2008/0087427 A1 | 4/2008 | Kaminsky et al. |
| 2008/0087428 A1 | 4/2008 | Symington et al. |
| 2008/0173443 A1 | 7/2008 | Symington et al. |
| 2008/0185145 A1 | 8/2008 | Carney et al. |
| 2008/0207970 A1 | 8/2008 | Meurer et al. |
| 2008/0230219 A1 | 9/2008 | Kaminsky |
| 2008/0271885 A1 | 11/2008 | Kaminsky |
| 2008/0283241 A1 | 11/2008 | Kaminsky et al. |
| 2008/0289819 A1 | 11/2008 | Kaminsky et al. |
| 2008/0290719 A1 | 11/2008 | Kaminsky et al. |
| 2009/0038795 A1 | 2/2009 | Kaminsky et al. |
| 2009/0050319 A1 | 2/2009 | Kaminsky et al. |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. |
| 2009/0308608 A1 | 12/2009 | Kaminsky et al. |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1 | 4/2010 | Symington et al. |
| 2010/0218946 A1 | 9/2010 | Symington et al. |
| 2010/0282460 A1 | 11/2010 | Stone et al. |
| 2010/0319909 A1 | 12/2010 | Symington et al. |

FOREIGN PATENT DOCUMENTS

| | | |
|---|---|---|
| CA | 1288043 | 8/1991 |
| CA | 2560223 | 3/2007 |
| EP | 0387846 | 9/1990 |
| FR | 0866212 | 9/1998 |
| GB | 855408 | 11/1960 |
| GB | 1454324 | 11/1976 |
| GB | 1463444 | 2/1977 |
| GB | 1 478 880 | 7/1977 |
| GB | 1501310 | 2/1978 |
| GB | 1559948 | 1/1980 |
| GB | 1595082 | 8/1981 |
| WO | WO 82/01408 | 4/1982 |
| WO | WO 90/06480 | 6/1990 |
| WO | WO 99/67504 | 12/1999 |
| WO | WO 01/78914 | 10/2001 |
| WO | WO 01/81505 | 11/2001 |
| WO | WO 02/085821 | 10/2002 |
| WO | WO 2005/010320 | 2/2005 |
| WO | WO 2005/045192 | 5/2005 |
| WO | WO 2006/115943 | 11/2006 |
| WO | WO 2007/033371 | 3/2007 |
| WO | WO 2007/050445 | 5/2007 |
| WO | WO 2007/050479 | 5/2007 |
| WO | WO 2010/047859 | 4/2010 |

OTHER PUBLICATIONS

Boyers, H. et al. (1985) "Heat-Resistant Materials," *Metals Handbook*, Chap. 16., Amer. Soc. for Metals.

Brandt, H. et al. (1965) "Stimulating Heavy Oil Reserves With Downhole Air-Gas Burners," *World Oil*, pp. 91-95.

De Priester, C. et al. (1963) "Well Stimulation by Downhole Gas-Air Burner," *Journal of Petro. Tech.*,, pp. 1297-1302.

Fainberg, V. et al. (1998) "Integrated Oil Shale Processing Into Energy and Chemicals Using Combined-Cycle Technology," *Energy Sources*, v.20.6, Abstract, 1 page.

Holmes, A. S. et al. (1982) "Process Improves Acid Gas Separation," *Hydrocarbon Processing*, pp. 131-136.

Holmes, A. S. et al. (1983) "Pilot Tests Prove Out Cryogenic Acid-Gas/Hydrocarbon Separation Processes," *Oil & Gas Journal*, pp. 85-91.

Katz, D. L. et al. (1978) "Predicting Phase Behavior of Condensate/Crude-Oil Systems Using Methane Interaction Coefficients," *Jrnl. Petro. Tech.*, pp. 1649-1655.

Miknis, F. P. et al. (1985) "Isothermal Decomposition of Colorado Oil Shale," *U. S. Dept. Comm., Nat'l Tech. Info. Srvc.*, DOE/FE/60177-2288, 74 pgs.

Mut, S. (2005) "The Potential of Oil Shale," *Presentation at the Nat'l Academies in Washington, DC*, 11 pages.

Salomonsson, G. (1951) "The Ljunstrom In-Situ Method for Shale-Oil Recovery" *Oil Shale and Cannel Coal* (vol. 2), *Proceedings of the 2nd Oil Shale and Cannel Coal Conference*, Glasgow, Jul. 1951, pp. 260-280.

Sierra, R. et al. (2001) "Promising Progress in Field Application of Reservoir Electrical Heating Methods," *SPE Paper* 69709.

Smith, F. M. (1966) "A Down-Hole Burner—Versatile Tool for Well Heating," *25th Tech. Conf. Petro. Prod.*, Pennsylvania State Univ., pp. 275-285.

Ali, A.H.A, et al, (2003) "Watching Rocks Change-Mechanical Earth Modeling", *Oilfield Review*, pp. 22-39.

Allred, (1964) "Some Characteristic Properties of Colorado Oil Shale Which May Influence In Situ Processing," *Quarterly Colo. School Of Mines*, 1st *Symposium Oil Shale*, v.59. No. 3, pp. 47-75.

Asquith, G., et al., (2004) *Basic Well Log Analysis*, Second Ed., Chapter 1, pp. 1-20.

Ball, J.S., et al. (1949) "Composition of Colorado Shale-Oil Naphtha", *Industrial and Engineering Chemistry*, vol. 41, No. 3 pp. 581-587.
Barnes, A. L. et al. (1968) "Quarterly of the Colorado School of Mines" *Fifth Symposium on Oil Shale*, v. 63(4), Oct. 1968, pp. 827-852.
Bastow, T.P., (1998) Sedimentary Processes Involving Aromatic Hydrocarbons >>. Thesis (PhD in Applied Chemistry) Curtin University of Technology (Australia), Dec., p. 201.
Baugman, G. L. (1978) *Synthetic Fuels Data Handbook*, Second Edition, Cameron Engineers Inc.
Berry, K. L., et al. (1982) "Modified in situ retorting results of two field retorts", Gary, J. H., ed., 15th Oil Shale Symp., CSM, pp. 385-396.
Blanton, T. L. et al, (1999) "Stress Magnitudes from Logs: Effects of Tectonic Strains and Temperature", *SPE Reservoir Eval. & Eng. 2*, vol. 1, February, pp. 62-68.
Brandt, A. R., "Converting Oil Shale to Liquid Fuels: Energy Inputs and Greenhouse Gas Emissions of the Shell in Situ Conversion Process," Environ. Sci. Technol. 2008, 42, pp. 7489-7495.
Bridges, J. E., et al. (1983) "The IITRI in situ fuel recovery process", *J. Microwave Power*, v. 18, pp. 3-14.
Burnham, A. K. et al. (1983) "High-Pressure Pyrolysis of Green River Oil Shale" in Geochemistry and Chemistry of Oil Shales: ACS Symposium Series.
Burwell, E. L. et al. (1970) "Shale Oil Recovery by In-Situ Retorting—A Pilot Study" Journal of Petroleum Engr., Dec. 1970, pp. 1520-1524.
Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.
Chute, F. S., and Vermeulen, F. E., (1988) "Present and potential applications of electromagnetic heating in the in situ recovery of oil", AOSTRA J. Res., v. 4, pp. 19-33.
Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.
Cipolla, C.L., et al. (1994), "Practical Application of in-situ Stress Profiles", *Society of Petroleum Engineers*, SPE 28607, pp. 487-499.
Cook, G. L. et al. (1968) "The Composition of Green River Shale Oils" United Nations Symposium of the Development and Utilization of Oil Shale Resources, 23 pgs.
Covell, J. R., et al. (1984) "Indirect in situ retorting of oil shale using the TREE process", Gary, J. H., ed., 17th Oil Shale Symposium Proceedings, Colorado School of Mines, pp. 46-58.
Cummins, J. J. et al. (1972) "Thermal Degradation of Green River Kerogen at 150 to 350C: Rate of Product Formation, Report of Investigation 7620," US Bureau of Mines, 1972.
Day, R. L., (1998) "Solution Mining of Colorado Nahcolite, Wyoming State Geological Survey Public Information Circular 40," *Proceedings of the First International Soda Ash Conference*, V.11 (Rock Springs, Wyoming, Jun. 10-12) pp. 121-130.
DePriester, C. et al. (1963) "Well Stimulation by Downhole Gas-Air Burner," Jrnl. Petro. Tech., (Dec. 1963), pp. 1297-1302.
Domine, F. et al. (2002) "Up to What Temperature is Petroleum Stable? New Insights from a 5200 Free Radical Reactions Model", *Organic Chemistry*, 33, pp. 1487-1499.
Dougan, P. M. et al. (1981) "BX In Situ Oil Shale Project," *Colorado School of Mines; Fourteenth Oil Shale Symposium Proceedings*, 1981, pp. 118-127.
Dougan, P. M. (1979) "The BX In Situ Oil Shale Project," *Chem. Engr. Progress*, pp. 81-84.
Duncan, D. C., (1967) "Geologic Setting of Oil Shale Deposits and World Prospects," in Proceedings of the Seventh World Petroleum Congress, v.3, Elsevier Publishing, pp. 659-667.
Dunks, G. et al. (1983) "Electrochemical Studies of Molten Sodium Carbonate," Inorg. Chem., 22, pp. 2168-2177.
Dusseault, M.B. (1998) "Casing Shear: Causes, Cases, Cures", Society of Petroleum Engineers, SPE 48,864 pp. 337-349.
Dyni, J. R., (1974) "Stratigraphy and Nahcolite Resources of the Saline Facies of the Green River Formation in Northwest Colorado," in D.K. Murray (ed.), Guidebook to the Energy Resources of the *Piceance Creek Basin Colorado, Rocky Mountain Association of Geologists*, Guidebook, pp. 111-122.
Farouq Ali, S. M., (1994), "Redeeming features of in situ combustion", DOE/NIPER *Symposium on In Situ Combustion Practices-Past, Present, and Future Application*, Tulsa, OK, Apr. 21-22, No. ISC 1, p. 3-8.
Fisher, S. T. (1980) "A Comparison of Eleven Processes for Production of Energy from the Solid Fossil Fuels of North America," *SPE* 9098, pp. 1-27.
Fox, J. P, (1980) "Water-related Impacts of In-Situ Oil Shale Processing," California Univ., Berkeley, Lawrence Berkeley Lab, Chapters 6-7.
Fredrich, J. T. et al, (1996) "Three-Dimensional Geomechanical Simulation of Reservoir Compaction and Implications for Well Failures in the Belridge Diatomite", *Society of Petroleum Engineers* SPE 36698, pp. 195-210.
Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.
Fredrich, J. T. et al, (2003) "Stress Perturbations Adjacent to Salt Bodies in the Deepwater Gulf of Mexico", *Society of Petroleum Engineers* SPE 84554, pp. 1-14.
Frederiksen, S. et al, (2000) "A Numerical Dynamic Model for the Norwegian-Danish Basin", *Tectonophysics*, 343, 2001, pp. 165-183.
Freund, H. et al., (1989) "Low-Temperature Pyrolysis of Green River Kerogen", *The American Association of Petroleum Geologists Bulletin*, v. 73, No. 8 (August) pp. 1011-1017.
Gatens III, J. M. et al, (1990) "In-Situ Stress Tests and Acoustic Logs Determine Mechanical Properties and Stress Profiles in the Devonian Shales", *SPE Formation Evaluation* SPE 18523, pp. 248-254.
Garthoffner, E. H., (1998), "Combustion front and burned zone growth in successful California ISC projects", SPE 46244, pp. 1-11.
Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.
Hansen, K. S. et al, (1989) "Earth Stress Measurements in the South Belridge Oil Field, Kern County, California", *SPE Formation Evaluation*, Dec. pp. 541-549.
Hansen, K. S. et al, (1993) "Finite-Element Modeling of Depletion-Induced Reservoir Compaction and Surface Subsidence in the South Belridge Oil Field, California", SPE 26074, pp. 437-452.
Hansen, K. S. et al, (1995) "Modeling of Reservoir Compaction and Surface Subsidence at South Belridge", *SPE Production & Facilities*, Aug. pp. 134-143.
Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.
Hardy, M., et al. (2003) "Solution Mining of Nahcolite at American Soda's Yankee Gulch Project," *Mining Engineering*, Oct. 2003, pp. 23-31.
Henderson, W, et al. (1968) "Thermal Alteration as a Contributory Process to the Genesis of Petroleum", *Nature* vol. 219, pp. 1012-1016.
Hilbert, L. B. et al, (1999) "Field-Scale and Wellbore Modeling of Compaction-Induced Casing Failures", *SPE Drill. & Completion*, 14(2), Jun. pp. 92-101.
Hill, G.R. et al. (1967) "The Characteristics of a Low Temperature In Situ Shale Oil," $4^{th}$ *Symposium on Oil Shale, Quarterly of the Colorado School of Mines*, v.62(3), pp. 641-656.
Hill, G. R. et al. (1967) "Direct Production of a Low Pour Point High Gravity Shale Oil", *I&EC Product Research and Development*, 6(1), Mar. pp. 52-59.
Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.
Humphrey, J. P. (1978) "Energy from in situ processing of Antrim oil shale", *DOE Report FE-2346-29*.
Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.

Jacobs, H. R. (1983) "Analysis of the Effectiveness of Steam Retorting of Oil Shale", *AIChE Symposium Series—Heat Transfer*—Seattle 1983 pp. 373-382.

Johnson, D. J. (1966) "Decomposition Studies of Oil Shale," *University of Utah*, May 1966.

Kenter, C. J. et al, (2004) "Geomechanics and 4D: Evaluation of Reservoir Characteristics from Timeshifts in the Overburden", *Gulf Rocks 2004, 6th North America Rock Mechanics Symposium (NARMS): Rock Mechanics Across Borders and Disciplines*, Houston, Texas, Jun. 5-9, ARMA/NARMS 04-627.

Kuo, M. C. T. et al (1979) "Inorganics leaching of spent shale from modified in situ processing," J. H. Gary (ed.) *Twelfth Oil Shale Symposium Proceedings*, Colorado School of Mines, Golden CO., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Lekas, M. A. et al. (1991) "Initial evaluation of fracturing oil shale with propellants for in situ retorting—Phase 2", *DOE Report DOE/MC/11076-3064*.

Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1-6-14.

Lundquist, L. (1951) "Refining of Swedish Shale Oil", *Oil Shale Cannel Coal Conference*, vol./Issue: 2, pp. 621-627.

Marotta, A. M. et al, (2003) "Numerical Models of Tectonic Deformation at the Baltica-Avalonia Transition Zone During the Paleocene Phase of Inversion", *Tectonophysics*, 373, pp. 25-37.

Mohammed, Y.A., et al (2001) "A Mathematical Algorithm for Modeling Geomechanical Rock Properties of the Khuff and PreKhuff Reservoirs in Ghawar Field", *Society of Petroleum Engineers* SPE 68194, pp. 1-8.

Molenaar, M. M. et al, (2004) "Applying Geo-Mechanics and 4D: '4D In-Situ Stress' as a Complementary Tool for Optimizing Field Management", *Gulf Rocks 2004, 6th North America Rock Mechanics Symposium (NARMS): Rock Mechanics Across Borders and Disciplines*, Houston, Texas, Jun. 5-9, ARMA/NARMS 04-639, pp. 1-7.

Moschovidis, Z. (1989) "Interwell Communication by Concurrent Fracturing—a New Stimulation Technique", *Journ. of Canadian Petro. Tech.* 28(5), pp. 42-48.

Motzfeldt, K. (1954) "The Thermal Decomposition of Sodium Carbonate by the Effusion Method," *Jrnl. Phys. Chem.*, v. LIX, pp. 139-147.

Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Newkirk, A. E. et al. (1958) "Drying and Decomposition of Sodium Carbonate," *Anal. Chem.*, 30(5), pp. 982-984.

Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.

Nottenburg, R.N. et al. (1979) "Temperature and stress dependence of electrical and mechanical properties of Green River oil shale," *Fuel*, 58, pp. 144-148.

Nowacki, P. (ed.), (1981) *Oil Shale Technical Handbook*, Noyes Data Corp.

Pattillo, P. D. et al, (1998) "Reservoir Compaction and Seafloor Subsidence at Valhall", SPE 47274, 1998, pp. 377-386.

Pattillo, P. D. et al, (2002) "Analysis of Horizontal Casing Integrity in the Valhall Field", SPE 78204, pp. 1-10.

Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.

Peters, G., (1990) "The Beneficiation of Oil Shale by the Solution Mining of Nahcolite," *23rd Colorado School of Mines Oil Shale Symposium* (Golden, CO) pp. 142-151.

Plischke, B., (1994) "Finite Element Analysis of Compaction and Subsidence—Experience Gained from Several Chalk Fields", *Society of Petroleum Engineers*, SPE 28129, 1994, pp. 795-802.

Prats, M. et al. (1975) "The Thermal Conductivity and Diffusivity of Green River Oil Shales", *Journal of Petroleum Technology*, pp. 97-106, Jan. 1975.

Prats, M., et al. (1977) "Soluble-Salt Processes for In-Situ Recovery of Hydrocarbons from Oil Shale," *Journal of Petrol. Technol.*, pp. 1078-1088.

Rajeshwar, K. et al. (1979) "Review: Thermophysical Properties of Oil Shales", *Journal of Materials Science*, v.14, pp. 2025-2052.

Ramey, M. et al. (2004) "The History and Performance of Vertical Well Solution Mining of Nahcolite ($NaHCO_3$) in the Piceance Basin, Northwestern, Colorado, USA," *Solution Mining Research Institute: Fall 2004 Technical Meeting* (Berlin, Germany).

Reade Advanced Materials; 2006 About.com Electrical resistivity of materials. [Retrieved on Oct. 15, 2009] Retrieved from Internet: URL: http://www.reade.com/Particle%5FBriefings/elec%5Fres.html. Entire Document.

Riva, D. et al. (1998) "Suncor down under: the Stuart Oil Shale Project", Annual Meeting of the *Canadian Inst. of Mining, Metallurgy, and Petroleum*, Montreal, May 3-7.

Rupprecht, R. (1979) "Application of the Ground-Freezing Method to Penetrate a Sequence of Water-Bearing and Dry Formations—Three Construction Cases," *Engineering Geology*, 13, pp. 541-546.

Ruzicka, D.J. et al. (1987) "Modified Method Measures Bromine Number of Heavy Fuel Oils", *Oil & Gas Journal*, 85(31), Aug. 3, pp. 48-50.

Sahu, D. et al. (1988) "Effect of Benzene and Thiophene on Rate of Coke Formation During Naphtha Pyrolysis", *Canadian Journ. of Chem. Eng.*, 66, October pp. 808-816.

Sandberg, C. R. et al. (1962) "In-Situ Recovery of Oil from Oil Shale—A Review and Summary of Field and Laboratory Studies," RR62.039FR, Nov. 1962.

Siskin, M. et al. (1995) "Detailed Structural Characterization of the Organic Material in Rundel Ramsay Crossing and Green River Oil Shales," *Kluwer Academic Publishers*, pp. 143-158.

Smart, K. J. et al, (2004) "Integrated Structural Analysis and Geomechanical Modeling: an Aid to Reservoir Exploration and Development", *Gulf Rocks 2004, 6th North America Rock Mechanics Symposium (NARMS): Rock Mechanics Across Borders and Disciplines*, Houston, Texas, Jun. 5-9, ARMA/NARMS 04-470.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stevens, A. L., and Zahradnik, R. L. (1983) "Results from the simultaneous processing of modified in situ retorts 7& 8", Gary, J. H., ed., *16th Oil Shale Symp.*, CSM, p. 267-280.

Stoss, K. et al. (1979) "Uses and Limitations of Ground Freezing With Liquid Nitrogen," *Engineering Geology*, 13, pp. 485-494.

Symington, W.A., et al (2006) ExxonMobil's electrofrac process for in situ oil shale conversion *26th Oil Shale Symposium*, Colorado School of Mines.

Syunyaev, Z.I. et al. (1965) "Change in the Resistivity of Petroleum Coke on Calcination," Chemistry and Technology of Fuels and Oils, 1(4), pp. 292-295.

Templeton, C. C. (1978) "Pressure-Temperature Relationship for Decomposition of Sodium Bicarbonate from 200 to 600° F.," *J. of Chem. And Eng. Data*, 23(1), pp. 7-8.

Thomas, A. M. (1963) "Thermal Decomposition of Sodium Carbonate Solutions," *J. of Chem. And Eng. Data*, 8(1), pp. 51-54.

Thomas, G. W. (1964) "A Simplified Model of Conduction Heating in Systems of Limited Permeability," *Soc.Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. Et al. (1967) "Thermal Conductivity and Thermal Diffusivity of Green River Oil Shale," *Thermal Conductivity: Proceedings of the Seventh Conference (Nov. 13-16, 1967)*, NBS Special Publication 302, pp. 529-535, 1968.

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

Tisot, P. R. et al. (1971) "Structural Deformation of Green River Oil Shale as It Relates to In Situ Retorting," *US Bureau of Mines Report of Investigations* 7576, 1971.

Tisot, P. R. (1975) "Structural Response of Propped Fractures in Green River Oil Shale as It Relates to Underground Retorting," *US Bureau of Mines Report of Investigations 8021*.

Tissot, B. P., and Welte, D. H. (1984) *Petroleum Formation and Occurrence*, New York, Springer-Verlag, p. 160-174, 175-198 and 254-266.

Tissot, B. P., and Welte, D. H. (1984) *Petroleum Formation and Occurrence*, New York, Springer-Verlag, p. 267-289 and 470-492.

Turta, A., (1994), "In situ combustion—from pilot to commercial application", *DOE/NIPER Symposium on In Situ Combustion Practices-Past, Present, and Future Application*, Tulsa, OK, Apr. 21-22, No. ISC 3, p. 15-39.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Tzanco, E. T., et al. (1990), "Laboratory Combustion Behavior of Countess B Light Oil", *Petroleum Soc. of CIM and SPE*, Calgary, Jun. 10-13, No. CIM/SPE 90-63, p. 63.1-63.16.

Veatch, Jr. R.W. and Martinez, S.J., et al. (1990) "Hydraulic Fracturing: Reprint Series No. 28", *Soc. of Petroleum Engineers* SPE 14085, Part I, Overview.

Warpinski, N.R., (1989) "Elastic and Viscoelastic Calculations of Stresses in Sedimentary Basins", *SPE Formation Evaluation*, vol. 4, pp. 522-530.

Yen, T. F. et al. (1976) *Oil Shale*, Amsterdam, Elsevier, p. 216-267.

Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.

Oil & Gas Journal, 1998, "Aussie oil shale project moves to Stage 2", Oct. 26, p. 42.

"Encyclopedia of Chemical Technology" (4$^{th}$ ed.), *Alkali and Chlorine Products*, pp. 1025-1039 (1998).

EP Search Report dated Dec. 29, 2003 (RS 110243, Corresponding to US Pat 7,331,385).

EP Search Report dated Mar. 17, 2004 (RS 110686, Corresponding to U.S. Patent 7,441,603).

EP Search Report, Supplementary dated Apr. 10, 2007 (EP 04 77 9878 Corresponding to U.S. Patent 7,441,603).

EP Search Report dated Apr. 29, 2005 (RS 112183, Corresponding to U.S. Appl. No. 11/250,804, Published as US 2006/0100837 on May 11, 2008).

EP Search Report dated Jun. 2, 2006 (RS113865, corresponding to U.S. Appl. No. 11/726,651).

EP Search Report dated Feb. 16, 2007 (RS 114808, Corresponding to U.S. Appl. No. 11/973,746, Published as US 2008/0087420 on May 17, 2008).

EP Search Report dated Feb. 16, 2007 (RS 114804, Corresponding to U.S. Appl. No. 11/973,750, Published as US 2008/0087427 on Apr. 17, 2008).

EP Search Report dated Mar. 21, 2007 (RS 114890, Corresponding to U.S. Patent 7,516,787).

EP Search Report dated Feb. 16, 2007 (RS 114807, Corresponding to U.S. Patent 7,669,657).

EP Search Report dated Nov. 13, 2007 (RS 115479, Corresponding to U.S. Appl. No. 12/148,414).

EP Search Report dated Aug. 29, 2007 (No. RS115553, Corresponding to U.S. Appl. No. 12/148,388).

EP Search Report dated Jul. 4, 2007 (RS 115341 Corresponding to U.S. Appl. No. 12/074,899).

EP Search Report dated Jul. 5, 2007 (RS 115432 Corresponding to U.S. Appl. No. 12/075,087).

EP Search Report dated Mar. 12, 2009 (EP 08 00 3956,-Corresponding to U.S. Appl. No. 12/271,521).

EP Search Report dated Aug. 29, 2007 (RS 1155554, Corresponding to U.S. Appl. No. 12/154,238).

EP Search Report dated Aug. 28, 2007 (RS 1155555, Corresponding to U.S. Appl. No. 12/154,256).

International Search Report for PCT/US01/09247 Jun. 20, 2001.
International Search Report for PCT/US04/11508, Jan. 5, 2005.
International Search Report for PCT/US08/88045, Feb. 12, 2009.
International Search Report for PCT/US04/24947 Mar. 10, 2005.
International Search Report for PCT/US07/07133, Jan. 4, 2008.
International Search Report for PCT/US07/21673 Jun. 24, 2008.
International Search Report for PCT/US07/21668 Apr. 29, 2008.
International Search Report for PCT/US07/21666 Apr. 4, 2008.
International Search Report for PCT/US07/21669, Apr. 29, 2008.
International Search Report for PCT/US07/21660 Apr. 4, 2008.
International Search Report for PCT/US07/021968, May 14, 2008.
International Search Report for PCT/US07/021968, May 21, 2008.
International Search Report for PCT/US08/005008, Aug. 29, 2008.
International Search Report for PCT/US08/05056, Aug. 25, 2008.
International Search Report for PCT/US/08/003069, Jun. 25, 2008.
International Search Report for PCT/US08/003043, Jul. 2, 2008.
International Search Report for PCT/US08/083815, Mar. 20, 2009.
International Search Report for PCT/US08/006462 Sep. 22, 2008.
International Search Report for PCT/US08/006463 Aug. 22, 2008.
International Search Report for PCT/US07/21645 Apr. 21, 2008.
International Search Report for PCT/US09/037419 Jul. 7, 2009.
International Search Report for PCT/US09/055403, Oct. 22, 2009.
International Search Report for PCT/US10/20342 Feb. 26, 2010.
International Search Report for PCT/US10/031910 Aug. 3, 2010.
International Search Report for PCT/US10/057204 Jan. 27, 2011.
U.S. Appl. No. 12/630,636 Office Action mailed Oct. 27, 2010.
U.S. Appl. No. 11/250,804 Office Action mailed Oct. 16, 2008.
U.S. Appl. No. 11/250,804 Office Action mailed Jun. 11, 2009.
U.S. Appl. No. 11/973,746 Office Action mailed Jun. 25, 2009.
U.S. Appl. No. 11/973,746 Office Action mailed Nov. 8, 2010.
U.S. Appl. No. 11/973,750 Office Action mailed Dec. 4, 2008.
U.S. Appl. No. 11/973,750 Office Action mailed Jul. 22, 2009.
U.S. Appl. No. 12/638,630 Office Action mailed Mar. 16, 2011.
U.S. Appl. No. 12/712,904 Office Action mailed Nov. 10, 2010.
U.S. Appl. No. 12/148,414 Office Action mailed May 19, 2010.
U.S. Appl. No. 12/148,414 Office Action mailed Oct. 22, 2010.
U.S. Appl. No. 12/148,388 Office Action mailed Jun. 10, 2010.
U.S. Appl. No. 12/148,388 Office Action mailed Nov. 19, 2010.
U.S. Appl. No. 12/074,899 Office Action mailed Dec. 16, 2009.
U.S. Appl. No. 12/074,899 Office Action mailed Jul. 26, 2010.
U.S. Appl. No. 12/074,899 Office Action mailed Jan. 4, 2011.
U.S. Appl. No. 12/075,087 Office Action mailed Oct. 12, 2010.
U.S. Appl. No. 12/075,087 Office Action mailed Mar. 7, 2011.
U.S. Appl. No. 12/271,521 Office Action mailed Nov. 2, 2010.
U.S. Appl. No. 11/973,898 Office Action mailed May 6, 2010.
U.S. Appl. No. 11/973,898 Office Action mailed Dec. 20, 2010.
U.S. Appl. No. 12/405,901 Office Action mailed Feb. 14, 2011.
U.S. Appl. No. 12/154,238 Office Action mailed Apr. 22, 2011.
U.S. Appl. No. 12/154,256 Office Action mailed May 9, 2011.
U.S. Appl. No. 12/148,414 Office Action mailed May 17, 2011.
U.S. Appl. No. 12/443,680 Office Action mailed Jun. 23, 2011.
U.S. Pat No. 6,918,444—Office Action mailed Sep. 16, 2004.
US Pat No. 7,331,385—Office Action mailed Jul. 12, 2007.
U.S. Pat No. 7,631,691—Office Action mailed Mar. 18, 2009.
U.S. Pat No. 7,441,603—Office Action mailed Feb. 25, 2008.
U.S. Pat No. 7,857,056—Office Action mailed Mar. 19, 2010.
US Pat No. 7,516,785—Office Action mailed Apr. 2, 2008.
US Pat No. 7,516,787—Office Action mailed Apr. 3, 2008.
U.S. Pat No. 7,647,972—Office Action mailed May 19, 2009.
U.S. Pat No. 7,647,971—Office Action mailed May 21, 2009.
U.S. Pat No. 7,669,657—Office Action mailed Jun. 26, 2008.
U.S. Pat No. 7,669,657—Office Action mailed Dec. 15, 2008.
U.S. Pat No. 7,669,657—Office Action mailed Sep. 15, 2009.
US Pat No. 7,644,993—Office Action mailed Jun. 24, 2009.

\* cited by examiner

UTILIZATION OF LOW BTU GAS GENERATED DURING IN SITU HEATING OF ORGANIC-RICH ROCK

CROSS-REFERENCE TO RELATED APPLICATIONS

This application claims the benefit of U.S. Provisional Patent Application Ser. No. 60/931,820, filed May 25, 2007. That application is titled "Utilization of Low BTU Gas Generated During In Situ Heating of Organic-Rich Rock."

This application is related to concurrently filed, and commonly assigned U.S. patent application Ser. No. 12/154,238 entitled "A Process for Producing Hydrocarbon Fluids Combining In Situ Heating, a Power Plant and a Gas Plant", published as U.S. Patent Application Publication No. 2008/0290719 and incorporated by reference herein, which claims the benefit of U.S. Provisional Patent Application Ser. No. 60/931,940, filed May 25, 2007.

BACKGROUND OF THE INVENTION

1. Field of the Invention

The present invention relates to the field of hydrocarbon recovery from subsurface formations. More specifically, the present invention relates to in situ recovery of hydrocarbon fluids from organic-rich rock formations, including, for example, oil shale formations, coal formations and tar sands formations.

2. Background of the Invention

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids are mobile within the rock matrix, while the carbonaceous coke remains essentially immobile.

Oil shale formations are found in various areas worldwide, including the United States. Oil shale formations tend to reside at relatively shallow depths. In the United States, oil shale is most notably found in Wyoming, Colorado, and Utah. These formations are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well such as Australia, Brazil, China, Estonia, France, Russia, South Africa, Spain, and Sweden. However, the practice has been mostly discontinued in recent years because it proved to be uneconomical or because of environmental constraints on spent shale disposal. (See T. F. Yen, and G. V. Chilingarian, "Oil Shale," Amsterdam, Elsevier, p. 292.) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ to distill and produce hydrocarbons. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as heat injection wells. The electrical heating elements in the heat injection wells were placed within sand or cement or other heat-conductive material to permit the heat injection well to transmit heat into the surrounding oil shale while preventing the inflow of fluid. According to Ljungstrom, the "aggregate" was heated to between 500° and 1,000° C. in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "The Ljungstrom In Situ Method for Shale-Oil Recovery," 2.sup.nd Oil Shale and Cannel Coal Conference, v. 2, Glasgow, Scotland, Institute of Petroleum, London, p. 260-280(1951).)

Additional in situ methods have been proposed. These methods generally involve the injection of heat and/or solvent into a subsurface oil shale. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W. Hoover, et al.), heat fracturing (see U.S. Pat. No. 3,284,281 to R. W. Thomas), and steam fracturing (see U.S. Pat. No. 2,952,450 to H. Purre).

In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]contrary to the implications of . . . prior teachings and beliefs . . . the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's application. The '118 patent proposed controlling the rate of heat conduction within the rock surrounding each heat injection well to provide a uniform heat front.

Additional history behind oil shale retorting and shale oil recovery can be found in co-owned patent publication WO 2005/010320 entitled "Methods of Treating a Subterranean Formation to Convert Organic Matter into Producible Hydrocarbons," and in patent publication WO 2005/045192 entitled "Hydrocarbon Recovery from Impermeable Oil Shales."

A need exists for improved processes for the production of shale oil. In addition, a need exists for improved methods of producing shale oil with improved properties. Further, a need exists for a process that is able to utilize low quality gas and/or gas with a changing quality over time that is produced from in situ heating. Further, a need exists for a process that is able to generate electricity from a low quality gas and/or gas with a changing quality over time that is produced from in situ heating.

SUMMARY OF THE INVENTION

In one embodiment, the invention includes a method for utilizing gas produced from an in situ conversion process. The method includes heating an organic-rich rock formation in situ and producing a production fluid from the organic-rich rock formation, where the production fluid is at least partially generated as a result of pyrolysis of formation hydrocarbons located in the organic-rich rock formation. The production fluid may include hydrocarbon fluids. The method may further include obtaining a gas stream from the production fluid, where the gas stream includes a combustible hydrocarbon fluid. The method may further include separating the gas stream into a first composition gas stream and a second composition gas stream, where the composition of the first composition gas stream is maintained in a substantially constant condition and the first composition gas stream has a lower heating value less than 800 BTU/SCF. The method may further include passing the first composition gas stream through a first gas turbine to form a first gas turbine exhaust stream, where the first gas turbine is configured to provide energy to a first electrical generator.

In one embodiment, the invention includes a method for utilizing gas produced from an in situ conversion process. The method includes heating an organic-rich rock formation in situ and producing a production fluid from the organic-rich rock formation, where the production fluid is at least partially generated as a result of pyrolysis of formation hydrocarbons located in the organic-rich rock formation. The production fluid may include hydrocarbon fluids. The method may include obtaining a gas stream from the production fluid, where the gas stream includes a combustible hydrocarbon fluid and the Wobbe Index of the gas stream changes over time. The method may further include separating the gas stream into a first composition gas stream and a second composition gas stream, where the Wobbe Index of the first composition gas stream is maintained substantially constant and the first composition gas stream has a lower heating value less than 800 BTU/SCF. The method may further include passing the first composition gas stream through a first gas turbine to form a first gas turbine exhaust stream, the first gas turbine being configured to provide energy to a first electrical generator.

In one embodiment, the invention includes a method for producing a hydrocarbon fluid. The method includes heating an organic-rich rock formation in situ and producing a production fluid from the organic-rich rock formation, where the production fluid is at least partially generated as a result of pyrolysis of formation hydrocarbons located in the organic-rich rock formation. The production fluid may include hydrocarbon fluids. The method may further include obtaining a gas stream from the production fluid, where the gas stream includes a combustible hydrocarbon fluid. The method may further include separating the gas stream into a first composition gas stream and a second composition gas stream, where the composition of the first composition gas stream is maintained in a substantially constant condition and the first composition gas stream has a lower heating value less than 800 BTU/SCF. The method may further include passing the first composition gas stream through a first gas turbine to form a first gas turbine exhaust stream, where the first gas turbine is configured to provide energy to a first electrical generator.

BRIEF DESCRIPTION OF THE DRAWINGS

So that the manner in which the features of the present invention can be better understood, certain drawings, graphs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
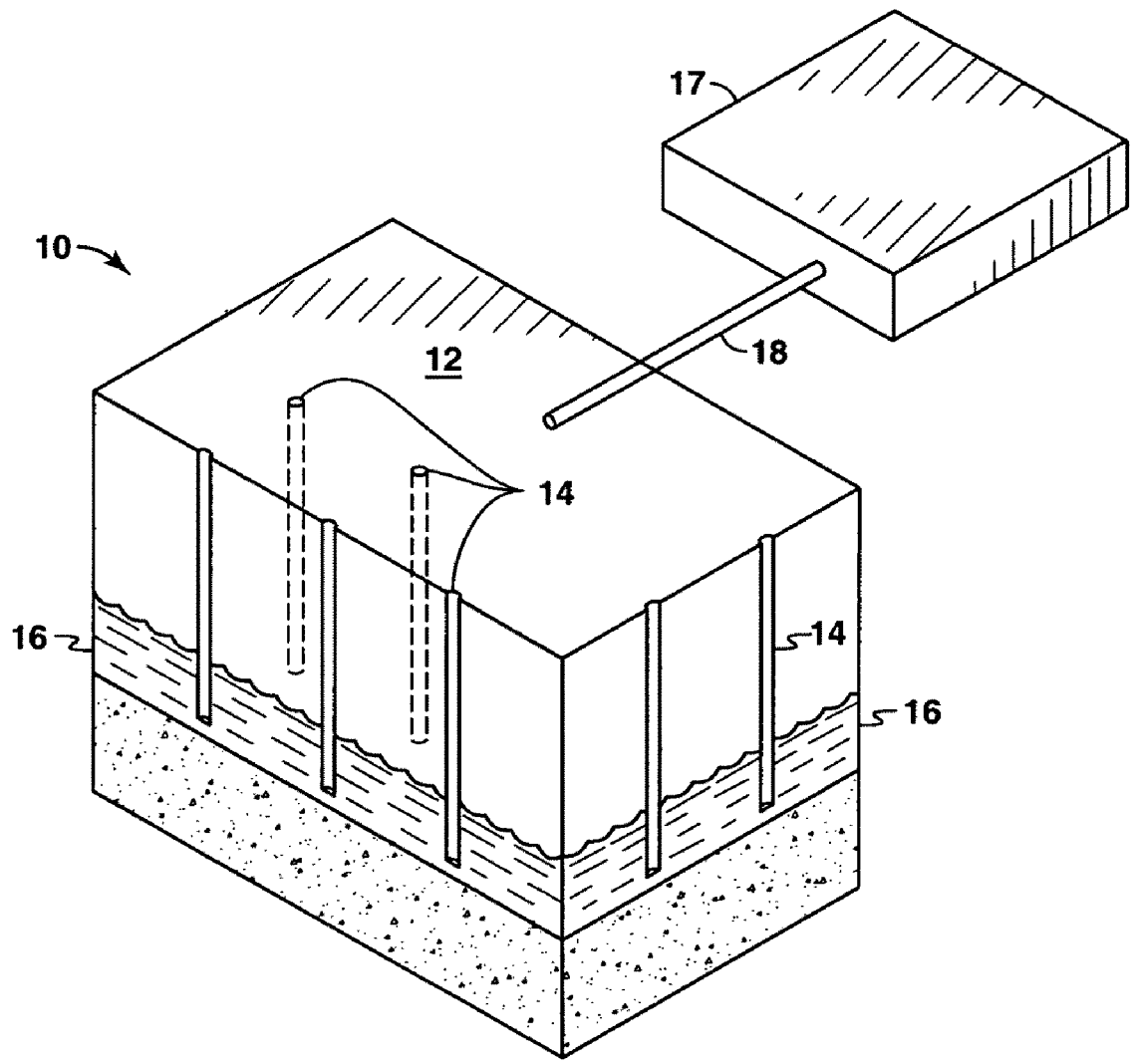
FIG. 1 is a cross-sectional isometric view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites.

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are both soluble or moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

DESCRIPTION OF SPECIFIC EMBODIMENTS

The inventions are described herein in connection with certain specific embodiments. However, to the extent that the following detailed description is specific to a particular embodiment or a particular use, such is intended to be illustrative only and is not to be construed as limiting the scope of the invention.

As discussed herein, some embodiments of the invention include or have application related to an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the invention the natural resources may include hydrocarbon fluids, including, for example, products of the pyrolysis of formation hydrocarbons such as shale oil. In some embodiments of the invention the natural resources may also include water-soluble minerals, including, for example, nahcolite (sodium bicarbonate, or $2NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen) and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas, and water produced from the heated formation. The fluid processing facility 17 may further include equipment for separating out dissolved water-soluble minerals and/or migratory contaminant species, including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
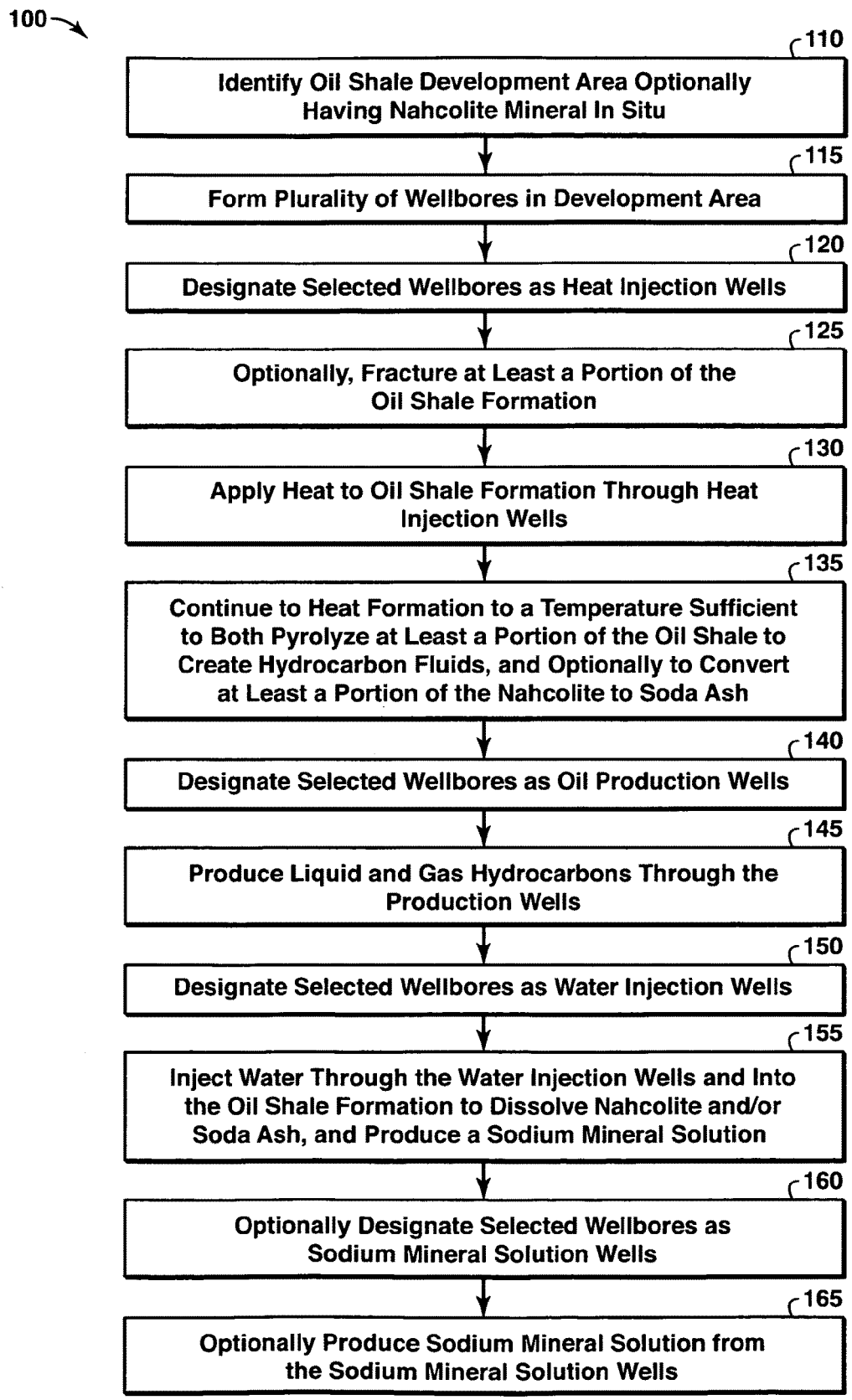
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness, and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and hydrocarbon fluid generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years. The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naptha. Generated gases include light alkanes, light alkenes, $H_2$, $CO_2$, CO, and $NH_3$.

Conversion of the oil shale will create permeability in the oil shale section in rocks that were originally impermeable. Preferably, the heating and conversion processes of boxes 130 and 135, occur over a lengthy period of time. In one aspect, the heating period is from three months to four or more years. Also as an optional part of box 135, the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability of portions of the formation are increased via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability in portions of the formation and/or be used to provide a planar source for heating.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (Box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
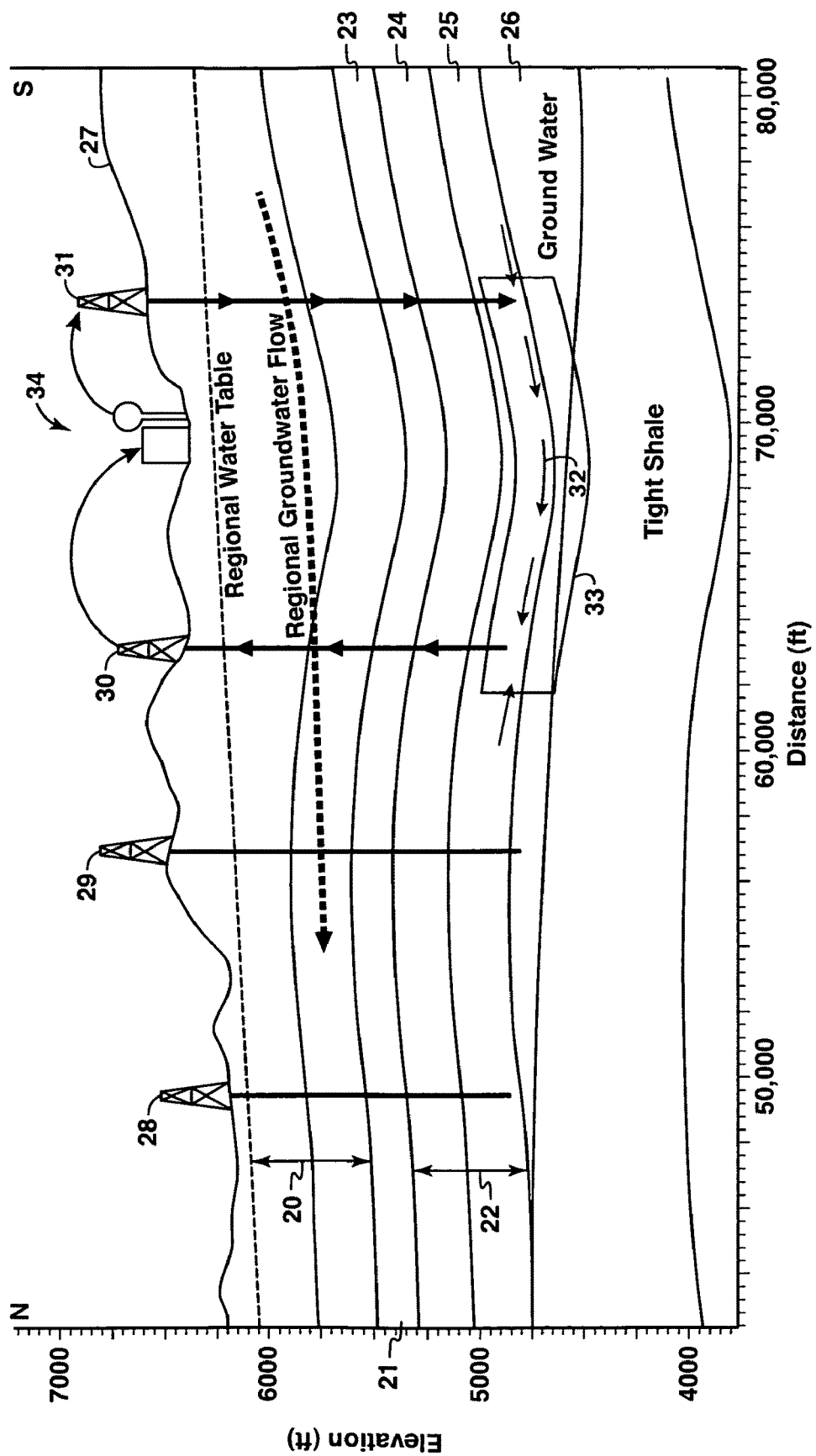
FIG. 3 is a cross-sectional side view of an illustrative oil shale formation that is within or connected to groundwater aquifers and a formation leaching operation.

FIG. 3 is a cross-sectional view of an illustrative oil shale formation that is within or connected to ground water aquifers and a formation leaching operation. Four separate oil shale formation zones are depicted (23, 24, 25 and 26) within the oil shale formation. The water aquifers are below the ground surface 27, and are categorized as an upper aquifer 20 and a lower aquifer 22. Intermediate the upper and lower aquifers is an aquitard 21. It can be seen that certain zones of the formation are both aquifers or aquitards and oil shale zones. A plurality of wells (28, 29, 30 and 31) is shown traversing vertically downward through the aquifers. One of the wells is serving as a water injection well 31, while another is serving as a water production well 30. In this way, water is circulated 32 through at least the lower aquifer 22.

FIG. 3 shows diagrammatically the water circulation 32 through an oil shale volume that was heated 33, that resides within or is connected to an aquifer 22, and from which hydrocarbon fluids were previously recovered. Introduction of water via the water injection well 31 forces water into the previously heated oil shale 33 and water-soluble minerals and migratory contaminants species are swept to the water production well 30. The water may then processed in a facility 34 wherein the water-soluble minerals (e.g. nahcolite or soda ash) and the migratory contaminants may be substantially removed from the water stream. Water is then reinjected into the oil shale volume 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water. It is understood that there may be numerous water injection and water production wells in an actual oil shale development. Moreover, the system may include monitoring wells (28 and 29) which can be utilized during the oil shale heating phase, the shale oil production phase, the leaching phase, or during any combination of these phases to monitor for migratory contaminant species and/or water-soluble minerals.

In order to expand upon various features and methods for shale oil development, certain sections are specifically entitled below.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 m, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich formation hydrocarbon layer. Of course, producing hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

In producing hydrocarbon fluids from an oil shale field, it may be desirable to control the migration of pyrolyzed fluids. In some instances, this includes the use of injection wells, particularly around the periphery of the field. Such wells may inject water, steam, $CO_2$, heated methane, or other fluids to drive cracked kerogen fluids inwardly towards production wells. In some embodiments, physical barriers may be placed around the area of the organic-rich rock formation under development. One example of a physical barrier involves the creation of freeze walls. Freeze walls are formed by circulating refrigerant through peripheral wells to substantially reduce the temperature of the rock formation. This, in turn, prevents the pyrolyzation of kerogen present at the periphery of the field and the outward migration of oil and gas. Freeze walls will also cause native water in the formation along the periphery to freeze.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. Nos. 6,880,633 and 7,032,660. Shell's '660 patent uses subsurface freezing to protect against groundwater flow and groundwater contamination during in situ shale oil production. Additional patents that disclose the use of so-called freeze walls are U.S. Pat. Nos. 3,528,252, 3,943,722, 3,729,965, 4,358,222, 4,607,488, and WO Pat. No. 98/996,480.

Another example of a physical barrier that may be used to limit fluid flow into or out of an oil shale field is the creation of grout walls. Grout walls are formed by injecting cement into the formation to fill permeable pathways. In the context of an oil shale field, cement would be injected along the periphery of the field. This prevents the movement of pyrolyzed fluids out of the field under development, and the movement of water from adjacent aquifers into the field.

As noted above, several different types of wells may be used in the development of an organic-rich rock formation, including, for example, an oil shale field. For example, the heating of the organic-rich rock formation may be accomplished through the use of heater wells. The heater wells may include, for example, electrical resistance heating elements. The production of hydrocarbon fluids from the formation may be accomplished through the use of wells completed for the production of fluids. The injection of an aqueous fluid may be accomplished through the use of injection wells. Finally, the production of an aqueous solution may be accomplished through use of solution production wells.

The different wells listed above may be used for more than one purpose. Stated another way, wells initially completed for one purpose may later be used for another purpose, thereby lowering project costs and/or decreasing the time required to perform certain tasks. For example, one or more of the production wells may also be used as injection wells for later injecting water into the organic-rich rock formation. Alternatively, one or more of the production wells may also be used as solution production wells for later producing an aqueous solution from the organic-rich rock formation.

In other aspects, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.). Finally, monitoring wells may later be used for other purposes such as water production.

The wellbores for the various wells may be located in relatively close proximity, being from 10 feet to up to 300 feet in separation. Alternatively, the wellbores may be spaced from 30 to 200 feet or 50 to 100 feet. Typically, the wellbores are also completed at shallow depths, being from 200 to 5,000 feet at total depth. Alternatively, the wellbores may be completed at depths from 1,000 to 4,000 feet, or 1,500 to 3,500 feet. In some embodiments, the oil shale formation targeted for in situ retorting is at a depth greater than 200 feet below the surface. In alternative embodiments, the oil shale formation targeted for in situ retorting is at a depth greater than 500, 1,000, or 1,500 feet below the surface. In alternative embodiments, the oil shale formation targeted for in situ retorting is at a depth between 200 and 5,000 feet, alternatively between 1,000 and 4,000 feet, 1,200 and 3,700 feet, or 1,500 and 3,500 feet below the surface.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. The pattern may also be a line drive pattern. A line drive pattern generally includes a first linear array of heater wells, a second linear array of heater wells, and a production well or a linear array of production wells between the first and second linear array of heater wells. Interspersed among the heater wells are typically one or more production wells. The injection wells may likewise be disposed within a repetitive pattern of units, which may be similar to or different from that used for the heater wells.

One method to reduce the number of wells is to use a single well as both a heater well and a production well. Reduction of the number of wells by using single wells for sequential purposes can reduce project costs. One or more monitoring wells may be disposed at selected points in the field. The monitoring wells may be configured with one or more devices that measure a temperature, a pressure, and/or a property of a fluid in the wellbore. In some instances, a heater well may also serve as a monitoring well, or otherwise be instrumented.

Another method for reducing the number of heater wells is to use well patterns. Regular patterns of heater wells equidistantly spaced from a production well may be used. The patterns may form equilateral triangular arrays, hexagonal arrays, or other array patterns. The arrays of heater wells may be disposed such that a distance between each heater well is less than about 70 feet (21 m). A portion of the formation may be heated with heater wells disposed substantially parallel to a boundary of the hydrocarbon formation.

In alternative embodiments, the array of heater wells may be disposed such that a distance between each heater well may be less than about 100 feet, or 50 feet, or 30 feet. Regardless of the arrangement of or distance between the heater wells, in certain embodiments, a ratio of heater wells to production wells disposed within a organic-rich rock formation may be greater than about 5, 8, 10, 20, or more.

In one embodiment, individual production wells are surrounded by at most one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. Flow and reservoir simulations may be employed to assess the pathways and temperature history of hydrocarbon fluids generated in situ as they migrate from their points of origin to production wells.

Figure 4:
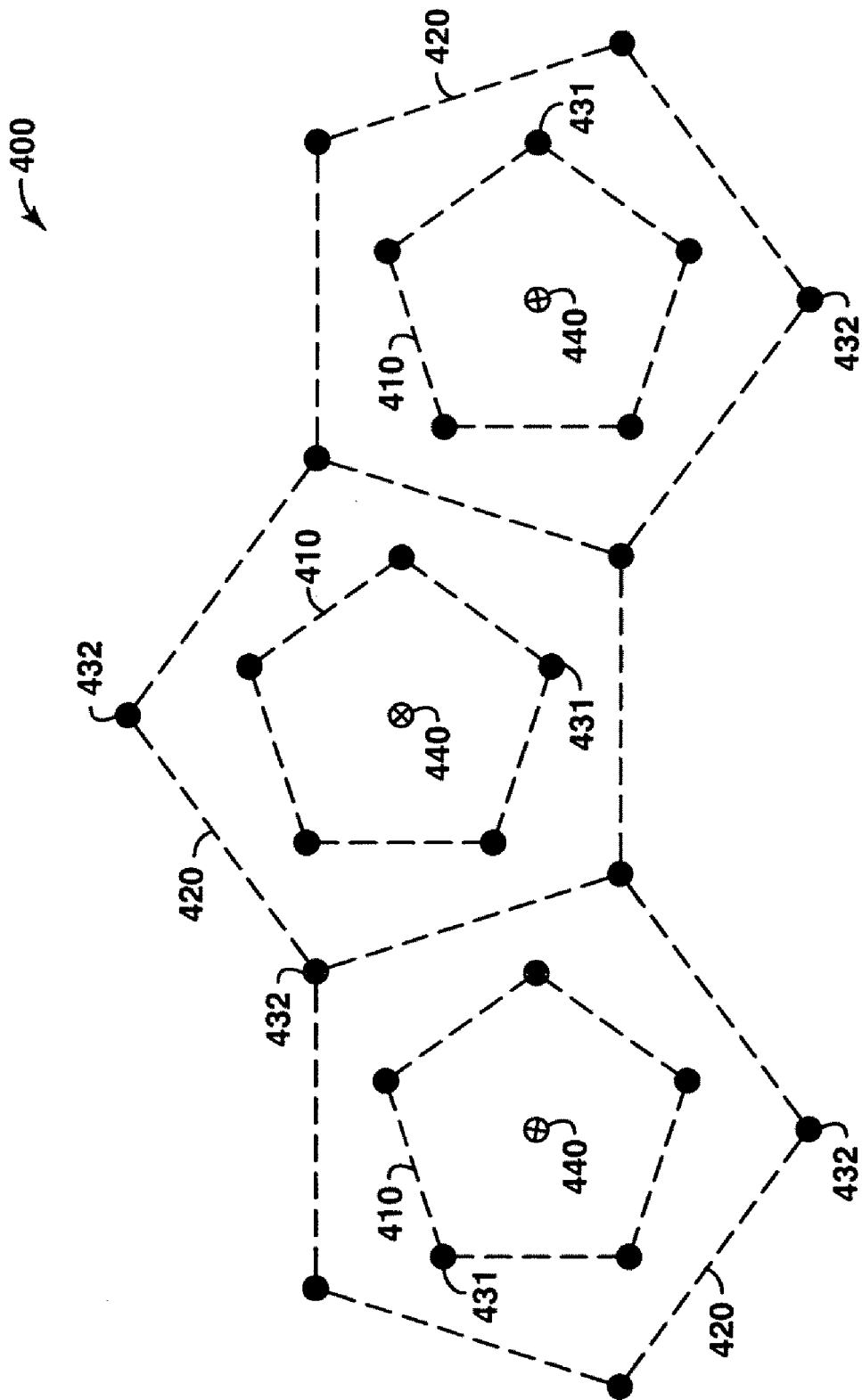
FIG. 4 is a plan view of an illustrative heater well pattern, around a production well. Two layers of heater wells are shown.

FIG. 4 provides a plan view of an illustrative heater well arrangement using more than one layer of heater wells. The heater well arrangement is used in connection with the production of hydrocarbons from a shale oil development area 400. In FIG. 4, the heater well arrangement employs a first layer of heater wells 410, surrounded by a second layer of heater wells 420. The heater wells in the first layer 410 are referenced at 431, while the heater wells in the second layer 420 are referenced at 432.

A production well 440 is shown central to the well layers 410 and 420. It is noted that the heater wells 432 in the second layer 420 of wells are offset from the heater wells 431 in the first layer 410 of wells, relative to the production well 440. The purpose is to provide a flowpath for converted hydrocarbons that minimizes travel near a heater well in the first layer 410 of heater wells. This, in turn, minimizes secondary cracking of hydrocarbons converted from kerogen as hydrocarbons flow from the second layer of wells 420 to the production wells 440.

In the illustrative arrangement of FIG. 4, the first layer 410 and the second layer 420 each defines a 5-spot pattern. However, it is understood that other patterns may be employed, such as 3-spot or 6-spot patterns. In any instance, a plurality of heater wells 431 comprising a first layer of heater wells 410 is placed around a production well 440, with a second plurality of heater wells 432 comprising a second layer of heater wells 420 placed around the first layer 410.

The heater wells in the two layers also may be arranged such that the majority of hydrocarbons generated by heat from each heater well 432 in the second layer 420 are able to migrate to a production well 440 without passing substantially near a heater well 431 in the first layer 410. The heater wells 431, 432 in the two layers 410, 420 further may be arranged such that the majority of hydrocarbons generated by heat from each heater well 432 in the second layer 420 are able to migrate to the production well 440 without passing through a zone of substantially increasing formation temperature.

One method to reduce the number of heater wells is to use well patterns that are elongated in a particular direction, particularly in the direction of most efficient thermal conductivity. Heat convection may be affected by various factors such as bedding planes and stresses within the formation. For instance, heat convection may be more efficient in the direction perpendicular to the least horizontal principal stress on the formation. In some instances, heat convection may be more efficient in the direction parallel to the least horizontal principal stress.

In connection with the development of an oil shale field, it may be desirable that the progression of heat through the subsurface in accordance with steps 130 and 135 be uniform. However, for various reasons the heating and maturation of formation hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven fluid maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated. One method may include generating heat by burning a fuel external to or within a subsurface formation. For example, heat may be supplied by surface burners or downhole burners or by circulating hot fluids (such as methane gas or naphtha) into the formation through, for example, wellbores via, for example, natural or artificial fractures. Some burners may be configured to perform flameless combustion. Alternatively, some methods may include combusting fuel within the formation such as via a natural distributed combustor, which generally refers to a heater that uses an oxidant to oxidize at least a portion of the carbon in the formation to generate heat, and wherein the oxidation takes place in a vicinity proximate to a wellbore. The present methods are not limited to the heating technique employed unless so stated in the claims.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. Nos. 1,701,884, 3,376,403, 4,626,665, 4,704,514, and 6,023,554.

A review of application of electrical heating methods for heavy oil reservoirs is given by R. Sierra and S. M. Farouq Ali, "Promising Progress in Field Application of Reservoir Electrical Heating Methods", Society of Petroleum Engineers Paper 69709, 2001.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, horizontal planes formed by horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. The WO 2005/010320 process creates an "in situ toaster" that artificially matures oil shale through the application of electric heat. Thermal conduction heats the oil shale to conversion temperatures in excess of 300° C. causing artificial maturation.

International patent publication WO 2005/045192 teaches an alternative heating means that employs the circulation of a heated fluid within an oil shale formation. In the process of WO 2005/045192 supercritical heated naphtha may be circulated through fractures in the formation. This means that the oil shale is heated by circulating a dense, hot hydrocarbon vapor through sets of closely-spaced hydraulic fractures. In one aspect, the fractures are horizontally formed and conventionally propped. Fracture temperatures of 320°-400° C. are maintained for up to five to ten years. Vaporized naptha may be the preferred heating medium due to its high volumetric heat capacity, ready availability and relatively low degradation rate at the heating temperature. In the WO 2005/045192 process, as the kerogen matures, fluid pressure will drive the generated oil to the heated fractures, where it will be produced with the cycling hydrocarbon vapor.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation, (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur.

The pyrolysis temperature range may vary depending on the types of formation hydrocarbons within the formation, the heating methodology, and the distribution of heating sources. For example, a pyrolysis temperature range may include temperatures between about 270° C. and about 900° C. Alternatively, the bulk of the target zone of the formation may be heated to between 300° to 600° C. In an alternative embodiment, a pyrolysis temperature range may include temperatures between about 270° C. to about 500° C.

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. The bulk of the target zone of the formation may be heated to between 270° to 800° C. Preferably, the bulk of the target zone of the formation is heated to between 300° to 600° C. Alternatively, the bulk of the target zone is ultimately heated to a temperature below 400° C. (752° F.).

In certain embodiments of the methods of the present invention, downhole burners may be used to heat a targeted oil shale zone. Downhole burners of various design have been discussed in the patent literature for use in oil shale and other largely solid hydrocarbon deposits. Examples include U.S. Pat. Nos. 2,887,160; 2,847,071; 2,895,555; 3,109,482; 3,225,829; 3,241,615; 3,254,721; 3,127,936; 3,095,031; 5,255,742; and 5,899,269. Downhole burners operate through the transport of a combustible fuel (typically natural gas) and an oxidizer (typically air) to a subsurface position in a wellbore. The fuel and oxidizer react downhole to generate heat. The combustion gases are removed (typically by transport to the surface, but possibly via injection into the formation). Oftentimes, downhole burners utilize pipe-in-pipe arrangements to transport fuel and oxidizer downhole, and then to remove the flue gas back up to the surface. Some downhole burners generate a flame, while others may not.

The use of downhole burners is an alternative to another form of downhole heat generation called steam generation. In downhole steam generation, a combustor in the well is used to boil water placed in the wellbore for injection into the formation. Applications of the downhole heat technology have been described in F. M. Smith, "A Down-hole burner—Versatile tool for well heating," 25$^{th}$ Technical Conference on Petroleum Production, Pennsylvania State University, pp 275-285 (Oct. 19-21, 1966); H. Brandt, W. G. Poynter, and J. D. Hummell, "Stimulating Heavy Oil Reservoirs with Downhole Air-Gas Burners," World Oil, pp. 91-95 (September 1965); and C. I. DePriester and A. J. Pantaleo, "Well Stimulation by Downhole Gas-Air Burner," Journal of Petroleum Technology, pp. 1297-1302 (December 1963).

Downhole burners have advantages over electrical heating methods due to the reduced infrastructure cost. In this respect, there is no need for an expensive electrical power plant and distribution system. Moreover, there is increased thermal efficiency because the energy losses inherently experienced during electrical power generation are avoided.

Few applications of downhole burners exist. Downhole burner design issues include temperature control and metallurgy limitations. In this respect, the flame temperature can overheat the tubular and burner hardware and cause them to fail via melting, thermal stresses, severe loss of tensile strength, or creep. Certain stainless steels, typically with high chromium content, can tolerate temperatures up to ~700° C. for extended periods. (See for example H. E. Boyer and T. L. Gall (eds.), *Metals Handbook*, "Chapter 16: Heat-Resistant Materials", American Society for Metals, (1985.) The existence of flames can cause hot spots within the burner and in the formation surrounding the burner. This is due to radiant heat transfer from the luminous portion of the flame. However, a typical gas flame can produce temperatures up to about 1,650° C. Materials of construction for the burners must be sufficient to withstand the temperatures of these hot spots. The heaters are therefore more expensive than a comparable heater without flames.

For downhole burner applications, heat transfer can occur in one of several ways. These include conduction, convection, and radiative methods. Radiative heat transfer can be particularly strong for an open flame. Additionally, the flue gases can be corrosive due to the $CO_2$ and water content. Use of refractory metals or ceramics can help solve these problems, but typically at a higher cost. Ceramic materials with acceptable strength at temperatures in excess of 900° C. are generally high alumina content ceramics. Other ceramics that may be useful include chrome oxide, zirconia oxide, and magnesium oxide based ceramics. Additionally, depending on the nature of the downhole combustion $NO_x$ generation may be significant.

Heat transfer in a pipe-in-pipe arrangement for a downhole burner can also lead to difficulties. The down going fuel and air will heat exchange with the up going hot flue gases. In a well there is minimal room for a high degree of insulation and hence significant heat transfer is typically expected. This cross heat exchange can lead to higher flame temperatures as the fuel and air become preheated. Additionally, the cross heat exchange can limit the transport of heat downstream of the burner since the hot flue gases may rapidly lose heat energy to the rising cooler flue gases.

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics. These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of the formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 5.

Figure 5:
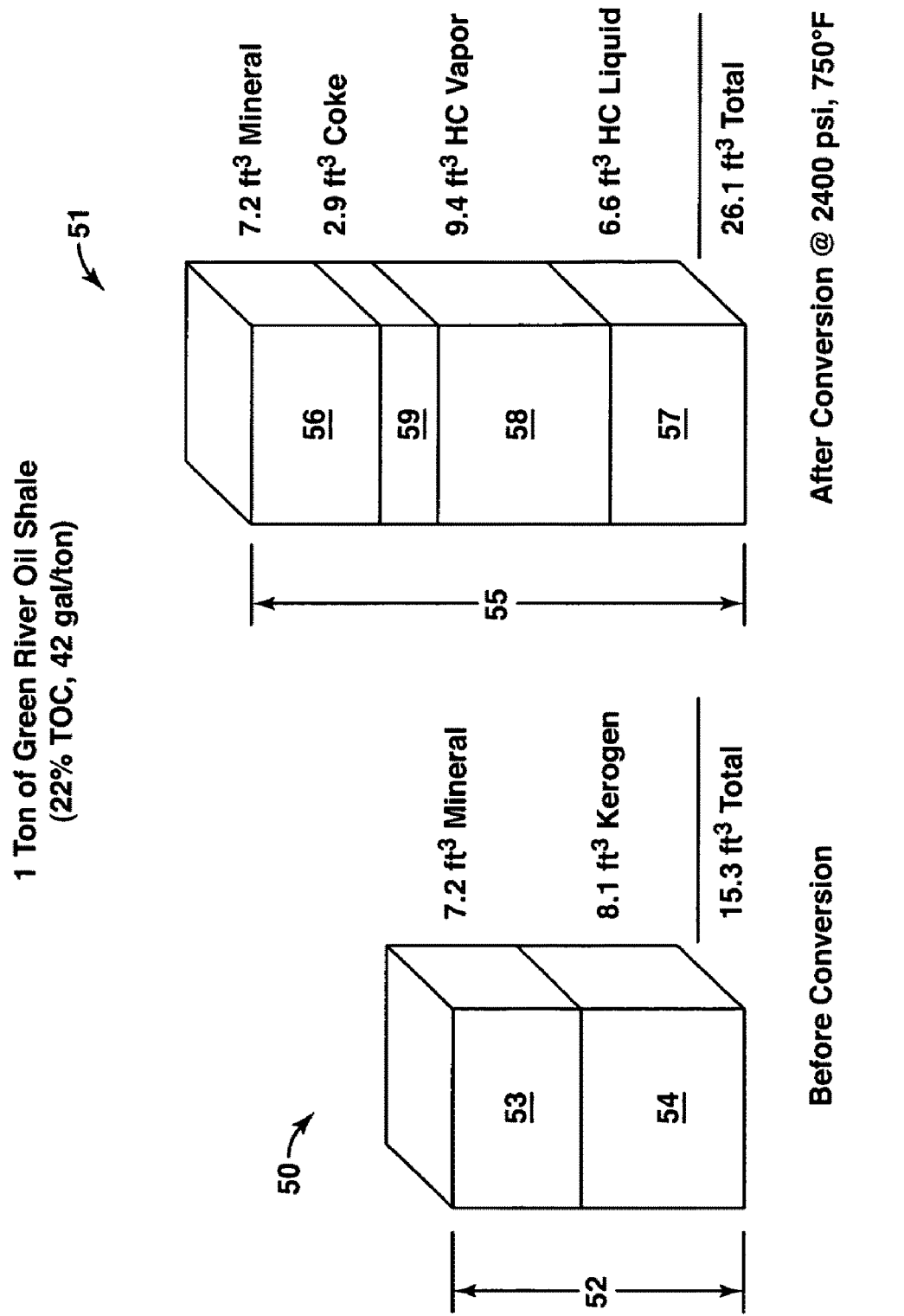
FIG. 5 is a bar chart comparing one ton of Green River oil shale before and after a simulated in situ, retorting process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 $ft^3$ of rock matrix 52 existed. This matrix comprised 7.2 $ft^3$ of mineral 53, i.e., dolomite, limestone, etc., and 8.1 $ft^3$ of kerogen 54 imbedded within the shale. As a result of the conversion the material expanded to 26.1 $ft^3$ 55. This represented 7.2 $ft^3$ of mineral 56 (the same number as before the conversion), 6.6 $ft^3$ of hydrocarbon liquid 57, 9.4 $ft^3$ of hydrocarbon vapor 58, and 2.9 $ft^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with heating the organic-rich rock formation, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In addition, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide an extended geometry for a heater well. The WO 2005/010320 patent publication describes one such method.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow.

The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties.

The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation.

Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

One embodiment of the invention includes an in situ method of producing hydrocarbon fluids with improved properties from an organic-rich rock formation. Applicants have surprisingly discovered that the quality of the hydrocarbon fluids produced from in situ heating and pyrolysis of an organic-rich rock formation may be improved by selecting sections of the organic-rich rock formation with higher lithostatic stress for in situ heating and pyrolysis.

The method may include in situ heating of a section of the organic-rich rock formation that has a high lithostatic stress to form hydrocarbon fluids with improved properties. The method may include creating the hydrocarbon fluid by pyrolysis of a solid hydrocarbon and/or a heavy hydrocarbon present in the organic-rich rock formation. Embodiments may include the hydrocarbon fluid being partially, predominantly or substantially completely created by pyrolysis of the solid hydrocarbon and/or heavy hydrocarbon present in the organic-rich rock formation. The method may include heating the section of the organic-rich rock formation by any method, including any of the methods described herein. For example, the method may include heating the section of the organic-rich rock formation by electrical resistance heating. Further, the method may include heating the section of the organic-rich rock formation through use of a heated heat transfer fluid. The method may include heating the section of the organic-rich rock formation to above 270° C. Alternatively, the method may include heating the section of the organic-rich rock formation between 270° C. and 500° C.

The method may include heating in situ a section of the organic-rich rock formation having a lithostatic stress greater than 200 psi and producing a hydrocarbon fluid from the heated section of the organic-rich rock formation. In alternative embodiments, the heated section of the organic-rich rock formation may have a lithostatic stress greater than 400 psi. In alternative embodiments, the heated section of the organic-rich rock formation may have a lithostatic stress greater than 800 psi, greater than 1,000 psi, greater than 1,200 psi, greater than 1,500 psi or greater than 2,000 psi. Applicants have found that in situ heating and pyrolysis of organic-rich rock formations with increasing amounts of stress lead to the production of hydrocarbon fluids with improved properties.

The lithostatic stress of a section of an organic-rich formation can normally be estimated by recognizing that it will generally be equal to the weight of the rocks overlying the formation. The density of the overlying rocks can be expressed in units of psi/ft. Generally, this value will fall between 0.8 and 1.1 psi/ft and can often be approximated as 0.9 psi/ft. As a result the lithostatic stress of a section of an organic-rich formation can be estimated by multiplying the depth of the organic-rich rock formation interval by 0.9 psi/ft. Thus the lithostatic stress of a section of an organic-rich formation occurring at about 1,000 ft can be estimated to be about (0.9 psi/ft) multiplied by (1,000 ft) or about 900 psi. If a more precise estimate of lithostatic stress is desired the density of overlying rocks can be measured using wireline logging techniques or by making laboratory measurements on samples recovered from coreholes. The method may include heating a section of the organic-rich rock formation that is located at a depth greater than 200 ft below the earth's surface. Alternatively, the method may include heating a section of the organic-rich rock formation that is located at a depth greater than 500 ft below the earth's surface, greater than 1,000 ft below the earth's surface, greater than 1,200 ft below the earth's surface, greater than 1,500 ft below the earth's surface, or greater than 2,000 ft below the earth's surface.

The organic-rich rock formation may be, for example, a heavy hydrocarbon formation or a solid hydrocarbon formation. Particular examples of such formations may include an oil shale formation, a tar sands formation or a coal formation. Particular formation hydrocarbons present in such formations may include oil shale, kerogen, coal, and/or bitumen.

The hydrocarbon fluid produced from the organic-rich rock formation may include both a condensable hydrocarbon portion (e.g. liquid) and a non-condensable hydrocarbon portion (e.g. gas). The hydrocarbon fluid may additionally be produced together with non-hydrocarbon fluids. Exemplary non-hydrocarbon fluids include, for example, water, carbon dioxide, hydrogen sulfide, hydrogen, ammonia, and/or carbon monoxide.

The condensable hydrocarbon portion of the hydrocarbon fluid may be a fluid present within different locations associated with an organic-rich rock development project. For example, the condensable hydrocarbon portion of the hydrocarbon fluid may be a fluid present within a production well that is in fluid communication with the organic-rich rock formation. The production well may serve as a device for withdrawing the produced hydrocarbon fluids from the organic-rich rock formation. Alternatively, the condensable hydrocarbon portion may be a fluid present within processing equipment adapted to process hydrocarbon fluids produced from the organic-rich rock formation. Exemplary processing equipment is described herein. Alternatively, the condensable hydrocarbon portion may be a fluid present within a fluid storage vessel. Fluid storage vessels may include, for example, fluid storage tanks with fixed or floating roofs, knock-out vessels, and other intermediate, temporary or product storage vessels. Alternatively, the condensable hydrocarbon portion may be a fluid present within a fluid transportation pipeline. A fluid transportation pipeline may include, for example, piping from production wells to processing equipment or fluid storage vessels, piping from processing equipment to fluid storage vessels, or pipelines associated with collection or transportation of fluids to or from intermediate or centralized storage locations.

The following discussion of FIG. 7-16 concerns data obtained in Examples 1-5 which are discussed in the section labeled "Experiments". The data was obtained through the experimental procedures, gas and liquid sample collection procedures, hydrocarbon gas sample gas chromatography (GC) analysis methodology, gas sample GC peak integration methodology, gas sample GC peak identification methodology, whole oil gas chromatography (WOGC) analysis methodology, whole oil gas chromatography (WOGC) peak integration methodology, whole oil gas chromatography (WOGC) peak identification methodology, and pseudo component analysis methodology discussed in the Experiments section. For clarity, when referring to gas chromatography chromatograms of hydrocarbon gas samples, graphical data is provided for one unstressed experiment through Example 1, two 400 psi stressed experiments through Examples 2 and 3, and two 1,000 psi stressed experiments through Examples 4 and 5. When referring to whole oil gas chromatography (WOGC) chromatograms of liquid hydrocarbon samples, graphical data is provided for one unstressed experiment through Example 1, one 400 psi stressed experiments through Example 3, and one 1,000 psi stressed experiment through Example 4.

Figure 7:
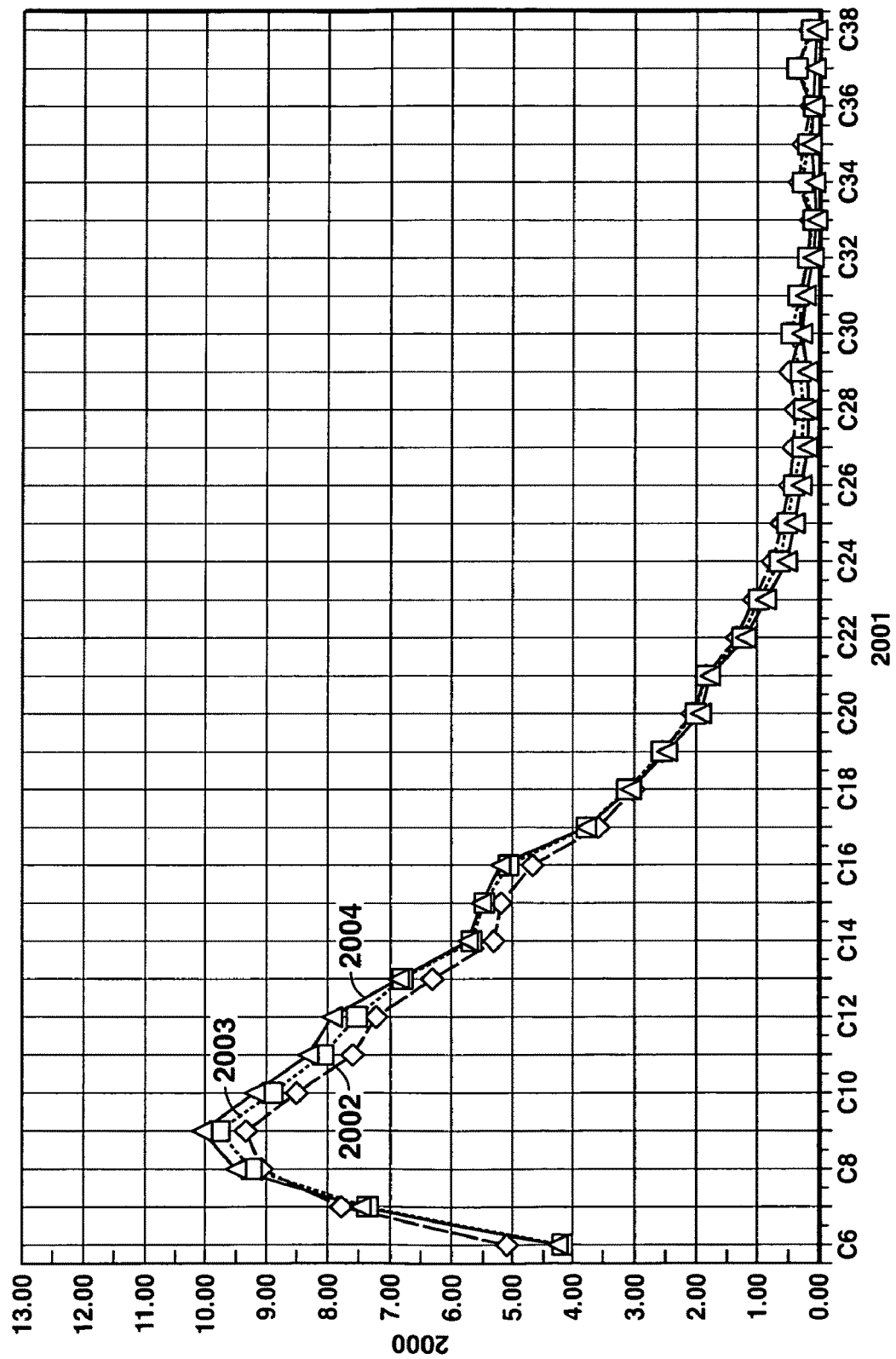
FIG. 7 is a graph of the weight percent of each carbon number pseudo component occurring from C6 to C38 for laboratory experiments conducted at three different stress levels.

FIG. 7 is a graph of the weight percent of each carbon number pseudo component occurring from C6 to C38 for each of the three stress levels tested and analyzed in the laboratory experiments discussed herein. The pseudo component weight percentages were obtained through the experimental procedures, liquid sample collection procedures, whole oil gas chromatography (WOGC) analysis methodology, whole oil gas chromatography (WOGC) peak identification and integration methodology, and pseudo component analysis methodology discussed in the Experiments section. For clarity, the pseudo component weight percentages are taken as a percentage of the entire C3 to pseudo C38 whole oil gas chromatography areas and calculated weights. Thus the graphed C6 to C38 weight percentages do not include the weight contribution of the associated gas phase product from any of the experiments which was separately treated. Further, the graphed weight percentages do not include the weight contribution of any liquid hydrocarbon compounds heavier than (i.e. having a longer retention time than) the C38 pseudo component. The y-axis 2000 represents the concentration in terms of weight percent of each C6 to C38 pseudo component in the liquid phase. The x-axis 2001 contains the identity of each hydrocarbon pseudo component from C6 to C38. The data points occurring on line 2002 represent the weight percent of each C6 to C38 pseudo component for the unstressed experiment of Example 1. The data points occurring on line 2003 represent the weight percent of each C6 to C38 pseudo component for the 400 psi stressed experiment of Example 3. While the data points occurring on line 2004 represent the weight percent of each C6 to C38 pseudo component for the 1,000 psi stressed experiment of Example 4. From FIG. 7 it can be seen that the hydrocarbon liquid produced in the unstressed experiment, represented by data points on line 2002, contains a lower weight percentage of lighter hydrocarbon components in the C8 to C17 pseudo component range and a greater weight percentage of heavier hydrocarbon components in the C20 to C29 pseudo component range, both as compared to the 400 psi stress experiment hydrocarbon liquid and the 1,000 psi stress experiment hydrocarbon liquid. Looking now at the data points occurring on line 2003, it is apparent that the intermediate level 400 psi stress experiment produced a hydrocarbon liquid having C8 to C17 pseudo component concentrations between the unstressed experiment represented by line 2002 and the 1,000 psi stressed experiment represented by line 2004. It is noted that the C17 pseudo component data for both the 400 psi and 1,000 psi stressed experiments are about equal. Further, it is apparent that the weight percentage of heavier hydrocarbon components in the C20 to C29 pseudo component range for the intermediate stress level experiment represented by line 2003 falls between the unstressed experiment (Line 2002) hydrocarbon liquid and the 1,000 psi stress experiment (Line 2004) hydrocarbon liquid. Lastly, it is apparent that the high level 1,000 psi stress experiment produced a hydrocarbon liquid having C8 to C17 pseudo component concentrations greater than both the unstressed experiment represented by line 2002 and the 400 psi stressed experiment represented by line 2003. Further, it is apparent that the weight percentage of heavier hydrocarbon components in the C20 to C29 pseudo component range for the high level stress experiment represented by line 2004 are less than both the unstressed experiment (Line 2002) hydrocarbon liquid and the 400 psi stress experiment (Line 2003) hydrocarbon liquid. Thus pyrolyzing oil shale under increasing levels of lithostatic stress appears to produce hydrocarbon liquids having increasingly lighter carbon number distributions.

Figure 8:
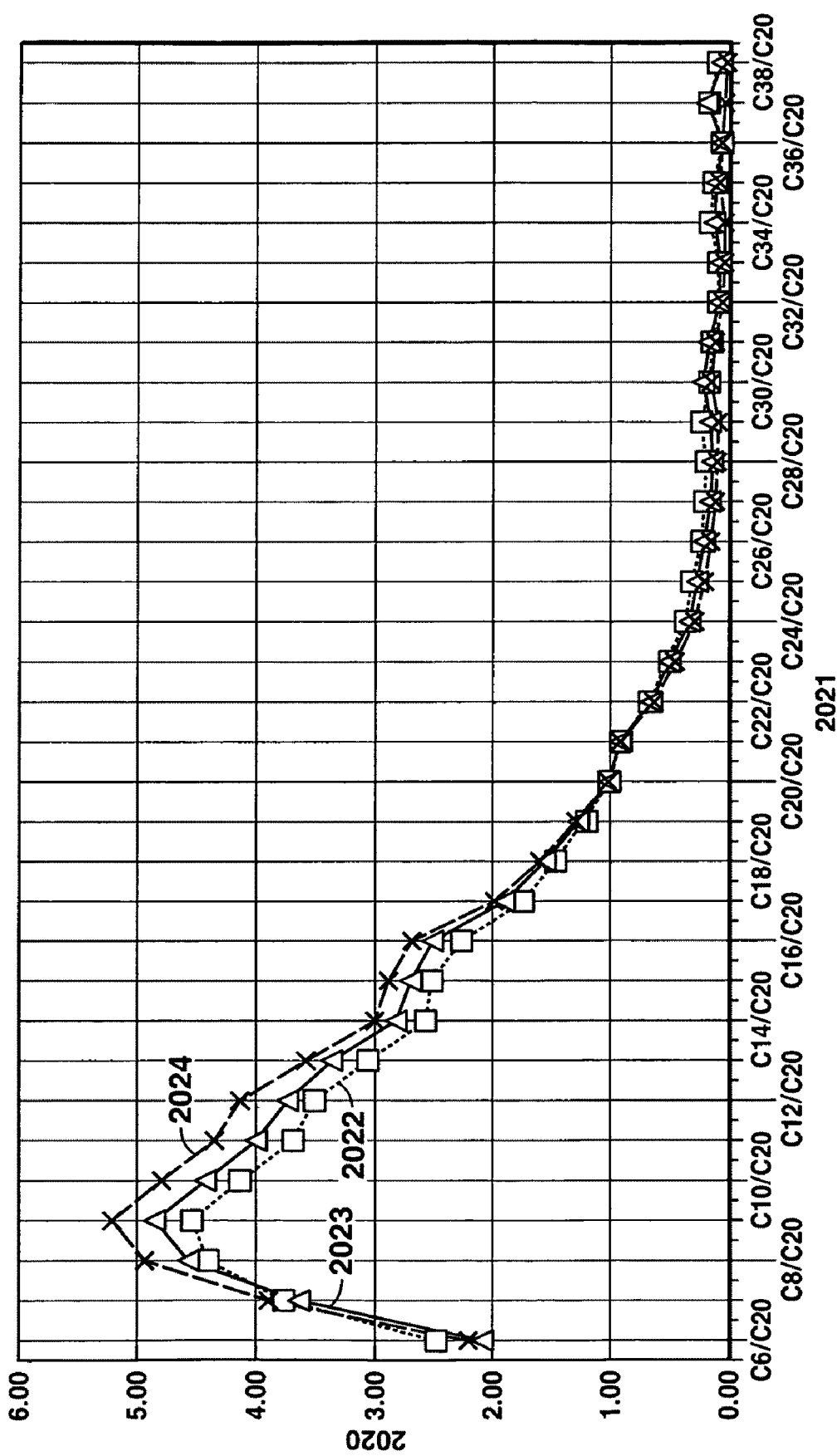
FIG. 8 is a graph of the weight percent ratios of each carbon number pseudo component occurring from C6 to C38 as compared to the C20 pseudo component for laboratory experiments conducted at three different stress levels.

FIG. 8 is a graph of the weight percent ratios of each carbon number pseudo component occurring from C6 to C38 as compared to the C20 pseudo component for each of the three stress levels tested and analyzed in the laboratory experiments discussed herein. The pseudo component weight percentages were obtained as described for FIG. 7. The y-axis 2020 represents the weight ratio of each C6 to C38 pseudo component compared to the C20 pseudo component in the liquid phase. The x-axis 2021 contains the identity of each hydrocarbon pseudo component ratio from C6/C20 to C38/C20. The data points occurring on line 2022 represent the weight ratio of each C6 to C38 pseudo component to C20 pseudo component for the unstressed experiment of Example 1. The data points occurring on line 2023 represent the weight ratio of each C6 to C38 pseudo component to C20 pseudo component for the 400 psi stressed experiment of Example 3. While the data points occurring on line 2024 represent the weight ratio of each C6 to C38 pseudo component to C20 pseudo component for the 1,000 psi stressed experiment of Example 4. From FIG. 8 it can be seen that the hydrocarbon liquid produced in the unstressed experiment, represented by data points on line 2022, contains a lower weight percentage of lighter hydrocarbon components in the C8 to C18 pseudo component range as compared to the C20 pseudo component and a greater weight percentage of heavier hydrocarbon components in the C22 to C29 pseudo component range as compared to the C20 pseudo component, both as compared to the 400 psi stress experiment hydrocarbon liquid and the 1,000 psi stress experiment hydrocarbon liquid. Looking now at the data points occurring on line 2023, it is apparent that the intermediate level 400 psi stress experiment produced a hydrocarbon liquid having C8 to C18 pseudo component concentrations as compared to the C20 pseudo component between the unstressed experiment represented by line 2022 and the 1,000 psi stressed experiment represented by line 2024. Further, it is apparent that the weight percentage of heavier hydrocarbon components in the C22 to C29 pseudo component range as compared to the C20 pseudo component for the intermediate stress level experiment represented by line 2023 falls between the unstressed experiment (Line 2022) hydrocarbon liquid and the 1,000 psi stress experiment (Line 2024) hydrocarbon liquid. Lastly, it is apparent that the high level 1,000 psi stress experiment produced a hydrocarbon liquid having C8 to C18 pseudo component concentrations as compared to the C20 pseudo component greater than both the unstressed experiment represented by line 2022 and the 400 psi stressed experiment represented by line 2023. Further, it is apparent that the weight percentage of heavier hydrocarbon components in the C22 to C29 pseudo component range as compared to the C20 pseudo component; for the high level stress experiment represented by line 2024 are less than both the unstressed experiment (Line 2022) hydrocarbon liquid and the 400 psi stress experiment (Line 2023) hydrocarbon liquid. This analysis further supports the relationship that pyrolizing oil shale under increasing levels of lithostatic stress produces hydrocarbon liquids having increasingly lighter carbon number distributions.

Figure 9:
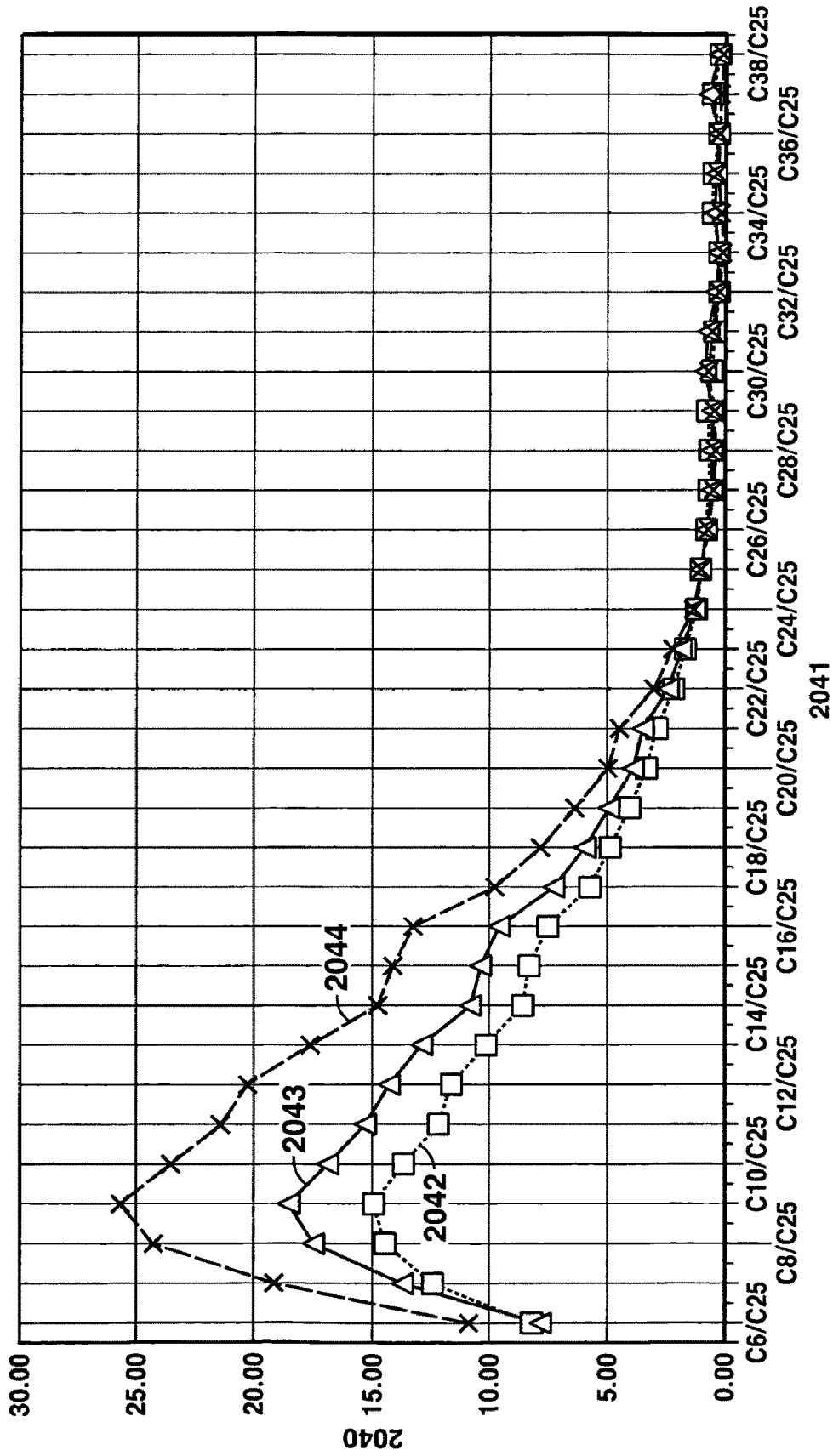
FIG. 9 is a graph of the weight percent ratios of each carbon number pseudo component occurring from C6 to C38 as compared to the C25 pseudo component for laboratory experiments conducted at three different stress levels.

FIG. 9 is a graph of the weight percent ratios of each carbon number pseudo component occurring from C6 to C38 as compared to the C25 pseudo component for each of the three stress levels tested and analyzed in the laboratory experiments discussed herein. The pseudo component weight percentages were obtained as described for FIG. 7. The y-axis 2040 represents the weight ratio of each C6 to C38 pseudo component compared to the C25 pseudo component in the liquid phase. The x-axis 2041 contains the identity of each hydrocarbon pseudo component ratio from C6/C25 to C38/C25. The data points occurring on line 2042 represent the weight ratio of each C6 to C38 pseudo component to C25 pseudo component for the unstressed experiment of Example 1. The data points occurring on line 2043 represent the weight ratio of each C6 to C38 pseudo component to C25 pseudo component for the 400 psi stressed experiment of Example 3. While the data points occurring on line 2044 represent the weight ratio of each C6 to C38 pseudo component to C25 pseudo component for the 1,000 psi stressed experiment of Example 4. From FIG. 9 it can be seen that the hydrocarbon liquid produced in the unstressed experiment, represented by data points on line 2042, contains a lower weight percentage of lighter hydrocarbon components in the C7 to C24 pseudo component range as compared to the C25 pseudo component and a greater weight percentage of heavier hydrocarbon components in the C26 to C29 pseudo component range as compared to the C25 pseudo component, both as compared to the 400 psi stress experiment hydrocarbon liquid and the 1,000 psi stress experiment hydrocarbon liquid. Looking now at the data points occurring on line 2043, it is apparent that the intermediate level 400 psi stress experiment produced a hydrocarbon liquid having C7 to C24 pseudo component concentrations as compared to the C25 pseudo component between the unstressed experiment represented by line 2042 and the 1,000 psi stressed experiment represented by line 2044. Further, it is apparent that the weight percentage of heavier hydrocarbon components in the C26 to C29 pseudo component range as compared to the C25 pseudo component for the intermediate stress level experiment represented by line 2043 falls between the unstressed experiment (Line 2042) hydrocarbon liquid and the 1,000 psi stress experiment (Line 2044) hydrocarbon liquid. Lastly, it is apparent that the high level 1,000 psi stress experiment produced a hydrocarbon liquid having C7 to C24 pseudo component concentrations as compared to the C25 pseudo component greater than both the unstressed experiment represented by line 2042 and the 400 psi stressed experiment represented by line 2043. Further, it is apparent that the weight percentage of heavier hydrocarbon components in the C26 to C29 pseudo component range as compared to the C25 pseudo component for the high level stress experiment represented by line 2044 are less than both the unstressed experiment (Line 2042) hydrocarbon liquid and the 400 psi stress experiment (Line 2043) hydrocarbon liquid. This analysis further supports the relationship that pyrolyzing oil shale under increasing levels of lithostatic stress produces hydrocarbon liquids having increasingly lighter carbon number distributions.

Figure 10:
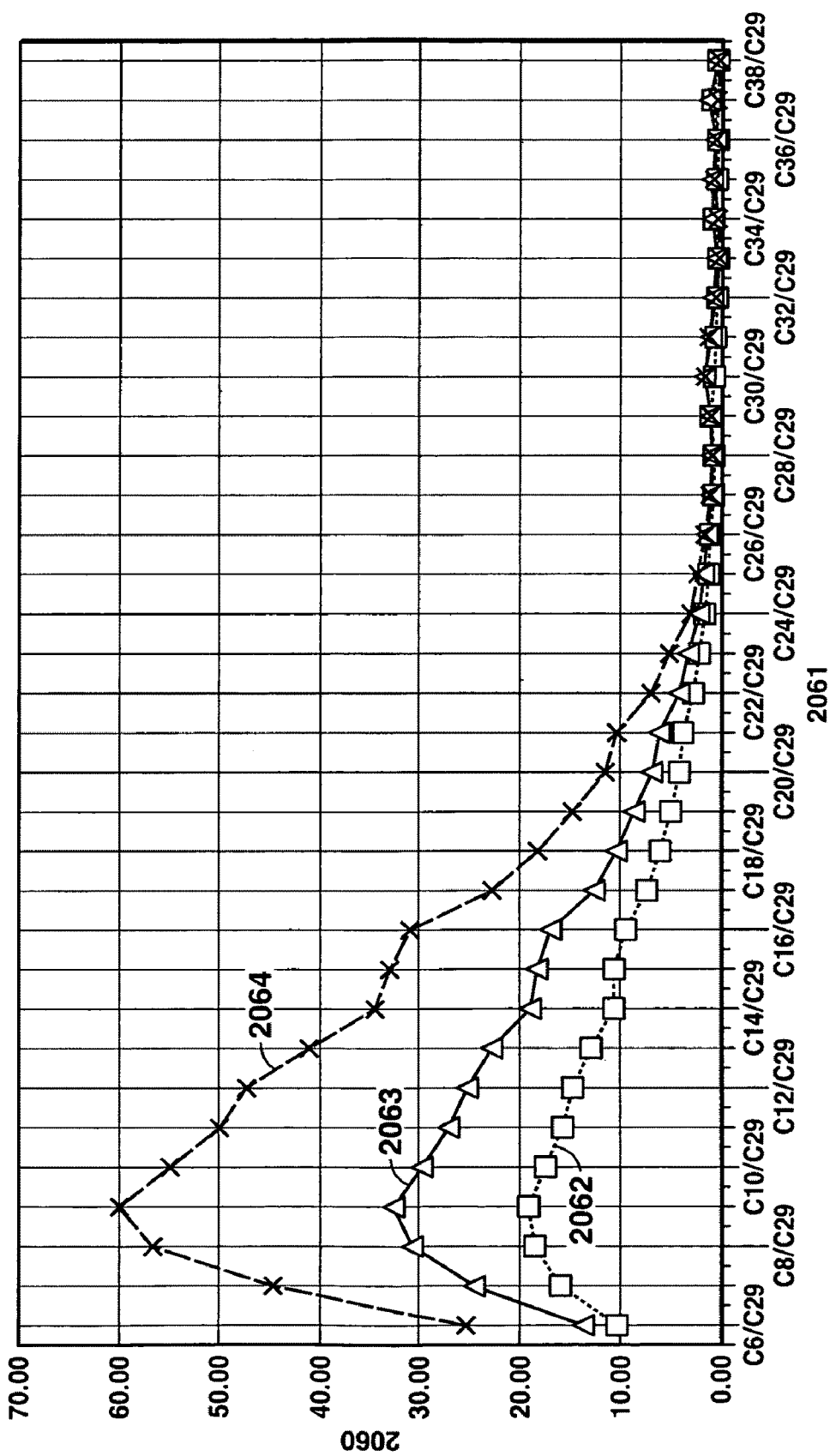
FIG. 10 is a graph of the weight percent ratios of each carbon number pseudo component occurring from C6 to C38 as compared to the C29 pseudo component for laboratory experiments conducted at three different stress levels.

FIG. 10 is a graph of the weight percent ratios of each carbon number pseudo component occurring from C6 to C38 as compared to the C29 pseudo component for each of the three stress levels tested and analyzed in the laboratory experiments discussed herein. The pseudo component weight percentages were obtained as described for FIG. 7. The y-axis 2060 represents the weight ratio of each C6 to C38 pseudo component compared to the C29 pseudo component in the liquid phase. The x-axis 2061 contains the identity of each hydrocarbon pseudo component ratio from C6/C29 to C38/C29. The data points occurring on line 2062 represent the weight ratio of each C6 to C38 pseudo component to C29 pseudo component for the unstressed experiment of Example 1. The data points occurring on line 2063 represent the weight ratio of each C6 to C38 pseudo component to C29 pseudo component for the 400 psi stressed experiment of Example 3. While the data points occurring on line 2064 represent the weight ratio of each C6 to C38 pseudo component to C29 pseudo component for the 1,000 psi stressed experiment of Example 4. From FIG. 10 it can be seen that the hydrocarbon liquid produced in the unstressed experiment, represented by data points on line 2062, contains a lower weight percentage of lighter hydrocarbon components in the C6 to C28 pseudo component range as compared to the C29 pseudo component, both as compared to the 400 psi stress experiment hydrocarbon liquid and the 1,000 psi stress experiment hydrocarbon liquid. Looking now at the data points occurring on line 2063, it is apparent that the intermediate level 400 psi stress experiment produced a hydrocarbon liquid having C6 to C28 pseudo component concentrations as compared to the C29 pseudo component between the unstressed experiment represented by line 2062 and the 1,000 psi stressed experiment represented by line 2064. Lastly, it is apparent that the high level 1,000 psi stress experiment produced a hydrocarbon liquid having C6 to C28 pseudo component concentrations as compared to the C29 pseudo component greater than both the unstressed experiment represented by line 2062 and the 400 psi stressed experiment represented by line 2063. This analysis further supports the relationship that pyrolizing oil shale under increasing levels of lithostatic stress produces hydrocarbon liquids having increasingly lighter carbon number distributions.

Figure 11:
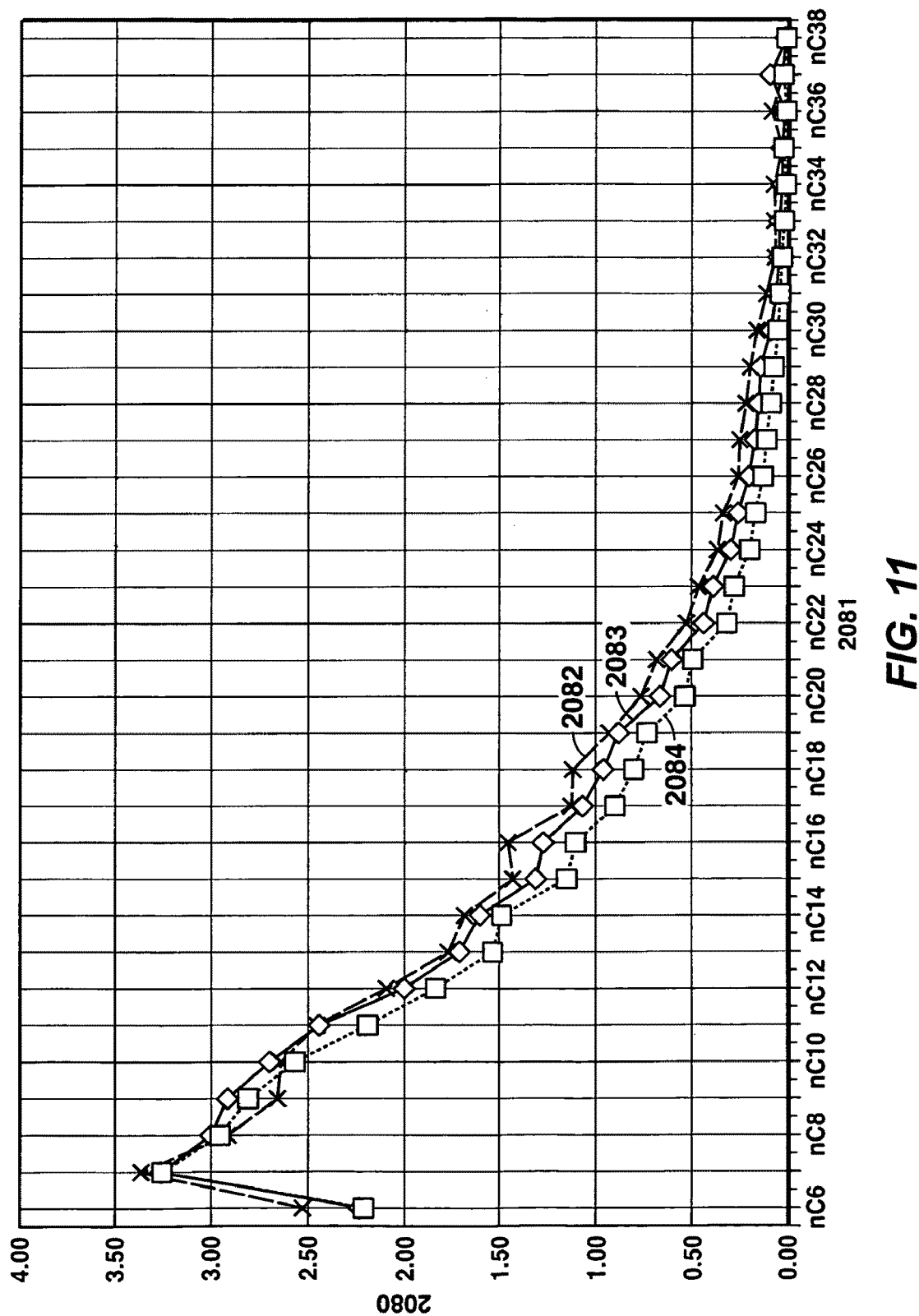
FIG. 11 is a graph of the weight percent of normal alkane hydrocarbon compounds occurring from normal-C6 to normal-C38 for laboratory experiments conducted at three different stress levels.

FIG. 11 is a graph of the weight percent of normal alkane hydrocarbon compounds occurring from the normal-C6 alkane to the normal-$C_{3-8}$ alkane for each of the three stress levels tested and analyzed in the laboratory experiments discussed herein. The normal alkane compound weight percentages were obtained as described for FIG. 7, except that each individual normal alkane compound peak area integration was used to determine each respective normal alkane compound weight percentage. For clarity, the normal alkane hydrocarbon weight percentages are taken as a percentage of the entire C3 to pseudo C38 whole oil gas chromatography areas and calculated weights as used in the pseudo compound data presented in FIG. 7. The y-axis 2080 represents the concentration in terms of weight percent of each normal-C6 to normal-C38 compound found in the liquid phase. The x-axis 2081 contains the identity of each normal alkane hydrocarbon compound from normal-C6 to normal-C38. The data points occurring on line 2082 represent the weight percent of each normal-C6 to normal-$C_{3-8}$ hydrocarbon compound for the unstressed experiment of Example 1. The data points occurring on line 2083 represent the weight percent of each normal-C6 to normal-$C_{3-8}$ hydrocarbon compound for the 400 psi stressed experiment of Example 3. While the data points occurring on line 2084 represent the weight percent of each normal-C6 to normal-$C_{3-8}$ hydrocarbon compound for the 1,000 psi stressed experiment of Example 4. From FIG. 11 it can be seen that the hydrocarbon liquid produced in the unstressed experiment, represented by data points on line 2082, contains a greater weight percentage of hydrocarbon compounds in the normal-C12 to normal-C30 compound range, both as compared to the 400 psi stress experiment hydrocarbon liquid and the 1,000 psi stress experiment hydrocarbon liquid. Looking now at the data points occurring on line 2083, it is apparent that the intermediate level 400 psi stress experiment produced a hydrocarbon liquid having normal-C12 to normal-C30 compound concentrations between the unstressed experiment represented by line 2082 and the 1,000 psi stressed experiment represented by line 2084. Lastly, it is apparent that the high level 1,000 psi stress experiment produced a hydrocarbon liquid having normal-C12 to normal-C30 compound concentrations less than both the unstressed experiment represented by line 2082 and the 400 psi stressed experiment represented by line 2083. Thus pyrolyzing oil shale under increasing levels of lithostatic stress appears to produce hydrocarbon liquids having lower concentrations of normal alkane hydrocarbons.

Figure 12:
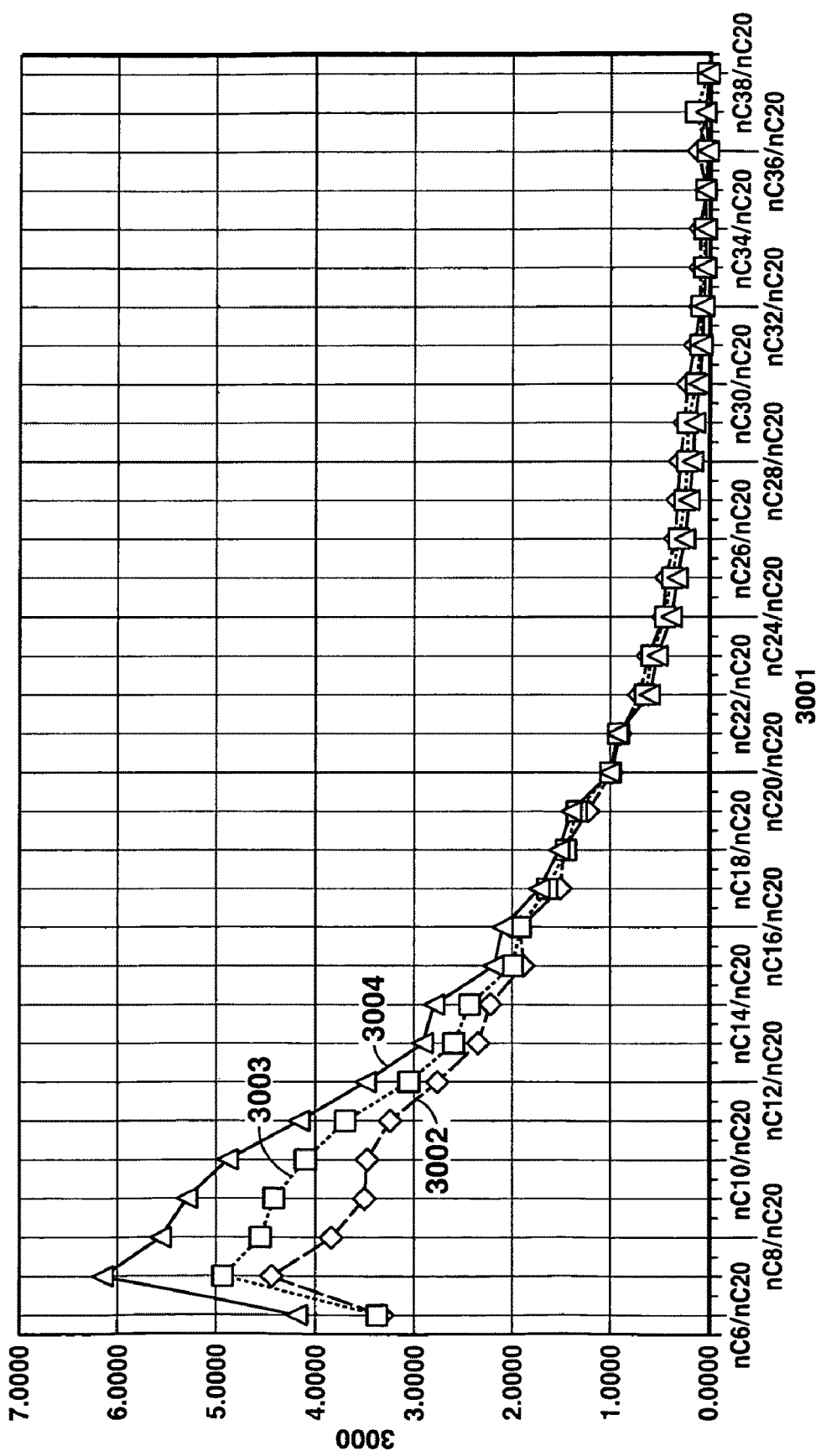
FIG. 12 is a graph of the weight percent of normal alkane hydrocarbon compounds occurring from normal-C6 to normal-C38 as compared to the normal-C20 hydrocarbon compound for laboratory experiments conducted at three different stress levels.

FIG. 12 is a graph of the weight percent of normal alkane hydrocarbon compounds occurring from normal-C6 to normal-C38 as compared to the normal-C20 hydrocarbon compound for each of the three stress levels tested and analyzed in the laboratory experiments discussed herein. The normal compound weight percentages were obtained as described for FIG. 11. The y-axis 3000 represents the concentration in terms of weight ratio of each normal-C6 to normal-C38 compound as compared to the normal-C20 compound found in the liquid phase. The x-axis 3001 contains the identity of each normal alkane hydrocarbon compound ratio from normal-C6/normal-C20 to normal-C38/normal-C20. The data points occurring on line 3002 represent the weight ratio of each normal-C6 to normal-C38 hydrocarbon compound as compared to the normal-C20 compound for the unstressed experiment of Example 1. The data points occurring on line 3003 represent the weight ratio of each normal-C6 to normal-C38 hydrocarbon compound as compared to the normal-C20 compound for the 400 psi stressed experiment of Example 3. While the data points occurring on line 3004 represent the weight ratio of each normal-C6 to normal-C38 hydrocarbon compound as compared to the normal-C20 compound for the 1,000 psi stressed experiment of Example 4. From FIG. 12 it can be seen that the hydrocarbon liquid produced in the unstressed experiment, represented by data points on line 3002, contains a lower weight percentage of lighter normal alkane hydrocarbon components in the normal-C6 to normal-C17 compound range as compared to the normal-C20 compound and a greater weight percentage of heavier hydrocarbon components in the normal-C22 to normal-C34 compound range as compared to the normal-C20 compound, both as compared to the 400 psi stress experiment hydrocarbon liquid and the 1,000 psi stress experiment hydrocarbon liquid. Looking now at the data points occurring on line 3003, it is apparent that the intermediate level 400 psi stress experiment produced a hydrocarbon liquid having normal-C6 to normal-C17 compound concentrations as compared to the normal-C20 compound between the unstressed experiment represented by line 3002 and the 1,000 psi stressed experiment represented by line 3004. Further, it is apparent that the weight percentage of heavier hydrocarbon components in the normal-C22 to normal-C34 compound range as compared to the normal-C20 compound for the intermediate stress level experiment represented by line 3003 falls between the unstressed experiment (Line 3002) hydrocarbon liquid and the 1,000 psi stress experiment (Line 3004) hydrocarbon liquid. Lastly, it is apparent that the high level 1,000 psi stress experiment produced a hydrocarbon liquid having normal-C6 to normal-C17 compound concentrations as compared to the normal-C20 compound greater than both the unstressed experiment represented by line 3002 and the 400 psi stressed experiment represented by line 3003. Further, it is apparent that the weight percentage of heavier hydrocarbon components in the normal-C22 to normal-C34 compound range as compared to the normal-C20 compound for the high level stress experiment represented by line 3004 are less than both the unstressed experiment (Line 3002) hydrocarbon liquid and the 400 psi stress experiment (Line 3003) hydrocarbon liquid. This analysis further supports the relationship that pyrolizing oil shale under increasing levels of lithostatic stress produces hydrocarbon liquids having lower concentrations of normal alkane hydrocarbons.

Figure 13:
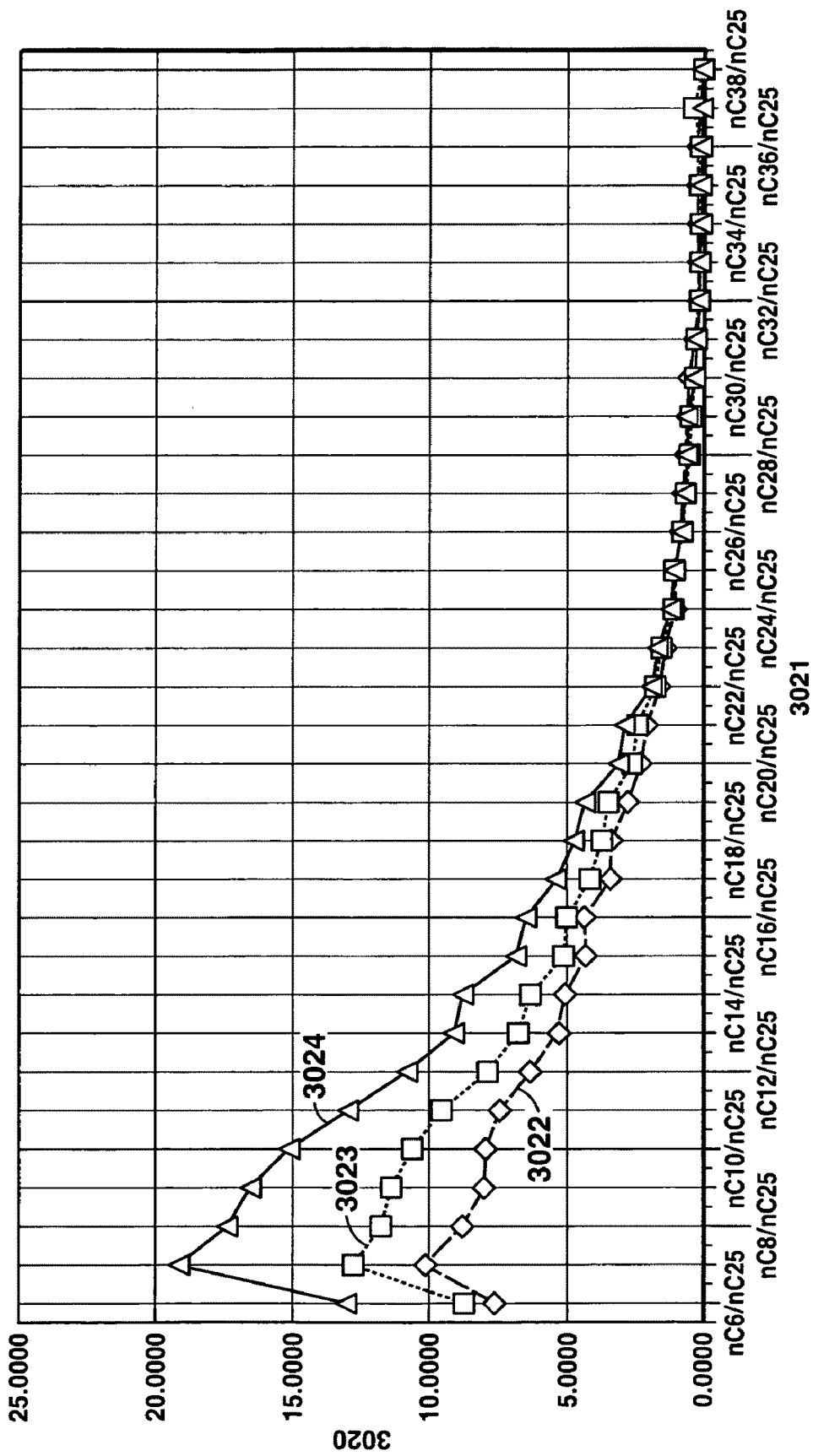
FIG. 13 is a graph of the weight percent of normal alkane hydrocarbon compounds occurring from normal-C6 to normal-C38 as compared to the normal-C25 hydrocarbon compound for laboratory experiments conducted at three different stress levels.

FIG. 13 is a graph of the weight percent of normal alkane hydrocarbon compounds occurring from normal-C6 to normal-C38 as compared to the normal-$C_{2-5}$ hydrocarbon compound for each of the three stress levels tested and analyzed in the laboratory experiments discussed herein. The normal compound weight percentages were obtained as described for FIG. 11. The y-axis 3020 represents the concentration in terms of weight ratio of each normal-C6 to normal-C38 compound as compared to the normal-C25 compound found in the liquid phase. The x-axis 3021 contains the identity of each normal alkane hydrocarbon compound ratio from normal-C6/normal-C25 to normal-C38/normal-C25. The data points occurring on line 3022 represent the weight ratio of each normal-C6 to normal-C38 hydrocarbon compound as compared to the normal-C25 compound for the unstressed experiment of Example 1. The data points occurring on line 3023 represent the weight ratio of each normal-C6 to normal-C38 hydrocarbon compound as compared to the normal-C25 compound for the 400 psi stressed experiment of Example 3. While the data points occurring on line 3024 represent the weight ratio of each normal-C6 to normal-C38 hydrocarbon compound as compared to the normal-C25 compound for the 1,000 psi stressed experiment of Example 4. From FIG. 13 it can be seen that the hydrocarbon liquid produced in the unstressed experiment, represented by data points on line 3022, contains a lower weight percentage of lighter normal alkane hydrocarbon components in the normal-C6 to normal-C24 compound range as compared to the normal-C25 compound and a greater weight percentage of heavier hydrocarbon components in the normal-C26 to normal-C30 compound range as compared to the normal-C25 compound, both as compared to the 400 psi stress experiment hydrocarbon liquid and the 1,000 psi stress experiment hydrocarbon liquid. Looking now at the data points occurring on line 3023, it is apparent that the intermediate level 400 psi stress experiment produced a hydrocarbon liquid having normal-C6 to normal-C24 compound concentrations as compared to the normal-C25 compound between the unstressed experiment represented by line 3022 and the 1,000 psi stressed experiment represented by line 3024. Further, it is apparent that the weight percentage of heavier hydrocarbon components in the normal-C26 to normal-C30 compound range as compared to the normal-C25 compound for the intermediate stress level experiment represented by line 3023 falls between the unstressed experiment (Line 3022) hydrocarbon liquid and the 1,000 psi stress experiment (Line 3024) hydrocarbon liquid. Lastly, it is apparent that the high level 1,000 psi stress experiment produced a hydrocarbon liquid having normal-C6 to normal-C24 compound concentrations as compared to the normal-C25 compound greater than both the unstressed experiment represented by line 3022 and the 400 psi stressed experiment represented by line 3023. Further, it is apparent that the weight percentage of heavier hydrocarbon components in the normal-C26 to normal-C30 compound range as compared to the normal-C25 compound for the high level stress experiment represented by line 3024 are less than both the unstressed experiment (Line 3022) hydrocarbon liquid and the 400 psi stress experiment (Line 3023) hydrocarbon liquid. This analysis further supports the relationship that pyrolizing oil shale under increasing levels of lithostatic stress produces hydrocarbon liquids having lower concentrations of normal alkane hydrocarbons.

Figure 14:
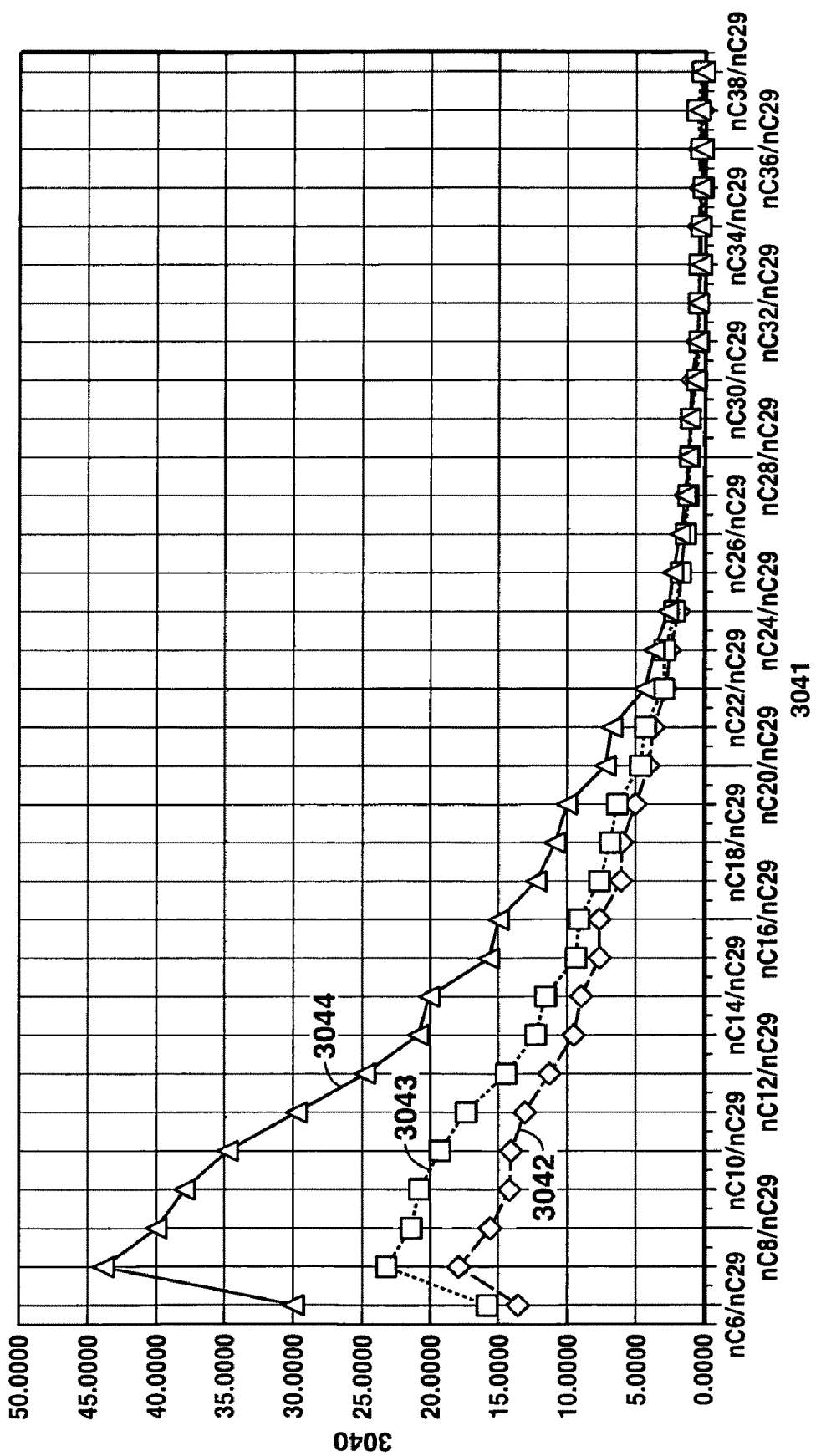
FIG. 14 is a graph of the weight percent of normal alkane hydrocarbon compounds occurring from normal-C6 to normal-C38 as compared to the normal-C29 hydrocarbon compound for laboratory experiments conducted at three different stress levels.

FIG. 14 is a graph of the weight percent of normal alkane hydrocarbon compounds occurring from normal-C6 to normal-C38 as compared to the normal-C29 hydrocarbon compound for each of the three stress levels tested and analyzed in the laboratory experiments discussed herein. The normal compound weight percentages were obtained as described for FIG. 11. The y-axis 3040 represents the concentration in terms of weight ratio of each normal-C6 to normal-C38 compound as compared to the normal-C29 compound found in the liquid phase. The x-axis 3041 contains the identity of each normal alkane hydrocarbon compound ratio from normal-C6/normal-C29 to normal-C38/normal-C29. The data points occurring on line 3042 represent the weight ratio of each normal-C6 to normal-$C_{3-8}$ hydrocarbon compound as compared to the normal-C29 compound for the unstressed experiment of Example 1. The data points occurring on line 3043 represent the weight ratio of each normal-C6 to normal-$C_{3-8}$ hydrocarbon compound as compared to the normal-C29 compound for the 400 psi stressed experiment of Example 3. While the data points occurring on line 3044 represent the weight ratio of each normal-C6 to normal-$C_{3-8}$ hydrocarbon compound as compared to the normal-C29 compound for the 1,000 psi stressed experiment of Example 4. From FIG. 14 it can be seen that the hydrocarbon liquid produced in the unstressed experiment, represented by data points on line 3042, contains a lower weight percentage of lighter normal alkane hydrocarbon components in the normal-C6 to normal-C26 compound range as compared to the normal-C29 compound, both as compared to the 400 psi stress experiment hydrocarbon liquid and the 1,000 psi stress experiment hydrocarbon liquid. Looking now at the data points occurring on line 3043, it is apparent that the intermediate level 400 psi stress experiment produced a hydrocarbon liquid having normal-C6 to normal-C26 compound concentrations as compared to the normal-C29 compound between the unstressed experiment represented by line 3042 and the 1,000 psi stressed experiment represented by line 3044. Lastly, it is apparent that the high level 1,000 psi stress experiment produced a hydrocarbon liquid having normal-C6 to normal-C26 compound concentrations as compared to the normal-C29 compound greater than both the unstressed experiment represented by line 3042 and the 400 psi stressed experiment represented by line 3043. This analysis further supports the relationship that pyrolizing oil shale under increasing levels of lithostatic stress produces hydrocarbon liquids having lower concentrations of normal alkane hydrocarbons.

Figure 15:
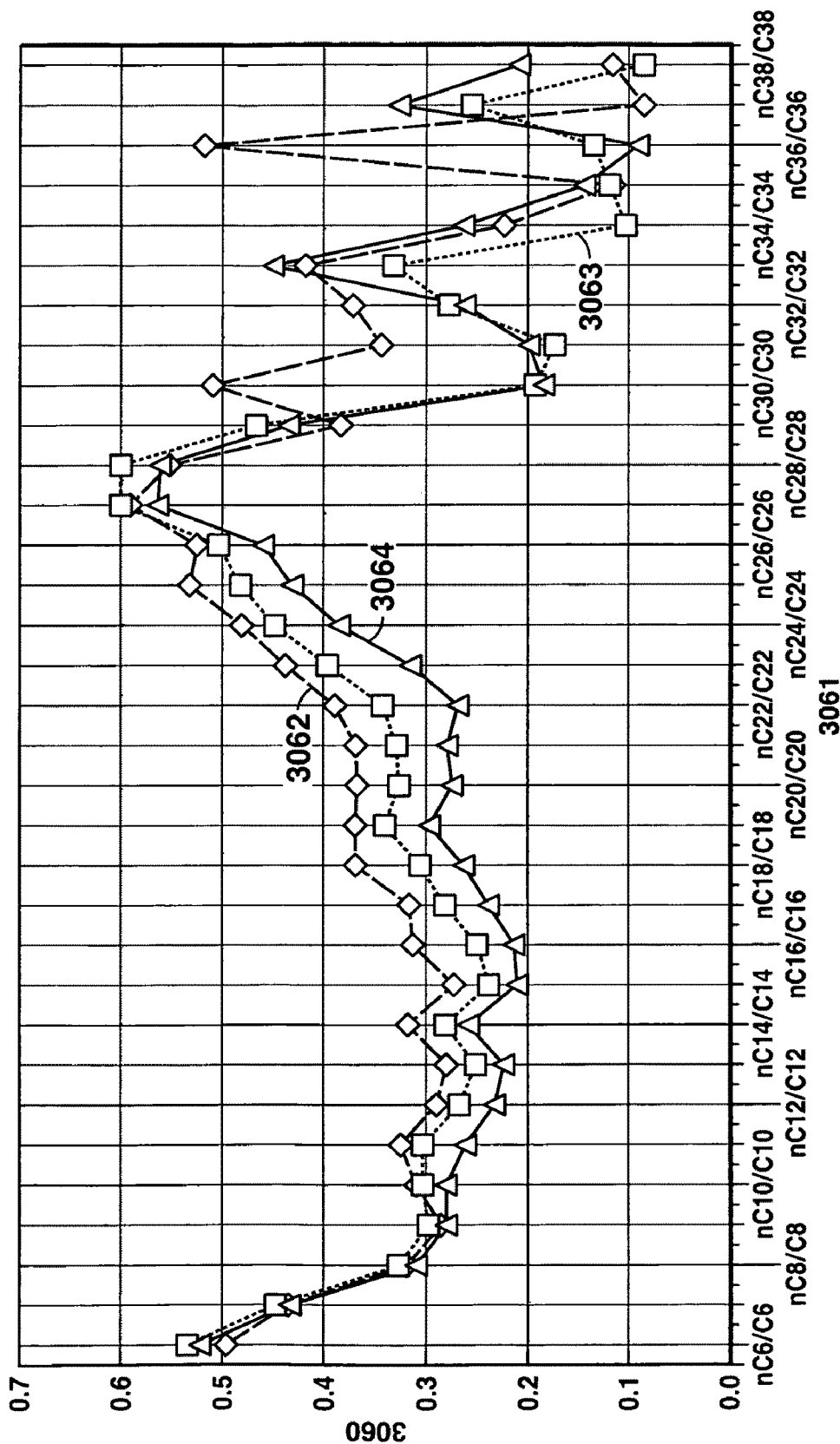
FIG. 15 is a graph of the weight ratio of normal alkane hydrocarbon compounds to pseudo components for each carbon number from C6 to C38 for laboratory experiments conducted at three different stress levels.

FIG. 15 is a graph of the weight ratio of normal alkane hydrocarbon compounds to pseudo components for each carbon number from C6 to C38 for each of the three stress levels tested and analyzed in the laboratory experiments discussed herein. The normal compound and pseudo component weight percentages were obtained as described for FIGS. 7 & 11. For clarity, the normal alkane hydrocarbon and pseudo component weight percentages are taken as a percentage of the entire C3 to pseudo C38 whole oil gas chromatography areas and calculated weights as used in the pseudo compound data presented in FIG. 7. The y-axis 3060 represents the concentration in terms of weight ratio of each normal-C6/pseudo C6 to normal-C38/pseudo C38 compound found in the liquid phase. The x-axis 3061 contains the identity of each normal alkane hydrocarbon compound to pseudo component ratio from normal-C6/pseudo C6 to normal-C38/pseudo C38. The data points occurring on line 3062 represent the weight ratio of each normal-C6/pseudo C6 to normal-C38/pseudo C38 ratio for the unstressed experiment of Example 1. The data points occurring on line 3063 represent the weight ratio of each normal-C6/pseudo C6 to normal-C38/pseudo C38 ratio for the 400 psi stressed experiment of Example 3. While the data points occurring on line 3064 represent the weight ratio of each normal-C6/pseudo C6 to normal-C38/pseudo C38 ratio for the 1,000 psi stressed experiment of Example 4. From FIG. 15 it can be seen that the hydrocarbon liquid produced in the unstressed experiment, represented by data points on line 3062, contains a greater weight percentage of normal alkane hydrocarbon compounds to pseudo components in the C10 to C26 range, both as compared to the 400 psi stress experiment hydrocarbon liquid and the 1,000 psi stress experiment hydrocarbon liquid. Looking now at the data points occurring on line 3063, it is apparent that the intermediate level 400 psi stress experiment produced a hydrocarbon liquid having normal alkane hydrocarbon compound to pseudo component ratios in the C10 to C26 range between the unstressed experiment represented by line 3062 and the 1,000 psi stressed experiment represented by line 3064. Lastly, it is apparent that the high level 1,000 psi stress experiment produced a hydrocarbon liquid having normal alkane hydrocarbon compound to pseudo component ratios in the C10 to C26 range less than both the unstressed experiment represented by line 3062 and the 400 psi stressed experiment represented by line 3063. Thus pyrolyzing oil shale under increasing levels of lithostatic stress appears to produce hydrocarbon liquids having lower concentrations of normal alkane hydrocarbons as compared to the total hydrocarbons for a given carbon number occurring between C10 and C26.

From the above-described data, it can be seen that heating and pyrolysis of oil shale under increasing levels of stress results in a condensable hydrocarbon fluid product that is lighter (i.e., greater proportion of lower carbon number compounds or components relative to higher carbon number compounds or components) and contains a lower concentration of normal alkane hydrocarbon compounds. Such a product may be suitable for refining into gasoline and distillate products. Further, such a product, either before or after further fractionation, may have utility as a feed stock for certain chemical processes.

In some embodiments, the produced hydrocarbon fluid includes a condensable hydrocarbon portion. In some embodiments the condensable hydrocarbon portion may have one or more of a total C7 to total C20 weight ratio greater than 0.8, a total C8 to total C20 weight ratio greater than 1.7, a total C9 to total C20 weight ratio greater than 2.5, a total C10 to total C20 weight ratio greater than 2.8, a total C11 to total C20 weight ratio greater than 2.3, a total C12 to total C20 weight ratio greater than 2.3, a total C13 to total C20 weight ratio greater than 2.9, a total C14 to total C20 weight ratio greater than 2.2, a total C15 to total C20 weight ratio greater than 2.2, and a total C16 to total C20 weight ratio greater than 1.6. In alternative embodiments the condensable hydrocarbon portion has one or more of a total C7 to total C20 weight ratio greater than 2.5, a total C8 to total C20 weight ratio greater than 3.0, a total C9 to total C20 weight ratio greater than 3.5, a total C10 to total C20 weight ratio greater than 3.5, a total C11 to total C20 weight ratio greater than 3.0, and a total C12 to total C20 weight ratio greater than 3.0. In alternative embodiments the condensable hydrocarbon portion has one or more of a total C7 to total C20 weight ratio greater than 3.5, a total C8 to total C20 weight ratio greater than 4.3, a total C9 to total C20 weight ratio greater than 4.5, a total C10 to total C20 weight ratio greater than 4.2, a total C11 to total C20 weight ratio greater than 3.7, and a total C12 to total C20 weight ratio greater than 3.5. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C7 to total C20 weight ratio greater than 0.8. Alternatively, the condensable hydrocarbon portion may have a total C7 to total C20 weight ratio greater than 1.0, greater than 1.5, greater than 2.0, greater than 2.5, greater than 3.5 or greater than 3.7. In alternative embodiments, the condensable hydrocarbon portion may have a total C7 to total C20 weight ratio less than 10.0, less than 7.0, less than 5.0 or less than 4.0. In some embodiments the condensable hydrocarbon portion has a total C8 to total C20 weight ratio greater than 1.7. Alternatively, the condensable hydrocarbon portion may have a total C8 to total C20 weight ratio greater than 2.0, greater than 2.5, greater than 3.0, greater than 4.0, greater than 4.4, or greater than 4.6. In alternative embodiments, the condensable hydrocarbon portion may have a total C8 to total C20 weight ratio less than 7.0 or less than 6.0. In some embodiments the condensable hydrocarbon portion has a total C9 to total C20 weight ratio greater than 2.5. Alternatively, the condensable hydrocarbon portion may have a total C9 to total C20 weight ratio greater than 3.0, greater than 4.0, greater than 4.5, or greater than 4.7. In alternative embodiments, the condensable hydrocarbon portion may have a total C9 to total C20 weight ratio less than 7.0 or less than 6.0. In some embodiments the condensable hydrocarbon portion has a total C10 to total C20 weight ratio greater than 2.8. Alternatively, the condensable hydrocarbon portion may have a total C10 to total C20 weight ratio greater than 3.0, greater than 3.5, greater than 4.0, or greater than 4.3. In alternative embodiments, the condensable hydrocarbon portion may have a total C10 to total C20 weight ratio less than 7.0 or less than 6.0. In some embodiments the condensable hydrocarbon portion has a total C11 to total C20 weight ratio greater than 2.3. Alternatively, the condensable hydrocarbon portion may have a total C11 to total C20 weight ratio greater than 2.5, greater than 3.5, greater than 3.7, greater than 4.0. In alternative embodiments, the condensable hydrocarbon portion may have a total C11 to total C20 weight ratio less than 7.0 or less than 6.0. In some embodiments the condensable hydrocarbon portion has a total C12 to total C20 weight ratio greater than 2.3. Alternatively, the condensable hydrocarbon portion may have a total C12 to total C20 weight ratio greater than 2.5, greater than 3.0, greater than 3.5, or greater than 3.7. In alternative embodiments, the condensable hydrocarbon portion may have a total C12 to total C20 weight ratio less than 7.0 or less than 6.0. In some embodiments the condensable hydrocarbon portion has a total C13 to total C20 weight ratio greater than 2.9. Alternatively, the condensable hydrocarbon portion may have a total C13 to total C20 weight ratio greater than 3.0, greater than 3.1, or greater than 3.2. In alternative embodiments, the condensable hydrocarbon portion may have a total C13 to total C20 weight ratio less than 6.0 or less than 5.0. In some embodiments the condensable hydrocarbon portion has a total C14 to total C20 weight ratio greater than 2.2. Alternatively, the condensable hydrocarbon portion may have a total C14 to total C20 weight ratio greater than 2.5, greater than 2.6, or greater than 2.7. In alternative embodiments, the condensable hydrocarbon portion may have a total C14 to total C20 weight ratio less than 6.0 or less than 4.0. In some embodiments the condensable hydrocarbon portion has a total C15 to total C20 weight ratio greater than 2.2. Alternatively, the condensable hydrocarbon portion may have a total C15 to total C20 weight ratio greater than 2.3, greater than 2.4, or greater than 2.6. In alternative embodiments, the condensable hydrocarbon portion may have a total C15 to total C20 weight ratio less than 6.0 or less than 4.0. In some embodiments the condensable hydrocarbon portion has a total C16 to total C20 weight ratio greater than 1.6. Alternatively, the condensable hydrocarbon portion may have a total C16 to total C20 weight ratio greater than 1.8, greater than 2.3, or greater than 2.5. In alternative embodiments, the condensable hydrocarbon portion may have a total C16 to total C20 weight ratio less than 5.0 or less than 4.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total C7 to total C25 weight ratio greater than 2.0, a total C8 to total C25 weight ratio greater than 4.5, a total C9 to total C25 weight ratio greater than 6.5, a total C10 to total C25 weight ratio greater than 7.5, a total $C_{11}$ to total C25 weight ratio greater than 6.5, a total C12 to total C25 weight ratio greater than 6.5, a total C13 to total C25 weight ratio greater than 8.0, a total C14 to total C25 weight ratio greater than 6.0, a total C15 to total C25 weight ratio greater than 6.0, a total C16 to total C25 weight ratio greater than 4.5, a total C17 to total C25 weight ratio greater than 4.8, and a total C18 to total C25 weight ratio greater than 4.5. In alternative embodiments the condensable hydrocarbon portion has one or more of a total C7 to total C25 weight ratio greater than 7.0, a total C8 to total C25 weight ratio greater than 10.0, a total C9 to total C25 weight ratio greater than 10.0, a total C10 to total C25 weight ratio greater than 10.0, a total C11 to total C25 weight ratio greater than 8.0, and a total C12 to total C25 weight ratio greater than 8.0. In alternative embodiments the condensable hydrocarbon portion has one or more of a total C7 to total C25 weight ratio greater than 13.0, a total C8 to total C25 weight ratio greater than 17.0, a total C9 to total C25 weight ratio greater than 17.0, a total C10 to total C25 weight ratio greater than 15.0, a total C11 to total C25 weight ratio greater than 14.0, and a total C12 to total C25 weight ratio greater than 13.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C7 to total C25 weight ratio greater than 2.0. Alternatively, the condensable hydrocarbon portion may have a total C7 to total C25 weight ratio greater than 3.0, greater than 5.0, greater than 10.0, greater than 13.0, or greater than 15.0. In alternative embodiments, the condensable hydrocarbon portion may have a total C7 to total C25 weight ratio less than 30.0 or less than 25.0. In some embodiments the condensable hydrocarbon portion has a total C8 to total C25 weight ratio greater than 4.5. Alternatively, the condensable hydrocarbon portion may have a total C8 to total C25 weight ratio greater than 5.0, greater than 7.0, greater than 10.0, greater than 15.0, or greater than 17.0. In alternative embodiments, the condensable hydrocarbon portion may have a total C8 to total C25 weight ratio less than 35.0, or less than 30.0. In some embodiments the condensable hydrocarbon portion has a total C9 to total C25 weight ratio greater than 6.5. Alternatively, the condensable hydrocarbon portion may have a total C9 to total C25 weight ratio greater than 8.0, greater than 10.0, greater than 15.0, greater than 17.0, or greater than 19.0. In alternative embodiments, the condensable hydrocarbon portion may have a total C9 to total C25 weight ratio less than 40.0 or less than 35.0. In some embodiments the condensable hydrocarbon portion has a total C10 to total C25 weight ratio greater than 7.5. Alternatively, the condensable hydrocarbon portion may have a total C10 to total C25 weight ratio greater than 10.0, greater than 14.0, or greater than 17.0. In alternative embodiments, the condensable hydrocarbon portion may have a total C10 to total C25 weight ratio less than 35.0 or less than 30.0. In some embodiments the condensable hydrocarbon portion has a total C11 to total C25 weight ratio greater than 6.5. Alternatively, the condensable hydrocarbon portion may have a total C11 to total C25 weight ratio greater than 8.5, greater than 10.0, greater than 12.0, or greater than 14.0. In alternative embodiments, the condensable hydrocarbon portion may have a total C11 to total C25 weight ratio less than 35.0 or less than 30.0. In some embodiments the condensable hydrocarbon portion has a total C12 to total C25 weight ratio greater than 6.5. Alternatively, the condensable hydrocarbon portion may have a total C12 to total C25 weight ratio greater than 8.5, a total C12 to total C25 weight ratio greater than 10.0, greater than 12.0, or greater than 14.0. In alternative embodiments, the condensable hydrocarbon portion may have a total C12 to total C25 weight ratio less than 30.0 or less than 25.0. In some embodiments the condensable hydrocarbon portion has a total C13 to total C25 weight ratio greater than 8.0. Alternatively, the condensable hydrocarbon portion may have a total C13 to total C25 weight ratio greater than 10.0, greater than 12.0, or greater than 14.0. In alternative embodiments, the condensable hydrocarbon portion may have a total C13 to total C25 weight ratio less than 25.0 or less than 20.0. In some embodiments the condensable hydrocarbon portion has a total C14 to total C25 weight ratio greater than 6.0. Alternatively, the condensable hydrocarbon portion may have a total C14 to total C25 weight ratio greater than 8.0, greater than 10.0, or greater than 12.0. In alternative embodiments, the condensable hydrocarbon portion may have a total C14 to total C25 weight ratio less than 25.0 or less than 20.0. In some embodiments the condensable hydrocarbon portion has a total C15 to total C25 weight ratio greater than 6.0. Alternatively, the condensable hydrocarbon portion may have a total C15 to total C25 weight ratio greater than 8.0, or greater than 10.0. In alternative embodiments, the condensable hydrocarbon portion may have a total C15 to total C25 weight ratio less than 25.0 or less than 20.0. In some embodiments the condensable hydrocarbon portion has a total C16 to total C25 weight ratio greater than 4.5. Alternatively, the condensable hydrocarbon portion may have a total C16 to total C25 weight ratio greater than 6.0, greater than 8.0, or greater than 10.0. In alternative embodiments, the condensable hydrocarbon portion may have a total C16 to total C25 weight ratio less than 20.0 or less than 15.0. In some embodiments the condensable hydrocarbon portion has a total C17 to total C25 weight ratio greater than 4.8. Alternatively, the condensable hydrocarbon portion may have a total C17 to total C25 weight ratio greater than 5.5 or greater than 7.0. In alternative embodiments, the condensable hydrocarbon portion may have a total C17 to total C25 weight ratio less than 20.0. In some embodiments the condensable hydrocarbon portion has a total C18 to total C25 weight ratio greater than 4.5. Alternatively, the condensable hydrocarbon portion may have a total C18 to total C25 weight ratio greater than 5.0 or greater than 5.5. In alternative embodiments, the condensable hydrocarbon portion may have a total C18 to total C25 weight ratio less than 15.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total C7 to total C29 weight ratio greater than 3.5, a total C8 to total C29 weight ratio greater than 9.0, a total C9 to total C29 weight ratio greater than 12.0, a total C10 to total C29 weight ratio greater than 15.0, a total C11 to total C29 weight ratio greater than 13.0, a total C12 to total C29 weight ratio greater than 12.5, and a total C13 to total C29 weight ratio greater than 16.0, a total C14 to total C29 weight ratio greater than 12.0, a total C15 to total C29 weight ratio greater than 12.0, a total C16 to total C29 weight ratio greater than 9.0, a total C17 to total C29 weight ratio greater than 10.0, a total C18 to total C29 weight ratio greater than 8.8, a total C19 to total C29 weight ratio greater than 7.0, a total C20 to total C29 weight ratio greater than 6.0, a total C21 to total C29 weight ratio greater than 5.5, and a total C22 to total C29 weight ratio greater than 4.2. In alternative embodiments the condensable hydrocarbon portion has one or more of a total C7 to total C29 weight ratio greater than 16.0, a total C8 to total C29 weight ratio greater than 19.0, a total C9 to total C29 weight ratio greater than 20.0, a total C10 to total C29 weight ratio greater than 18.0, a total C11 to total C29 weight ratio greater than 16.0, a total C12 to total C29 weight ratio greater than 15.0, and a total C13 to total C29 weight ratio greater than 17.0, a total C14 to total C29 weight ratio greater than 13.0, a total C15 to total C29 weight ratio greater than 13.0, a total C16 to total C29 weight ratio greater than 10.0, a total C17 to total C29 weight ratio greater than 11.0, a total C18 to total C29 weight ratio greater than 9.0, a total C19 to total C29 weight ratio greater than 8.0, a total C20 to total C29 weight ratio greater than 6.5, and a total C21 to total C29 weight ratio greater than 6.0. In alternative embodiments the condensable hydrocarbon portion has one or more of a total C7 to total C29 weight ratio greater than 24.0, a total C8 to total C29 weight ratio greater than 30.0, a total C9 to total C29 weight ratio greater than 32.0, a total C10 to total C29 weight ratio greater than 30.0, a total C11 to total C29 weight ratio greater than 27.0, a total C12 to total C29 weight ratio greater than 25.0, and a total C13 to total C29 weight ratio greater than 22.0, a total C14 to total C29 weight ratio greater than 18.0, a total C15 to total C29 weight ratio greater than 18.0, a total C16 to total C29 weight ratio greater than 16.0, a total C17 to total C29 weight ratio greater than 13.0, a total C18 to total C29 weight ratio greater than 10.0, a total C19 to total C29 weight ratio greater than 9.0, and a total C20 to total C29 weight ratio greater than 7.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C7 to total C29 weight ratio greater than 3.5. Alternatively, the condensable hydrocarbon portion may have a total C7 to total C29 weight ratio greater than 5.0, greater than 10.0, greater than 18.0, greater than 20.0, or greater than 24.0. In alternative embodiments, the condensable hydrocarbon portion may have a total C7 to total C29 weight ratio less than 60.0 or less than 50.0. In some embodiments the condensable hydrocarbon portion has a total C8 to total C29 weight ratio greater than 9.0. Alternatively, the condensable hydrocarbon portion may have a total C8 to total C29 weight ratio greater than 10.0, greater than 18.0, greater than 20.0, greater than 25.0, or greater than 30.0. In alternative embodiments, the condensable hydrocarbon portion may have a total C8 to total C29 weight ratio less than 85.0 or less than 75.0. In some embodiments the condensable hydrocarbon portion has a total C9 to total C29 weight ratio greater than 12.0. Alternatively, the condensable hydrocarbon portion may have a total C9 to total C29 weight ratio greater than 15.0, greater than 20.0, greater than 23.0, greater than 27.0, or greater than 32.0. In alternative embodiments, the condensable hydrocarbon portion may have a total C9 to total C29 weight ratio less than 85.0 or less than 75.0. In some embodiments the condensable hydrocarbon portion has a total C10 to total C29 weight ratio greater than 15.0. Alternatively, the condensable hydrocarbon portion may have a total C10 to total C29 weight ratio greater than 18.0, greater than 22.0, or greater than 28.0. In alternative embodiments, the condensable hydrocarbon portion may have a total C10 to total C29 weight ratio less than 80.0 or less than 70.0. In some embodiments the condensable hydrocarbon portion has a total C11 to total C29 weight ratio greater than 13.0. Alternatively, the condensable hydrocarbon portion may have a total C11 to total C29 weight ratio greater than 16.0, greater than 18.0, greater than 24.0, or greater than 27.0. In alternative embodiments, the condensable hydrocarbon portion may have a total C11 to total C29 weight ratio less than 75.0 or less than 65.0. In some embodiments the condensable hydrocarbon portion has a total C12 to total C29 weight ratio greater than 12.5. Alternatively, the condensable hydrocarbon portion may have a total C12 to total C29 weight ratio greater than 14.5, greater than 18.0, greater than 22.0, or greater than 25.0. In alternative embodiments, the condensable hydrocarbon portion may have a total C12 to total C29 weight ratio less than 75.0 or less than 65.0. In some embodiments the condensable hydrocarbon portion has a total C13 to total C29 weight ratio greater than 16.0. Alternatively, the condensable hydrocarbon portion may have a total C13 to total C29 weight ratio greater than 18.0, greater than 20.0, or greater than 22.0. In alternative embodiments, the condensable hydrocarbon portion may have a total C13 to total C29 weight ratio less than 70.0 or less than 60.0. In some embodiments the condensable hydrocarbon portion has a total C14 to total C29 weight ratio greater than 12.0. Alternatively, the condensable hydrocarbon portion may have a total C14 to total C29 weight ratio greater than 14.0, greater than 16.0, or greater than 18.0. In alternative embodiments, the condensable hydrocarbon portion may have a total C14 to total C29 weight ratio less than 60.0 or less than 50.0. In some embodiments the condensable hydrocarbon portion has a total C15 to total C29 weight ratio greater than 12.0. Alternatively, the condensable hydrocarbon portion may have a total C15 to total C29 weight ratio greater than 15.0 or greater than 18.0. In alternative embodiments, the condensable hydrocarbon portion may have a total C15 to total C29 weight ratio less than 60.0 or less than 50.0. In some embodiments the condensable hydrocarbon portion has a total C16 to total C29 weight ratio greater than 9.0. Alternatively, the condensable hydrocarbon portion may have a total C16 to total C29 weight ratio greater than 10.0, greater than 13.0, or greater than 16.0. In alternative embodiments, the condensable hydrocarbon portion may have a total C16 to total C29 weight ratio less than 55.0 or less than 45.0. In some embodiments the condensable hydrocarbon portion has a total C17 to total C29 weight ratio greater than 10.0. Alternatively, the condensable hydrocarbon portion may have a total C17 to total C29 weight ratio greater than 11.0 or greater than 12.0. In alternative embodiments, the condensable hydrocarbon portion may have a total C17 to total C29 weight ratio less than 45.0. In some embodiments the condensable hydrocarbon portion has a total C18 to total C29 weight ratio greater than 8.8. Alternatively, the condensable hydrocarbon portion may have a total C18 to total C29 weight ratio greater than 9.0 or greater than 10.0. In alternative embodiments, the condensable hydrocarbon portion may have a total C18 to total C29 weight ratio less than 35.0. In some embodiments the condensable hydrocarbon portion has a total C19 to total C29 weight ratio greater than 7.0. Alternatively, the condensable hydrocarbon portion may have a total C19 to total C29 weight ratio greater than 8.0 or greater than 9.0. In alternative embodiments, the condensable hydrocarbon portion may have a total C19 to total C29 weight ratio less than 30.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total C9 to total C20 weight ratio between 2.5 and 6.0, a total C10 to total C20 weight ratio between 2.8 and 7.3, a total C11 to total C20 weight ratio between 2.6 and 6.5, a total C12 to total C20 weight ratio between 2.6 and 6.4 and a total C13 to total C20 weight ratio between 3.2 and 8.0. In alternative embodiments the condensable hydrocarbon portion has one or more of a total C9 to total C20 weight ratio between 3.0 and 5.5, a total C10 to total C20 weight ratio between 3.2 and 7.0, a total C11 to total C20 weight ratio between 3.0 and 6.0, a total C12 to total C20 weight ratio between 3.0 and 6.0, and a total C13 to total C20 weight ratio between 3.3 and 7.0. In alternative embodiments the condensable hydrocarbon portion has one or more of a total C9 to total C20 weight ratio between 4.6 and 5.5, a total C10 to total C20 weight ratio between 4.2 and 7.0, a total C11 to total C20 weight ratio between 3.7 and 6.0, a total C12 to total C20 weight ratio between 3.6 and 6.0, and a total C13 to total C20 weight ratio between 3.4 and 7.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C9 to total C20 weight ratio between 2.5 and 6.0. Alternatively, the condensable hydrocarbon portion may have a total C9 to total C20 weight ratio between 3.0 and 5.8, between 3.5 and 5.8, between 4.0 and 5.8, between 4.5 and 5.8, between 4.6 and 5.8, or between 4.7 and 5.8. In some embodiments the condensable hydrocarbon portion has a total C10 to total C20 weight ratio between 2.8 and 7.3. Alternatively, the condensable hydrocarbon portion may have a total C10 to total C20 weight ratio between 3.0 and 7.2, between 3.5 and 7.0, between 4.0 and 7.0, between 4.2 and 7.0, between 4.3 and 7.0, or between 4.4 and 7.0. In some embodiments the condensable hydrocarbon portion has a total C11 to total C20 weight ratio between 2.6 and 6.5. Alternatively, the condensable hydrocarbon portion may have a total C11 to total C20 weight ratio between 2.8 and 6.3, between 3.5 and 6.3, between 3.7 and 6.3, between 3.8 and 6.3, between 3.9 and 6.2, or between 4.0 and 6.2. In some embodiments the condensable hydrocarbon portion has a total C12 to total C20 weight ratio between 2.6 and 6.4. Alternatively, the condensable hydrocarbon portion may have a total C12 to total C20 weight ratio between 2.8 and 6.2, between 3.2 and 6.2, between 3.5 and 6.2, between 3.6 and 6.2, between 3.7 and 6.0, or between 3.8 and 6.0. In some embodiments the condensable hydrocarbon portion has a total C13 to total C20 weight ratio between 3.2 and 8.0. Alternatively, the condensable hydrocarbon portion may have a total C13 to total C20 weight ratio between 3.3 and 7.8, between 3.3 and 7.0, between 3.4 and 7.0, between 3.5 and 6.5, or between 3.6 and 6.0. The embodiments described in this paragraph may be combined with any of the other aspects of the invention discussed herein.

In some embodiments the condensable hydrocarbon portion may have one or more of a total C10 to total C25 weight ratio between 7.1 and 24.5, a total C11 to total C25 weight ratio between 6.5 and 22.0, a total C12 to total C25 weight ratio between 6.5 and 22.0, and a total C13 to total C25 weight ratio between 8.0 and 27.0. In alternative embodiments the condensable hydrocarbon portion has one or more of a total C10 to total C25 weight ratio between 10.0 and 24.0, a total C11 to total C25 weight ratio between 10.0 and 21.5, a total C12 to total C25 weight ratio between 10.0 and 21.5, and a total C13 to total C25 weight ratio between 9.0 and 25.0. In alternative embodiments the condensable hydrocarbon portion has one or more of a total C10 to total C25 weight ratio between 14.0 and 24.0, a total C11 to total C25 weight ratio between 12.5 and 21.5, a total C12 to total C25 weight ratio between 12.0 and 21.5, and a total C13 to total C25 weight ratio between 10.5 and 25.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C10 to total C25 weight ratio between 7.1 and 24.5. Alternatively, the condensable hydrocarbon portion may have a total C10 to total C25 weight ratio between 7.5 and 24.5, between 12.0 and 24.5, between 13.8 and 24.5, between 14.0 and 24.5, or between 15.0 and 24.5. In some embodiments the condensable hydrocarbon portion has a total C11 to total C25 weight ratio between 6.5 and 22.0. Alternatively, the condensable hydrocarbon portion may have a total C11 to total C25 weight ratio between 7.0 and 21.5, between 10.0 and 21.5, between 12.5 and 21.5, between 13.0 and 21.5, between 13.7 and 21.5, or between 14.5 and 21.5. In some embodiments the condensable hydrocarbon portion has a total C12 to total C25 weight ratio between 10.0 and 21.5. Alternatively, the condensable hydrocarbon portion may have a total C12 to total C25 weight ratio between 10.5 and 21.0, between 11.0 and 21.0, between 12.0 and 21.0, between 12.5 and 21.0, between 13.0 and 21.0, or between 13.5 and 21.0. In some embodiments the condensable hydrocarbon portion has a total C13 to total C25 weight ratio between 8.0 and 27.0. Alternatively, the condensable hydrocarbon portion may have a total C13 to total C25 weight ratio between 9.0 and 26.0, between 10.0 and 25.0, between 10.5 and 25.0, between 11.0 and 25.0, or between 11.5 and 25.0. The embodiments described in this paragraph may be combined with any of the other aspects of the invention discussed herein.

In some embodiments the condensable hydrocarbon portion may have one or more of a total C10 to total C29 weight ratio between 15.0 and 60.0, a total C11 to total C29 weight ratio between 13.0 and 54.0, a total C12 to total C29 weight ratio between 12.5 and 53.0, and a total C13 to total C29 weight ratio between 16.0 and 65.0. In alternative embodiments the condensable hydrocarbon portion has one or more of a total C10 to total C29 weight ratio between 17.0 and 58.0, a total C11 to total C29 weight ratio between 15.0 and 52.0, a total C12 to total C29 weight ratio between 14.0 and 50.0, and a total C13 to total C29 weight ratio between 17.0 and 60.0. In alternative embodiments the condensable hydrocarbon portion has one or more of a total C10 to total C29 weight ratio between 20.0 and 58.0, a total C11 to total C29 weight ratio between 18.0 and 52.0, a total C12 to total C29 weight ratio between 18.0 and 50.0, and a total C13 to total C29 weight ratio between 18.0 and 50.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C10 to total C29 weight ratio between 15.0 and 60.0. Alternatively, the condensable hydrocarbon portion may have a total C10 to total C29 weight ratio between 18.0 and 58.0, between 20.0 and 58.0, between 24.0 and 58.0, between 27.0 and 58.0, or between 30.0 and 58.0. In some embodiments the condensable hydrocarbon portion has a total C11 to total C29 weight ratio between 13.0 and 54.0. Alternatively, the condensable hydrocarbon portion may have a total C11 to total C29 weight ratio between 15.0 and 53.0, between 18.0 and 53.0, between 20.0 and 53.0, between 22.0 and 53.0, between 25.0 and 53.0, or between 27.0 and 53.0. In some embodiments the condensable hydrocarbon portion has a total C12 to total C29 weight ratio between 12.5 and 53.0. Alternatively, the condensable hydrocarbon portion may have a total C12 to total C29 weight ratio between 14.5 and 51.0, between 16.0 and 51.0, between 18.0 and 51.0, between 20.0 and 51.0, between 23.0 and 51.0, or between 25.0 and 51.0. In some embodiments the condensable hydrocarbon portion has a total C13 to total C29 weight ratio between 16.0 and 65.0. Alternatively, the condensable hydrocarbon portion may have a total C13 to total C29 weight ratio between 17.0 and 60.0, between 18.0 and 60.0, between 20.0 and 60.0, between 22.0 and 60.0, or between 25.0 and 60.0. The embodiments described in this paragraph may be combined with any of the other aspects of the invention discussed herein.

In some embodiments the condensable hydrocarbon portion may have one or more of a normal-C7 to normal-C20 weight ratio greater than 0.9, a normal-C8 to normal-C20 weight ratio greater than 2.0, a normal-C9 to normal-C20 weight ratio greater than 1.9, a normal-C10 to normal-C20 weight ratio greater than 2.2, a normal-C11 to normal-C20 weight ratio greater than 1.9, a normal-C12 to normal-C20 weight ratio greater than 1.9, a normal-C13 to normal-C20 weight ratio greater than 2.3, a normal-C14 to normal-C20 weight ratio greater than 1.8, a normal-C15 to normal-C20 weight ratio greater than 1.8, and normal-C16 to normal-C20 weight ratio greater than 1.3. In alternative embodiments the condensable hydrocarbon portion has one or more of a normal-C7 to normal-C20 weight ratio greater than 4.4, a normal-C8 to normal-C20 weight ratio greater than 3.7, a normal-C9 to normal-C20 weight ratio greater than 3.5, a normal-C10 to normal-C20 weight ratio greater than 3.4, a normal-C11 to normal-C20 weight ratio greater than 3.0, and a normal-C12 to normal-C20 weight ratio greater than 2.7. In alternative embodiments the condensable hydrocarbon portion has one or more of a normal-C7 to normal-C20 weight ratio greater than 4.9, a normal-C8 to normal-C20 weight ratio greater than 4.5, a normal-C9 to normal-C20 weight ratio greater than 4.4, a normal-C10 to normal-C20 weight ratio greater than 4.1, a normal-C11 to normal-C20 weight ratio greater than 3.7, and a normal-C12 to normal-C20 weight ratio greater than 3.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C7 to normal-C20 weight ratio greater than 0.9. Alternatively, the condensable hydrocarbon portion may have a normal-C7 to normal-C20 weight ratio greater than 1.0, than 2.0, greater than 3.0, greater than 4.0, greater than 4.5, or greater than 5.0. In alternative embodiments, the condensable hydrocarbon portion may have a normal-C7 to normal-C20 weight ratio less than 8.0 or less than 7.0. In some embodiments the condensable hydrocarbon portion has a normal-C8 to normal-C20 weight ratio greater than 1.7. Alternatively, the condensable hydrocarbon portion may have a normal-C8 to normal-C20 weight ratio greater than 2.0, greater than 2.5, greater than 3.0, greater than 3.5, greater than 4.0, or greater than 4.4. In alternative embodiments, the condensable hydrocarbon portion may have a normal-C8 to normal-C20 weight ratio less than 8.0 or less than 7.0. In some embodiments the condensable hydrocarbon portion has a normal-C9 to normal-C20 weight ratio greater than 1.9. Alternatively, the condensable hydrocarbon portion may have a normal-C9 to normal-C20 weight ratio greater than 2.0, greater than 3.0, greater than 4.0, or greater than 4.5. In alternative embodiments, the condensable hydrocarbon portion may have a normal-C9 to normal-C20 weight ratio less than 7.0 or less than 6.0. In some embodiments the condensable hydrocarbon portion has a normal-C10 to normal-C20 weight ratio greater than 2.2. Alternatively, the condensable hydrocarbon portion may have a normal-C10 to normal-C20 weight ratio greater than 2.8, greater than 3.3, greater than 3.5, or greater than 4.0. In alternative embodiments, the condensable hydrocarbon portion may have a normal-C10 to normal-C20 weight ratio less than 7.0 or less than 6.0. In some embodiments the condensable hydrocarbon portion has a normal-C11 to normal-C20 weight ratio greater than 1.9. Alternatively, the condensable hydrocarbon portion may have a normal-C11 to normal-C20 weight ratio greater than 2.5, greater than 3.0, greater than 3.5, or greater than 3.7. In alternative embodiments, the condensable hydrocarbon portion may have a normal-C11 to normal-C20 weight ratio less than 7.0 or less than 6.0. In some embodiments the condensable hydrocarbon portion has a normal-C12 to normal-C20 weight ratio greater than 1.9. Alternatively, the condensable hydrocarbon portion may have a normal-C12 to normal-C20 weight ratio greater than 2.0, greater than 2.2, greater than 2.6, or greater than 3.0. In alternative embodiments, the condensable hydrocarbon portion may have a normal-C12 to normal-C20 weight ratio less than 7.0 or less than 6.0. In some embodiments the condensable hydrocarbon portion has a normal-C13 to normal-C20 weight ratio greater than 2.3. Alternatively, the condensable hydrocarbon portion may have a normal-C13 to normal-C20 weight ratio greater than 2.5, greater than 2.7, or greater than 3.0. In alternative embodiments, the condensable hydrocarbon portion may have a normal-C13 to normal-C20 weight ratio less than 6.0 or less than 5.0. In some embodiments the condensable hydrocarbon portion has a normal-C14 to normal-C20 weight ratio greater than 1.8. Alternatively, the condensable hydrocarbon portion may have a normal-C14 to normal-C20 weight ratio greater than 2.0, greater than 2.2, or greater than 2.5. In alternative embodiments, the condensable hydrocarbon portion may have a normal-C14 to normal-C20 weight ratio less than 6.0 or less than 4.0. In some embodiments the condensable hydrocarbon portion has a normal-C15 to normal-C20 weight ratio greater than 1.8. Alternatively, the condensable hydrocarbon portion may have a normal-C15 to normal-C20 weight ratio greater than 2.0, greater than 2.2, or greater than 2.4. In alternative embodiments, the condensable hydrocarbon portion may have a normal-C15 to normal-C20 weight ratio less than 6.0 or less than 4.0. In some embodiments the condensable hydrocarbon portion has a normal-C16 to normal-C20 weight ratio greater than 1.3. Alternatively, the condensable hydrocarbon portion may have a normal-C16 to normal-C20 weight ratio greater than 1.5, greater than 1.7, or greater than 2.0. In alternative embodiments, the condensable hydrocarbon portion may have a normal-C16 to normal-C20 weight ratio less than 5.0 or less than 4.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-C7 to normal-C25 weight ratio greater than 1.9, a normal-C8 to normal-C25 weight ratio greater than 3.9, a normal-C9 to normal-C25 weight ratio greater than 3.7, a normal-C10 to normal-C25 weight ratio greater than 4.4, a normal-C11 to normal-C25 weight ratio greater than 3.8, a normal-C12 to normal-C25 weight ratio greater than 3.7, a normal-C13 to normal-C25 weight ratio greater than 4.7, a normal-C14 to normal-C25 weight ratio greater than 3.7, a normal-C15 to normal-C25 weight ratio greater than 3.7, a normal-C16 to normal-C25 weight ratio greater than 2.5, a normal-C17 to normal-C25 weight ratio greater than 3.0, and a normal-C18 to normal-C25 weight ratio greater than 3.4. In alternative embodiments the condensable hydrocarbon portion has one or more of a normal-C7 to normal-C25 weight ratio greater than 10, a normal-C8 to normal-C25 weight ratio greater than 8.0, a normal-C9 to normal-C25 weight ratio greater than 7.0, a normal-C10 to normal-C25 weight ratio greater than 7.0, a normal-C11 to normal-C25 weight ratio greater than 7.0, and a normal-C12 to normal-C25 weight ratio greater than 6.0. In alternative embodiments the condensable hydrocarbon portion has one or more of a normal-C7 to normal-C25 weight ratio greater than 10.0, a normal-C8 to normal-C25 weight ratio greater than 12.0, a normal-C9 to normal-C25 weight ratio greater than 11.0, a normal-C10 to normal-C25 weight ratio greater than 11.0, a normal-C11 to normal-C25 weight ratio greater than 9.0, and a normal-C12 to normal-C25 weight ratio greater than 8.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C7 to normal-C25 weight ratio greater than 1.9. Alternatively, the condensable hydrocarbon portion may have a normal-C7 to normal-C25 weight ratio greater than 3.0, greater than 5.0, greater than 8.0, greater than 10.0, or greater than 13.0. In alternative embodiments, the condensable hydrocarbon portion may have a normal-C7 to normal-C25 weight ratio less than 35.0 or less than 25.0. In some embodiments the condensable hydrocarbon portion has a normal-C8 to normal-C25 weight ratio greater than 3.9. Alternatively, the condensable hydrocarbon portion may have a normal-C8 to normal-C25 weight ratio greater than 4.5, greater than 6.0, greater than 8.0, greater than 10.0, or greater than 13.0. In alternative embodiments, the condensable hydrocarbon portion may have a normal-C8 to normal-C25 weight ratio less than 35.0 or less than 25.0. In some embodiments the condensable hydrocarbon portion has a normal-C9 to normal-C25 weight ratio greater than 3.7. Alternatively, the condensable hydrocarbon portion may have a normal-C9 to normal-C25 weight ratio greater than 4.5, greater than 7.0, greater than 10.0, greater than 12.0, or greater than 13.0. In alternative embodiments, the condensable hydrocarbon portion may have a normal-C9 to normal-C25 weight ratio less than 35.0 or less than 25.0. In some embodiments the condensable hydrocarbon portion has a normal-C10 to normal-C25 weight ratio greater than 4.4. Alternatively, the condensable hydrocarbon portion may have a normal-C10 to normal-C25 weight ratio greater than 6.0, greater than 8.0, or greater than 11.0. In alternative embodiments, the condensable hydrocarbon portion may have a normal-C10 to normal-C25 weight ratio less than 35.0 or less than 25.0. In some embodiments the condensable hydrocarbon portion has a normal-C11 to normal-C25 weight ratio greater than 3.8. Alternatively, the condensable hydrocarbon portion may have a normal-C11 to normal-C25 weight ratio greater than 4.5, greater than 7.0, greater than 8.0, or greater than 10.0. In alternative embodiments, the condensable hydrocarbon portion may have a normal-C11 to normal-C25 weight ratio less than 35.0 or less than 25.0. In some embodiments the condensable hydrocarbon portion has a normal-C12 to normal-C25 weight ratio greater than 3.7. Alternatively, the condensable hydrocarbon portion may have a normal-C12 to normal-C25 weight ratio greater than 4.5, greater than 6.0, greater than 7.0, or greater than 8.0. In alternative embodiments, the condensable hydrocarbon portion may have a normal-C12 to normal-C25 weight ratio less than 30.0 or less than 20.0. In some embodiments the condensable hydrocarbon portion has a normal-C13 to normal-C25 weight ratio greater than 4.7. Alternatively, the condensable hydrocarbon portion may have a normal-C13 to normal-C25 weight ratio greater than 5.0, greater than 6.0, or greater than 7.5. In alternative embodiments, the condensable hydrocarbon portion may have a normal-C13 to normal-C25 weight ratio less than 25.0 or less than 20.0. In some embodiments the condensable hydrocarbon portion has a normal-C14 to normal-C25 weight ratio greater than 3.7. Alternatively, the condensable hydrocarbon portion may have a normal-C14 to normal-C25 weight ratio greater than 4.5, greater than 5.5, or greater than 7.0. In alternative embodiments, the condensable hydrocarbon portion may have a normal-C14 to normal-C25 weight ratio less than 25.0 or less than 20.0. In some embodiments the condensable hydrocarbon portion has a normal-C15 to normal-C25 weight ratio greater than 3.7. Alternatively, the condensable hydrocarbon portion may have a normal-C15 to normal-C25 weight ratio greater than 4.2 or greater than 5.0. In alternative embodiments, the condensable hydrocarbon portion may have a normal-C15 to normal-C25 weight ratio less than 25.0 or less than 20.0. In some embodiments the condensable hydrocarbon portion has a normal-C16 to normal-C25 weight ratio greater than 2.5. Alternatively, the condensable hydrocarbon portion may have a normal-C16 to normal-C25 weight ratio greater than 3.0, greater than 4.0, or greater than 5.0. In alternative embodiments, the condensable hydrocarbon portion may have a normal-C16 to normal-C25 weight ratio less than 20.0 or less than 15.0. In some embodiments the condensable hydrocarbon portion has a normal-C17 to normal-C25 weight ratio greater than 3.0. Alternatively, the condensable hydrocarbon portion may have a normal-C17 to normal-C25 weight ratio greater than 3.5 or greater than 4.0. In alternative embodiments, the condensable hydrocarbon portion may have a normal-C17 to normal-C25 weight ratio less than 20.0. In some embodiments the condensable hydrocarbon portion has a normal-C18 to normal-C25 weight ratio greater than 3.4. Alternatively, the condensable hydrocarbon portion may have a normal-C18 to normal-C25 weight ratio greater than 3.6 or greater than 4.0. In alternative embodiments, the condensable hydrocarbon portion may have a normal-C18 to normal-C25 weight ratio less than 15.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-C7 to normal-C29 weight ratio greater than 18.0, a normal-C8 to normal-C29 weight ratio greater than 16.0, a normal-C9 to normal-C29 weight ratio greater than 14.0, a normal-C10 to normal-C29 weight ratio greater than 14.0, a normal-C11 to normal-C29 weight ratio greater than 13.0, a normal-C12 to normal-C29 weight ratio greater than 11.0, a normal-C13 to normal-C29 weight ratio greater than 10.0, a normal-C14 to normal-C29 weight ratio greater than 9.0, a normal-C15 to normal-C29 weight ratio greater than 8.0, a normal-C16 to normal-C29 weight ratio greater than 8.0, a normal-C17 to normal-C29 weight ratio greater than 6.0, a normal-C18 to normal-C29 weight ratio greater than 6.0, a normal-C19 to normal-C29 weight ratio greater than 5.0, a normal-C20 to normal-C29 weight ratio greater than 4.0, a normal-C21 to normal-C29 weight ratio greater than 3.6, and a normal-C22 to normal-C29 weight ratio greater than 2.8. In alternative embodiments the condensable hydrocarbon portion has one or more of a normal-C7 to normal-C29 weight ratio greater than 20.0, a normal-C8 to normal-C29 weight ratio greater than 18.0, a normal-C9 to normal-C29 weight ratio greater than 17.0, a normal-C10 to normal-C29 weight ratio greater than 16.0, a normal-C11 to normal-C29 weight ratio greater than 15.0, a normal-C12 to normal-C29 weight ratio greater than 12.5, a normal-C13 to normal-C29 weight ratio greater than 11.0, a normal-C14 to normal-C29 weight ratio greater than 10.0, a normal-C15 to normal-C29 weight ratio greater than 8.0, a normal-C16 to normal-C29 weight ratio greater than 8.0, a normal-C17 to normal-C29 weight ratio greater than 7.0, a normal-C18 to normal-C29 weight ratio greater than 6.5, a normal-C19 to normal-C29 weight ratio greater than 5.5, a normal-C20 to normal-C29 weight ratio greater than 4.5, and a normal-C21 to normal-C29 weight ratio greater than 4.0. In alternative embodiments the condensable hydrocarbon portion has one or more of a normal-C7 to normal-C29 weight ratio greater than 23.0, a normal-C8 to normal-C29 weight ratio greater than 21.0, a normal-C9 to normal-C29 weight ratio greater than 20.0, a normal-C10 to normal-C29 weight ratio greater than 19.0, a normal-C11 to normal-C29 weight ratio greater than 17.0, a normal-C12 to normal-C29 weight ratio greater than 14.0, a normal-C13 to normal-C29 weight ratio greater than 12.0, a normal-C14 to normal-C29 weight ratio greater than 11.0, a normal-C15 to normal-C29 weight ratio greater than 9.0, a normal-C16 to normal-C29 weight ratio greater than 9.0, a normal-C17 to normal-C29 weight ratio greater than 7.5, a normal-C18 to normal-C29 weight ratio greater than 7.0, a normal-C19 to normal-C29 weight ratio greater than 6.5, a normal-C20 to normal-C29 weight ratio greater than 4.8, and a normal-C21 to normal-C29 weight ratio greater than 4.5. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C7 to normal-C29 weight ratio greater than 18.0. Alternatively, the condensable hydrocarbon portion may have a normal-C7 to normal-C29 weight ratio greater than 20.0, greater than 22.0, greater than 25.0, greater than 30.0, or greater than 35.0. In alternative embodiments, the condensable hydrocarbon portion may have a normal-C7 to normal-C29 weight ratio less than 70.0 or less than 60.0. In some embodiments the condensable hydrocarbon portion has a normal-C8 to normal-C29 weight ratio greater than 16.0. Alternatively, the condensable hydrocarbon portion may have a normal-C8 to normal-C29 weight ratio greater than 18.0, greater than 22.0, greater than 25.0, greater than 27.0, or greater than 30.0. In alternative embodiments, the condensable hydrocarbon portion may have a normal-C8 to normal-C29 weight ratio less than 85.0 or less than 75.0. In some embodiments the condensable hydrocarbon portion has a normal-C9 to normal-C29 weight ratio greater than 14.0. Alternatively, the condensable hydrocarbon portion may have a normal-C9 to normal-C29 weight ratio greater than 18.0, greater than 20.0, greater than 23.0, greater than 27.0, or greater than 30.0. In alternative embodiments, the condensable hydrocarbon portion may have a normal-C9 to normal-C29 weight ratio less than 85.0 or less than 75.0. In some embodiments the condensable hydrocarbon portion has a normal-C10 to normal-C29 weight ratio greater than 14.0. Alternatively, the condensable hydrocarbon portion may have a normal-C10 to normal-C29 weight ratio greater than 20.0, greater than 25.0, or greater than 30.0. In alternative embodiments, the condensable hydrocarbon portion may have a normal-C10 to normal-C29 weight ratio less than 80.0 or less than 70.0. In some embodiments the condensable hydrocarbon portion has a normal-C11 to normal-C29 weight ratio greater than 13.0. Alternatively, the condensable hydrocarbon portion may have a normal-C11 to normal-C29 weight ratio greater than 16.0, greater than 18.0, greater than 24.0, or greater than 27.0. In alternative embodiments, the condensable hydrocarbon portion may have a normal-C11 to normal-C29 weight ratio less than 75.0 or less than 65.0. In some embodiments the condensable hydrocarbon portion has a normal-C12 to normal-C29 weight ratio greater than 11.0. Alternatively, the condensable hydrocarbon portion may have a normal-C12 to normal-C29 weight ratio greater than 14.5, greater than 18.0, greater than 22.0, or greater than 25.0. In alternative embodiments, the condensable hydrocarbon portion may have a normal-C12 to normal-C29 weight ratio less than 75.0 or less than 65.0. In some embodiments the condensable hydrocarbon portion has a normal-C13 to normal-C29 weight ratio greater than 10.0. Alternatively, the condensable hydrocarbon portion may have a normal-C13 to normal-C29 weight ratio greater than 18.0, greater than 20.0, or greater than 22.0. In alternative embodiments, the condensable hydrocarbon portion may have a normal-C13 to normal-C29 weight ratio less than 70.0 or less than 60.0. In some embodiments the condensable hydrocarbon portion has a normal-C14 to normal-C29 weight ratio greater than 9.0. Alternatively, the condensable hydrocarbon portion may have a normal-C14 to normal-C29 weight ratio greater than 14.0, greater than 16.0, or greater than 18.0. In alternative embodiments, the condensable hydrocarbon portion may have a normal-C14 to normal-C29 weight ratio less than 60.0 or less than 50.0. In some embodiments the condensable hydrocarbon portion has a normal-C15 to normal-C29 weight ratio greater than 8.0. Alternatively, the condensable hydrocarbon portion may have a normal-C15 to normal-C29 weight ratio greater than 12.0 or greater than 16.0. In alternative embodiments, the condensable hydrocarbon portion may have a normal-C15 to normal-C29 weight ratio less than 60.0 or less than 50.0. In some embodiments the condensable hydrocarbon portion has a normal-C16 to normal-C29 weight ratio greater than 8.0. Alternatively, the condensable hydrocarbon portion may have a normal-C16 to normal-C29 weight ratio greater than 10.0, greater than 13.0, or greater than 15.0. In alternative embodiments, the condensable hydrocarbon portion may have a normal-C16 to normal-C29 weight ratio less than 55.0 or less than 45.0. In some embodiments the condensable hydrocarbon portion has a normal-C17 to normal-C29 weight ratio greater than 6.0. Alternatively, the condensable hydrocarbon portion may have a normal-C17 to normal-C29 weight ratio greater than 8.0 or greater than 12.0. In alternative embodiments, the condensable hydrocarbon portion may have a normal-C17 to normal-C29 weight ratio less than 45.0. In some embodiments the condensable hydrocarbon portion has a normal-C18 to normal-C29 weight ratio greater than 6.0. Alternatively, the condensable hydrocarbon portion may have a normal-C18 to normal-C29 weight ratio greater than 8.0 or greater than 10.0. In alternative embodiments, the condensable hydrocarbon portion may have a normal-C18 to normal-C29 weight ratio less than 35.0. In some embodiments the condensable hydrocarbon portion has a normal-C19 to normal-C29 weight ratio greater than 5.0. Alternatively, the condensable hydrocarbon portion may have a normal-C19 to normal-C29 weight ratio greater than 7.0 or greater than 9.0. In alternative embodiments, the condensable hydrocarbon portion may have a normal-C19 to normal-C29 weight ratio less than 30.0. In some embodiments the condensable hydrocarbon portion has a normal-C20 to normal-C29 weight ratio greater than 4.0. Alternatively, the condensable hydrocarbon portion may have a normal-C20 to normal-C29 weight ratio greater than 6.0 or greater than 8.0. In alternative embodiments, the condensable hydrocarbon portion may have a normal-C20 to normal-C29 weight ratio less than 30.0. In some embodiments the condensable hydrocarbon portion has a normal-C21 to normal-C29 weight ratio greater than 3.6. Alternatively, the condensable hydrocarbon portion may have a normal-C21 to normal-C29 weight ratio greater than 4.0 or greater than 6.0. In alternative embodiments, the condensable hydrocarbon portion may have a normal-C21 to normal-C29 weight ratio less than 30.0. In some embodiments the condensable hydrocarbon portion has a normal-C22 to normal-C29 weight ratio greater than 2.8. Alternatively, the condensable hydrocarbon portion may have a normal-C22 to normal-C29 weight ratio greater than 3.0. In alternative embodiments, the condensable hydrocarbon portion may have a normal-C22 to normal-C29 weight ratio less than 30.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-C10 to total C10 weight ratio less than 0.31, a normal-C11 to total C11 weight ratio less than 0.32, a normal-C12 to total C12 weight ratio less than 0.29, a normal-C13 to total C13 weight ratio less than 0.28, a normal-C14 to total C14 weight ratio less than 0.31, a normal-C15 to total C15 weight ratio less than 0.27, a normal-C16 to total C16 weight ratio less than 0.31, a normal-C17 to total C17 weight ratio less than 0.31, a normal-C18 to total C18 weight ratio less than 0.37, normal-C19 to total C19 weight ratio less than 0.37, a normal-C20 to total C20 weight ratio less than 0.37, a normal-C21 to total C21 weight ratio less than 0.37, a normal-C22 to total C22 weight ratio less than 0.38, normal-C23 to total C23 weight ratio less than 0.43, a normal-C24 to total C24 weight ratio less than 0.48, and a normal-C25 to total C25 weight ratio less than 0.53. In alternative embodiments the condensable hydrocarbon portion has one or more of a normal-C11 to total C11 weight ratio less than 0.30, a normal-C12 to total C12 weight ratio less than 0.27, a normal-C13 to total C13 weight ratio less than 0.26, a normal-C14 to total C14 weight ratio less than 0.29, a normal-C15 to total C15 weight ratio less than 0.24, a normal-C16 to total C16 weight ratio less than 0.25, a normal-C17 to total C17 weight ratio less than 0.29, a normal-C18 to total C18 weight ratio less than 0.31, normal-C19 to total C19 weight ratio less than 0.35, a normal-C20 to total C20 weight ratio less than 0.33, a normal-C21 to total C21 weight ratio less than 0.33, a normal-C22 to total C22 weight ratio less than 0.35, normal-C23 to total C23 weight ratio less than 0.40, a normal-C24 to total C24 weight ratio less than 0.45, and a normal-C25 to total C25 weight ratio less than 0.49. In alternative embodiments the condensable hydrocarbon portion has one or more of a normal-C11 to total C11 weight ratio less than 0.28, a normal-C12 to total C12 weight ratio less than 0.25, a normal-C13 to total C13 weight ratio less than 0.24, a normal-C14 to total C14 weight ratio less than 0.27, a normal-C15 to total C15 weight ratio less than 0.22, a normal-C16 to total C16 weight ratio less than 0.23, a normal-C17 to total C17 weight ratio less than 0.25, a normal-C18 to total C18 weight ratio less than 0.28, normal-C19 to total C19 weight ratio less than 0.31, a normal-C20 to total C20 weight ratio less than 0.29, a normal-C21 to total C21 weight ratio less than 0.30, a normal-C22 to total C22 weight ratio less than 0.28, normal-C23 to total C23 weight ratio less than 0.33, a normal-C24 to total C24 weight ratio less than 0.40, and a normal-C25 to total C25 weight ratio less than 0.45. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C10 to total C10 weight ratio less than 0.31. Alternatively, the condensable hydrocarbon portion may have a normal-C10 to total C10 weight ratio less than 0.30 or less than 0.29. In alternative embodiments, the condensable hydrocarbon portion may have a normal-C10 to total C10 weight ratio greater than 0.15 or greater than 0.20. In some embodiments the condensable hydrocarbon portion has a normal-C11 to total C11 weight ratio less than 0.32. Alternatively, the condensable hydrocarbon portion may have a normal-C11 to total C11 weight ratio less than 0.31, less than 0.30, or less than 0.29. In alternative embodiments, the condensable hydrocarbon portion may have a normal-C11 to total C11 weight ratio greater than 0.15 or greater than 0.20. In some embodiments the condensable hydrocarbon portion has a normal-C12 to total C12 weight ratio less than 0.29. Alternatively, the condensable hydrocarbon portion may have a normal-C12 to total C12 weight ratio less than 0.26, or less than 0.24. In alternative embodiments, the condensable hydrocarbon portion may have a normal-C12 to total C12 weight ratio greater than 0.10 or greater than 0.15. In some embodiments the condensable hydrocarbon portion has a normal-C13 to total C13 weight ratio less than 0.28. Alternatively, the condensable hydrocarbon portion may have a normal-C13 to total C13 weight ratio less than 0.27, less than 0.25, or less than 0.23. In alternative embodiments, the condensable hydrocarbon portion may have a normal-C13 to total C13 weight ratio greater than 0.10 or greater than 0.15. In some embodiments the condensable hydrocarbon portion has a normal-C14 to total C14 weight ratio less than 0.31. Alternatively, the condensable hydrocarbon portion may have a normal-C14 to total C14 weight ratio less than 0.30, less than 0.28, or less than 0.26. In alternative embodiments, the condensable hydrocarbon portion may have a normal-C14 to total C14 weight ratio greater than 0.10 or greater than 0.15. In some embodiments the condensable hydrocarbon portion has a normal-C15 to total C15 weight ratio less than 0.27. Alternatively, the condensable hydrocarbon portion may have a normal-C15 to total C15 weight ratio less than 0.26, less than 0.24, or less than 0.22. In alternative embodiments, the condensable hydrocarbon portion may have a normal-C15 to total C15 weight ratio greater than 0.10 or greater than 0.15. In some embodiments the condensable hydrocarbon portion has a normal-C16 to total C16 weight ratio less than 0.31. Alternatively, the condensable hydrocarbon portion may have a normal-C16 to total C16 weight ratio less than 0.29, less than 0.26, or less than 0.24. In alternative embodiments, the condensable hydrocarbon portion may have a normal-C16 to total C16 weight ratio greater than 0.10 or greater than 0.15. In some embodiments the condensable hydrocarbon portion has a normal-C17 to total C17 weight ratio less than 0.31. Alternatively, the condensable hydrocarbon portion may have a normal-C17 to total C17 weight ratio less than 0.29, less than 0.27, or less than 0.25. In alternative embodiments, the condensable hydrocarbon portion may have a normal-C17 to total C17 weight ratio greater than 0.10 or greater than 0.15. In some embodiments the condensable hydrocarbon portion has a normal-C18 to total C18 weight ratio less than 0.37. Alternatively, the condensable hydrocarbon portion may have a normal-C18 to total C18 weight ratio less than 0.35, less than 0.31, or less than 0.28. In alternative embodiments, the condensable hydrocarbon portion may have a normal-C18 to total C18 weight ratio greater than 0.10 or greater than 0.15. In some embodiments the condensable hydrocarbon portion has a normal-C19 to total C19 weight ratio less than 0.37. Alternatively, the condensable hydrocarbon portion may have a normal-C19 to total C19 weight ratio less than 0.36, less than 0.34, or less than 0.31. In alternative embodiments, the condensable hydrocarbon portion may have a normal-C19 to total C19 weight ratio greater than 0.10 or greater than 0.15. In some embodiments the condensable hydrocarbon portion has a normal-C20 to total C20 weight ratio less than 0.37. Alternatively, the condensable hydrocarbon portion may have a normal-C20 to total C20 weight ratio less than 0.35, less than 0.32, or less than 0.29. In alternative embodiments, the condensable hydrocarbon portion may have a normal-C20 to total C20 weight ratio greater than 0.10 or greater than 0.15. In some embodiments the condensable hydrocarbon portion has a normal-C21 to total C21 weight ratio less than 0.37. Alternatively, the condensable hydrocarbon portion may have a normal-C21 to total C21 weight ratio less than 0.35, less than 0.32, or less than 0.30. In alternative embodiments, the condensable hydrocarbon portion may have a normal-C21 to total C21 weight ratio greater than 0.10 or greater than 0.15. In some embodiments the condensable hydrocarbon portion has a normal-C22 to total C22 weight ratio less than 0.38. Alternatively, the condensable hydrocarbon portion may have a normal-C22 to total C22 weight ratio less than 0.36, less than 0.34, or less than 0.30. In alternative embodiments, the condensable hydrocarbon portion may have a normal-C22 to total C22 weight ratio greater than 0.10 or greater than 0.15. In some embodiments the condensable hydrocarbon portion has a normal-C23 to total C23 weight ratio less than 0.43. Alternatively, the condensable hydrocarbon portion may have a normal-C23 to total C23 weight ratio less than 0.40, less than 0.35, or less than 0.29. In alternative embodiments, the condensable hydrocarbon portion may have a normal-C23 to total C23 weight ratio greater than 0.15 or greater than 0.20. In some embodiments the condensable hydrocarbon portion has a normal-C24 to total C24 weight ratio less than 0.48. Alternatively, the condensable hydrocarbon portion may have a normal-C24 to total C24 weight ratio less than 0.46, less than 0.42, or less than 0.40. In alternative embodiments, the condensable hydrocarbon portion may have a normal-C24 to total C24 weight ratio greater than 0.15 or greater than 0.20. In some embodiments the condensable hydrocarbon portion has a normal-C25 to total C25 weight ratio less than 0.48. Alternatively, the condensable hydrocarbon portion may have a normal-C25 to total C25 weight ratio less than 0.46, less than 0.42, or less than 0.40. In alternative embodiments, the condensable hydrocarbon portion may have a normal-C25 to total C25 weight ratio greater than 0.20 or greater than 0.25. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

The use of "total C_" (e.g., total C10) herein and in the claims is meant to refer to the amount of a particular pseudo component found in a condensable hydrocarbon fluid determined as described herein, particularly as described in the section labeled "Experiments" herein. That is "total C_" is determined using the whole oil gas chromatography (WOGC) analysis methodology according to the procedure described in the Experiments section of this application. Further, "total C_" is determined from the whole oil gas chromatography (WOGC) peak integration methodology used for identifying and quantifying each pseudo-component as described in the Experiments section herein. Further, "total C_" weight percent and mole percent values for the pseudo components were obtained using the pseudo component analysis methodology involving correlations developed by Katz and Firoozabadi (Katz, D. L., and A. Firoozabadi, 1978. Predicting phase behavior of condensate/crude-oil systems using methane interaction coefficients, J. Petroleum Technology (November 1978), 1649-1655) as described in the Experiments section, including the exemplary molar and weight percentage determinations.

The use of "normal-C_" (e.g., normal-C10) herein and in the claims is meant to refer to the amount of a particular normal alkane hydrocarbon compound found in a condensable hydrocarbon fluid determined as described herein, particularly in the section labeled "Experiments" herein. That is "normal-C_" is determined from the GC peak areas determined using the whole oil gas chromatography (WOGC) analysis methodology according to the procedure described in the Experiments section of this application. Further, "total C_" is determined from the whole oil gas chromatography (WOGC) peak identification and integration methodology used for identifying and quantifying individual compound peaks as described in the Experiments section herein. Further, "normal-C_" weight percent and mole percent values for the normal alkane compounds were obtained using methodology analogous to the pseudo component exemplary molar and weight percentage determinations explained in the Experiments section, except that the densities and molecular weights for the particular normal alkane compound of interest were used and then compared to the totals obtained in the pseudo component methodology to obtain weight and molar percentages.

Figure 16:
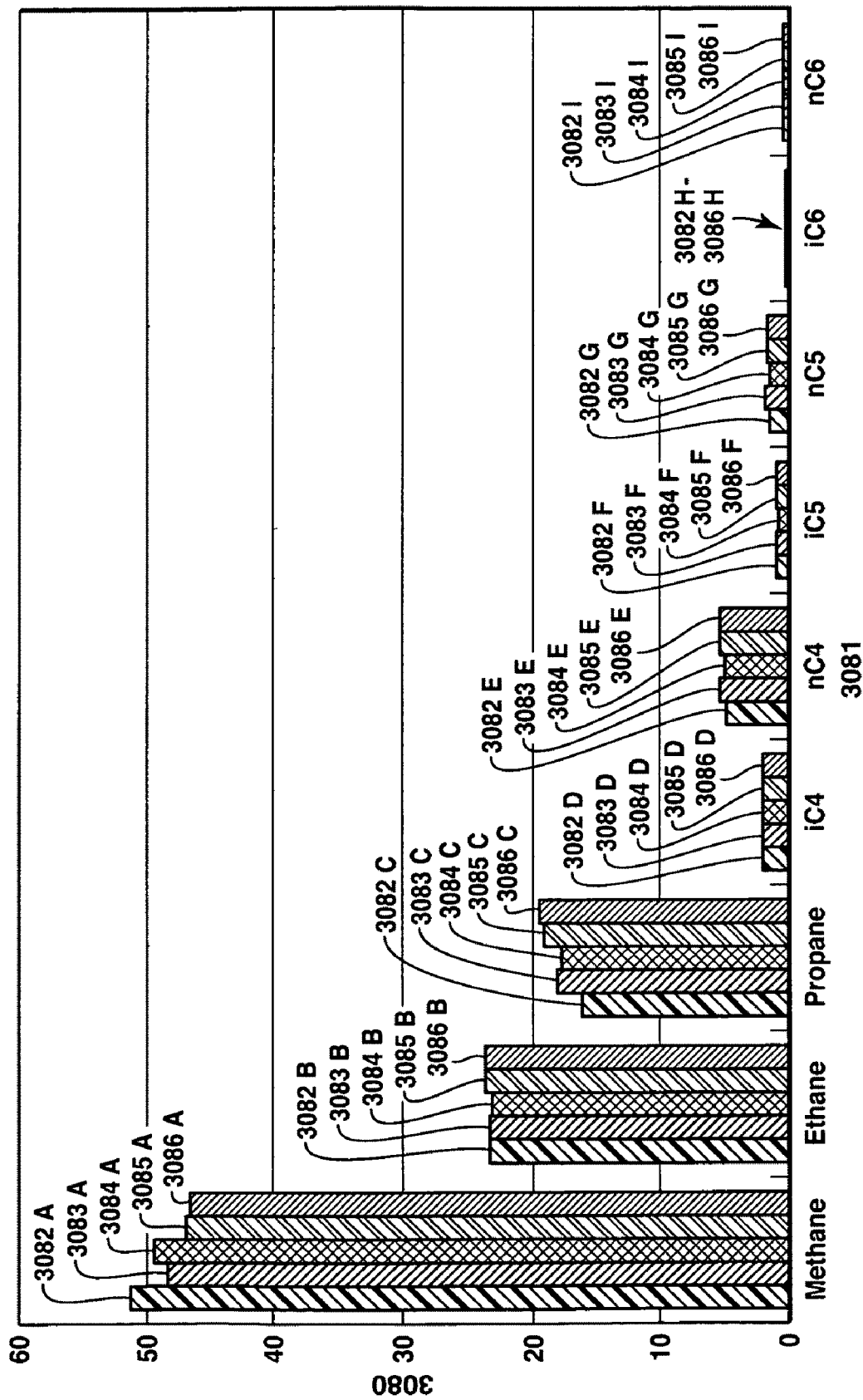
FIG. 16 is a bar graph showing the concentration, in molar percentage, of the hydrocarbon species present in the gas samples taken from duplicate laboratory experiments conducted at three different stress levels.

The following discussion of FIG. 16 concerns data obtained in Examples 1-5 which are discussed in the section labeled "Experiments". The data was obtained through the experimental procedures, gas sample collection procedures, hydrocarbon gas sample gas chromatography (GC) analysis methodology, and gas sample GC peak identification and integration methodology discussed in the Experiments section. For clarity, when referring to gas chromatograms of gaseous hydrocarbon samples, graphical data is provided for one unstressed experiment through Example 1, two 400 psi stressed experiments through Examples 2 and 3, and two 1,000 psi stressed experiments through Examples 4 and 5.

FIG. 16 is a bar graph showing the concentration, in molar percentage, of the hydrocarbon species present in the gas samples taken from each of the three stress levels tested and analyzed in the laboratory experiments discussed herein. The gas compound molar percentages were obtained through the experimental procedures, gas sample collection procedures, hydrocarbon gas sample gas chromatography (GC) analysis methodology, gas sample GC peak integration methodology and molar concentration determination procedures described herein. For clarity, the hydrocarbon molar percentages are taken as a percentage of the total of all identified hydrocarbon gas GC areas (i.e., methane, ethane, propane, iso-butane, n-butane, iso-pentane, n-pentane, 2-methyl pentane, and n-hexane) and calculated molar concentrations. Thus the graphed methane to normal C6 molar percentages for all of the experiments do not include the molar contribution of any associated non-hydrocarbon gas phase product (e.g., hydrogen, $CO_2$ or $H_2S$), any of the unidentified hydrocarbon gas species listed in Tables 2, 4, 5, 7, or 9 (e.g., peak numbers 2, 6, 8-11, 13, 15-22, 24-26, and 28-78 in Table 2) or any of the gas species dissolved in the liquid phase which were separately treated in the liquid GC's. The y-axis 3080 represents the concentration in terms of molar percent of each gaseous compound in the gas phase. The x-axis 3081 contains the identity of each hydrocarbon compound from methane to normal hexane. The bars 3082A-I represent the molar percentage of each gaseous compound for the unstressed experiment of Example 1. That is 3082A represents methane, 3082B represents ethane, 3082C represents propane, 3082D represents iso-butane, 3082E represents normal butane, 3082F represents iso-pentane, 3082G represents normal pentane, 3082H represents 2-methyl pentane, and 3082I represents normal hexane. The bars 3083A-I and 3084A-I represent the molar percent of each gaseous compound for samples from the duplicate 400 psi stressed experiments of Examples 2 and 3, with the letters assigned in the manner described for the unstressed experiment. While the bars 3085A-I and 3086A-I represent the molar percent of each gaseous compound for the duplicate 1,000 psi stressed experiments of Examples 4 and 5, with the letters assigned in the manner described for the unstressed experiment. From FIG. 16 it can be seen that the hydrocarbon gas produced in all the experiments is primarily methane, ethane and propane on a molar basis. It is further apparent that the unstressed experiment, represented by bars 3082A-I, contains the most methane 3082A and least propane 3082C, both as compared to the 400 psi stress experiments hydrocarbon gases and the 1,000 psi stress experiments hydrocarbon gases. Looking now at bars 3083A-I and 3084A-I, it is apparent that the intermediate level 400 psi stress experiments produced a hydrocarbon gas having methane 3083A & 3084A and propane 3083C & 3084C concentrations between the unstressed experiment represented by bars 3082A & 3082C and the 1,000 psi stressed experiment represented by bars 3085A & 3085C and 3086A & 3086C. Lastly, it is apparent that the high level 1,000 psi stress experiments produced hydrocarbon gases having the lowest methane 3085A & 3086A concentration and the highest propane concentrations 3085C & 3086C, as compared to both the unstressed experiments represented by bars 3082A & 3082C and the 400 psi stressed experiment represented by bars 3083A & 3084A and 3083C & 3084C. Thus pyrolizing oil shale under increasing levels of lithostatic stress appears to produce hydrocarbon gases having decreasing concentrations of methane and increasing concentrations of propane.

The hydrocarbon fluid produced from the organic-rich rock formation may include both a condensable hydrocarbon portion (e.g. liquid) and a non-condensable hydrocarbon portion (e.g. gas). In some embodiments the non-condensable hydrocarbon portion includes methane and propane. In some embodiments the molar ratio of propane to methane in the non-condensable hydrocarbon portion is greater than 0.32. In alternative embodiments, the molar ratio of propane to methane in the non-condensable hydrocarbon portion is greater than 0.34, 0.36 or 0.38. As used herein "molar ratio of propane to methane" is the molar ratio that may be determined as described herein, particularly as described in the section labeled "Experiments" herein. That is "molar ratio of propane to methane" is determined using the hydrocarbon gas sample gas chromatography (GC) analysis methodology, gas sample GC peak identification and integration methodology and molar concentration determination procedures described in the Experiments section of this application.

In some embodiments the condensable hydrocarbon portion of the hydrocarbon fluid includes benzene. In some embodiments the condensable hydrocarbon portion has a benzene content between 0.1 and 0.8 weight percent. Alternatively, the condensable hydrocarbon portion may have a benzene content between 0.15 and 0.6 weight percent, a benzene content between 0.15 and 0.5, or a benzene content between 0.15 and 0.5.

In some embodiments the condensable hydrocarbon portion of the hydrocarbon fluid includes cyclohexane. In some embodiments the condensable hydrocarbon portion has a cyclohexane content less than 0.8 weight percent. Alternatively, the condensable hydrocarbon portion may have a cyclohexane content less than 0.6 weight percent or less than 0.43 weight percent. Alternatively, the condensable hydrocarbon portion may have a cyclohexane content greater than 0.1 weight percent or greater than 0.2 weight percent.

In some embodiments the condensable hydrocarbon portion of the hydrocarbon fluid includes methyl-cyclohexane. In some embodiments the condensable hydrocarbon portion has a methly-cyclohexane content greater than 0.5 weight percent. Alternatively, the condensable hydrocarbon portion may have a methly-cyclohexane content greater than 0.7 weight percent or greater than 0.75 weight percent. Alternatively, the condensable hydrocarbon portion may have a methly-cyclohexane content less than 1.2 or 1.0 weight percent.

The use of weight percentage contents of benzene, cyclohexane, and methyl-cyclohexane herein and in the claims is meant to refer to the amount of benzene, cyclohexane, and methyl-cyclohexane found in a condensable hydrocarbon fluid determined as described herein, particularly as described in the section labeled "Experiments" herein. That is, respective compound weight percentages are determined from the whole oil gas chromatography (WOGC) analysis methodology and whole oil gas chromatography (WOGC) peak identification and integration methodology discussed in the Experiments section herein. Further, the respective compound weight percentages were obtained as described for FIG. 11, except that each individual respective compound peak area integration was used to determine each respective compound weight percentage. For clarity, the compound weight percentages are taken as a percentage of the entire C3 to pseudo C38 whole oil gas chromatography areas and calculated weights as used in the pseudo compound data presented in FIG. 7.

In some embodiments the condensable hydrocarbon portion of the hydrocarbon fluid has an API gravity greater than 30. Alternatively, the condensable hydrocarbon portion may have an API gravity greater than 30, 32, 34, 36, 40, 42 or 44. As used herein and in the claims, API gravity may be determined by any generally accepted method for determining API gravity.

In some embodiments the condensable hydrocarbon portion of the hydrocarbon fluid has a basic nitrogen to total nitrogen ratio between 0.1 and 0.50. Alternatively, the condensable hydrocarbon portion may have a basic nitrogen to total nitrogen ratio between 0.15 and 0.40. As used herein and in the claims, basic nitrogen and total nitrogen may be determined by any generally accepted method for determining basic nitrogen and total nitrogen. Where results conflict, the generally accepted more accurate methodology shall control.

The discovery that lithostatic stress can affect the composition of produced fluids generated within an organic-rich rock via heating and pyrolysis implies that the composition of the produced hydrocarbon fluid can also be influenced by altering the lithostatic stress of the organic-rich rock formation. For example, the lithostatic stress of the organic-rich rock formation may be altered by choice of pillar geometries and/or locations and/or by choice of heating and pyrolysis formation region thickness and/or heating sequencing.

Pillars are regions within the organic-rich rock formation left unpyrolized at a given time to lessen or mitigate surface subsidence. Pillars may be regions within a formation surrounded by pyrolysis regions within the same formation.

Alternatively, pillars may be part of or connected to the unheated regions outside the general development area. Certain regions that act as pillars early in the life of a producing field may be converted to producing regions later in the life of the field.

Typically in its natural state, the weight of a formation's overburden is fairly uniformly distributed over the formation. In this state the lithostatic stress existing at particular point within a formation is largely controlled by the thickness and density of the overburden. A desired lithostatic stress may be selected by analyzing overburden geology and choosing a position with an appropriate depth and position.

Although lithostatic stresses are commonly assumed to be set by nature and not changeable short of removing all or part of the overburden, lithostatic stress at a specific location within a formation can be adjusted by redistributing the overburden weight so it is not uniformly supported by the formation. For example, this redistribution of overburden weight may be accomplished by two exemplary methods. One or both of these methods may be used within a single formation. In certain cases, one method may be primarily used earlier in time whereas the other may be primarily used at a later time. Favorably altering the lithostatic stress experienced by a formation region may be performed prior to instigating significant pyrolysis within the formation region and also before generating significant hydrocarbon fluids. Alternately, favorably altering the lithostatic stress may be performed simultaneously with the pyrolysis.

A first method of altering lithostatic stress involves making a region of a subsurface formation less stiff than its neighboring regions. Neighboring regions thus increasingly act as pillars supporting the overburden as a particular region becomes less stiff. These pillar regions experience increased lithostatic stress whereas the less stiff region experience reduced lithostatic stress. The amount of change in lithostatic stress depends upon a number of factors including, for example, the change in stiffness of the treated region, the size of the treated region, the pillar size, the pillar spacing, the rock compressibility, and the rock strength. In an organic-rich rock formation, a region within a formation may be made to experience mechanical weakening by pyrolyzing the region and creating void space within the region by removing produced fluids. In this way a region within a formation may be made less stiff than neighboring regions that have not experienced pyrolysis or have experienced a lesser degree of pyrolysis or production.

A second method of altering lithostatic stress involves causing a region of a subsurface formation to expand and push against the overburden with greater force than neighboring regions. This expansion may remove a portion of the overburden weight from the neighboring regions thus increasing the lithostatic stress experienced by the heated region and reducing the lithostatic stress experienced by neighboring regions. If the expansion is sufficient, horizontal fractures will form in the neighboring regions and the contribution of these regions to supporting the overburden will decrease. The amount of change in lithostatic stress depends upon a number of factors including, for example, the amount of expansion in the treated region, the size of the treated region, the pillar size, the pillar spacing, the rock compressibility, and the rock strength. A region within a formation may be made to expand by heating it so to cause thermal expansion of the rock. Fluid expansion or fluid generation can also contribute to expansion if the fluids are largely trapped within the region. The total expansion amount may be proportional to the thickness of the heated region. It is noted that if pyrolysis occurs in the heated region and sufficient fluids are removed, the heated region may mechanically weaken and thus may alter the lithostatic stresses experienced by the neighboring regions as described in the first exemplary method.

Embodiments of the method may include controlling the composition of produced hydrocarbon fluids generated by heating and pyrolysis from a first region within an organic-rich rock formation by increasing the lithostatic stresses within the first region by first heating and pyrolyzing formation hydrocarbons present in the organic-rich rock formation and producing fluids from a second neighboring region within the organic-rich rock formation such that the Young's modulus (i.e., stiffness) of the second region is reduced.

Embodiments of the method may include controlling the composition of produced hydrocarbon fluids generated by heating and pyrolysis from a first region within an organic-rich rock formation by increasing the lithostatic stresses within the first region by heating the first region prior to or to a greater degree than neighboring regions within the organic-rich rock formation such that the thermal expansion within the first region is greater than that within the neighboring regions of the organic-rich rock formation.

Embodiments of the method may include controlling the composition of produced hydrocarbon fluids generated by heating and pyrolysis from a first region within an organic-rich rock formation by decreasing the lithostatic stresses within the first region by heating one or more neighboring regions of the organic-rich rock formation prior to or to a greater degree than the first region such that the thermal expansion within the neighboring regions is greater than that within the first region.

Embodiments of the method may include locating, sizing, and/or timing the heating of heated regions within an organic-rich rock formation so as to alter the in situ lithostatic stresses of current or future heating and pyrolysis regions within the organic-rich rock formation so as to control the composition of produced hydrocarbon fluids.

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite ($NaAl(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, flourides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be desirable for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so to maximize efficiency and so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance. In general gas turbines are highly optimized machines and variations in the gas feed can result in the need to periodically shut-down the turbine for significant overhaul and parts replacement to re-optimize the turbine. This is typically a costly operation in terms of both direct expenses and lost operational time. It is therefore desirable to minimize the need for such overhauls.

Fuel quality control may be useful for shale oil developments where the produced gas composition may change over the life of the field and where the gas typically has significant amounts of $CO_2$, CO, and $H_2$ in addition to light hydrocarbons. Commercial scale oil shale retorting is expected to produce a gas composition that changes with time. The variation in gas composition over time results from multiple and competing decomposition reactions occurring simultaneously when oil shale is pyrolyzed.

Inert gases in the turbine fuel can increase power generation by increasing mass flow while maintaining a flame temperature in a desirable range. Moreover inert gases can lower flame temperature and thus reduce $NO_x$ pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance. Total removal of $CO_2$ is not necessarily ideal.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. Nos. 6,684,644 and 6,858,049, the entire disclosures of which are hereby incorporated by reference).

In certain areas with oil shale resources, additional oil shale resources or other hydrocarbon resources may exist at lower depths. Other hydrocarbon resources may include natural gas in low permeability formations (so-called "tight gas") or natural gas trapped in and adsorbed on coal (so called "coal-bed methane"). In some embodiments with multiple shale oil resources it may be advantageous to develop deeper zones first and then sequentially shallower zones. In this way, wells will need not cross hot zones or zones of weakened rock. In other embodiments it may be advantageous to develop deeper zones by drilling wells through regions being utilized as pillars for shale oil development at a shallower depth.

Simultaneous development of shale oil resources and natural gas resources in the same area can synergistically utilize certain facility and logistic operations. For example, gas treating may be performed at a single plant. Likewise personnel may be shared among the developments.

Figure 6:
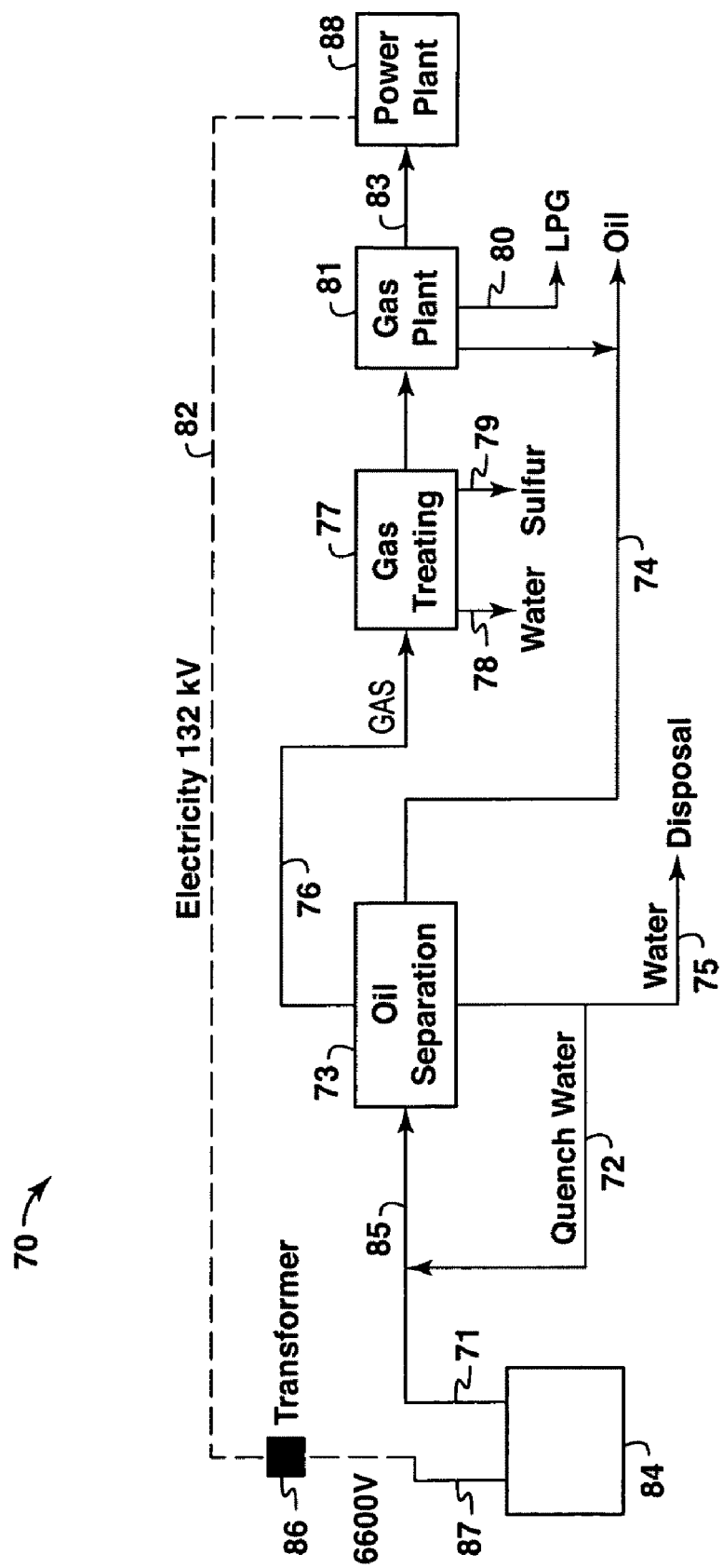
FIG. 6 is a process flow diagram of exemplary surface processing facilities for a subsurface formation development.

FIG. 6 illustrates a schematic diagram of an embodiment of surface facilities 70 that may be configured to treat a produced fluid. The produced fluid 85 may be produced from the subsurface formation 84 though a production well 71 as described herein. The produced fluid may include any of the produced fluids produced by any of the methods as described herein. The subsurface formation 84 may be any subsurface formation, including, for example, an organic-rich rock formation containing any of oil shale, coal, or tar sands for example. A production scheme may involve quenching 72 produced fluids to a temperature below 300° F., 200° F., or even 100° F., separating out condensable components (i.e., oil 74 and water 75) in an oil separator 73, treating the noncondensable components 76 (i.e. gas) in a gas treating unit 77 to remove water 78 and sulfur species 79, removing a portion of the heavier components from the gas (e.g., propane and butanes) in a gas plant 81 to form liquid petroleum gas (LPG) 80 for sale, and generating electrical power 82 in a power plant 88 from the remaining gas 83. The electrical power 82 may be used as an energy source for heating the subsurface formation 84 through any of the methods described herein. For example, the electrical power 82 may be fed at a high voltage, for example 132 kV, to a transformer 86 and let down to a lower voltage, for example 6600 V, before being fed to an electrical resistance heater element located in a heater well 87 located in the subsurface formation 84. In this way all or a portion of the power required to heat the subsurface formation 84 may be generated from the non-condensable portion of the produced fluids 85. Excess gas, if available, may be exported for sale.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of (alkanes, olefins, aromatics, and polyaromatics among others), $CO_2$, CO, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

Water in addition to condensable hydrocarbons may be dropped out of the gas when reducing temperature or increasing pressure. Liquid water may be separated from condensable hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream. Alternatively, a iron redox process (e.g., Low-Cat™) may be useful, especially where appreciable carbon monoxide and low levels of sulfur are present in the hydrocarbon gas stream. In liquid redox processes, an iron compound containing solution is cyclically reduced and oxidized, such that during the reductive part of the cycle, the hydrogen sulfide containing gases react with the iron compound to form elemental sulfur. The elemental sulfur is removed by in-line filters situated in the solution circuit between the reduction and oxidation portions of the cycle.

Acid gas removal may also be effectuated through the use of distillation towers. Such towers may include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream. Additional details of such a process and related processes may be found in U.S. Pat. Nos. 3,724,225, 4,511,382, 4,533,372, 4,923,493, 5,120,338, 5,956,971, the entirety of which are incorporated by reference herein.

The hydrogen content of a gas stream may be reduced by removing all or a portion of the hydrogen or increased by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

In one embodiment, a method for utilizing gas produced from an in situ conversion process is provided. The method may include heating an organic-rich rock formation in situ. Further, the method may include producing a production fluid from the organic-rich rock formation. The production fluid may include hydrocarbon fluids and be at least partially generated as a result of pyrolysis of formation hydrocarbons located in the organic-rich rock formation. A gas stream comprising combustible hydrocarbon fluids may be obtained from the production fluid. The gas stream may be separated into a first composition gas stream and a second composition gas stream, where the composition of the first composition gas stream is maintained in a substantially constant condition. The first composition gas stream may be passed through a first gas turbine to form a first gas turbine exhaust stream. The first gas turbine is configured to provide energy to a first electrical generator for the purpose of generating electricity.

As in other embodiments described herein the organic-rich rock formation may be, for example, a heavy hydrocarbon formation or a solid hydrocarbon formation. Particular examples of such formations may include an oil shale formation, a tar sands formation or a coal formation. Particular formation hydrocarbons present in such formations may include heavy hydrocarbons, oil shale, kerogen, coal, and/or bitumen.

The production fluid produced from the organic-rich rock formation may include a hydrocarbon fluid. The hydrocarbon fluid may include both a condensable hydrocarbon portion (e.g., liquid) and a non-condensable hydrocarbon portion (e.g., gas). The hydrocarbon fluid of the production fluid may additionally be produced together with non-hydrocarbon fluids. Exemplary non-hydrocarbon fluids include, for example, water, carbon dioxide ($CO_2$), hydrogen sulfide ($H_2S$), hydrogen gas ($H_2$), ammonia ($NH_3$), and/or carbon monoxide (CO). In in situ heating operations the composition of the production fluid is expected to change over time. Initially, both the production fluid flow rate and composition are expected to be different than from after a year or more of heating. For example early in pyrolysis of a volume of oil shale, the composition of the produced gas may have a high $CO_2$ mole fraction and a low $H_2$ mole fraction. As the pyrolysis continues, the composition of the produced gas changes to where the $CO_2$ concentration is low and the $H_2$ concentration is high. Alkane species (e.g., methane and ethane) may exhibit maximum concentrations in the pyrolysis gas at intermediate times. (See for example "Isothermal Decomposition of Colorado Oil Shale", DOE/FE/60177-2288.)

The composition of a gas stream produced from in situ heating of organic-rich rock formations is expected to change over time. In particular the proportion of hydrogen gas and carbon dioxide is expected to change significantly over the life of a commercial in situ heating field development, which may take from 3 to 10 years or more. Moreover, the relative proportions of gaseous hydrocarbon species, including methane, ethane, ethylene, propane, iso-propane and propylene are expected to change over the life of the field development. These changes may be particularly significant for a commercial oil shale development. In an oil shale development, the concentration of hydrogen gas in the produced gas is expected to increase over time while the concentration of $CO_2$ is expected to decrease over time. These expected changes in the overall produced gas composition are expected to present processing challenges, particularly where the produced gas or a portion thereof is combusted in a gas turbine because of the inability of gas turbines with specific combustors to accommodate large changes in feed gas composition while maintaining stable operation. Embodiments of the invention include obtaining a gas stream from the production fluid where the composition of the gas stream changes over time. The composition of the gas stream changing over time may include the averaged daily concentration of one or more species in the gas stream changing by greater than 5 mol percent over a 1 year period. In alternate embodiments, the averaged daily concentration of one or more species in the gas stream may change by greater than 10, 15 or 20 mol percent over a 1 year period. In alternate embodiments, the averaged daily concentration of one or more species in the gas stream may change by greater than 5, 10, 15 or 20 mol percent over a 2 year period. In particular embodiments the species who's concentration changes may be $CO_2$, methane, hydrogen gas, or combinations thereof. In alternate embodiments, the averaged daily Wobbe Index or Modified Wobbe Index of the gas stream may change by greater than 5, 10, 15 or 20 percent over a 1 year period. In alternate embodiments, the averaged daily Wobbe Index or Modified Wobbe Index of the gas stream may change by greater than 5, 10, 15 or 20 percent over a 2 year period.

Figure 32:
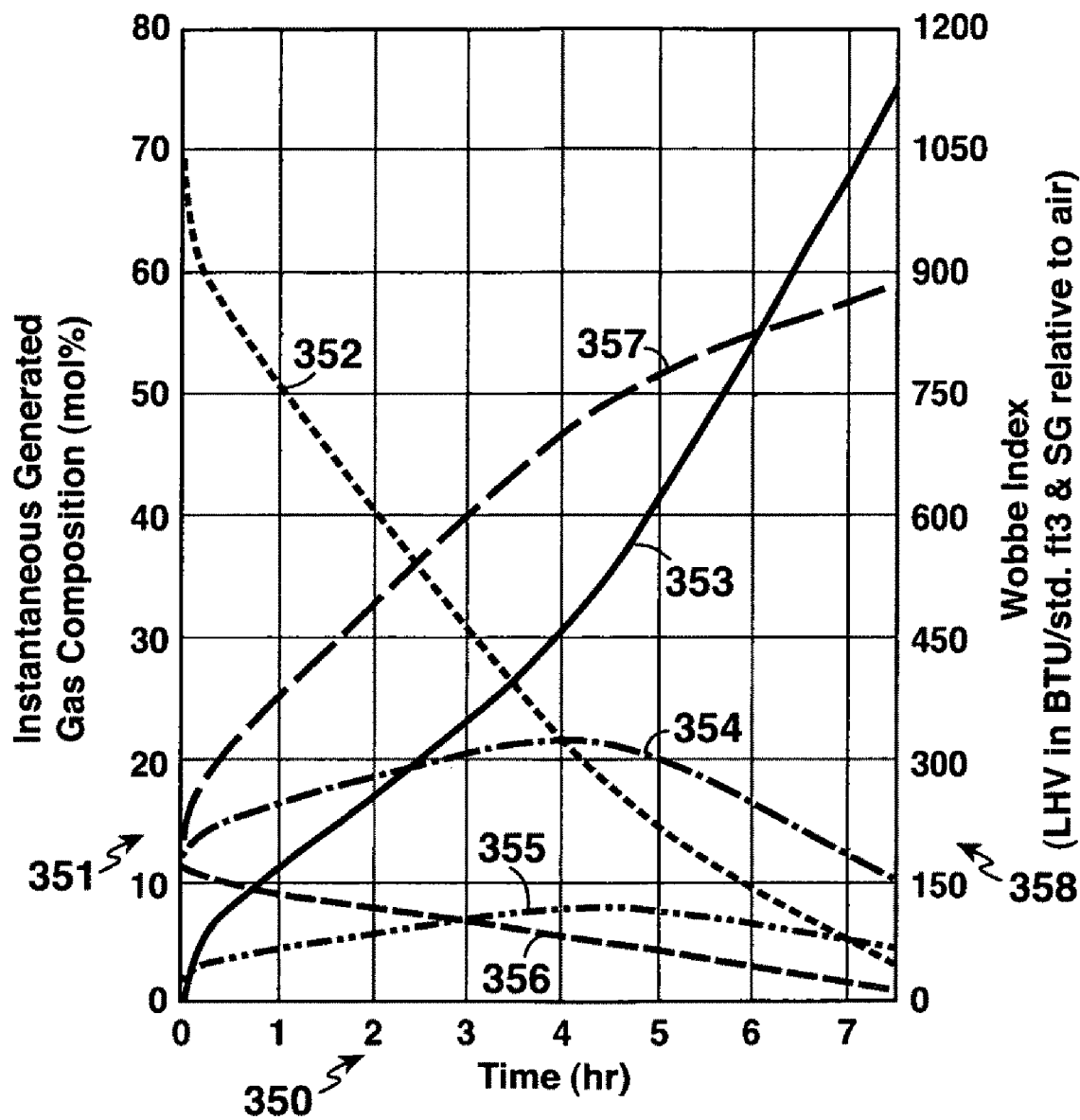
FIG. 32 is a graph of several gaseous species evolved from laboratory heating of Colorado oil shale. The left y-axis reports the concentration in mol % of the measured gaseous species, including $CO_2$, $H_2$, methane, ethane, and CO, evolved over a 12-hour experiment. The x-axis represents time and is in terms of hours.

FIG. 32 provides a graphical depiction of several gaseous species evolved from laboratory heating of Colorado oil shale. The figure is based on data from Miknis, F. P.; Conn, P. J.; and Turner, T. F., "Isothermal Decomposition of Colorado Oil Shale", DOE/FE/60177-2288 (DE87009043). The experiment consisted of heating and maintaining a sample of Colorado oil shale at a constant temperature of 368° C. for a period of at least 12 hours. The left y-axis 351 reports the concentration in mol % of the measured gaseous species, including $CO_2$ 352, $H_2$ 353, methane 354, ethane 355, and CO 356, evolved over the 12-hour experiment. The x-axis 350 represents time and is in terms of hours. The data in the figure represent values obtained by differentiating measured cumulative compositions so to obtain estimates of instantaneous gas compositions. The right y-axis 358 reports the Wobbe Index in units of BTU/SCF. Wobbe Index 357 was calculated based on the non-sulfur species in the gas. Lower heating value in BTU/SCF and specific gravity relative to air were used in the Wobbe Index calculation. As the graph shows, initially (hour 0-2) the evolved gas is primarily $CO_2$, ranging from 70 down to 40 mol % $CO_2$, with smaller amounts of methane (12-18 mol %) and ethane (2-6 mol %). As time progresses, hydrogen gas production increases with an almost corresponding decrease in $CO_2$ production. Near the end of the 7.5 hour-period, the $CO_2$ concentration has dropped to about 4 mol % while the hydrogen production has increased to over 70 mol %. The hydrocarbon species have also varied over the 7-hour period, however to a much lesser extent. The methane concentration has ranged from a low of about 12 mol % initially to a high of about 22 mol % at hour 4, back down to about 10 mol % by hour 7.5. The ethane concentration has ranged from a low of about 2-3 mol % initially to a high of about 8 mol % at hour 4.5, back down to about 5 mol % by hour 7.5. The varying composition over time results in a large change in Wobbe Index over time. The value is initially about 210 BTU/SCF and steadily increases to about 890 BTU/SCF at hour 7.5. The data also indicates that the gas produced from heating and pyrolyzing oil shale will be a relatively low BTU gas, including for example, large amounts of $CO_2$. The data presented in FIG. 32 is illustrative of the potential variation in gas composition over time for heating oil shale however the time scale in a commercial operation would be over a much longer time frame due to lower in situ temperatures, for example 270-350° C. The use of lower temperatures reflect the impracticality of rapidly heating large volumes of rock and increased efficiencies associated with application of lower average temperatures in the subsurface. For example, it may take from 1 to 3 years to gain significant hydrocarbon production in a commercial oil shale development depending on the energy input, heating rate, target formation density, target formation thickness, heater well spacing and heater well geometry. Further it may take from 6 to 10 years or more to fully convert the kerogen in the oil shale to producible fluid hydrocarbons in a commercial in situ heating oil shale development, again dependent on the specific development parameters mentioned previously.

A gas stream comprising combustible hydrocarbon fluids may be obtained from the production fluid. The gas stream may be further separated into a first composition gas stream and a second composition gas stream. In some embodiments the first composition gas stream and the second composition gas stream both contain hydrocarbon fluids. The identity of hydrocarbon species in the first composition gas stream may be the same or different from the identity of hydrocarbon species in the second composition gas stream. Further, the concentration of the same hydrocarbon species in the respective gas streams may be similar or very different. Exemplary gaseous hydrocarbon species in the respective gas streams may include methane, ethane, ethylene, propane, propylene, butane, iso-butane, butene, with potentially lesser amounts of pentane, iso-pentane, pentylene, C6+ hydrocarbon species and any combination thereof. In some embodiments, the first gas stream is greater than 5 mole percent hydrocarbon gas. In alternative embodiments, the first gas stream is greater than 10, 15, 20, 25, 30, 35 or 40 mole percent hydrocarbon gas. In some embodiments, the first composition gas stream is greater than 15 mole percent methane. In alternative embodiments, the first composition gas stream is greater than 20, 25, 30, 35 or 40 mole percent methane.

In some embodiments the first composition gas stream and the second composition gas stream both comprise combustible gases. Combustible gas may include both hydrocarbon gases and non-hydrocarbon gases, for example, hydrogen gas. In some embodiments the first composition gas stream, the second composition gas stream, or both are considered low heating value or low BTU gases. The streams are considered low BTU gas stream because they have a lower heating value less than the lower heating value (LHV) of typical pipeline natural gas, which has a lower heating value of about 1,000 BTU/SCF. However, the streams may have a high enough heating value to be useful in gas turbines and/or fired boilers and are therefore distinguished from gases which are the byproducts of combustion or incomplete combustion which may have lower heating values in the 50 to 150 BTU/SCF range. In some embodiments the first composition gas stream, the second composition gas stream, or both have a lower heating value greater than 200 BTU/SCF. In alternative embodiments, the first composition gas stream, the second composition gas stream, or both have a lower heating value greater than 300 BTU/SCF, 400 BTU/SCF, 500 BTU/SCF or 600 BTU/SCF. In other embodiments, the first composition gas stream, the second composition gas stream, or both have a lower heating value less than 800 BTU/SCF. In alternative embodiments, the first composition gas stream, the second composition gas stream, or both have a lower heating value less than 700 BTU/SCF, 600 BTU/SCF or 500 BTU/SCF.

The gas stream, the first composition gas stream, the second composition gas stream, or any combination thereof may include at least one inert gas, for example, $CO_2$. The presence of $CO_2$, as a zero heating value gas, serves as a diluent for heating value purposes and contributes to lowering the overall lower heating value of the gas stream. In some embodiments, the invention takes advantage of the pressure and mass flow rate of $CO_2$ present in the production fluid and makes such $CO_2$ available in the first gas stream; for eventual processing in the first gas turbine. It is envisioned that the production fluid may be produced from the organic-rich rock formation at elevated pressures of, for example, greater than 300, 400, 500, 600 or greater than 700 psig. A gaseous portion of the pressurized production fluid, after processing, may be sent to a gas turbine to recover energy from letting down the pressure of such a pressurized gaseous stream across the gas turbine. In this way energy is recovered not only from combustion of the combustible portions of the first gas stream but also from the pressurized non-combustible portions of the first gas stream. In some embodiments, the gas stream, the first composition gas stream, the second composition gas stream, or any combination thereof may have a $CO_2$ content that is greater than 10 mole percent. Alternatively, the gas stream, the first composition gas stream, the second composition gas stream, or any combination thereof may have a $CO_2$ content that is greater than 15, 20, 25, 30, 35 or 40 mole percent. Alternatively, the gas stream, the first composition gas stream, the second composition gas stream, or any combination thereof may have a $CO_2$ content that is less than 70, 60, 50 or 45 mole percent.

In one embodiment, the first composition gas stream is greater than 5 mole percent hydrogen gas. Alternatively, the first composition gas stream may be greater than 10, 20, 30, 40, 50, 60, 70, 80 or 90 mole percent hydrogen gas. Alternatively, the second composition gas stream may be greater than 30, 50, 70 or 90 mole percent hydrogen gas. The hydrogen gas content of the first composition gas stream, the second composition gas stream, or both may also be adjusted to compensate for high inert content (e.g., $CO_2$) in such gas streams, particularly when such a gas stream is combusted in a gas turbine. As the $CO_2$ concentration of a gas turbine feed stream increases, there is a corresponding decrease in such feed streams flame speed. Hydrogen gas has a relatively high flame speed and may be used to compensate for high $CO_2$ concentrations in gas turbine feed streams, thereby obtaining a gas turbine feed stream with a flame speed varying within acceptable parameters for a given turbine design. Alternatively, if additional hydrogen is needed, hydrogen may be made by reforming methane via the classic steam reforming followed by the water-gas shift reaction, thereby increasing the hydrogen concentration of a gas turbine feed stream or making additional hydrogen gas available for mixing with the gas turbine feed stream. The water-gas shift reaction is provided below:

Steam Reforming: $CH_4 + H_2O \rightarrow CO + 3H_2$

Water-Gas Shift: $H_2O + CO \rightarrow H_2 + CO_2$

In one embodiment, the first composition gas stream has a substantially constant $H_2$ to $CO_2$ molar ratio, thereby obtaining a relatively constant flame speed in the gas turbine. In alternate embodiments, the first composition gas stream has an $H_2$ to $CO_2$ molar ratio between 0.1 to 2.0, 0.3 to 1.8, 0.5 to 1.6 or between 0.7 to 1.4. Alternatively, the first composition gas stream may have a substantially constant ethane to $CO_2$ molar ratio. In particular, the ethane to $CO_2$ molar ratio of the first composition gas stream on an average daily basis may vary by less than 15 percent over a 7 day period. Further, the ethane to $CO_2$ molar ratio of the first composition gas stream on an average daily basis varies by less than 10 or 5 percent over a 7 day period.

The method includes passing at least the first composition gas stream to a gas turbine. In alternative embodiments the second composition gas stream may also optionally be passed to a gas turbine. In either case, a gas turbine includes a means of combustion that is a combustor. Generally, combustors include a nozzle or injector for injecting the gas feed and mixing the feed with air or an oxygen containing stream. The resulting mixture is then combusted prior to entry into the turbine portion of the gas turbine where energy is extracted from the hot combustion product stream. Gas combustors and their injectors are typically designed for a certain gas composition or range of compositions where the gas turbine will operate stably and efficiently. If the gas composition changes outside the design range then the gas turbine can experience unstable operation, inefficient operation, reduced reliability, and/or increased emissions of environmentally regulated species, including, for example, nitrogen oxides ($NO_x$), carbon monoxide (CO), and/or sulfur (e.g., sulfur oxides ($SO_x$)) emissions. In some embodiments, the first gas turbine is equipped with a dual gas combustor comprised of a first gas injector and a second gas injector, where the first gas injector is optimized or designed for the first composition gas stream and the second gas injector optimized or designed for the second composition gas stream. In alternate embodiments, the first gas turbine and/or the second gas turbine may be equipped with variable geometry combustors. In still further embodiments, the first gas turbine and/or the second gas turbine may be equipped with catalytic combustors. In still further embodiments, the first gas turbine and/or the second gas turbine may be equipped with lean pre-mixed combustor(s), Dry Low $NO_x$ (DLN) combustor(s), or Dry Low Emissions (DLE) combustor(s). Further, steam injection or water injection may be used to reduce $NO_x$.

Gas turbine manufactures typically designate a preferred pressure or range of pressures to deliver the gas turbine feed gas stream for combustion in the gas turbine combustor and further processing in the turbine of the gas turbine. If the gas turbine feed gas stream is delivered to the gas turbine outside the designated pressure range then the gas turbine can experience unstable operation, reduced efficiency and/or increased emissions of environmentally regulated components. Thus it is useful to operate an organic-rich rock formation in situ heating operation to provide not only a gas turbine feed gas with a composition that is in a substantially constant condition, but also to provide the feed gas within a targeted pressure range to the gas turbines. In some embodiments, the first composition gas stream may be provided to the first gas turbine at a substantially constant pressure. In some embodiments, the first composition gas stream may be delivered to the first gas turbine at a pressure in the range of 200 to 1,000 pounds per square inch gauge (psig). Alternatively, the first composition gas stream may be delivered to the first gas turbine at a pressure in the range of 300 to 800, 350 to 650 or 400 to 600 psig. In some embodiments, the pressure of the first composition gas stream on an averaged daily basis varies by less than 20 percent gauge pressure over a 7 day period. In alternate embodiments, the pressure of the first composition gas stream on an averaged daily basis varies by less than 15, 10, or 5 percent gauge pressure over a 7 day period.

One feature of the invention is that the composition of at least the first composition gas stream is maintained in a substantially constant condition. The composition of the first composition gas stream is maintained in a substantially constant condition in order to meet the desired operating parameters of the first gas turbine. Modern gas turbines are typically equipped with low emissions combustors in order to meet modern environmental regulation. Such turbines require relatively constant fuel compositions and therefore have little flexibility to accommodate wide changes in fuel gas composition. This is due to the fact that most gas turbines are equipped with fixed geometry combustors, typically a set of circular orifices. In order for the gas turbine to reliability operate according to generally accepted performance criteria, the fuel gas must be supplied with a well-regulated flowrate, pressure ratio, composition, temperature etc. If the fuel composition changes, and thus the Modified Wobbe Index changes, then the pressure ratio required to supply sufficient amounts of fuel energy to the turbine (in order to maintain load) will change. However, the pressure ratio required by the specific combustor geometry is set by the aero-mechanical design of the combustor, which is generally a fixed geometry. Therefore, any changes in fuel gas composition will force the combustor to operate outside of its optimal design point. When desired operation deviates from the optimal design point to a point beyond the acceptable design range, then negative consequences are typically encountered. A gas having a composition in a substantially constant condition is meant to refer to the range of fuel gas composition that a given gas turbine can utilize while maintaining a sufficiently stable operational performance. For example, a gas with a substantially constant set of conditions is able to be utilized by a given gas turbine without experiencing unacceptable combustion dynamics, including pressure pulsations, which may lead to unreliability caused by flame extinction, ultimately resulting in a shutdown of the turbine. Further, a gas with a substantially constant condition is able to be utilized by a given gas turbine without generating emissions (e.g., NO$_x$, CO, etc.) in excess of specified targets or environmental regulations. Further, a gas with a substantially constant condition is able to be utilized by a given gas turbine such that the turbine may be operated without need for frequent overhauls or replacement of its internal parts that may be caused by wear or fatigue of components due to excessive combustion dynamics or the damage of components due to flame flashback or flame anchoring in a location that is not designed for the elevated temperatures cause by such an event. Further, a gas with a substantially constant condition is able to be utilized without the need to shut down the turbine in order to replace the combustion components with components that are designed to accommodate a different fuel gas composition with respect to the initial fuel gas composition. This component replacement may be necessary to match the fuel injection port geometry to the new fuel gas composition in order to achieve the necessary pressure ratio of fuel gas supplied into the combustion zone, or it may be necessary to alter the geometry of the dilution air holes in the combustor in order to provide the proper air split between combustion and dilution.

There are many ways to evaluate expected gas turbine performance based on the quality of the gas. One method includes maintaining a substantially constant Wobbe index. One measure of Wobbe Index may be calculated using the following equation:

$$WI = \frac{LHV}{\sqrt{SG}}$$

Where WI is the Wobbe Index, LHV is the lower heating value of the fuel gas in units of BTU/SCF (or equivalent units), where BTU is a British Thermal Unit and SCF is the unit standard cubic feet, and SG is the specific gravity of the gas fuel relative to air at standard conditions (e.g., 1 atm and 20° C.).

A related measure is the Modified Wobbe Index, which may be calculated using the following equation:

$$MWI = \frac{LHV}{\sqrt{SG * Tgas}}$$

Where MWI is the Modified Wobbe Index, LHV is the lower heating value of the gas fuel in units of BTU/SCF, where BTU is a British Thermal Unit and SCF is the unit standard cubic feet, SG is the specific gravity of the gas fuel relative to air, and Tgas is the temperature of the gas fuel in degrees Rankine.

In some embodiments of the invention the first composition gas stream may be maintained in a substantially constant condition by varying the Wobbe Index or Modified Wobbe Index of the first composition gas stream on an averaged daily basis by less than 15 percent over a 7 day period. In alternative embodiments, the Wobbe Index or Modified Wobbe Index of the first composition gas stream on an averaged daily basis varies by less than 10 percent or 5 percent over a 7 day period. In further alternative embodiments, the Wobbe Index or Modified Wobbe Index of the first composition gas stream on an averaged hourly basis varies by less than 15 percent over a 1 day period. In further alternative embodiments, the Wobbe Index or Modified Wobbe Index of the first composition gas stream on an averaged hourly basis varies by less than 10 percent or 5 percent over a 1 day period. In further embodiments, the Wobbe Index or Modified Wobbe Index of the first composition gas stream on a five minute averaged basis varies by less than 15 percent over a 1 hour period. In further alternative embodiments, the Wobbe Index or Modified Wobbe Index of the first composition gas stream on a five minute averaged basis varies by less than 10 percent or 5 percent over a 1 hour period. In alternative embodiments, the Wobbe Index or Modified Wobbe Index of the first composition gas stream on an averaged daily basis varies by less than 15, 10, or 5 percent over a 30 day period.

In further embodiments, it may be sufficient to maintain a property of the gas stream in a substantially constant condition in order to maintain the composition of the gas stream in a substantially constant condition. For example, in some embodiments the specific gravity of the first composition gas stream on an averaged daily basis varies by less than 15, 10, or 5 percent over a 7 day period. In alternative embodiments, the specific gravity of the first composition gas stream on an averaged daily basis varies by less than 15, 10, or 5 percent over a 30 day period. In alternative embodiments, the specific gravity of the first composition gas stream on an averaged hourly basis varies by less than 15, 10 or 5 percent over a 1 day period. In further alternative embodiments, the lower heating value of the first composition gas stream on an averaged daily basis varies by less than 15, 10 or 5 percent over a 7 day period. In further alternative embodiments, the lower heating value of the first composition gas stream on an averaged daily basis varies by less than 15, 10 or 5 percent over a 30 day period. In alternative embodiments, the lower heating value of the first composition gas stream on an averaged hourly basis varies by less than 15, 10, or 5 percent over a 1 day period.

The Modified Wobbe Index may be fine tuned by adjusting the temperature of the gas turbine feed stream. Adjusting the temperature of the gas turbine feed stream will change the density of the gas, thus the specific gravity of the gas will change and therefore also affect the Wobbe Index equation presented above. Thus embodiments of the invention include adjusting the temperature of the first composition gas stream, thereby adjusting the Wobbe Index or Modified Wobbe Index of the first composition gas stream. The temperature of the first composition gas stream may be adjusted by various methods, including heat exchanging the first composition gas stream with the production fluid or a derivative thereof, heat exchanging the first composition gas stream with steam or boiler feed water, or heat exchanging the first composition gas stream with any of the various process stream included in the oil shale development surface processing facilities. In particular embodiments, the temperature of the first composition gas stream may be adjusted by heat exchanging the first composition gas stream with the first gas turbine exhaust stream, the production fluid, steam, or combinations thereof.

There are alternate methods of maintaining the composition of a gas stream in a substantially constant condition in order to meet the desired operating parameters of a gas turbine. In some embodiments of the invention the composition of the first composition gas stream may be maintained in a substantially constant condition by varying the total concentration of a particular species or group of species by less than a specified amount. In some embodiments of the invention the first composition gas stream may be maintained in a substantially constant condition by varying the concentration of inert species in the first composition gas stream on an averaged daily basis by less than 15 mole percent over a 7 day period. In alternative embodiments, the total concentration of inert species in the first composition gas stream on an averaged daily basis varies by less than 10 or 5 mole percent over a 30 day period. In alternative embodiments, the total concentration of inert species in the first composition gas stream on an averaged daily basis varies by less than 10 or 5 mole percent over a 7 day period. In further alternative embodiments, the total concentration of inert species in the first composition gas stream on an averaged hourly basis varies by less than 15, 10 or 5 mole percent over a 1 day period. In one embodiment the concentration of a particular inert species, carbon dioxide, may be varied by less than a specified amount in order to maintain the gas stream in a substantially constant condition. In one embodiment the concentration of $CO_2$ in the first composition gas stream on an averaged daily basis varies by less than 15, 10 or 5 mole percent over a 7 day period. In one embodiment the concentration of $CO_2$ in the first composition gas stream on an averaged daily basis varies by less than 15, or 5 mole percent over a 30 day period. In alternative embodiments, the concentration of $CO_2$ in the first composition gas stream on an averaged hourly basis varies by less than 15, 10 or 5 mole percent over a 1 day period.

In some embodiments of the invention the composition of the first gas stream may be maintained in a substantially constant condition by varying the total concentration of hydrogen gas by less than a specified amount. In some embodiments of the invention the first gas stream may be maintained in a substantially constant condition by varying the concentration of $H_2$ in the first gas stream on an averaged daily basis by less than 15 mole percent over a 7 day period. In alternative embodiments, the total concentration of $H_2$ in the first gas stream on an averaged daily basis varies by less than 10 or 5 mole percent over a 7 day period. In alternative embodiments, the total concentration of $H_2$ in the first gas stream on an averaged daily basis varies by less than 10 or 5 mole percent over a 30 day period. In further alternative embodiments, the total concentration of $H_2$ in the first gas stream on an averaged hourly basis varies by less than 15, 10 or 5 mole percent over a 1 day period.

In some embodiments of the invention the composition of the first composition gas stream may be maintained in a substantially constant condition by varying the total concentration of a particular hydrocarbon species or group of hydrocarbon species by less than a specified amount. In some embodiments of the invention the composition of the first composition gas stream may be maintained in a substantially constant condition by varying the concentration of methane in the first composition gas stream on an averaged daily basis by less than 15, 10 or 5 mole percent over a 7 day period. In alternative embodiments, the concentration of methane in the first composition gas stream on an averaged daily basis varies by less than 15, 10 or 5 mole percent over a 30 day period. In alternative embodiments, the concentration of methane in the first composition gas stream on an averaged hourly basis varies by less than 15, 10 or 5 mole percent over a 1 day period. In alternative embodiments, the concentration of ethane in the first composition gas stream on an averaged daily basis varies by less than 15, 10 or 5 mole percent over a 7 day period. In alternative embodiments, the concentration of ethane in the first composition gas stream on an averaged daily basis varies by less than 15, 10 or 5 mole percent over a 30 day period. In alternative embodiments, the concentration of ethane in the first composition gas stream on an averaged hourly basis varies by less than 15, 10, or 5 mole percent over a 1 day period. In some embodiments of the invention the composition of the first gas stream may be maintained in a substantially constant condition by varying the concentration of propane in the first gas stream on an averaged daily basis by less than 15, 10 or 5 mole percent over a 7 day period. In alternative embodiments, the concentration of propane in the first gas stream on an averaged daily basis varies by less than 15, 10 or 5 mole percent over a 30 day period. In alternative embodiments, the concentration of propane in the first gas stream on an averaged hourly basis varies by less than 15, 10 or 5 mole percent over a 1 day period.

In some embodiments, the composition of the second composition gas stream is also maintained in a substantially constant condition. Such conditions may be possible, by adjusting the relative rates of the first and second composition gas streams while maintaining a substantially constant composition of both streams. In such embodiments, the second composition gas stream may also be sent to a gas turbine, for example a second gas turbine, for power recovery.

In some embodiments of the invention maintaining the composition of the first composition gas stream in a substantially constant condition may be aided by monitoring the condition of the first composition gas stream. For example the first composition gas stream may be monitored for one or more properties. Exemplary properties that may be monitored may include one or more properties selected from gas composition, temperature, heating value, specific gravity, Wobbe Index, Modified Wobbe Index, dew point, flammability limit, flame velocity, and combinations thereof.

In some embodiments of the invention the first composition gas stream may be altered in order to control one or more operating parameters of the first composition gas stream. In such embodiments it may be useful to monitor the condition of the first composition gas stream and base such alterations or controls, either primarily or partially, on the results of such monitoring. Exemplary operating parameters that may be controlled include the concentration of one or more of $C_2$ and higher hydrocarbons, $C_3$ and higher hydrocarbons, carbon dioxide, inert gases, hydrogen gas, ethane, ethylene, propane, and combinations thereof. The chosen operating parameters may be maintained through altering the composition of the first composition gas stream through blending a blend gas stream with the first composition gas stream. The blend gas stream may include methane or a mixture of gaseous hydrocarbons, including a blend gas stream from a source other than the production fluid. In other embodiments the inert gas content of the first composition gas stream may be altered by adjusting the inert gas content of the first composition gas stream to maintain a substantially constant Wobbe Index or Modified Wobbe Index value over time.

In some embodiments of the invention altering the composition of the first composition gas stream includes adding hydrogen, ethane, ethylene, or combinations thereof to the first composition gas stream. The addition of such components may be useful in increasing the flame speed of the first composition gas stream, adjusting the burn rate of the first composition gas stream, stabilizing combustion in the first gas turbine, or combinations thereof.

In further embodiments, the first composition gas stream may be altered by reforming at least a portion of the methane in the first composition gas stream to generate hydrogen. This may be particularly useful where the gaseous feed to a gas turbine combustor contains significant $CO_2$ and therefore requires additional hydrogen in order to maintain a substantially constant flame speed in the combustor of the gas turbine. In some embodiments, other hydrocarbon compounds, for example ethane and/or propane, may also be reformed together with the methane. The hydrogen gas content of the gas turbine feed may be increased by different reforming configurations. In one embodiment, at least a portion of the methane is removed from the first composition gas stream prior to the reforming, the removed methane is reformed in separate processing facilities to generate hydrogen gas, and the generated hydrogen gas is returned to the first composition gas stream prior to passing the first composition gas stream to the gas turbine. Alternatively, at least a portion of the methane is reformed on line while present in the first composition gas stream without the need to remove the methane and generate hydrogen gas in separate reforming facilities. In either case, the portion of methane reformed into hydrogen may be controlled to maintain a chosen operating parameter, including for example a substantially constant Wobbe Index or Modified Wobbe Index value over time.

In the various methods described herein, the composition of the first composition gas stream may be altered by adjusting the pressure or temperature of one or more oil-gas separators located in the processing facilities. Such a pressure or temperature adjustment will thereby change the composition of the off gas from such a separator. The processing facilities may include several stages of oil-gas separators, typically at successively lower pressures. For a series of separators at similar temperatures, the off gas from the initial higher pressure separators will be lighter (e.g., richer in methane and hydrogen) than the off gas from the later low pressure separators (e.g., richer in propane and carbon dioxide). Thus the first composition gas stream may be comprised of a blend of at least a first separator gas from a first oil-gas separator and a second separator gas from a second oil gas separator. Further, the method may include altering the composition of the first composition gas stream by adjusting the relative amounts of the first separator gas and the second separator gas making up the first composition gas stream.

In the various methods described herein, the composition of the first composition gas stream or the second composition gas stream may be altered through use of vapor-liquid extraction techniques. In such techniques a gas stream may be contacted with a liquid in order to allow for mass transfer of certain components in the gas stream with preferential solubility in the liquid stream, typically heavier components, to move from the gas stream and dissolve in the liquid stream, thereby altering the composition of the resulting gas stream. Thus contacting may be used for example to increase $H_2$ content of a gas stream by reducing the amount of heavier components. There are many ways known in the art for conduction vapor-liquid extraction, including, for example employing trayed or packed columns to carry out contacting the liquid stream with the vapor or gas stream. Typically, the gas stream is cooled before contacting to improve solubility. Pressure may also be increased to improve solubility. The production fluid or a fraction thereof may be used as the liquid stream. In particular, a portion of produced liquids from later in the fluid processing system may be recycled back to contact with the gas stream, the first composition gas stream, the second composition gas stream, or derivatives thereof to solubilize and remove a portion of components in the stream. One method known as the Ryan-Holmes process is disclosed in U.S. Pat. No. 4,318,723 to Holmes et al. This patent describes the distillation of acid gases from methane using a non-polar addition such as $C_2$-$C_5$ alkanes. For additional discussion of the Ryan/Holmes process, see Holmes et al., Hydrocarbon Processing, May 1982, pp. 131-136; and Oil and Gas Journal, Jun. 27, 1983, pp. 85-91.

The method may include generating electricity from a gas turbine and optionally, the gas turbine being part of combined cycle power facilities. In such an embodiment the method may include, after passing the first composition gas stream through a first gas turbine and combusting the first composition gas stream, feeding the combusted first gas turbine exhaust stream to a steam boiler, thereby providing heat to the steam boiler for producing steam in the steam boiler. In a combined cycle operation the generated steam may then be fed to a steam turbine that is configured to provide energy to a second electrical generator. The second electrical generator may be the same electrical generator used by the first gas turbine or a different electrical generator. In different embodiments the steam boiler may be a supplementally fired waste heat boiler or may not include a supplemental boiler feed stream. By using a combined cycle power plant, it may be possible to generate all or most of the electricity demand of the in situ heating operation where the in situ heating is conducted primarily, predominately or exclusively through electrical resistive heating.

In some embodiments, it may be desirable to feed the second composition gas stream to a steam boiler or fired heater without first passing the second composition gas stream to a gas turbine for power recovery. In some embodiments, the second composition gas stream will have a varying composition in light of maintaining the first composition gas stream composition substantially constant. In other embodiments, the second composition gas stream may have a lower heating value that is less than the lower heating value of the first composition gas stream. In order to accommodate the varying composition and/or low heating value of the second composition gas stream, which may not be sufficiently constant for stable processing in a given gas turbine, the second composition gas stream may be sent to a fired steam boiler. Steam generated in the steam boiler may be used for generating electrical power through use of a steam turbine, thus further contributing to the overall process power generation capacity. In alternative embodiments the steam boiler may be a supercritical boiler or a steam boiler equipped with catalytic combustors which are particularly immune to composition variations in a combusted gas stream.

In some embodiments the hot production fluid may be heat exchanged with water to produce low pressure steam. In such a case, the water stream would be a boiler feed water quality water stream.

In other embodiments the steam generated from waste heat recovery of the first gas turbine exhaust stream, from combustion of the second composition gas stream in a steam boiler or portions of the steam generated from one or both source may be used in surface processing facilities and/or for providing at least a portion of the heat for heating the organic-rich rock formation. Depending on the generation method, the steam may be generated as a low, medium or high pressure steam stream. A low pressure steam is generally at a pressure below 150 psig, a medium pressure steam is generally in the range of 150-250 psig, while a high pressure steam is generally over 250 psig. In one embodiment at least a portion of the steam, particularly where a high pressure steam, is delivered to the organic-rich rock formation to assist in heating the formation. Lower pressure steam, including for example a medium pressure steam, may also be useful in for formation heating through injection. In some embodiments, particularly where the steam is a steam turbine exhaust stream of a low or medium pressure, the low pressure steam stream may be utilized for process heat in processing of the production fluid or derivatives thereof. Exemplary processes where steam may be useful include in the regeneration of an absorber fluid for heavy hydrocarbons or acid gases, in a reboiler of a distillation system, or regeneration of a solid adsorption system for acid gas and trace contaminant removal. Further examples include membrane separation, cryogenic distillation, and pressure swing adsorption. In any of the aforementioned applications where steam is used for heating, the first gas turbine exhaust stream itself may be utilized for process heat as an alternative to steam in the processing of the production fluid or derivatives thereof.

Depending on the eventual destination of the gas turbine exhaust streams there may be a need to control the emissions from the various gas turbines described herein. For example, a gas turbine exhaust stream may, in some instances, be vented to the atmosphere, either before or after subsequent waste heat recovery and/or further treatment of the gas turbine exhaust stream. Certain gas turbine combustors are available in the market that are designed to reduce the creation of nitrogen oxide ($NO_x$) compounds in the gas turbine combustion process. Thus, some embodiments of the invention include equipping the first gas turbine with lean pre-mixed combustor(s), Dry Low $NO_x$ (DLN) combustor(s), Dry Low Emissions (DLE) combustor(s), or other similar devices in order to reduce the formation of $NO_x$. These technologies can be combined with targeting a gas turbine feed gas stream composition that is also conducive to low $NO_x$ generation. $NO_x$ formation is known to be affected by flame temperature and residence time of the nitrogen gas ($N_2$) in the combustion zone. Thus $NO_x$ generation can be reduced by decreasing the combustion zone temperature and/or the amount of $N_2$ present in the combustion zone. In one embodiment, the composition of the first composition gas stream may be altered by reducing the inert gas content of the first composition gas stream. In such an embodiment, the inert gas concentration of the first composition gas stream may be reduced by reducing the nitrogen gas content of the first composition gas stream. In one embodiment, the composition of the first composition gas stream may be altered by increasing the inert gas content of the first composition gas stream to reduce $NO_x$ generation in the first gas turbine. In such an embodiment, the inert gas concentration may be increased by increasing the $CO_2$ content of the first composition gas stream. In such an embodiment the inert gas content of the first composition gas stream that is passed to the first gas turbine may be between 10-60 mole percent.

Additional $NO_x$ reduction technologies may be used instead of or in combination with the previously discussed methods. The previously discussed technologies strive to reduce the generation of $NO_x$, however, there are additional methods useful in reducing the $NO_x$ present in a gas turbine exhaust stream. For example, generated $NO_x$ may be removed from a gas turbine exhaust stream by contacting the gas turbine exhaust stream with an ammonia ($NH_3$) treatment stream. The ammonia treatment stream may optionally be obtained from a stream derived completely or partially from the production fluid. One embodiment includes separating $NH_3$ from the production fluid to form a $NH_3$ treatment stream and injecting the $NH_3$ treatment stream into the first gas turbine exhaust stream, thereby converting a portion of $NO_x$ components in the first gas turbine exhaust stream to $N_2$. In some embodiments, the $NH_3$ treatment stream has a composition of greater than 50 mole percent $NH_3$. In alternate embodiments, the $NH_3$ treatment stream has a composition of greater than 90 mole percent $NH_3$.

The production fluid may contain sulfur compounds, including, for example, hydrogen sulfide. The hydrogen sulfide will be most prevalent in the gas stream formed from the production fluid. It is often desirable to remove hydrogen sulfide or other sulfur containing compounds from gas streams which are subsequently combusted in order to reduce or prevent the formation of sulfur oxides (e.g., $SO_2$) which are environmentally regulated compounds. The method may include treating the gas stream, the first composition gas stream, the second composition gas stream, or any combination thereof to remove at least a portion of the sulfur containing compounds present in such stream so that the resultant respective gas stream has less than 5 mole percent of sulfur containing compounds. Alternatively, the sulfur containing compounds present in such stream may be reduced so that the resultant respective gas stream has less than 1 mole percent or 1,000 ppm of sulfur containing compounds. In some embodiments, the method may include substantially removing $H_2S$ from the gas stream to form a rich $H_2S$ stream which can be further processed in, for example, a sulfur recovery plant. Alternatively, the rich $H_2S$ may be injected into a coal seam, a deep aquifer, a substantially depleted fractured tight gas zone, a substantially depleted oil shale zone, an oil shale zone depleted of sodium minerals or combinations thereof.

As previously discussed there may be synergies between organic-rich rock developments and other hydrocarbon recovery developments. For example, in some instances tight gas deposits are located in close proximity to oil shale deposits. In such a case, the produced gas from a tight gas development may be used as a feed for the first gas turbine used in the oil shale development. As previously discussed, it may take a period of time before achieving full hydrocarbon gas production from an in situ heating process of an organic-rich rock development. Thus there may be a need for a supplemental gas turbine gas feed source initially. In such a case, a portion of the produced gas from a tight gas development may be used as a feed for the first gas turbine for a period of time until sufficient hydrocarbon gas is produced from the organic-rich rock development, for example in the case of an oil shale development. Thus in one embodiment the produced gas from the tight gas development is used as a feed for the first gas turbine for a period of time beginning after commencement of heating the organic-rich rock formation until at least some time before completion of producing a production fluid comprising hydrocarbon fluids from the organic-rich rock. In alternate embodiments, electricity generated from electrical generators coupled to the gas turbines of the organic-rich rock formation development may be used to power a compressor used to compress produced gas from a tight gas development.

The methods of heating an organic-rich rock formation described herein may result in production of water vapor which may be produced from the organic-rich rock formation with the production fluid. The heating of the organic-rich rock formation in situ may cause the formation of water vapor. In such cases the water vapor may be produced to the surface for further processing. The produced water vapor may be condensed above-ground in the surface processing facilities thereby forming a condensed water stream. This condensed water stream may be a high purity water stream without significant mineral components. There are many possible uses of such a condensed water stream. For example the condensed water stream may be used as boiler feed water. In one embodiment, the condensed water or a derivative thereof may be fed to a waste heat boiler of a cogeneration combined-cycle or combined heat and power system. Moreover, the condensed water stream may be fed to a gas turbine to improve the performance of the gas turbine. The condensed water stream may be fed to the gas turbine with the gas turbine feed gas, into the combustion chamber of the gas turbine, or with the oxidant (e.g., air) feed stream. In one embodiment, the condensed water or a derivative thereof may be fed to the first gas turbine, thereby augmenting power in the first gas turbine, controlling emissions from the first gas turbine, or combinations thereof. In any of the cases described above, the condensed water or a derivative thereof may be preheated by heat exchanging it with the production fluid or derivatives thereof.

The various methods of using the gas stream or derivatives thereof for the generation of power may include using the generated power as an energy source for heating the organic-rich rock formation. As previously discussed, electrical power may be generated by coupling the first gas turbine to a first electrical generator, thereby generating electricity in the first electrical generator. Further, electrical power may be generated from steam turbines coupled to electrical generators as described herein. In any of these cases, the generated electricity may be used in combination with electrical resistance heaters to heat the organic-rich rock formation. The electrical resistance heaters may be powered partially, substantially or completely through use of the generated electricity. In one embodiment, the generated electricity accounts for greater than 60 percent of the heat used in heating the organic-rich rock formation. In alternate embodiments, the generated electricity accounts for greater than 70, 80, 90 or 95 percent of the heat used in heating the organic-rich rock formation.

The methods may in some embodiments utilize heating methods other than electrical resistance heating methods. In such cases a portion of the gas stream may be combusted in a process furnace to heat a process fluid. In one embodiment, the second composition gas stream may be fed to a furnace and combusted in the furnace to provide heat to a process stream. The heated process stream or a derivative thereof may then be used to heat the organic-rich rock formation. Alternatively, the heated process stream may be used as a heat transfer fluid in heating a separate fluid that is used to heat the organic-rich rock formation.

The generated electricity may be utilized for alternate uses in some embodiments. For example, the generated electricity, or a portion thereof, may be sold to a third party, including for example, an electric utility. Some embodiments may include buying electricity from an electricity supplier at selected off-peak demand times. Some or all of the purchased electricity may be used to heat the organic-rich rock formation by, for example, electrical resistance heating.

In some embodiments the production fluid or derivatives thereof may be sold or used in other processing units. In one embodiment the gas stream or derivatives thereof may be used for purposes other than the generation of electricity. For example, if electricity demands do not require utilization of the entirety of the gas stream, the first composition gas stream and/or the second composition gas stream for electricity generation, then a portion of such streams may be sold or used in other processes. The method may include obtaining a liquid stream from the production fluid in some embodiments. The liquid stream may be comprised of combustible hydrocarbon fluids. Exemplary liquid streams may include an LPG stream, a naphtha stream, a distillate stream and heavy oil stream. One or more of these streams may be sold or further refined to produce salable hydrocarbon products.

Figure 29:
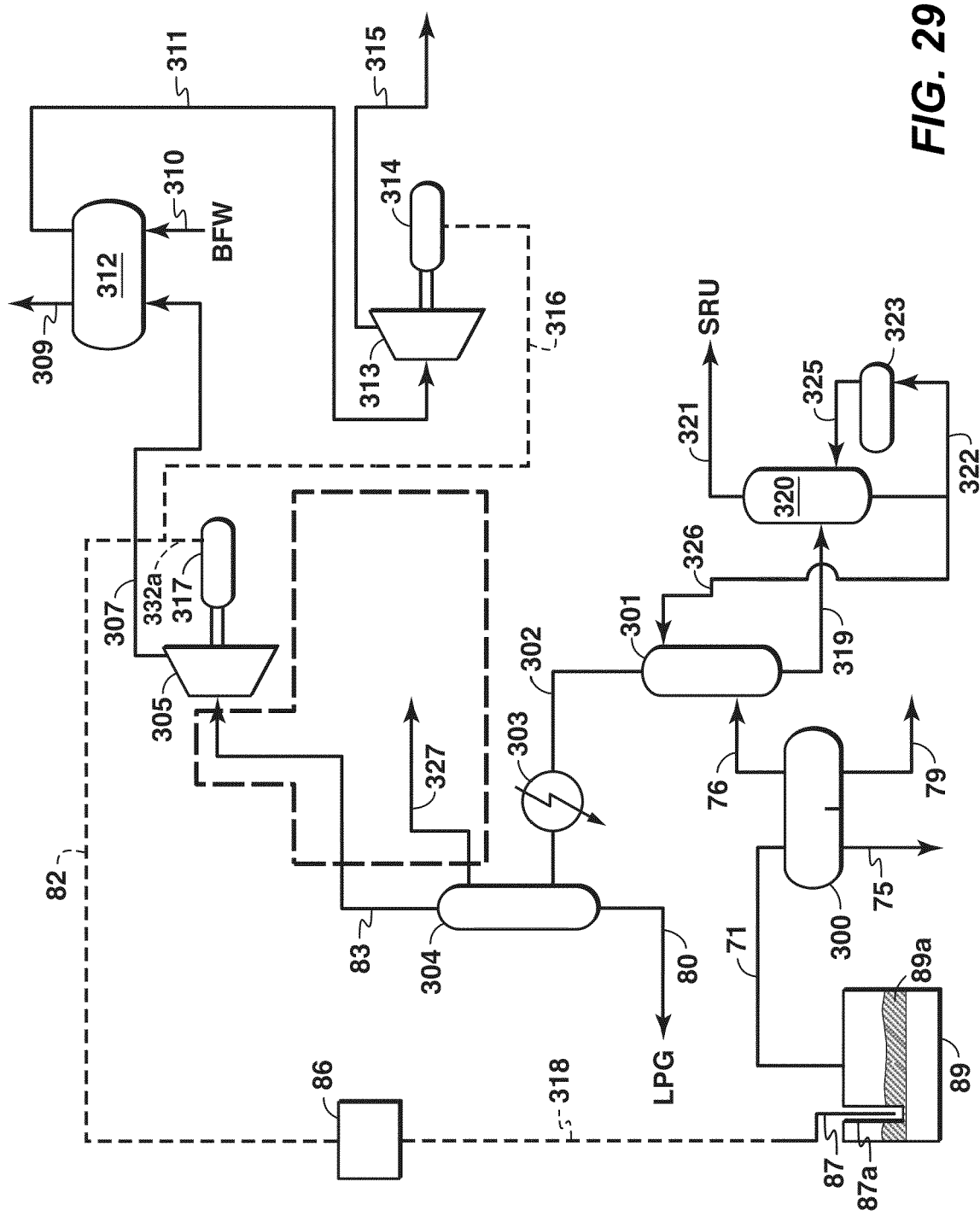
FIG. 29 is a process flow diagram of exemplary processing facilities that may be used in some embodiments of the invention.

FIG. 29 depicts a portion of the processing facilities for an exemplary in situ heating organic-rich rock formation field development project. An organic-rich rock formation 89a located in a portion of the subsurface 89 is penetrated by wellbore 87a. A heating element 87 is disposed in the wellbore 87a. The heating element 87 may be any type of heating element, for example, an electrical resistance heating element. In an actual commercial development, there would be several heater well wellbores 87a with heating elements 87 disposed in such wellbores 87a. Electricity is fed to the heating element 87 through electrically conductive line 318 in order to commence heating of the organic-rich rock formation 89a. After a period of heating the organic-rich formation 89a, a production fluid will be produced from the organic-rich rock formation 89a, for example through a production well (not shown), and transferred to the processing facilities by production line 71. The production fluid, which may be comprised of hydrocarbon fluids, including, for example, a condensable (liquid) portion and a non-condensable (gas) portion, and non-hydrocarbon fluids, including, for example, water, $CO_2$, $H_2S$, and $H_2$, is transferred to an oil-water separator 300 where the production fluid is split into three streams, a water stream 75, a hydrocarbon liquid stream 79, and a gas stream 76. Though not shown the production fluid may be quenched to reduce its temperature and thereby condense a portion of the gaseous components of the production fluid before entry into the oil-water separator 300. The production fluid may be quenched indirectly in a heat exchanger by use of a cooling fluid (e.g., boiler feed water) or may be quenched directly by the addition and mixing with a quench water stream. It is understood that oil-water separator 300 may be comprised of multiple oil-gas, oil-water, and/or oil-water-gas separators in a commercial facility, however only one separator is shown for brevity. The water stream 75 may be processed in other facilities (not shown) to remove and/or recover dissolved species before using or re-injecting the water into the subsurface. The hydrocarbon liquid stream 79 may contain a broad range of hydrocarbon species and have a broad distillation range. The hydrocarbon liquid stream 79 may be further processed and refined in other facilities (not shown) into useful hydrocarbon products.

The gas stream 76 is transferred to an acid gas contactor 301 where the gas stream is contacted with a lean amine stream 326 to facilitate removal of $H_2S$ and, in some cases, other acid gas species like $CO_2$. In the acid gas contactor 301, $H_2S$ and other acid gas species may dissolve in the lean amine forming a rich amine solution which falls to the bottom of the acid gas contactor 301 and is removed through rich amine stream 319. The rich amine stream 319 is fed to amine regenerator 320 where the temperature of the rich amine stream is raised and the $H_2S$ in the rich amine stream is liberated from the amine and is recovered in $H_2S$ stream 321. The recovered $H_2S$ stream 321 may be further processed in a sulfur recovery plant to produce elemental sulfur. Alternatively, $H_2S$ stream 321 may be injected into the subsurface as previously discussed. Heat is added to the amine regenerator 320 by amine reboiler 323 through removal of a first portion 322 of amine regenerator 320 bottoms stream and subsequently returned hot to amine regenerator 320 by reboiler return stream 325. A second portion of amine regenerator 320 bottoms or lean amine stream 326 is returned to the amine contactor 301 for reuse in removing acid gases from the gas stream 76. Further discussion of amine systems has been provided herein previously. In addition different methods for removing $H_2S$ and/or $CO_2$ have been discussed previously and may be substituted for the particular amine system depicted in FIG. 29.

Sweetened gas stream 302 is removed from the amine contactor 301 and cooled in cooler 303 before entering gas stripper tower 304. A bottoms product is removed from the gas stripper 304 to form an LPG product stream 80. Gas stripper 304 includes an overhead first composition gas stream 83 and a side draw second composition gas stream 327. It is understood that gas stripper tower 304 may have additional draw streams (not shown) but that only two are depicted for simplicity. Further, it is understood that any of the depicted draw streams may have a reflux circuit (not shown). It is also understood that gas stripper 304 may be comprised of multiple stripping and/or distillation towers with multiple draw and reflux streams in a commercial operation, however only one tower is shown for brevity.

In some embodiments, the composition of the first composition gas stream 83 and second composition gas stream 327 will be different and will require different gas turbine configurations as previously discussed. In the depicted embodiment, the first composition gas stream 83 is subsequently fed to first gas turbine 305. While only a single first gas turbine 305 is depicted in FIG. 29, it is understood that there may be multiple first gas turbines in a commercial operation. The first composition gas stream 83 is combusted in the first gas turbine 305 and energy is recovered from the combusted gas stream in the turbine portions of the first gas turbine 305. In the depicted embodiment, the first gas turbine is coupled to an electrical generator 317 for the purpose of generating electricity which is transported from the electrical generator 317 by electrically conductive line 332a. The generated electricity may be combined and transported to transformer 86 through electrically conductive line 82. The transformed electricity may then be used to generate heat in heating element 87 as previously discussed. In commercial embodiments there may be several transformers, heating elements and wells, though only one of each is depicted in FIG. 29.

First gas turbine 305 includes a combustor (not shown) that is optimized for the first composition gas stream compositions as previously discussed. That is, first gas turbine 305 is optimized for a range of compositions expected for the first composition gas stream 83. The relative amounts of the first composition gas stream 83 and the second composition gas stream 327 may change over the life of the field development as previously discussed.

Depending on the embodiment, the second composition gas stream 327 may be further processed in a variety of ways. In one embodiment, the second composition gas stream may be further processed in a second gas turbine (shown in FIG. 34). In an alternative embodiment, the second composition gas stream may be further processed to produce a salable product. Exemplary salable products include hydrogen gas, methane, ethane, ethylene, propane, propylene or combinations thereof. In alternative embodiments, the second composition gas stream may be used a fuel for a steam boiler or fired heater as discussed herein. In still alternative embodiments, the second composition gas stream 327 may be partially blended with the first composition gas stream 83, with the unblended portion of the second composition gas stream 327 being used in any of the ways specified above in this paragraph and the now blended first composition gas stream 83 being combusted in the first gas turbine 305.

The first gas turbine exhaust stream 307 is comprised of combusted gas and is fed to a steam boiler 312 for the purpose of generating steam from the hot combusted turbine exhaust stream. Gas turbine exhaust stream 307 is passed through steam boiler 312, gives up heat to the steam boiler 312 system and exits the steam boiler 312 at a reduced temperature through stream 309. Boiler feed water 310 is fed to steam boiler 312 where it is heated by the hot gas turbine exhaust stream 307, thus generating steam which exits the steam boiler 312 through steam stream 311. In some embodiments, the steam stream 311 may be a high pressure steam stream. In some embodiments, particularly where the steam stream 311 is a high pressure steam stream, the generated steam may be fed to a steam turbine 313 for further power recovery, this type of power cycle, including a gas turbine and a steam turbine, is generally referred to as a combined cycle power generation cycle. Alternatively, the steam stream 311 may be used for other processing needs (not shown). In the depicted embodiment steam stream 311 is fed to steam turbine 313 where energy is recovered from steam stream 311 in the steam turbine 313, thereby producing a low pressure steam stream 315 which may be used for other processing uses (not shown) or reheated (not shown) for eventual reuse in the steam turbine 313. The steam turbine 313 is coupled to an electrical generator 314 which generates electricity which is carried to the transformer 86 by electrically conductive lines 316 and 82.

Figure 30:
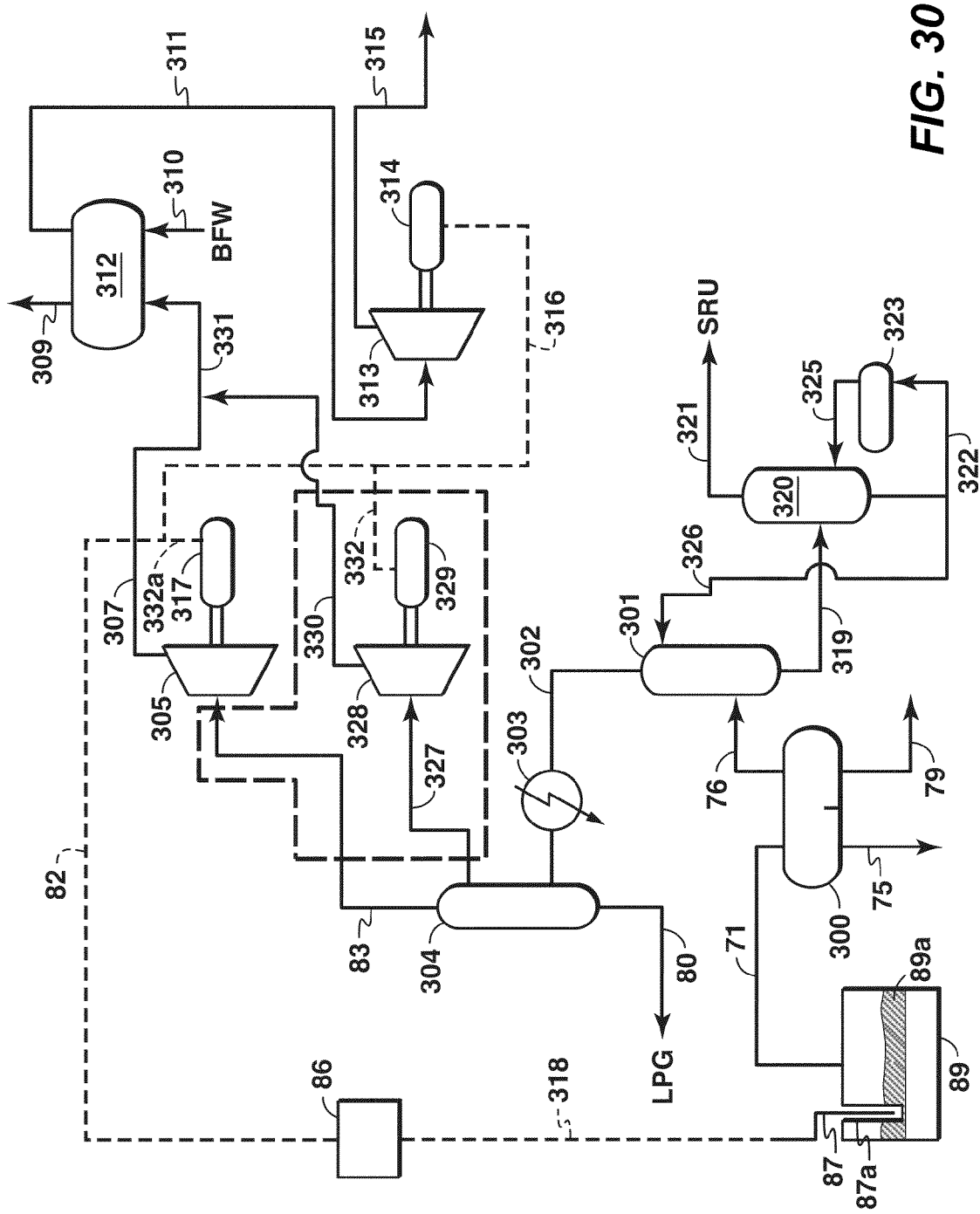
FIG. 30 is an alternative process flow diagram of exemplary processing facilities that may be used in some embodiments of the invention.

FIG. 30 depicts an alternative embodiment that utilizes a second gas turbine for processing the second composition gas stream. The process flow of FIG. 30 is the same as that described for FIG. 29 for processing occurring up to the gas stripper 304 outlet streams. Picking up the description with the gas stripper 304 gas product streams. The gas stripper 304 gas product streams include an overhead first composition gas stream 83 and a side draw second composition gas stream 327. As in FIG. 29, it is understood that gas stripper tower 304 may have additional draw streams (not shown) but that only two are depicted for simplicity. Further, it is understood that the depicted draw streams may have a reflux circuit (not shown). It is also understood that gas stripper 304 may be comprised of multiple stripping and/or distillation towers with multiple draw and reflux streams in a commercial operation, however only one tower is shown for brevity.

In the depicted embodiment, both the first composition gas stream 83 and the second composition gas stream 327 are subsequently fed to gas turbines 305 & 328. While only a single first gas turbine 305 and second gas turbine 328 are depicted in FIG. 30, it is understood that there may be multiple gas turbines for each type of gas turbine in a commercial operation. The respective gas streams 83 & 327 are combusted in the respective gas turbines 305 & 328 and energy is recovered from the combusted gas streams in the turbine portions of the respective gas turbines 305 & 328. Though not shown, alternatively the two gas turbines could be replaced with one gas turbine with a duel combustor comprised on a first gas injector optimized for the first composition gas stream and a second gas injector optimized for the second composition gas stream as previously discussed herein. In the depicted embodiment, each gas turbine is coupled to an electrical generator 317 & 329 for the purpose of generating electricity which is transported from the electrical generators by electrically conductive lines 332 & 332a. The generated electricity may be combined and transported to transformer 86 through electrically conductive line 82. The transformed electricity may then be used to generate heat in heating element 87 as previously discussed.

Gas turbines 305 & 328 include combustors (not shown) that are optimized for feed gasses having different compositions as previously discussed. That is, first gas turbine 305 is optimized for a range of compositions expected for the first composition gas stream 83 and second gas turbine 328 is optimized for a range of compositions expected for the second composition gas stream 327. The relative amounts of the first composition gas stream 83 and the second composition gas stream 327 is expected to change over the life of the field development, but the composition may remain in a substantially constant condition such that turbine performance remains acceptable.

The first gas turbine exhaust stream 307 and the second gas turbine exhaust stream 330, both comprised of combusted gas, are combined in stream 331 and fed to a steam boiler 312 for the purpose of generating steam from the hot combusted turbine exhaust streams. Combined stream 331 passed through steam boiler 312, gives up heat to the steam boiler 312 system and exits the steam boiler 312 at a reduced temperature through stream 309. Boiler feed water 310 is fed to steam boiler 312 where it is heated by the hot combined stream 331, thus generating steam which exits the steam boiler 312 through steam stream 311. In some embodiments, the steam stream 311 may be a high pressure steam stream. In some embodiments, particularly where the steam stream 311 is a high pressure steam stream, the generated steam may be fed to a steam turbine 313 for further power recovery, this type of power cycle, including a gas turbine and a steam turbine, is generally referred to as a combined cycle power generation cycle. Alternatively, the steam stream 311 may be used for other processing needs (not shown). In the depicted embodiment steam stream 311 is fed to steam turbine 313 where energy is recovered from steam stream 311 in the steam turbine 313, thereby producing a low pressure steam stream 315 which may be used for other processing uses (not shown) or reheated (not shown) for eventual reuse in the steam turbine 313. The steam turbine 313 is coupled to an electrical generator 314 which generates electricity which is carried to the transformer 86 by electrically conductive lines 316 and 82.

Figure 31:
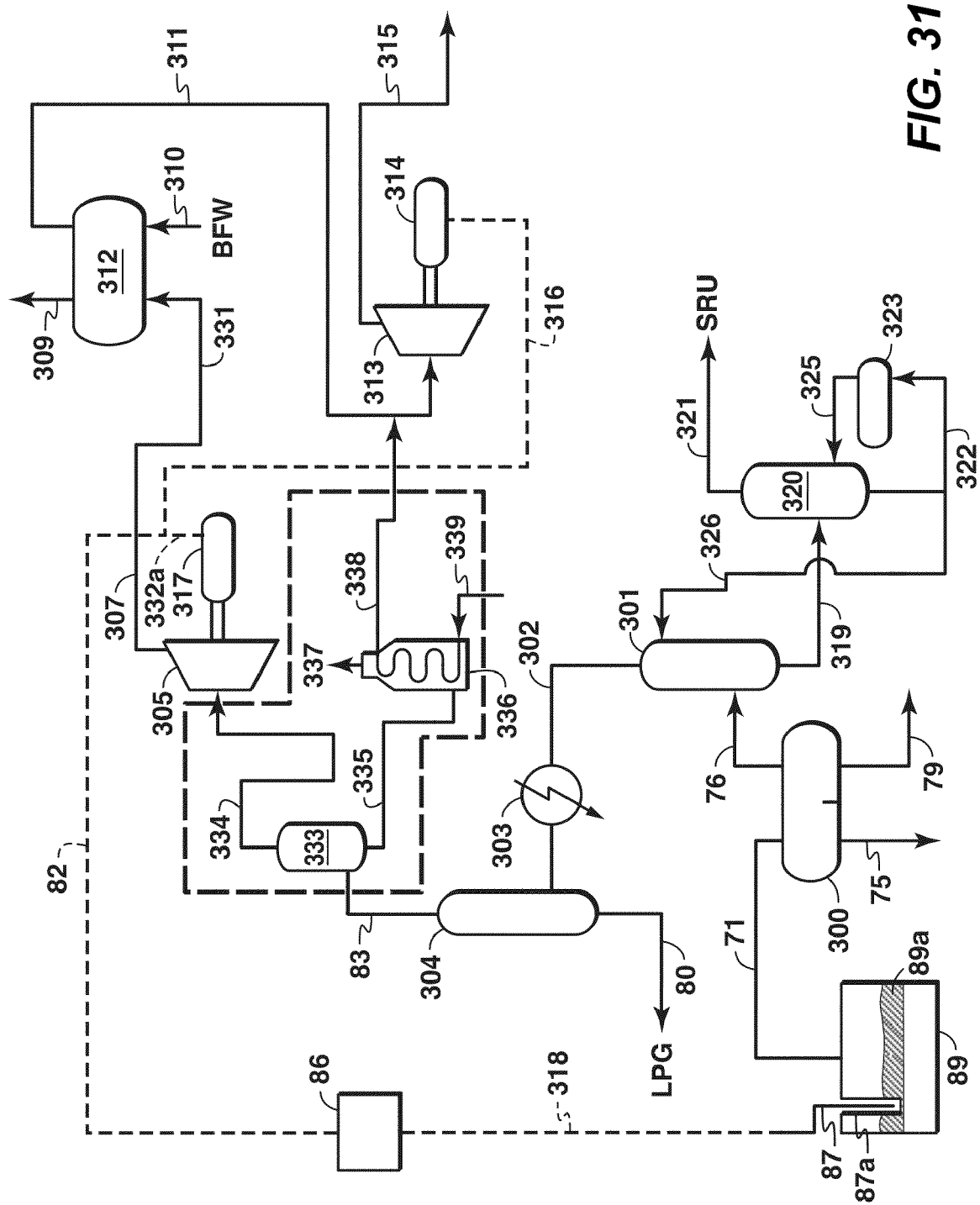
FIG. 31 is an alternative process flow diagram of exemplary processing facilities that may be used in some embodiments of the invention.

FIG. 31 depicts an alternative embodiment that utilizes a fired steam boiler instead of a second gas turbine for processing the second composition gas stream. The process flow of FIG. 31 is the same as that described for FIG. 29 for processing occurring up to the feed inlet for the gas stripper tower 304. Picking up the description with the sweetened gas stream 302 exiting the amine contactor 301, sweetened gas stream 302 is removed from the amine contactor 301 and cooled in cooler 303 before entering gas stripper tower 304. A bottoms product is removed from the gas stripper 304 to form an LPG product stream 80 as discussed in FIG. 29. Gas stripper 304 includes an overhead stream 83. As in FIG. 29, it is understood that gas stripper tower 304 may have additional draw streams (not shown) but that only one is depicted for simplicity. Further, it is understood that the depicted draw stream may have a reflux circuit (not shown). It is also understood that gas stripper 304 may be comprised of multiple stripping and/or distillation towers with multiple draw and reflux streams in a commercial operation, however only one tower is shown for brevity. Overhead stream is fed to a second splitter tower 333 for further separation of the feed overhead stream 83. Gas splitter tower 333 includes an overhead first composition gas stream 334 and a bottom draw second composition gas stream 335. Though depicted as a bottoms stream, second composition gas stream 335 may alternatively be a side draw with a separate bottoms stream. In the case where the second composition gas stream 335 is a bottom stream, the second composition gas stream 335 may be regassed (not shown) through addition of heat before being combusted in the fired steam boiler 336.

In some embodiments, the composition of the first composition gas stream 334 and second composition gas stream 335 will be different and will require different down stream processing as previously discussed. In the depicted embodiment, the first composition gas stream 334 is subsequently fed to gas turbine 305. The first composition gas stream 334 is combusted in the first gas turbine 305 and energy is recovered from the combusted gas stream in the turbine portion of the first gas turbine 305. The first gas turbine 305 is coupled to an electrical generator 317 for the purpose of generating electricity which is transported from the electrical generator 317 by electrically conductive line 332a. The generated electricity may be transported and used to generate heat in heating element 87 as previously discussed.

In the embodiment depicted in FIG. 31, the second composition gas stream 335 is not fed to a gas turbine as described in the embodiment depicted in FIG. 30, but is instead combusted in a fired steam boiler 336 to generate high pressure steam. The second composition gas stream 335 is combusted in the fired steam boiler 336, thereby providing heat to the steam boiler system before exiting the fired steam boiler 336 through exhaust stream 337. Alternatively, the fired steam boiler 336 could be replaced with a fired heater (not shown). In such case the fired heater may be used to heat a process fluid instead of steam. The heated process fluid could be used for other processing needs, including, for example, being used as a heating fluid for heating the organic-rich rock formation as discussed previously. Exhaust stream 337 may be vented to the atmosphere as shown or be a source of heat for further heat recovery (not shown) or for injection into the subsurface (not shown). Boiler feed water 339 is fed to fired steam boiler 336 which is heated in steam boiler 336 thereby generating a high pressure steam stream 338. High pressure steam stream 338 is fed to steam turbine 313 for power recovery as discussed in FIG. 29.

The embodiment depicted in FIG. 31 may be useful where it is not possible to maintain the composition of both the first composition gas stream and the second composition gas stream in a substantially constant condition. In such a case, the first composition gas stream may be maintained in a substantially constant condition while the second composition gas stream is allowed to vary. Because of the variability of the second composition gas stream it may not be suitable for power recovery using a gas turbine due to the limited range of compositions under which a gas turbine can maintain stable operation as previously discussed. Thus the variable second composition gas stream may be processed in a fired stream boiler which is much less affected by compositional changes of a feed gas stream. In cases where substantial electricity generation is desired, the steam produced in the fired steam boiler may be used for electricity generation through use of a steam turbine as depicted in FIG. 31.

Figure 33:
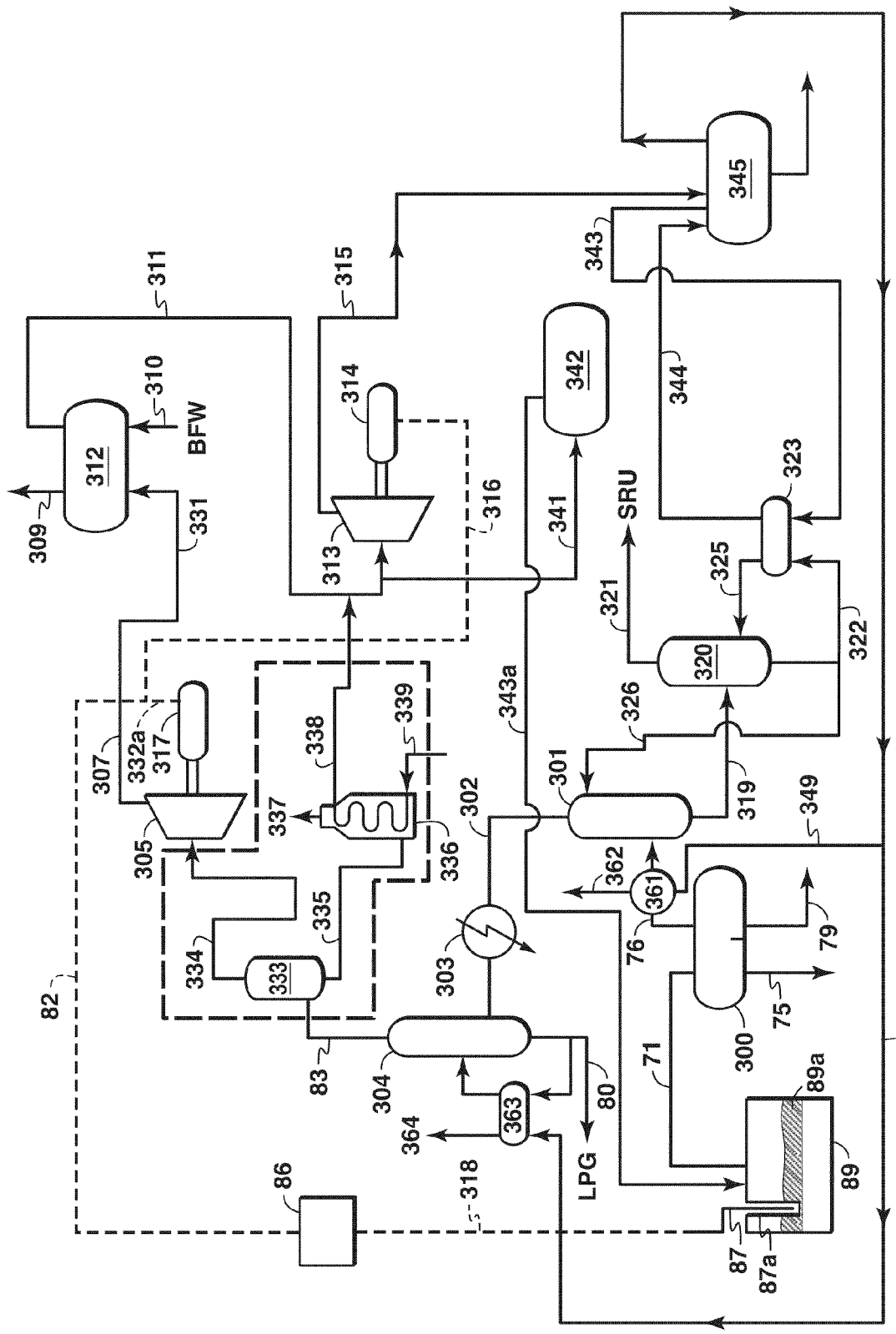
FIG. 33 is an alternative process flow diagram of exemplary processing facilities that may be used in some embodiments of the invention.

In some embodiments the steam generated from waste heat recovery of the first gas turbine exhaust stream, from combustion of the second composition gas stream in a steam boiler or portions of the steam generated from one or both source may be used in surface processing facilities and/or for providing at least a portion of the heat for heating the organic-rich rock formation. Referring now to FIG. 33 which depicts an alternative embodiment that includes various uses of steam generated in the surface facilities. FIG. 33 utilizes a first gas turbine 305 and a fired steam boiler 336 as depicted in FIG. 31. The process flow of FIG. 33 is the same as that described for FIG. 31 except that FIG. 33 includes additional process flows for steam streams and additional processing equipment related to steam processing and steam use. Picking up the description with the fired steam boiler 336 and the steam boiler 312, boiler feed water 339 is fed to fired steam boiler 336 which is heated in fired steam boiler 336 thereby generating a high pressure steam stream 338. High pressure steam stream 338 is fed to steam turbine 313 for power recovery as discussed in FIG. 29. With reference to the steam boiler 312, combined stream 331 passes through steam boiler 312, gives up heat to the steam boiler 312 system and exits the steam boiler 312 at a reduced temperature through stream 309. Boiler feed water 310 is fed to steam boiler 312 where it is heated by the hot combined stream 331, thus generating steam which exits the steam boiler 312 through steam stream 311. In some embodiments, the steam stream 311 may be a high pressure or medium pressure steam stream. In some embodiments, particularly where the steam stream 311 is a high pressure steam stream, the generated steam may be fed to a steam turbine 313 for further power recovery as depicted. In addition, the steam stream 311 from the steam boiler 312 and the high pressure steam stream 338 from the fired steam boiler 336 may be used for other processing needs, some of which are depicted in FIG. 33.

As depicted in FIG. 33, a portion of the steam streams 338 & 311 may be sent to a high pressure steam drum 342 through line 341. A first high pressure steam stream 343*a* may be used as a heat source in heating the organic-rich rock formation 89*a* as previously discussed herein. Steam from the outlet of the steam turbine 313 forms a low pressure steam stream 315 which is sent to a low pressure steam drum 345 together with steam condensate outlet 344 of amine reboiler 323. Low pressure steam may be used in various processing facilities, including the depicted first low pressure steam stream 349 used in an amine contactor preheater 361. The steam condensate outlet 362 from the amine contactor preheater 361 may be recycled for other processing needs or recycled as a boiler feed water stream (not shown). A second low pressure steam stream 360 may be used as a heat source for a stripper reboiler 363 used as a heat source for gas stripper tower 304. The steam condensate outlet 364 from the stripper reboiler 363 may be recycled for other processing needs or recycled as a boiler feed water stream (not shown). A third low pressure steam stream 343 may be used as a heat source for amine reboiler 323 as previously discussed with reference to FIG. 29. As previously discussed herein there are other uses for high, medium and low pressure steam in the processing facilities and the forgoing are described as illustrative examples. Exemplary processes where steam may be useful include in the regeneration of an adsorber or absorber for heavy hydrocarbons, in a reboiler of a distillation system, or regeneration of a solid adsorption system for acid gas and trace contaminant removal. Further examples include membrane separation, cryogenic distillation, pressure swing adsorption and sulfur recovery units.

Figure 34:
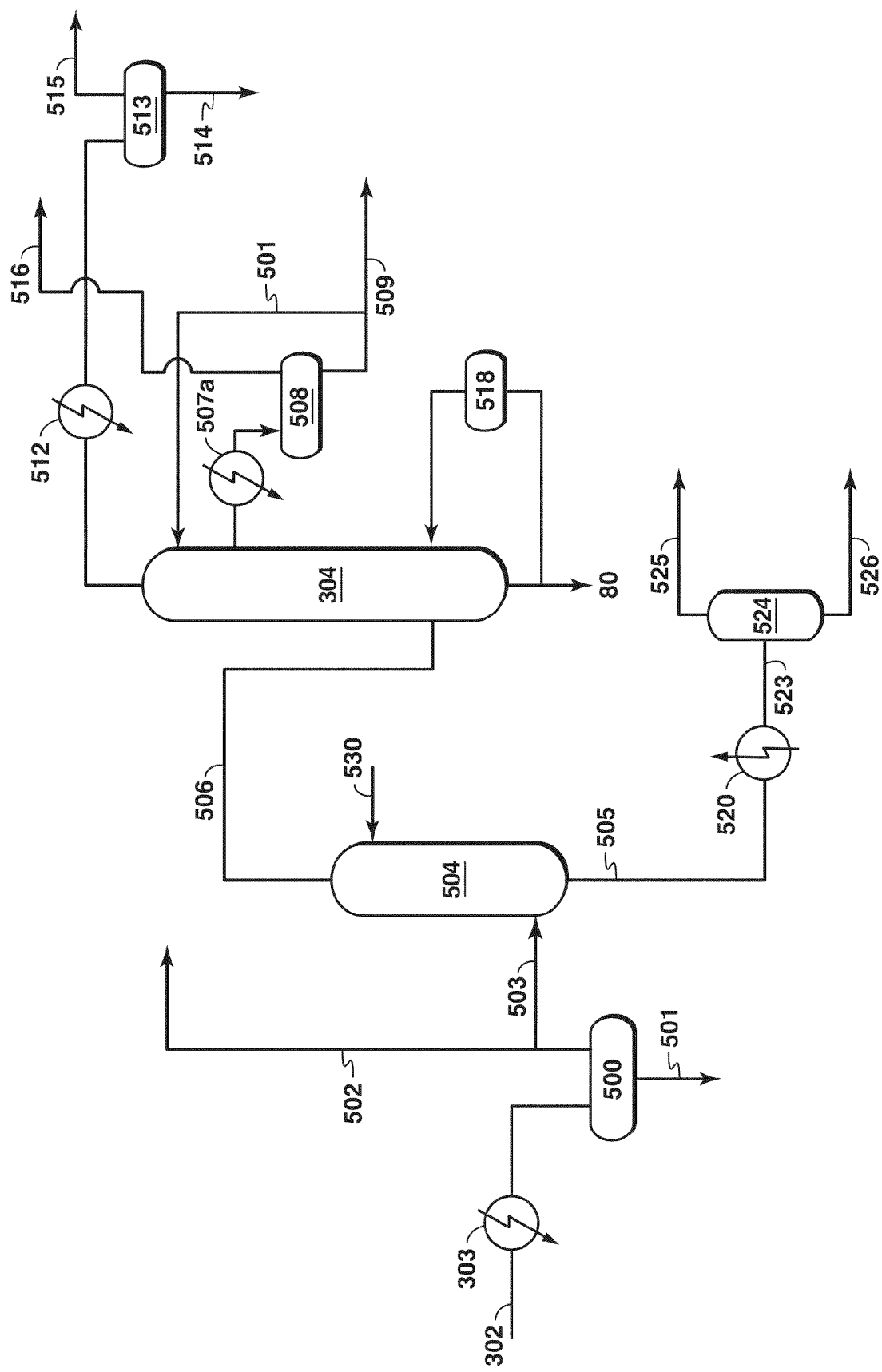
FIG. 34 is an alternative process flow diagram of exemplary processing facilities that may be used in some embodiments of the invention.

In the various methods described herein, the composition of the first composition gas stream or the second composition gas stream may be altered by adjusting the pressure or temperature of one or more oil-gas separators located in the processing facilities. FIG. 34 depicts an alternative illustrative embodiment including various oil-gas separators that may optionally be used in surface processing facilities. FIG. 34 picks up at the overhead stream from the acid gas contactor. Sweetened gas stream 302 is removed from the amine contactor (not shown) and cooled in cooler 303 before entering absorber feed drum 500. Absorber feed drum 500 includes a liquid stream 501 and a vapor stream which is split into a first absorber feed drum gas stream 502 and absorber feed stream 503. Absorber feed stream 503 is contacted by oil stream 530 in absorber 504 for the purpose of removing heavier hydrocarbon species from absorber feed stream 503 before feeding the gas stripper tower 304 with absorber overhead stream 506. The oil stream 530 may be any oil stream, including the hydrocarbon liquid stream 79, or a derivative thereof, as previously discussed with reference to FIG. 29. The absorber bottoms 505 may be sent to a flash drum 524 after being heated by heat exchanger 520. In the flash drum the now heated feed 523 can be separated into a flash drum gas 525 and a flash drum liquid 526. Absorber overhead stream 506 is fed to gas stripper tower 304 as previously discussed with reference to FIG. 29. The gas stripper tower 304 depicted in FIG. 34 however includes an optional reflux cooler 507*a* and reflux drum 508 as well as an optional overhead cooler 512 and overhead product drum 513. The reflux drum 508 includes a reflux offgas stream 516, a reflux stream 510 and a reflux product stream 509. The optional overhead product drum 513 includes overhead gas product 515 and overhead liquid product 514. One or more of the first absorber feed drum gas stream 502, flash drum gas 525, reflux offgas stream 516, or overhead gas product 515, may be used as the first composition gas stream or the second composition gas stream as previously described herein. The composition of the first or second composition gas stream may therefore be adjusted by adjusting the temperature and/or pressure of the absorber feed drum 500, flash drum 524, reflux drum 508, or overhead product drum 513, thereby changing the composition of the off gas from such respective oil-gas separator. While only one oil-gas separator is depicted in FIG. 34 for each service type, it is understood that the processing facilities may include several stages of oil-gas separators, typically at successively lower pressures. For a series of separators at similar temperatures, the off gas from the initial higher pressure separators will be lighter (e.g., richer in methane and hydrogen) than the off gas from the later low pressure separators (e.g., richer in propane and carbon dioxide). Thus the first composition gas stream may be comprised of a blend of at least a first separator gas from a first oil-gas separator and a second separator gas from a second oil gas separator. Further, the method may include altering the composition of the first composition gas stream by adjusting the relative amounts of the first separator gas and the second separator gas making up the first composition gas stream. Particular exemplary streams that may be selected for mixing to form the first composition gas stream include, for example, one or more of the first absorber feed drum gas stream 502, flash drum gas 525, reflux offgas stream 516, overhead gas product 515, and LPG product stream 80.

In the various methods described herein, the composition of the first composition gas stream or the second composition gas stream may be altered through use of vapor-liquid extraction techniques, such as described for absorber 504. In such techniques a gas stream may be contacted with a liquid in order to allow for mass transfer of certain components in the gas stream with preferential solubility in the liquid stream, typically heavier components, to move from the gas stream and dissolve in the liquid stream, thereby altering the composition of the resulting gas stream. The production fluid or a fraction thereof may be used as the liquid stream. In particular, a portion of produced liquids from later in the fluid processing system may be recycled back to contact with the gas stream, the first composition gas stream, the second composition gas stream, or derivatives thereof to solubilize and remove a portion of components in the stream.

Figure 35:
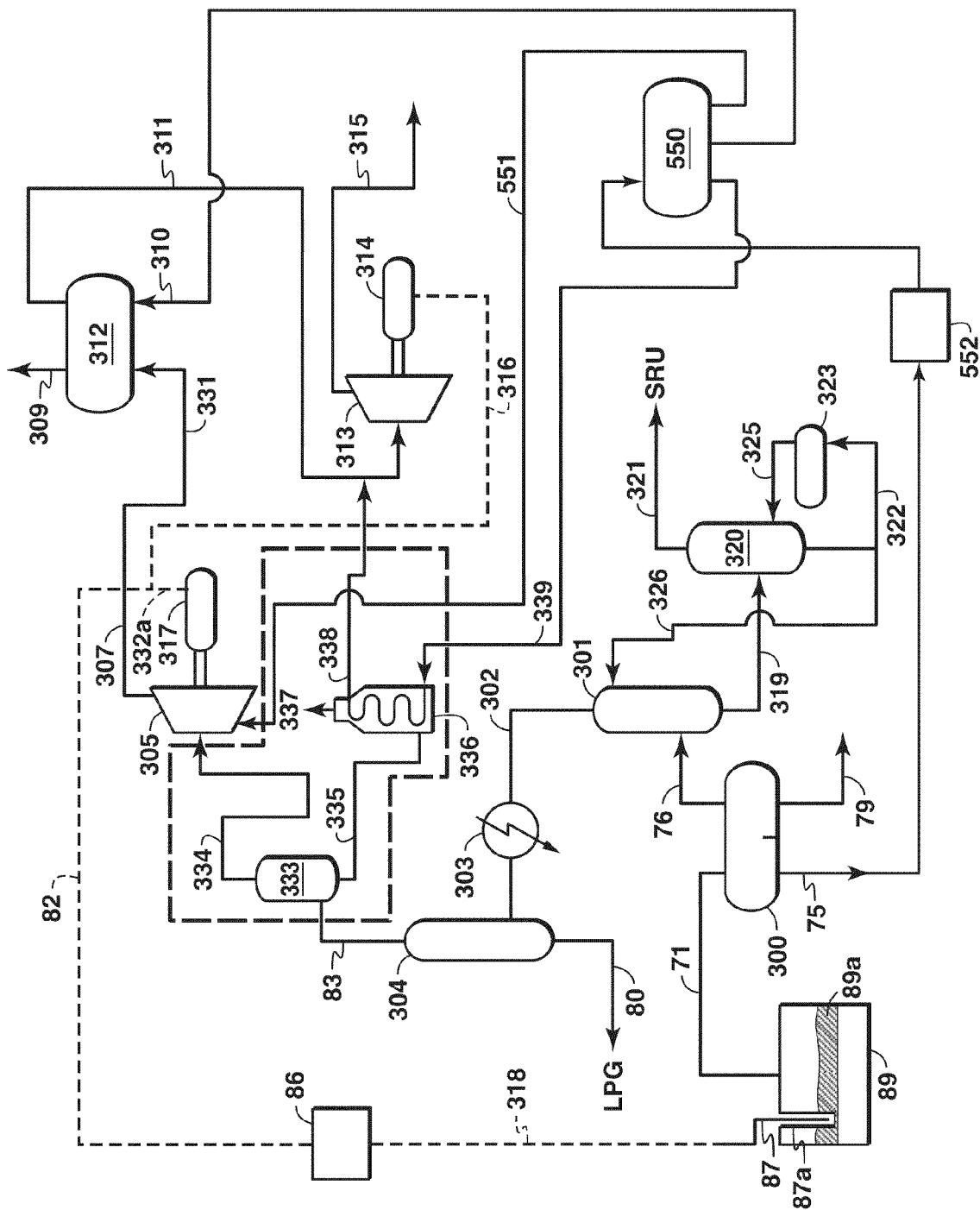
FIG. 35 is an alternative process flow diagram of exemplary processing facilities that may be used in some embodiments of the invention.

The methods of heating an organic-rich rock formation described herein may result in production of water vapor which may be produced from the organic-rich rock formation with the production fluid. In such cases the water vapor may be further processed in the processing facilities. FIG. 35 depicts an alternative embodiment that includes processing of the produced water and uses for the condensed produced water in the surface facilities. FIG. 35 utilizes a steam turbine 313 and a fired steam boiler 336 as depicted in FIG. 31. The process flow of FIG. 35 is the same as that described for FIG. 31 except that FIG. 35 includes additional process flows for produced water and additional processing equipment related to boiler feed water processing and use. Picking up the description with the oil-water separator 300 where the production fluid 71 is split into three streams, a water stream 75, a hydrocarbon liquid stream 79, and a gas stream 76. Though not shown the production fluid may be quenched to reduce its temperature and thereby condense a portion of the gaseous components of the production fluid before entry into the oil-water separator 300. The water stream 75 may be a high purity water stream without significant mineral components, especially if water entered the wellbore 87*a* as a vapor. In the depicted embodiment, the water stream 75 is transferred to a boiler feed water drum 550. Optionally, the water stream may be treated in water treatment facilities 552 before entering the boiler feed water drum 550. A first boiler feed water stream 339 feeds fired steam boiler 336. Fired steam boiler 336 has been previously discussed with reference to FIG. 31. A second boiler feed water stream 310 feeds steam boiler 312. Steam boiler 312 has been previously discussed with reference to FIG. 31. A third boiler feed water stream 551 is used as a feed to first gas turbine 305. First gas turbine 305 has been previously discussed with reference to FIG. 31. As previously discussed herein, a condensed produced water stream may be fed to a gas turbine to improve the performance of the gas turbine. The third boiler feed water stream 551 may be fed to the first gas turbine 305 with the gas turbine feed gas 334, into the combustion chamber of the gas turbine, or with the oxidant (e.g., air) feed stream.

EXPERIMENTS

Figure 18:
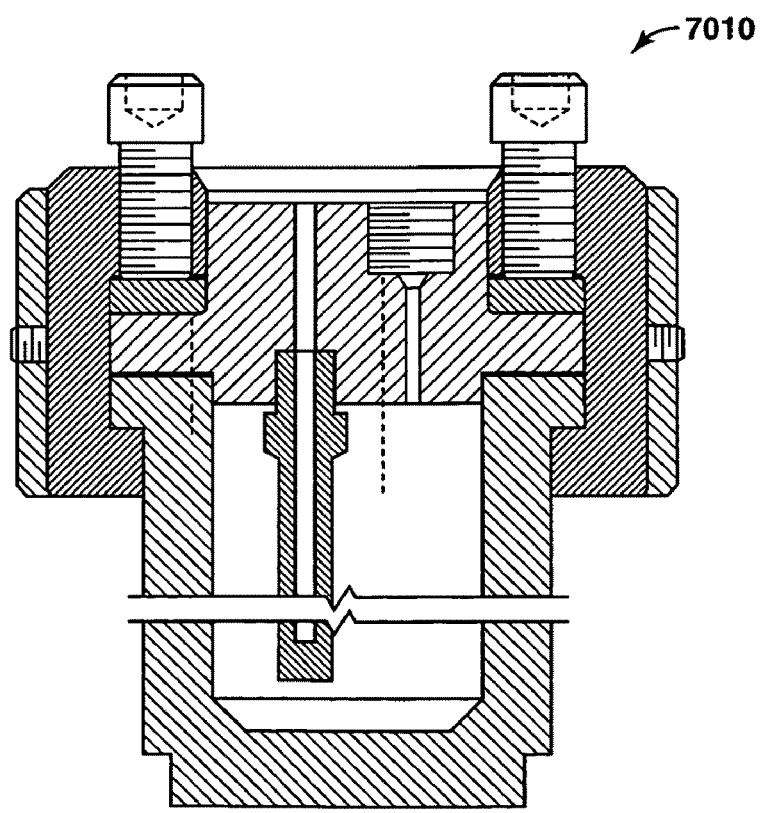
FIG. 18 is a cross-sectional view of the Parr vessel used in Examples 1-5.

Heating experiments were conducted on several different oil shale specimens and the liquids and gases released from the heated oil shale examined in detail. An oil shale sample from the Mahogany formation in the Piceance Basin in Colorado was collected. A solid, continuous block of the oil shale formation, approximately 1 cubic foot in size, was collected from the pilot mine at the Colony mine site on the eastern side of Parachute Creek. The oil shale block was designated CM-1B. The core specimens taken from this block, as described in the following examples, were all taken from the same stratigraphic interval. The heating tests were conducted using a Parr vessel, model number 243HC5, which is shown in FIG. 18 and is available from Parr Instrument Company.

Example 1

Figure 17:
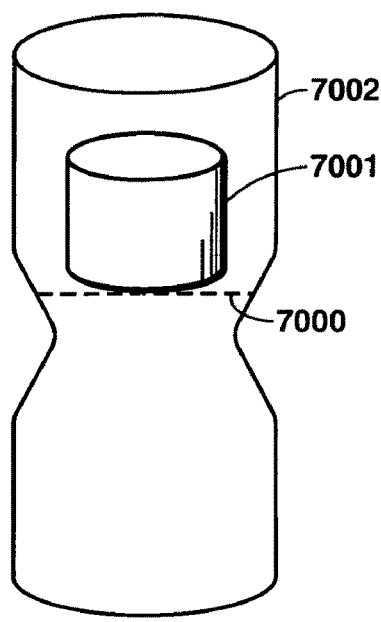
FIG. 17 is an exemplary view of the gold tube apparatus used in the unstressed Parr heating test described in Example 1.

Oil shale block CM-1B was cored across the bedding planes to produce a cylinder 1.391 inches in diameter and approximately 2 inches long. A gold tube 7002 approximately 2 inches in diameter and 5 inches long was crimped and a screen 7000 inserted to serve as a support for the core specimen 7001 (FIG. 17). The oil shale core specimen 7001, 82.46 grams in weight, was placed on the screen 7000 in the gold tube 7002 and the entire assembly placed into a Parr heating vessel. The Parr vessel 7010, shown in FIG. 18, had an internal volume of 565 milliliters. Argon was used to flush the Parr vessel 7010 several times to remove air present in the chamber and the vessel pressurized to 500 psi with argon. The Parr vessel was then placed in a furnace which was designed to fit the Parr vessel. The furnace was initially at room temperature and was heated to 400° C. after the Parr vessel was placed in the furnace. The temperature of the Parr vessel achieved 400° C. after about 3 hours and remained in the 400° C. furnace for 24 hours. The Parr vessel was then removed from the furnace and allowed to cool to room temperature over a period of approximately 16 hours.

Figure 19:
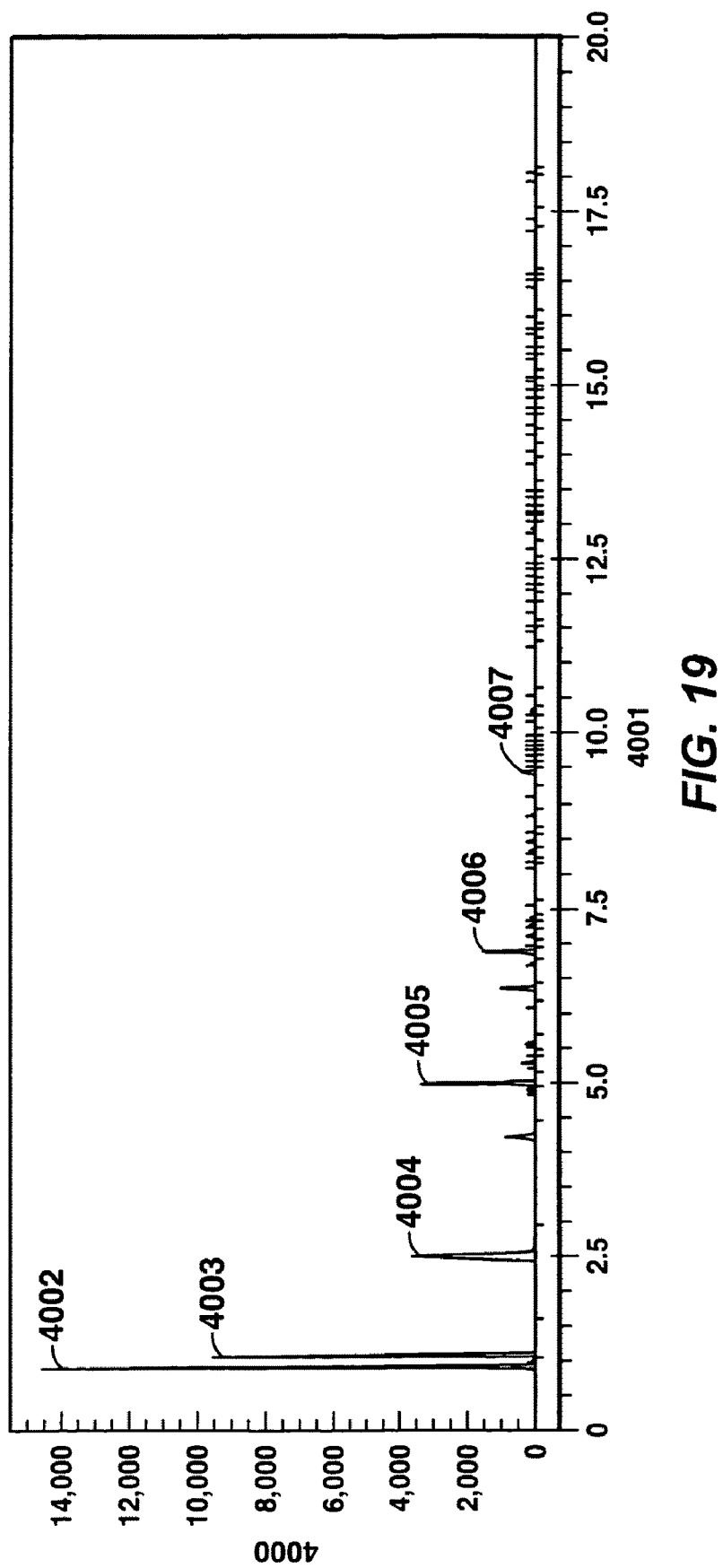
FIG. 19 is gas chromatogram of gas sampled from Example 1.

The room temperature Parr vessel was sampled to obtain a representative portion of the gas remaining in the vessel following the heating experiment. A small gas sampling cylinder 150 milliliters in volume was evacuated, attached to the Parr vessel and the pressure allowed to equilibrate. Gas chromatography (GC) analysis testing and non-hydrocarbon gas sample gas chromatography (GC) (GC not shown) of this gas sample yielded the results shown in FIG. 19, Table 2 and Table 1. In FIG. 19 the y-axis 4000 represents the detector response in pico-amperes (pA) while the x-axis 4001 represents the retention time in minutes. In FIG. 19 peak 4002 represents the response for methane, peak 4003 represents the response for ethane, peak 4004 represents the response for propane, peak 4005 represents the response for butane, peak 4006 represents the response for pentane and peak 4007 represents the response for hexane. From the GC results and the known volumes and pressures involved the total hydrocarbon content of the gas (2.09 grams), $CO_2$ content of the gas (3.35 grams), and $H_2S$ content of the gas (0.06 gram) were obtained.

TABLE 2

Peak and area details for FIG. 19 - Example 1 - 0 stress - gas GC

| Peak Number | RetTime [min] | Area [pA*s] | Name |
|---|---|---|---|
| 1 | 0.910 | 1.46868e4 | Methane |
| 2 | 0.999 | 148.12119 | ? |
| 3 | 1.077 | 1.26473e4 | Ethane |
| 4 | 2.528 | 1.29459e4 | Propane |
| 5 | 4.243 | 2162.93066 | iC4 |
| 6 | 4.922 | 563.11804 | ? |
| 7 | 5.022 | 5090.54150 | n-Butane |
| 8 | 5.301 | 437.92255 | ? |
| 9 | 5.446 | 4.67394 | ? |
| 10 | 5.582 | 283.92194 | ? |
| 11 | 6.135 | 15.47334 | ? |
| 12 | 6.375 | 1159.83130 | iC5 |
| 13 | 6.742 | 114.83960 | ? |
| 14 | 6.899 | 1922.98450 | n-Pentane |
| 15 | 7.023 | 2.44915 | ? |
| 16 | 7.136 | 264.34424 | ? |
| 17 | 7.296 | 127.60601 | ? |
| 18 | 7.383 | 118.79453 | ? |
| 19 | 7.603 | 3.99227 | ? |
| 20 | 8.138 | 13.15432 | ? |
| 21 | 8.223 | 13.01887 | ? |
| 22 | 8.345 | 103.15615 | ? |
| 23 | 8.495 | 291.26767 | 2-methyl pentane |
| 24 | 8.651 | 15.64066 | ? |
| 25 | 8.884 | 91.85989 | ? |
| 26 | 9.165 | 40.09448 | ? |
| 27 | 9.444 | 534.44507 | n-Hexane |
| 28 | 9.557 | 2.64731 | ? |
| 29 | 9.650 | 32.28295 | ? |
| 30 | 9.714 | 52.42796 | ? |
| 31 | 9.793 | 42.05001 | ? |
| 32 | 9.852 | 8.93775 | ? |
| 33 | 9.914 | 4.43648 | ? |
| 34 | 10.013 | 24.74299 | ? |
| 35 | 10.229 | 13.34387 | ? |
| 36 | 10.302 | 133.95892 | ? |
| 37 | 10.577 | 2.67224 | ? |
| 38 | 11.252 | 27.57400 | ? |
| 39 | 11.490 | 23.41665 | ? |
| 40 | 11.567 | 8.13992 | ? |
| 41 | 11.820 | 32.80781 | ? |
| 42 | 11.945 | 4.61821 | ? |
| 43 | 12.107 | 30.67044 | ? |
| 44 | 12.178 | 2.58269 | ? |
| 45 | 12.308 | 13.57769 | ? |
| 46 | 12.403 | 12.43018 | ? |
| 47 | 12.492 | 34.29918 | ? |
| 48 | 12.685 | 4.71311 | ? |
| 49 | 12.937 | 183.31729 | ? |
| 50 | 13.071 | 7.18510 | ? |
| 51 | 13.155 | 2.01699 | ? |
| 52 | 13.204 | 7.77467 | ? |
| 53 | 13.317 | 7.21400 | ? |
| 54 | 13.443 | 4.22721 | ? |
| 55 | 13.525 | 35.08374 | ? |
| 56 | 13.903 | 18.48654 | ? |
| 57 | 14.095 | 6.39745 | ? |
| 58 | 14.322 | 3.19935 | ? |
| 59 | 14.553 | 8.48772 | ? |
| 60 | 14.613 | 3.34738 | ? |
| 61 | 14.730 | 5.44062 | ? |
| 62 | 14.874 | 40.17010 | ? |
| 63 | 14.955 | 3.41596 | ? |
| 64 | 15.082 | 3.04766 | ? |
| 65 | 15.138 | 7.33028 | ? |
| 66 | 15.428 | 2.71734 | ? |
| 67 | 15.518 | 11.00256 | ? |

TABLE 2-continued

Peak and area details for FIG. 19 - Example 1 - 0 stress - gas GC

| Peak Number | RetTime [min] | Area [pA*s] | Name |
|---|---|---|---|
| 68 | 15.644 | 5.16752 | ? |
| 69 | 15.778 | 45.12025 | ? |
| 70 | 15.855 | 3.26920 | ? |
| 71 | 16.018 | 3.77424 | ? |
| 72 | 16.484 | 4.66657 | ? |
| 73 | 16.559 | 5.54783 | ? |
| 74 | 16.643 | 10.57255 | ? |
| 75 | 17.261 | 2.19534 | ? |
| 76 | 17.439 | 10.26123 | ? |
| 77 | 17.971 | 1.85618 | ? |
| 78 | 18.097 | 11.42077 | ? |

Figure 20:
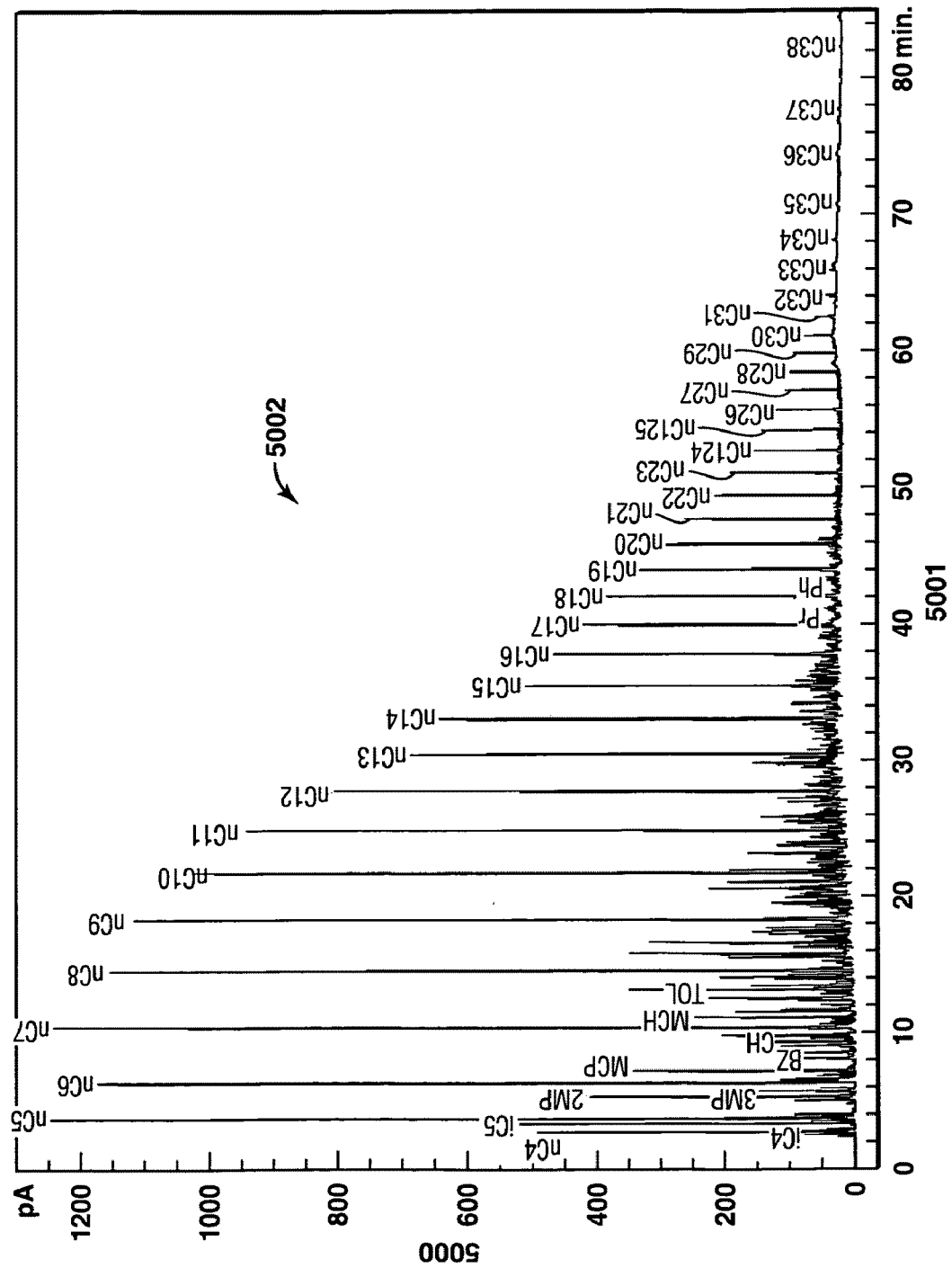
FIG. 20 is a whole oil gas chromatogram of liquid sampled from Example 1.

The Parr vessel was then vented to achieve atmospheric pressure, the vessel opened, and liquids collected from both inside the gold tube and in the bottom of the Parr vessel. Water was separated from the hydrocarbon layer and weighed. The amount collected is noted in Table 1. The collected hydrocarbon liquids were placed in a small vial, sealed and stored in the absence of light. No solids were observed on the walls of the gold tube or the walls of the Parr vessel. The solid core specimen was weighed and determined to have lost 19.21 grams as a result of heating. Whole oil gas chromatography (WOGC) testing of the liquid yielded the results shown in FIG. 20, Table 3, and Table 1. In FIG. 20 the y-axis 5000 represents the detector response in pico-amperes (pA) while the x-axis 5001 represents the retention time in minutes. The GC chromatogram is shown generally by label 5002 with individual identified peaks labeled with abbreviations.

TABLE 3

Peak and area details for FIG. 20 - Example 1 - 0 stress - liquid GC

| Peak # | Ret. Time [min] | Peak Area [pA*s] | Compound Name |
|---|---|---|---|
| 1 | 2.660 | 119.95327 | iC4 |
| 2 | 2.819 | 803.25989 | nC4 |
| 3 | 3.433 | 1091.80298 | iC5 |
| 4 | 3.788 | 2799.32520 | nC5 |
| 5 | 5.363 | 1332.67871 | 2-methyl pentane (2MP) |
| 6 | 5.798 | 466.35703 | 3-methyl pentane (3MP) |
| 7 | 6.413 | 3666.46240 | nC6 |
| 8 | 7.314 | 1161.70435 | Methyl cyclopentane (MCP) |
| 9 | 8.577 | 287.05969 | Benzene (BZ) |
| 10 | 9.072 | 530.19781 | Cyclohexane (CH) |
| 11 | 10.488 | 4700.48291 | nC7 |
| 12 | 11.174 | 937.38757 | Methyl cyclohexane (MCH) |
| 13 | 12.616 | 882.17358 | Toluene (TOL) |
| 14 | 14.621 | 3954.29687 | nC8 |
| 15 | 18.379 | 3544.52905 | nC9 |
| 16 | 21.793 | 3452.04199 | nC10 |
| 17 | 24.929 | 3179.11841 | nC11 |
| 18 | 27.843 | 2680.95459 | nC12 |
| 19 | 30.571 | 2238.89600 | nC13 |
| 20 | 33.138 | 2122.53540 | nC14 |
| 21 | 35.561 | 1773.59973 | nC15 |
| 22 | 37.852 | 1792.89526 | nC16 |
| 23 | 40.027 | 1394.61707 | nC17 |
| 24 | 40.252 | 116.81663 | Pristane (Pr) |
| 25 | 42.099 | 1368.02734 | nC18 |
| 26 | 42.322 | 146.96437 | Phytane (Ph) |
| 27 | 44.071 | 1130.63342 | nC19 |
| 28 | 45.956 | 920.52136 | nC20 |
| 29 | 47.759 | 819.92810 | nC21 |
| 30 | 49.483 | 635.42065 | nC22 |
| 31 | 51.141 | 563.24316 | nC23 |
| 32 | 52.731 | 432.74606 | nC24 |
| 33 | 54.261 | 397.36270 | nC25 |
| 34 | 55.738 | 307.56073 | nC26 |
| 35 | 57.161 | 298.70926 | nC27 |
| 36 | 58.536 | 252.60083 | nC28 |
| 37 | 59.867 | 221.84540 | nC29 |
| 38 | 61.154 | 190.29596 | nC30 |
| 39 | 62.539 | 123.65781 | nC31 |
| 40 | 64.133 | 72.47668 | nC32 |
| 41 | 66.003 | 76.84142 | nC33 |
| 42 | 68.208 | 84.35004 | nC34 |
| 43 | 70.847 | 36.68131 | nC35 |
| 44 | 74.567 | 87.62341 | nC36 |
| 45 | 77.798 | 33.30892 | nC37 |
| 46 | 82.361 | 21.99784 | nC38 |
| Totals: | | 5.32519e4 | |

Example 2

Figure 21:
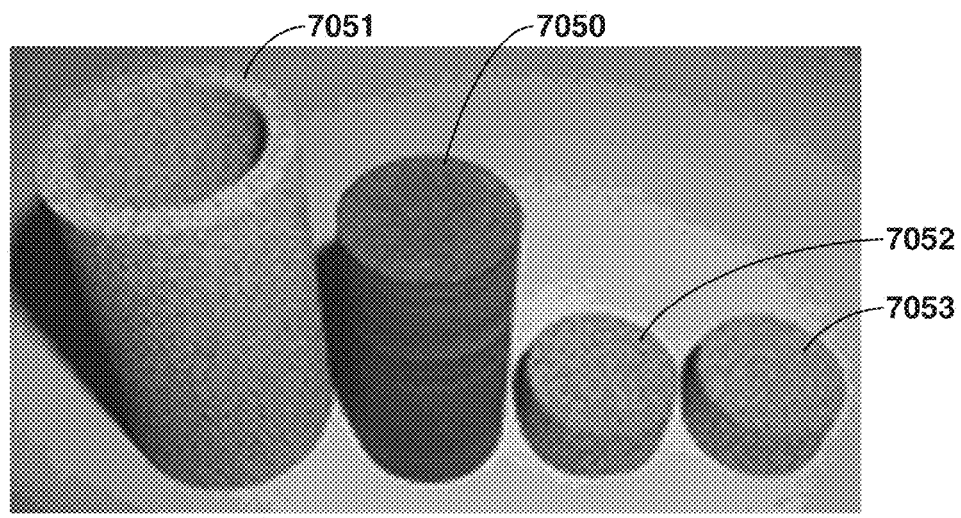
FIG. 21 is an exemplary view of a Berea cylinder, Berea plugs, and an oil shale core specimen as used in Examples 2-5.
Figure 22:
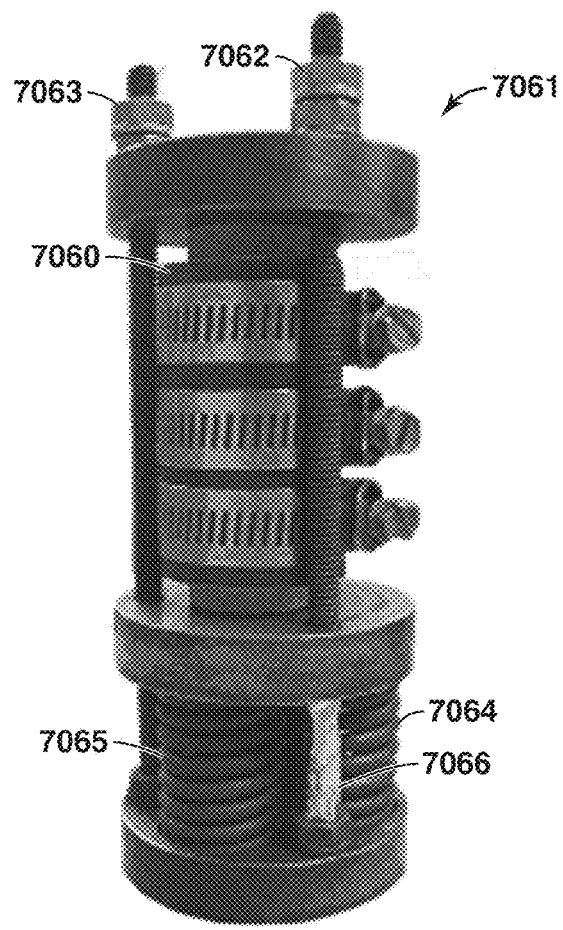
FIG. 22 is an exemplary view of the mini load frame and sample assembly used in Examples 2-5.

Oil shale block CM-1B was cored in a manner similar to that of Example 1 except that a 1 inch diameter core was created. With reference to FIG. 21, the core specimen 7050 was approximately 2 inches in length and weighed 42.47 grams. This core specimen 7050 was placed in a Berea sandstone cylinder 7051 with a 1-inch inner diameter and a 1.39 inch outer diameter. Berea plugs 7052 and 7053 were placed at each end of this assembly, so that the core specimen was completely surrounded by Berea. The Berea cylinder 7051 along with the core specimen 7050 and the Berea end plugs 7052 and 7053 were placed in a slotted stainless steel sleeve and clamped into place. The sample assembly 7060 was placed in a spring-loaded mini-load-frame 7061 as shown in FIG. 22. Load was applied by tightening the nuts 7062 and 7063 at the top of the load frame 7061 to compress the springs 7064 and 7065. The springs 7064 and 7065 were high temperature, Inconel springs, which delivered 400 psi effective stress to the oil shale specimen 7060 when compressed. Sufficient travel of the springs 7064 and 7065 remained in order to accommodate any expansion of the core specimen 7060 during the course of heating. In order to ensure that this was the case, gold foil 7066 was placed on one of the legs of the apparatus to gauge the extent of travel. The entire spring loaded apparatus 7061 was placed in the Parr vessel (FIG. 18) and the heating experiment conducted as described in Example 1.

Figure 23:
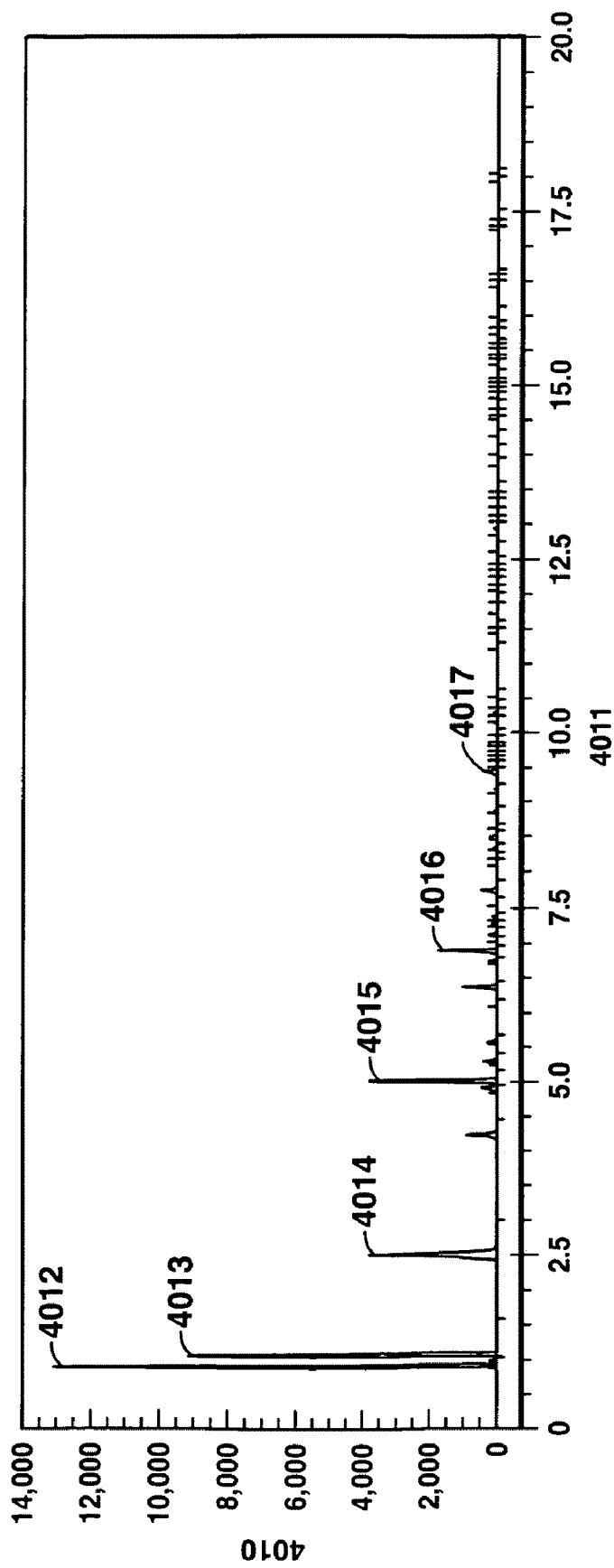
FIG. 23 is gas chromatogram of gas sampled from Example 2.

As described in Example 1, the room temperature Parr vessel was then sampled to obtain a representative portion of the gas remaining in the vessel following the heating experiment. Gas sampling, hydrocarbon gas sample gas chromatography (GC) testing, and non-hydrocarbon gas sample gas chromatography (GC) was conducted as in Example 1. Results are shown in FIG. 23, Table 4 and Table 1. In FIG. 23 the y-axis 4010 represents the detector response in pico-amperes (pA) while the x-axis 4011 represents the retention time in minutes. In FIG. 23 peak 4012 represents the response for methane, peak 4013 represents the response for ethane, peak 4014 represents the response for propane, peak 4015 represents the response for butane, peak 4016 represents the response for pentane and peak 4017 represents the response for hexane. From the gas chromatographic results and the known volumes and pressures involved the total hydrocarbon content of the gas was determined to be 1.33 grams and $CO_2$ content of the gas was 1.70 grams.

TABLE 4

Peak and area details for FIG. 23 -
Example 2 - 400 psi stress - gas GC

| Peak Number | RetTime [min] | Area [pA*s] | Name |
|---|---|---|---|
| 1 | 0.910 | 1.36178e4 | Methane |
| 2 | 0.999 | 309.65613 | ? |
| 3 | 1.077 | 1.24143e4 | Ethane |
| 4 | 2.528 | 1.41685e4 | Propane |
| 5 | 4.240 | 2103.01929 | iC4 |
| 6 | 4.917 | 1035.25513 | ? |
| 7 | 5.022 | 5689.08887 | n-Butane |
| 8 | 5.298 | 450.26572 | ? |
| 9 | 5.578 | 302.56229 | ? |
| 10 | 6.125 | 33.82201 | ? |
| 11 | 6.372 | 1136.37097 | iC5 |
| 12 | 6.736 | 263.35754 | ? |
| 13 | 6.898 | 2254.86621 | n-Pentane |
| 14 | 7.066 | 7.12101 | ? |
| 15 | 7.133 | 258.31876 | ? |
| 16 | 7.293 | 126.54671 | ? |
| 17 | 7.378 | 155.60977 | ? |
| 18 | 7.598 | 6.73467 | ? |
| 19 | 7.758 | 679.95312 | ? |
| 20 | 8.133 | 27.13466 | ? |
| 21 | 8.216 | 24.77329 | ? |
| 22 | 8.339 | 124.70064 | ? |
| 23 | 8.489 | 289.12952 | 2-methyl pentane |
| 24 | 8.644 | 19.83309 | ? |
| 25 | 8.878 | 92.18938 | ? |
| 26 | 9.184 | 102.25701 | ? |
| 27 | 9.438 | 664.42584 | n-Hexane |
| 28 | 9.549 | 2.91525 | ? |
| 29 | 9.642 | 26.86672 | ? |
| 30 | 9.705 | 49.83235 | ? |
| 31 | 9.784 | 52.11239 | ? |
| 32 | 9.843 | 9.03158 | ? |
| 33 | 9.904 | 6.18217 | ? |
| 34 | 10.004 | 24.84150 | ? |
| 35 | 10.219 | 13.21182 | ? |
| 36 | 10.292 | 158.67511 | ? |
| 37 | 10.411 | 2.49094 | ? |
| 38 | 10.566 | 3.25252 | ? |
| 39 | 11.240 | 46.79988 | ? |
| 40 | 11.478 | 29.59438 | ? |
| 41 | 11.555 | 12.84377 | ? |
| 42 | 11.809 | 38.67433 | ? |
| 43 | 11.935 | 5.68525 | ? |
| 44 | 12.096 | 31.29068 | ? |
| 45 | 12.167 | 5.84513 | ? |
| 46 | 12.297 | 15.52042 | ? |
| 47 | 12.393 | 13.54158 | ? |
| 48 | 12.483 | 30.95983 | ? |
| 49 | 12.669 | 20.21915 | ? |
| 50 | 12.929 | 229.00655 | ? |
| 51 | 13.063 | 6.38678 | ? |
| 52 | 13.196 | 10.89876 | ? |
| 53 | 13.306 | 7.91553 | ? |
| 54 | 13.435 | 5.05444 | ? |
| 55 | 13.516 | 44.42806 | ? |
| 56 | 13.894 | 20.61910 | ? |
| 57 | 14.086 | 8.32365 | ? |
| 58 | 14.313 | 2.80677 | ? |
| 59 | 14.545 | 9.18198 | ? |
| 60 | 14.605 | 4.93703 | ? |
| 61 | 14.722 | 5.06628 | ? |
| 62 | 14.865 | 46.53282 | ? |
| 63 | 14.946 | 6.55945 | ? |
| 64 | 15.010 | 2.85594 | ? |
| 65 | 15.075 | 4.05371 | ? |
| 66 | 15.131 | 9.15954 | ? |
| 67 | 15.331 | 2.16523 | ? |
| 68 | 15.421 | 3.03294 | ? |
| 69 | 15.511 | 9.73797 | ? |
| 70 | 15.562 | 5.22962 | ? |
| 71 | 15.636 | 3.73105 | ? |
| 72 | 15.771 | 54.64651 | ? |
| 73 | 15.848 | 3.95764 | ? |
| 74 | 16.010 | 3.39639 | ? |
| 75 | 16.477 | 5.49586 | ? |
| 76 | 16.552 | 6.21470 | ? |
| 77 | 16.635 | 11.08140 | ? |
| 78 | 17.257 | 2.28673 | ? |
| 79 | 17.318 | 2.82284 | ? |
| 80 | 17.433 | 11.11376 | ? |
| 81 | 17.966 | 2.54065 | ? |
| 82 | 18.090 | 14.28333 | ? |

At this point, the Parr vessel was vented to atmospheric pressure, the vessel opened, and liquids collected from inside the Parr vessel. Water was separated from the hydrocarbon layer and weighed. The amount collected is noted in Table 1. The collected hydrocarbon liquids were placed in a small vial, sealed and stored in the absence of light. Any additional liquid coating the surface of the apparatus or sides of the Parr vessel was collected with a paper towel and the weight of this collected liquid added to the total liquid collected. Any liquid remaining in the Berea sandstone was extracted with methylene chloride and the weight accounted for in the liquid total reported in Table 1. The Berea sandstone cylinder and end caps were clearly blackened with organic material as a result of the heating. The organic material in the Berea was not extractable with either toluene or methylene chloride, and was therefore determined to be coke formed from the cracking of hydrocarbon liquids. After the heating experiment, the Berea was crushed and its total organic carbon (TOC) was measured. This measurement was used to estimate the amount of coke in the Berea and subsequently how much liquid must have cracked in the Berea. A constant factor of 2.283 was used to convert the TOC measured to an estimate of the amount of liquid, which must have been present to produce the carbon found in the Berea. This liquid estimated is the "inferred oil" value shown in Table 1. The solid core specimen was weighed and determined to have lost 10.29 grams as a result of heating.

Example 3

Figure 24:
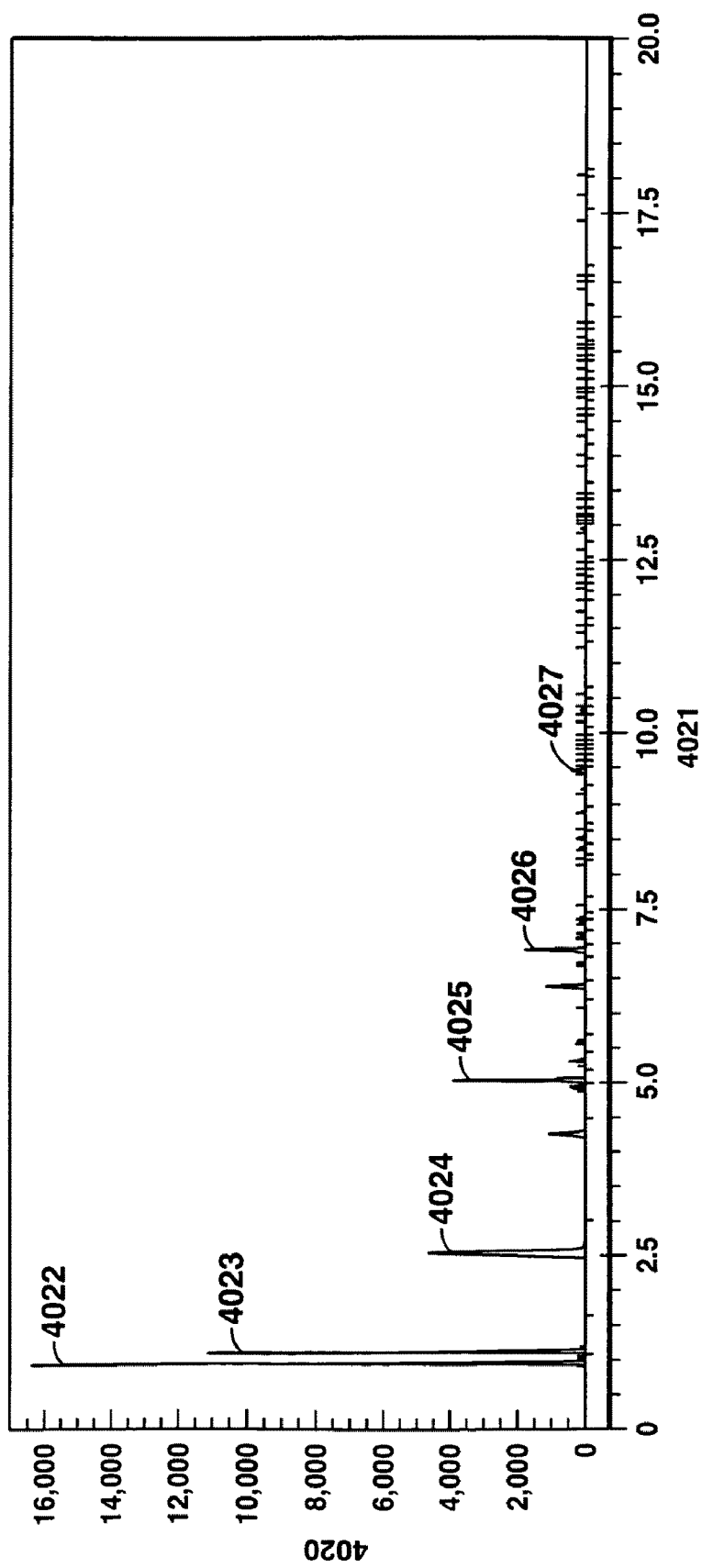
FIG. 24 is gas chromatogram of gas sampled from Example 3.
Figure 25:
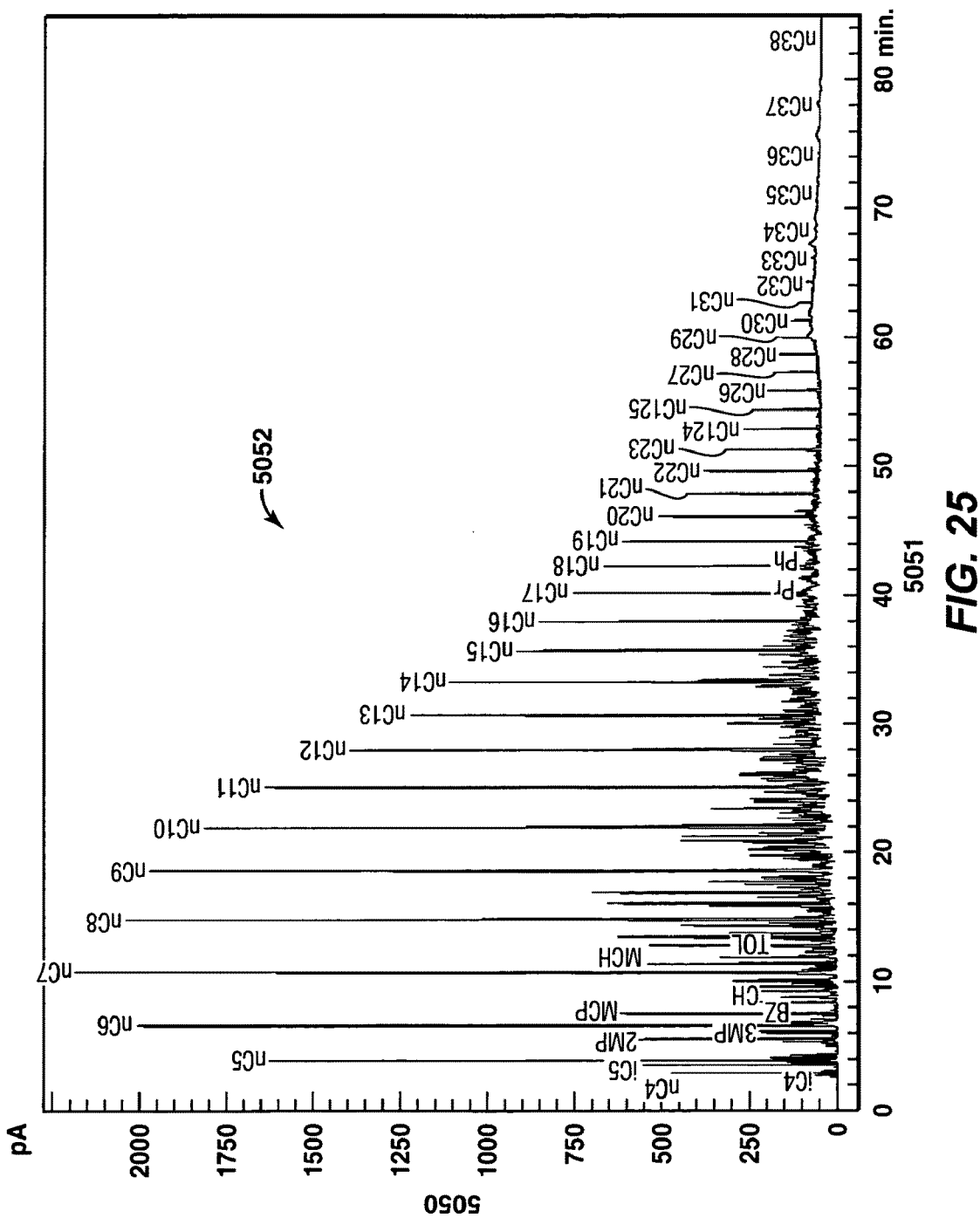
FIG. 25 is a whole oil gas chromatogram of liquid sampled from Example 3.

Conducted in a manner similar to that of Example 2 on a core specimen from oil shale block CM-1B, where the effective stress applied was 400 psi. Results for the gas sample collected and analyzed by hydrocarbon gas sample gas chromatography (GC) and non-hydrocarbon gas sample gas chromatography (GC) (GC not shown) are shown in FIG. 24, Table 5 and Table 1. In FIG. 24 the y-axis 4020 represents the detector response in pico-amperes (pA) while the x-axis 4021 represents the retention time in minutes. In FIG. 24 peak 4022 represents the response for methane, peak 4023 represents the response for ethane, peak 4024 represents the response for propane, peak 4025 represents the response for butane, peak 4026 represents the response for pentane and peak 4027 represents the response for hexane. Results for the liquid collected and analyzed by whole oil gas chromatography (WOGC) analysis are shown in FIG. 25, Table 6 and Table 1. In FIG. 25 the y-axis 5050 represents the detector response in pico-amperes (pA) while the x-axis 5051 represents the retention time in minutes. The GC chromatogram is shown generally by label 5052 with individual identified peaks labeled with abbreviations.

TABLE 5

Peak and area details for FIG. 24 - Example 3 - 400 psi stress - gas GC

| Peak Number | RetTime [min] | Area [pA*s] | Name |
|---|---|---|---|
| 1 | 0.910 | 1.71356e4 | Methane |
| 2 | 0.998 | 341.71646 | ? |
| 3 | 1.076 | 1.52621e4 | Ethane |
| 4 | 2.534 | 1.72319e4 | Propane |
| 5 | 4.242 | 2564.04077 | iC4 |
| 6 | 4.919 | 1066.90942 | ? |
| 7 | 5.026 | 6553.25244 | n-Butane |
| 8 | 5.299 | 467.88803 | ? |
| 9 | 5.579 | 311.65158 | ? |
| 10 | 6.126 | 33.61063 | ? |
| 11 | 6.374 | 1280.77869 | iC5 |
| 12 | 6.737 | 250.05510 | ? |
| 13 | 6.900 | 2412.40918 | n-Pentane |
| 14 | 7.134 | 249.80679 | ? |
| 15 | 7.294 | 122.60424 | ? |
| 16 | 7.379 | 154.40988 | ? |
| 17 | 7.599 | 6.87471 | ? |
| 18 | 8.132 | 25.50270 | ? |
| 19 | 8.216 | 22.33015 | ? |
| 20 | 8.339 | 129.17023 | ? |
| 21 | 8.490 | 304.97903 | 2-methyl pentane |
| 22 | 8.645 | 18.48411 | |
| 23 | 8.879 | 98.23043 | ? |
| 24 | 9.187 | 89.71329 | ? |
| 25 | 9.440 | 656.02161 | n-Hexane |
| 26 | 9.551 | 3.05892 | ? |
| 27 | 9.645 | 25.34058 | ? |
| 28 | 9.708 | 45.14915 | ? |
| 29 | 9.786 | 48.62077 | ? |
| 30 | 9.845 | 10.03335 | ? |
| 31 | 9.906 | 5.43165 | ? |
| 32 | 10.007 | 22.33582 | ? |
| 33 | 10.219 | 16.02756 | ? |
| 34 | 10.295 | 196.43715 | ? |
| 35 | 10.413 | 2.98115 | ? |
| 36 | 10.569 | 3.88067 | ? |
| 37 | 11.243 | 41.63386 | ? |
| 38 | 11.482 | 28.44063 | ? |
| 39 | 11.558 | 12.05196 | ? |
| 40 | 11.812 | 37.83630 | ? |
| 41 | 11.938 | 5.45990 | ? |
| 42 | 12.100 | 31.03111 | ? |
| 43 | 12.170 | 4.91053 | ? |
| 44 | 12.301 | 15.75041 | ? |
| 45 | 12.397 | 13.75454 | ? |
| 46 | 12.486 | 30.26099 | ? |
| 47 | 12.672 | 15.14775 | ? |
| 48 | 12.931 | 207.50433 | ? |
| 49 | 13.064 | 3.35393 | ? |
| 50 | 13.103 | 3.04880 | ? |
| 51 | 13.149 | 1.62203 | ? |
| 52 | 13.198 | 7.97665 | ? |
| 53 | 13.310 | 7.49605 | ? |
| 54 | 13.437 | 4.64921 | ? |
| 55 | 13.519 | 41.82572 | ? |
| 56 | 13.898 | 19.01739 | ? |
| 57 | 14.089 | 7.34498 | ? |
| 58 | 14.316 | 2.68912 | ? |
| 59 | 14.548 | 8.29593 | ? |
| 60 | 14.608 | 3.93147 | ? |
| 61 | 14.725 | 4.75483 | ? |
| 62 | 14.869 | 40.93447 | ? |
| 63 | 14.949 | 5.30140 | ? |
| 64 | 15.078 | 5.79979 | ? |
| 65 | 15.134 | 7.95179 | ? |
| 66 | 15.335 | 1.91589 | ? |
| 67 | 15.423 | 2.75893 | ? |
| 68 | 15.515 | 8.64343 | ? |
| 69 | 15.565 | 3.76481 | ? |
| 70 | 15.639 | 3.41854 | ? |
| 71 | 15.774 | 45.59035 | ? |
| 72 | 15.850 | 3.73501 | ? |
| 73 | 16.014 | 5.84199 | ? |
| 74 | 16.480 | 4.87036 | ? |
| 75 | 16.555 | 5.12607 | ? |
| 76 | 16.639 | 9.97469 | ? |
| 77 | 17.436 | 8.00434 | ? |
| 78 | 17.969 | 3.86749 | ? |
| 79 | 18.093 | 9.71661 | ? |

TABLE 6

Peak and area details from FIG. 25 - Example 3 - 400 psi stress - liquid GC.

| Peak # | RetTime [min] | Peak Area [pA*s] | Compound Name |
|---|---|---|---|
| 1 | 2.744 | 102.90978 | iC4 |
| 2 | 2.907 | 817.57861 | nC4 |
| 3 | 3.538 | 1187.01831 | iC5 |
| 4 | 3.903 | 3752.84326 | nC5 |
| 5 | 5.512 | 1866.25342 | 2MP |
| 6 | 5.950 | 692.18964 | 3MP |
| 7 | 6.580 | 6646.48242 | nC6 |
| 8 | 7.475 | 2117.66919 | MCP |
| 9 | 8.739 | 603.21204 | BZ |
| 10 | 9.230 | 1049.96240 | CH |
| 11 | 10.668 | 9354.29590 | nC7 |
| 12 | 11.340 | 2059.10303 | MCH |
| 13 | 12.669 | 689.82861 | TOL |
| 14 | 14.788 | 8378.59375 | nC8 |
| 15 | 18.534 | 7974.54883 | nC9 |
| 16 | 21.938 | 7276.47705 | nC10 |
| 17 | 25.063 | 6486.47998 | nC11 |
| 18 | 27.970 | 5279.17187 | nC12 |
| 19 | 30.690 | 4451.49902 | nC13 |
| 20 | 33.254 | 4156.73389 | nC14 |
| 21 | 35.672 | 3345.80273 | nC15 |
| 22 | 37.959 | 3219.63745 | nC16 |
| 23 | 40.137 | 2708.28003 | nC17 |
| 24 | 40.227 | 219.38252 | Pr |
| 25 | 42.203 | 2413.01929 | nC18 |
| 26 | 42.455 | 317.17825 | Ph |
| 27 | 44.173 | 2206.65405 | nC19 |
| 28 | 46.056 | 1646.56616 | nC20 |
| 29 | 47.858 | 1504.49097 | nC21 |
| 30 | 49.579 | 1069.23608 | nC22 |
| 31 | 51.234 | 949.49316 | nC23 |
| 32 | 52.823 | 719.34735 | nC24 |
| 33 | 54.355 | 627.46436 | nC25 |
| 34 | 55.829 | 483.81885 | nC26 |
| 35 | 57.253 | 407.86371 | nC27 |
| 36 | 58.628 | 358.52216 | nC28 |
| 37 | 59.956 | 341.01791 | nC29 |
| 38 | 61.245 | 214.87863 | nC30 |
| 39 | 62.647 | 146.06461 | nC31 |
| 40 | 64.259 | 127.66831 | nC32 |
| 41 | 66.155 | 85.17574 | nC33 |
| 42 | 68.403 | 64.29253 | nC34 |
| 43 | 71.066 | 56.55088 | nC35 |
| 44 | 74.282 | 28.61854 | nC36 |
| 45 | 78.140 | 220.95929 | nC37 |
| 46 | 83.075 | 26.95426 | nC38 |
| Totals: | | 9.84518e4 | |

Example 4

Figure 26:
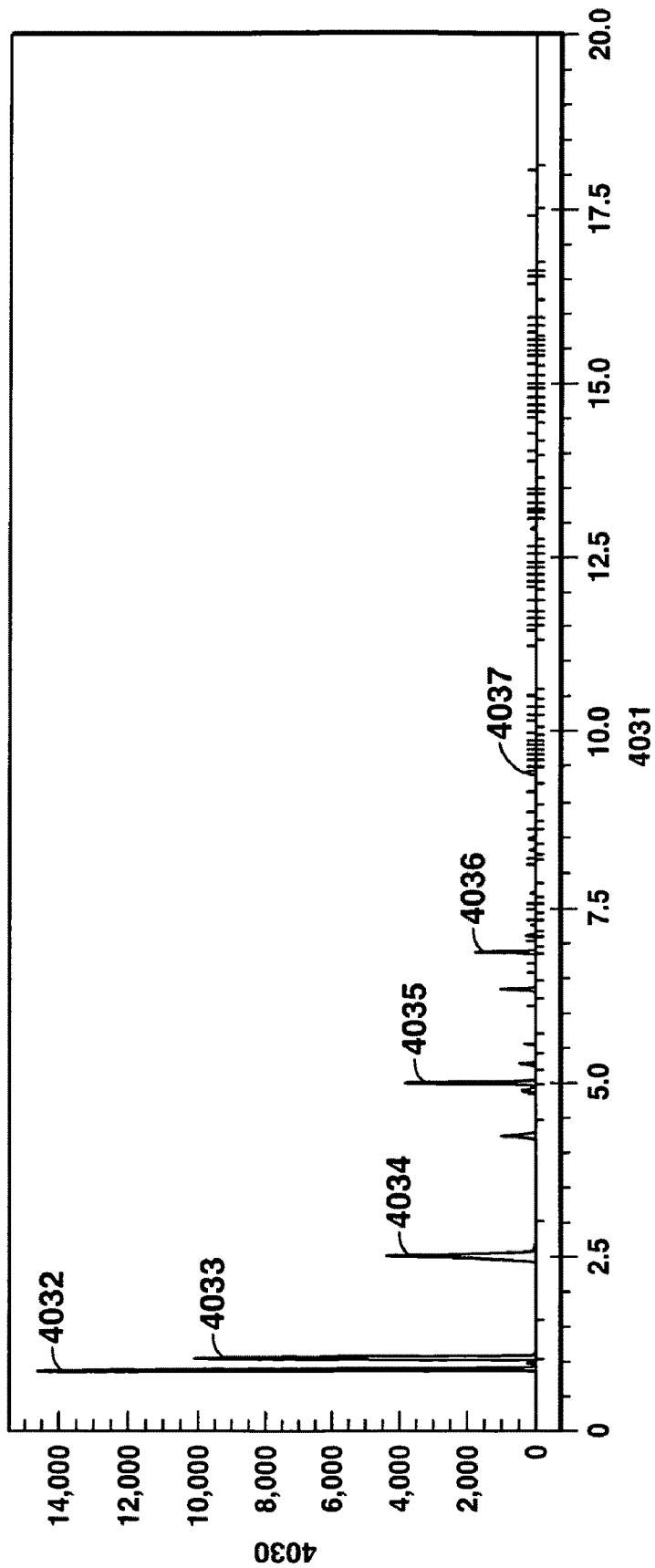
FIG. 26 is gas chromatogram of gas sampled from Example 4.
Figure 27:
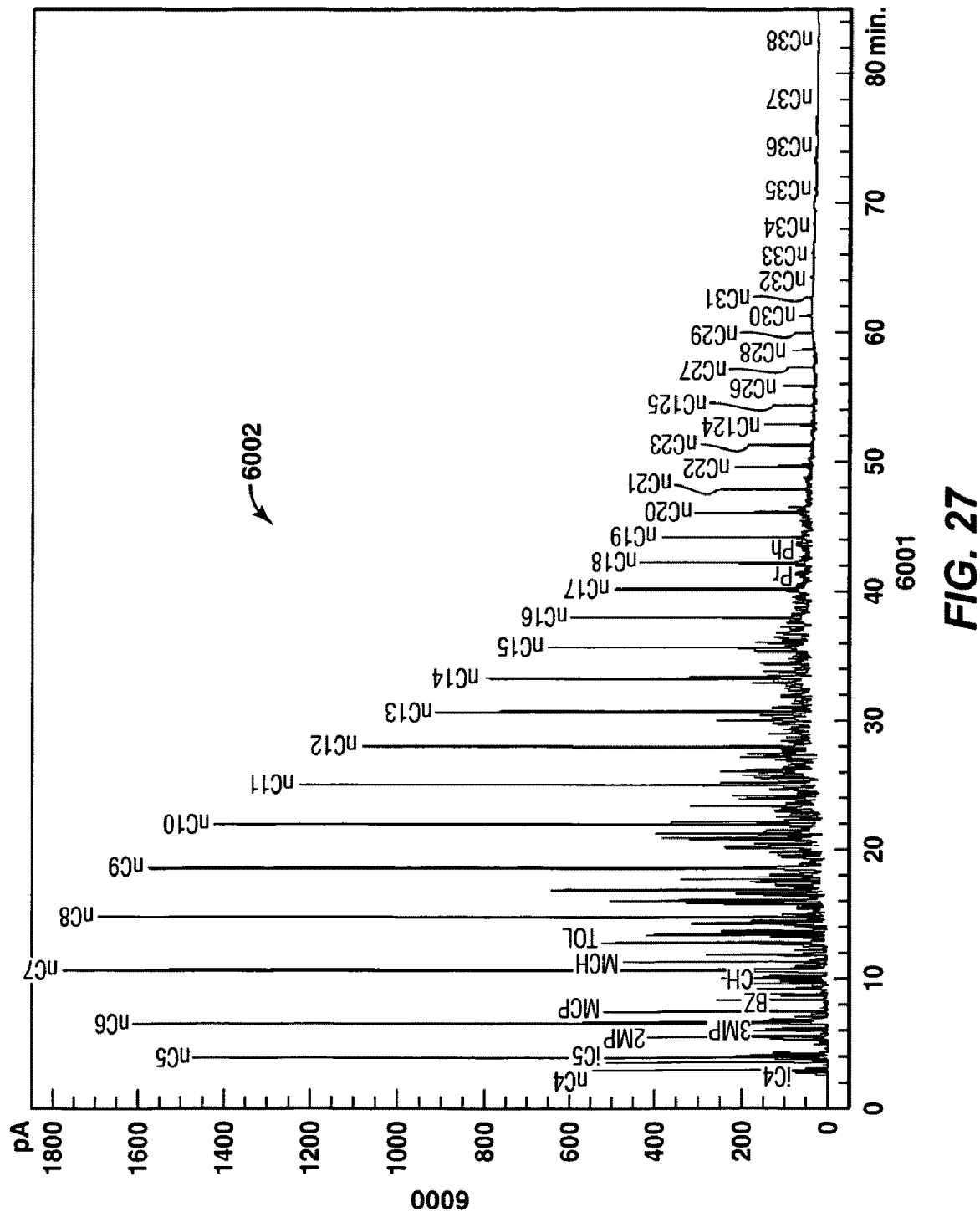
FIG. 27 is a whole oil gas chromatogram of liquid sampled from Example 4.

Conducted in a manner similar to that of Example 2 on a core specimen from oil shale block CM-1B; however, in this example the applied effective stress was 1,000 psi. Results for the gas collected and analyzed by hydrocarbon gas sample gas chromatography (GC) and non-hydrocarbon gas sample gas chromatography (GC) (GC not shown) are shown in FIG. 26, Table 7 and Table 1. In FIG. 26 the y-axis 4030 represents the detector response in pico-amperes (pA) while the x-axis 4031 represents the retention time in minutes. In FIG. 26 peak 4032 represents the response for methane, peak 4033 represents the response for ethane, peak 4034 represents the response for propane, peak 4035 represents the response for butane, peak 4036 represents the response for pentane and peak 4037 represents the response for hexane. Results for the liquid collected and analyzed by whole oil gas chromatography (WOGC) are shown in FIG. 27, Table 8 and Table 1. In FIG. 27 the y-axis 6000 represents the detector response in pico-amperes (pA) while the x-axis 6001 represents the retention time in minutes. The GC chromatogram is shown generally by label 6002 with individual identified peaks labeled with abbreviations.

TABLE 7

Peak and area details for FIG. 26 - Example 4 - 1000 psi stress - gas GC

| Peak Number | RetTime [min] | Area [pA*s] | Name |
|---|---|---|---|
| 1 | 0.910 | 1.43817e4 | Methane |
| 2 | 1.000 | 301.69287 | ? |
| 3 | 1.078 | 1.37821e4 | Ethane |
| 4 | 2.541 | 1.64047e4 | Propane |
| 5 | 4.249 | 2286.08032 | iC4 |
| 6 | 4.924 | 992.04395 | ? |
| 7 | 5.030 | 6167.50000 | n-Butane |
| 8 | 5.303 | 534.37000 | ? |
| 9 | 5.583 | 358.96567 | ? |
| 10 | 6.131 | 27.44937 | ? |
| 11 | 6.376 | 1174.68872 | iC5 |
| 12 | 6.740 | 223.61662 | ? |
| 13 | 6.902 | 2340.79248 | n-Pentane |
| 14 | 7.071 | 5.29245 | ? |
| 15 | 7.136 | 309.94775 | ? |
| 16 | 7.295 | 154.59171 | ? |
| 17 | 7.381 | 169.53279 | ? |
| 18 | 7.555 | 2.80458 | ? |
| 19 | 7.601 | 5.22327 | ? |
| 20 | 7.751 | 117.69164 | ? |
| 21 | 8.134 | 29.41086 | ? |
| 22 | 8.219 | 19.39338 | ? |
| 23 | 8.342 | 133.52739 | ? |
| 24 | 8.492 | 281.61343 | 2-methyl pentane |
| 25 | 8.647 | 22.19704 | ? |
| 26 | 8.882 | 99.56919 | ? |
| 27 | 9.190 | 86.65676 | ? |
| 28 | 9.443 | 657.28754 | n-Hexane |
| 29 | 9.552 | 4.12572 | ? |
| 30 | 9.646 | 34.33701 | ? |
| 31 | 9.710 | 59.12064 | ? |
| 32 | 9.788 | 62.97972 | ? |
| 33 | 9.847 | 15.13559 | ? |
| 34 | 9.909 | 6.88310 | ? |
| 35 | 10.009 | 29.11555 | ? |
| 36 | 10.223 | 23.65434 | ? |
| 37 | 10.298 | 173.95422 | ? |
| 38 | 10.416 | 3.37255 | ? |
| 39 | 10.569 | 7.64592 | ? |
| 40 | 11.246 | 47.30062 | ? |
| 41 | 11.485 | 32.04262 | ? |
| 42 | 11.560 | 13.74583 | ? |
| 43 | 11.702 | 2.68917 | ? |
| 44 | 11.815 | 36.51670 | ? |
| 45 | 11.941 | 6.45255 | ? |
| 46 | 12.103 | 28.44484 | ? |
| 47 | 12.172 | 5.96475 | ? |
| 48 | 12.304 | 17.59856 | ? |
| 49 | 12.399 | 15.17446 | ? |
| 50 | 12.490 | 31.96492 | ? |
| 51 | 12.584 | 3.27834 | ? |
| 52 | 12.675 | 14.08259 | ? |
| 53 | 12.934 | 207.21574 | ? |

TABLE 7-continued

Peak and area details for FIG. 26 - Example 4 - 1000 psi stress - gas GC

| Peak Number | RetTime [min] | Area [pA*s] | Name |
|---|---|---|---|
| 54 | 13.105 | 8.29743 | ? |
| 55 | 13.151 | 2.25476 | ? |
| 56 | 13.201 | 8.36965 | ? |
| 57 | 13.312 | 9.49917 | ? |
| 58 | 13.436 | 6.09893 | ? |
| 59 | 13.521 | 46.34579 | ? |
| 60 | 13.900 | 20.53506 | ? |
| 61 | 14.090 | 8.41120 | ? |
| 62 | 14.318 | 4.36870 | ? |
| 63 | 14.550 | 8.68951 | ? |
| 64 | 14.610 | 4.39150 | ? |
| 65 | 14.727 | 4.35713 | ? |
| 66 | 14.870 | 37.17881 | ? |
| 67 | 14.951 | 5.78219 | ? |
| 68 | 15.080 | 5.54470 | ? |
| 69 | 15.136 | 8.07308 | ? |
| 70 | 15.336 | 2.07075 | ? |
| 71 | 15.425 | 2.67118 | ? |
| 72 | 15.516 | 8.47004 | ? |
| 73 | 15.569 | 3.89987 | ? |
| 74 | 15.641 | 3.96979 | ? |
| 75 | 15.776 | 40.75155 | ? |
| 76 | 16.558 | 5.06379 | ? |
| 77 | 16.641 | 8.43767 | ? |
| 78 | 17.437 | 6.00180 | ? |
| 79 | 18.095 | 7.66881 | ? |
| 80 | 15.853 | 3.97375 | ? |
| 81 | 16.016 | 5.68997 | ? |
| 82 | 16.482 | 3.27234 | ? |

TABLE 8

Peak and area details from FIG. 27 - Example 4 - 1000 psi stress - liquid GC.

| Peak # | RetTime [min] | Peak Area [pA*s] | Compound Name |
|---|---|---|---|
| 1 | 2.737 | 117.78948 | iC4 |
| 2 | 2.901 | 923.40125 | nC4 |
| 3 | 3.528 | 1079.83325 | iC5 |
| 4 | 3.891 | 3341.44604 | nC5 |
| 5 | 5.493 | 1364.53186 | 2MP |
| 6 | 5.930 | 533.68530 | 3MP |
| 7 | 6.552 | 5160.12207 | nC6 |
| 8 | 7.452 | 1770.29932 | MCP |
| 9 | 8.717 | 487.04718 | BZ |
| 10 | 9.206 | 712.61566 | CH |
| 11 | 10.634 | 7302.51123 | nC7 |
| 12 | 11. | 1755.92236 | MCH |
| 13 | 12.760 | 2145.57666 | TOL |
| 14 | 14.755 | 6434.40430 | nC8 |
| 15 | 18.503 | 6007.12891 | nC9 |
| 16 | 21.906 | 5417.67480 | nC10 |
| 17 | 25.030 | 4565.11084 | nC11 |
| 18 | 27.936 | 3773.91943 | nC12 |
| 19 | 30.656 | 3112.23950 | nC13 |
| 20 | 33.220 | 2998.37720 | nC14 |
| 21 | 35.639 | 2304.97632 | nC15 |
| 22 | 37.927 | 2197.88892 | nC16 |
| 23 | 40.102 | 1791.11877 | nC17 |
| 24 | 40.257 | 278.39423 | Pr |
| 25 | 42.171 | 1589.64233 | nC18 |
| 26 | 42.428 | 241.65131 | Ph |
| 27 | 44.141 | 1442.51843 | nC19 |
| 28 | 46.025 | 1031.68481 | nC20 |
| 29 | 47.825 | 957.65479 | nC21 |
| 30 | 49.551 | 609.59943 | nC22 |
| 31 | 51.208 | 526.53339 | nC23 |
| 32 | 52.798 | 383.01022 | nC24 |
| 33 | 54.329 | 325.93640 | nC25 |

TABLE 8-continued

Peak and area details from FIG. 27 - Example 4 - 1000 psi stress - liquid GC.

| Peak # | RetTime [min] | Peak Area [pA*s] | Compound Name |
|---|---|---|---|
| 34 | 55.806 | 248.12935 | nC26 |
| 35 | 57.230 | 203.21725 | nC27 |
| 36 | 58.603 | 168.78055 | nC28 |
| 37 | 59.934 | 140.40034 | nC29 |
| 38 | 61.222 | 95.47594 | nC30 |
| 39 | 62.622 | 77.49546 | nC31 |
| 40 | 64.234 | 49.08135 | nC32 |
| 41 | 66.114 | 33.61663 | nC33 |
| 42 | 68.350 | 27.46170 | nC34 |
| 43 | 71.030 | 35.89277 | nC35 |
| 44 | 74.162 | 16.87499 | nC36 |
| 45 | 78.055 | 29.21477 | nC37 |
| 46 | 82.653 | 9.88631 | nC38 |
| Totals: | | 7.38198e4 | |

Example 5

Figure 28:
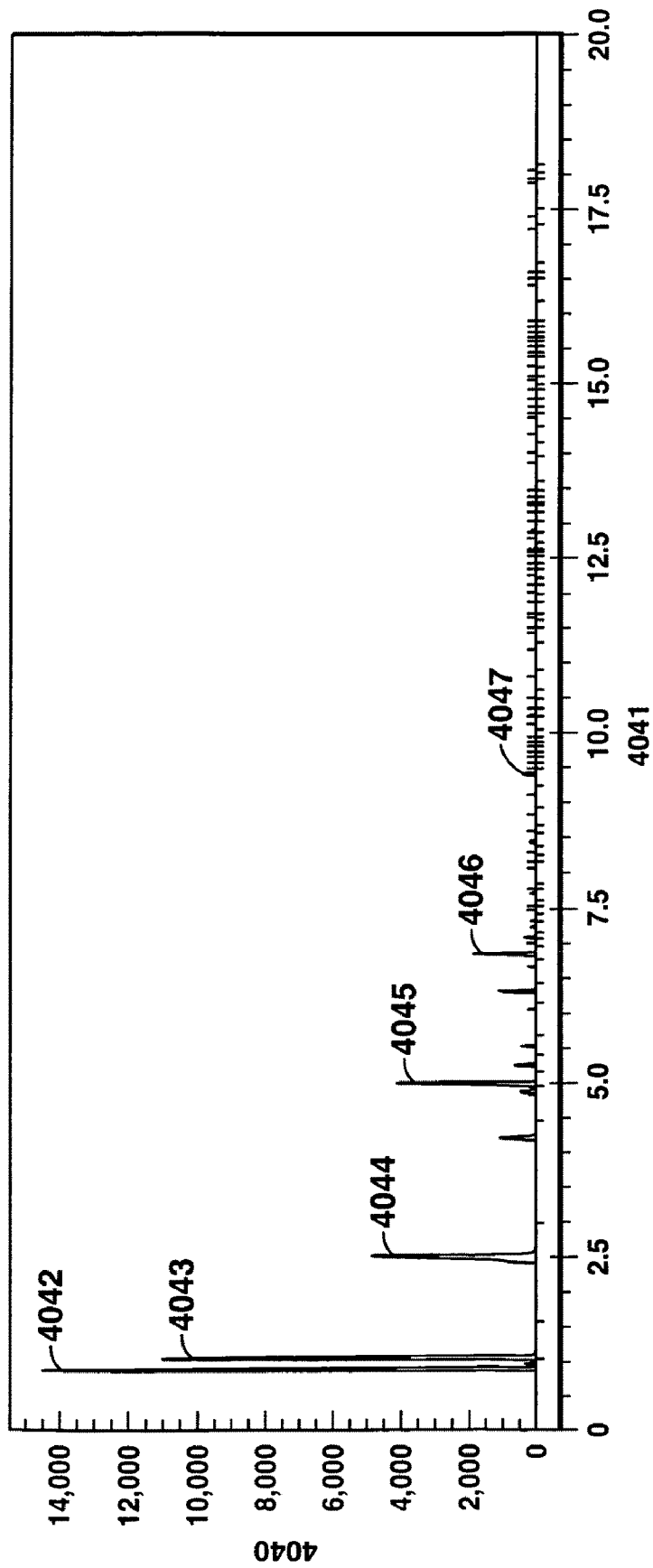
FIG. 28 is gas chromatogram of gas sampled from Example 5.

Conducted in a manner similar to that of Example 2 on a core specimen from oil shale block CM-1B; however, in this example the applied effective stress was 1,000 psi. Results for the gas collected and analyzed by hydrocarbon gas sample gas chromatography (GC) and non-hydrocarbon gas sample gas chromatography (GC) (GC not shown) are shown in FIG. 28, Table 9 and Table 1. In FIG. 28 the y-axis 4040 represents the detector response in pico-amperes (pA) while the x-axis 4041 represents the retention time in minutes. In FIG. 28 peak 4042 represents the response for methane, peak 4043 represents the response for ethane, peak 4044 represents the response for propane, peak 4045 represents the response for butane, peak 4046 represents the response for pentane and peak 4047 represents the response for hexane.

TABLE 9

Peak and area details for FIG. 28 - Example 5 - 1000 psi stress - gas GC

| Peak Number | RetTime [min] | Area [pA*s] | Name |
|---|---|---|---|
| 1 | 0.910 | 1.59035e4 | Methane |
| 2 | 0.999 | 434.21375 | ? |
| 3 | 1.077 | 1.53391e4 | Ethane |
| 4 | 2.537 | 1.86530e4 | Propane |
| 5 | 4.235 | 2545.45850 | iC4 |
| 6 | 4.907 | 1192.68970 | ? |
| 7 | 5.015 | 6814.44678 | n-Butane |
| 8 | 5.285 | 687.83679 | ? |
| 9 | 5.564 | 463.25885 | ? |
| 10 | 6.106 | 30.02624 | ? |
| 11 | 6.351 | 1295.13477 | iC5 |
| 12 | 6.712 | 245.26985 | ? |
| 13 | 6.876 | 2561.11792 | n-Pentane |
| 14 | 7.039 | 4.50998 | ? |
| 15 | 7.109 | 408.32999 | ? |
| 16 | 7.268 | 204.45311 | ? |
| 17 | 7.354 | 207.92183 | ? |
| 18 | 7.527 | 4.02397 | ? |
| 19 | 7.574 | 5.65699 | ? |
| 20 | 7.755 | 2.35952 | ? |
| 21 | 7.818 | 2.00382 | ? |
| 22 | 8.107 | 38.23093 | ? |
| 23 | 8.193 | 20.54333 | ? |
| 24 | 8.317 | 148.54445 | ? |
| 25 | 8.468 | 300.31586 | 2-methyl pentane |
| 26 | 8.622 | 26.06131 | ? |
| 27 | 8.858 | 113.70123 | ? |

TABLE 9-continued

Peak and area details for FIG. 28 - Example 5 - 1000 psi stress - gas GC

| Peak Number | RetTime [min] | Area [pA*s] | Name |
|---|---|---|---|
| 28 | 9.168 | 90.37163 | ? |
| 29 | 9.422 | 694.74438 | n-Hexane |
| 30 | 9.531 | 4.88323 | ? |
| 31 | 9.625 | 45.91505 | ? |
| 32 | 9.689 | 76.32931 | ? |
| 33 | 9.767 | 77.63214 | ? |
| 34 | 9.826 | 19.23768 | ? |
| 35 | 9.889 | 8.54605 | ? |
| 36 | 9.989 | 37.74959 | ? |
| 37 | 10.204 | 30.83943 | ? |
| 38 | 10.280 | 184.58420 | ? |
| 39 | 10.397 | 4.43609 | ? |
| 40 | 10.551 | 10.59880 | ? |
| 41 | 10.843 | 2.30370 | ? |
| 42 | 11.231 | 55.64666 | ? |
| 43 | 11.472 | 35.46931 | ? |
| 44 | 11.547 | 17.16440 | ? |
| 45 | 11.691 | 3.30460 | ? |
| 46 | 11.804 | 39.46368 | ? |
| 47 | 11.931 | 7.32969 | ? |
| 48 | 12.094 | 30.59748 | ? |
| 49 | 12.163 | 6.93754 | ? |
| 50 | 12.295 | 18.69523 | ? |
| 51 | 12.391 | 15.96837 | ? |
| 52 | 12.482 | 33.66422 | ? |
| 53 | 12.577 | 2.02121 | ? |
| 54 | 12.618 | 2.32440 | ? |
| 55 | 12.670 | 12.83803 | ? |
| 56 | 12.851 | 2.22731 | ? |
| 57 | 12.929 | 218.23195 | ? |
| 58 | 13.100 | 14.33166 | ? |
| 59 | 13.198 | 10.20244 | ? |
| 60 | 13.310 | 12.02551 | ? |
| 61 | 13.432 | 8.23884 | ? |
| 62 | 13.519 | 47.64641 | ? |
| 63 | 13.898 | 22.63760 | ? |
| 64 | 14.090 | 9.29738 | ? |
| 65 | 14.319 | 3.88012 | ? |
| 66 | 14.551 | 9.26884 | ? |
| 67 | 14.612 | 4.34914 | ? |
| 68 | 14.729 | 4.07543 | ? |
| 69 | 14.872 | 46.24465 | ? |
| 70 | 14.954 | 6.62461 | ? |
| 71 | 15.084 | 3.92423 | ? |
| 72 | 15.139 | 8.60328 | ? |
| 73 | 15.340 | 2.17899 | ? |
| 74 | 15.430 | 2.96646 | ? |
| 75 | 15.521 | 9.66407 | ? |
| 76 | 15.578 | 4.27190 | ? |
| 77 | 15.645 | 4.37904 | ? |
| 78 | 15.703 | 2.68909 | ? |
| 79 | 15.782 | 46.97895 | ? |
| 80 | 15.859 | 4.69475 | ? |
| 81 | 16.022 | 7.36509 | ? |
| 82 | 16.489 | 3.91073 | ? |
| 83 | 16.564 | 6.22445 | ? |
| 84 | 16.648 | 10.24660 | ? |
| 85 | 17.269 | 2.69753 | ? |
| 86 | 17.445 | 10.16989 | ? |
| 87 | 17.925 | 2.28341 | ? |
| 88 | 17.979 | 2.71101 | ? |
| 89 | 18.104 | 11.19730 | ? |

TABLE 1

Summary data for Examples 1-5.

|  | Example 1 | Example 2 | Example 3 | Example 4 | Example 5 |
|---|---|---|---|---|---|
| Effective Stress (psi) | 0 | 400 | 400 | 1000 | 1000 |
| Sample weight (g) | 82.46 | 42.57 | 48.34 | 43.61 | 43.73 |
| Sample weight loss (g) | 19.21 | 10.29 | 11.41 | 10.20 | 9.17 |
| Fluids Recovered: | | | | | |
| Oil (g) | 10.91 | 3.63 | 3.77 | 3.02 | 2.10 |
|  | 36.2 gal/ton | 23.4 gal/ton | 21.0 gal/ton | 19.3 gal/ton | 13/1 gal/ton |
| Water (g) | 0.90 | 0.30 | 0.34 | 0.39 | 0.28 |
|  | 2.6 gal/ton | 1.7 gal/ton | 1.7 gal/ton | 2.1 gal/ton | 1.5 gal/ton |
| HC gas (g) | 2.09 | 1.33 | 1.58 | 1.53 | 1.66 |
|  | 683 scf/ton | 811 scf/ton | 862 scf/ton | 905 scf/ton | 974 scf/ton |
| $CO_2$ (g) | 3.35 | 1.70 | 1.64 | 1.74 | 1.71 |
|  | 700 scf/ton | 690 scf/ton | 586 scf/ton | 690 scf/ton | 673 scf/ton |
| $H_2S$ (g) | 0.06 | 0.0 | 0.0 | 0.0 | 0.0 |
| Coke Recovered: | 0.0 | 0.73 | 0.79 | .47 | 0.53 |
| Inferred Oil (g) | 0.0 | 1.67 | 1.81 | 1.07 | 1.21 |
|  | 0 gal/ton | 10.8 gal/ton | 10.0 gal/ton | 6.8 gal/ton | 7.6 gal/ton |
| Total Oil (g) | 10.91 | 5.31 | 5.58 | 4.09 | 3.30 |
|  | 36.2 gal/ton | 34.1 gal/ton | 31.0 gal/ton | 26.1 gal/ton | 20.7 gal/ton |
| Balance (g) | 1.91 | 2.59 | 3.29 | 3.05 | 2.91 |

Analysis

The gas and liquid samples obtained through the experimental procedures and gas and liquid sample collection procedures described for Examples 1-5, were analyzed by the following hydrocarbon gas sample gas chromatography (GC) analysis methodology, non-hydrocarbon gas sample gas chromatography (GC) analysis methodology, gas sample GC peak identification and integration methodology, whole oil gas chromatography (WOGC) analysis methodology, and whole oil gas chromatography (WOGC) peak identification and integration methodology.

Gas samples collected during the heating tests as described in Examples 1-5 were analyzed for both hydrocarbon and non-hydrocarbon gases, using an Agilent Model 6890 Gas Chromatograph coupled to an Agilent Model 5973 quadrapole mass selective detector. The 6890 GC was configured with two inlets (front and back) and two detectors (front and back) with two fixed volume sample loops for sample introduction. Peak identifications and integrations were performed using the Chemstation software (Revision A.03.01) supplied with the GC instrument. For hydrocarbon gases, the GC configuration consisted of the following:

a) split/splitless inlet (back position of the GC)
b) FID (Flame ionization detector) back position of the GC
c) HP Ultra-2 (5% Phenyl Methyl Siloxane) capillary columns (two) (25 meters×200 μm ID) one directed to the FID detector, the other to an Agilent 5973 Mass Selective Detector
d) 500 μl fixed volume sample loop
e) six-port gas sampling valve
f) cryogenic (liquid nitrogen) oven cooling capability
g) Oven program −80° C. for 2 mins., 20° C./min. to 0° C., then 4° C./min to 20° C., then 10° C./min. to 100° C., hold for 1 min.
h) Helium carrier gas flow rate of 2.2 ml/min
i) Inlet temperature 100° C.
j) Inlet pressure 19.35 psi
k) Split ratio 25:1
l) FID temperature 310° C.

For non-hydrocarbon gases (e.g., argon, carbon dioxide and hydrogen sulfide) the GC configuration consisted of the following:

a) PTV (programmable temperature vaporization) inlet (front position of the GC)
b) TCD (Thermal conductivity detector) front position of the GC
c) GS-GasPro capillary column (30 meters×0.32 mm ID)
d) 100 μl fixed volume sample loop
e) six port gas sampling valve
f) Oven program: 25° C. hold for 2 min., then 10° C./min to 200° C., hold 1 min.
g) Helium carrier gas flow rate of 4.1 ml/min.
h) Inlet temperature 200° C.
i) Inlet pressure 14.9 psi
j) Splitless mode
k) TCD temperature 250° C.

For Examples 1-5, a stainless steel sample cylinder containing gas collected from the Parr vessel (FIG. 18) was fitted with a two stage gas regulator (designed for lecture bottle use) to reduce gas pressure to approximately twenty pounds per square inch. A septum fitting was positioned at the outlet port of the regulator to allow withdrawal of gas by means of a Hamilton model 1005 gas-tight syringe. Both the septum fitting and the syringe were purged with gas from the stainless steel sample cylinder to ensure that a representative gas sample was collected. The gas sample was then transferred to a stainless steel cell (septum cell) equipped with a pressure transducer and a septum fitting. The septum cell was connected to the fixed volume sample loop mounted on the GC by stainless steel capillary tubing. The septum cell and sample loop were evacuated for approximately 5 minutes. The evacuated septum cell was then isolated from the evacuated sample loop by closure of a needle valve positioned at the outlet of the septum cell. The gas sample was introduced into the septum cell from the gas-tight syringe through the septum fitting and a pressure recorded. The evacuated sample loop was then opened to the pressurized septum cell and the gas sample allowed to equilibrate between the sample loop and the septum cell for one minute. The equilibrium pressure was then recorded, to allow calculation of the total moles of gas present in the sample loop before injection into the GC inlet. The sample loop contents were then swept into the inlet by Helium carrier gas and components separated by retention time in the capillary column, based upon the GC oven temperature program and carrier gas flow rates.

Calibration curves, correlating integrated peak areas with concentration, were generated for quantification of gas compositions using certified gas standards. For hydrocarbon gases, standards containing a mixture of methane, ethane, propane, butane, pentane and hexane in a helium matrix in varying concentrations (parts per million, mole basis) were injected into the GC through the fixed volume sample loop at atmospheric pressure. For non-hydrocarbon gases, standards containing individual components, i.e., carbon dioxide in helium and hydrogen sulfide in natural gas, were injected into the GC at varying pressures in the sample loop to generate calibration curves.

The hydrocarbon gas sample molar percentages reported in FIG. 16 were obtained using the following procedure. Gas standards for methane, ethane, propane, butane, pentane and hexane of at least three varying concentrations were run on the gas chromatograph to obtain peak area responses for such standard concentrations. The known concentrations were then correlated to the respective peak area responses within the Chemstation software to generate calibration curves for methane, ethane, propane, butane, pentane and hexane. The calibration curves were plotted in Chemstation to ensure good linearity (R2>0.98) between concentration and peak intensity. A linear fit was used for each calibrated compound, so that the response factor between peak area and molar concentration was a function of the slope of the line as determined by the Chemstation software. The Chemstation software program then determined a response factor relating GC peak area intensity to the amount of moles for each calibrated compound. The software then determined the number of moles of each calibrated compound from the response factor and the peak area. The peak areas used in Examples 1-5 are reported in Tables 2, 4, 5, 7, and 9. The number of moles of each identified compound for which a calibration curve was not determined (i.e., iso-butane, iso-pentane, and 2-methyl pentane) was then estimated using the response factor for the closest calibrated compound (i.e., butane for iso-butane; pentane for iso-pentane; and hexane for 2-methyl pentane) multiplied by the ratio of the peak area for the identified compound for which a calibration curve was not determined to the peak area of the calibrated compound. The values reported in FIG. 16 were then taken as a percentage of the total of all identified hydrocarbon gas GC areas (i.e., methane, ethane, propane, iso-butane, n-butane, iso-pentane, n-pentane, 2-methyl pentane, and n-hexane) and calculated molar concentrations. Thus the graphed methane to normal C6 molar percentages for all of the experiments do not include the molar contribution of the unidentified hydrocarbon gas species listed in Tables 2, 4, 5, 7, or 9 (e.g., peak numbers 2, 6, 8-11, 13, 15-22, 24-26, and 28-78 in Table 2).

Liquid samples collected during the heating tests as described in Examples 1, 3 and 4 were analyzed by whole oil gas chromatography (WOGC) according to the following procedure. Samples, QA/QC standards and blanks (carbon disulfide) were analyzed using an Ultra 1 Methyl Siloxane column (25 m length, 0.32 µm diameter, 0.52 µm film thickness) in an Agilent 6890 GC equipped with a split/splitless injector, autosampler and flame ionization detector (FID). Samples were injected onto the capillary column in split mode with a split ratio of 80:1. The GC oven temperature was kept constant at 20° C. for 5 min, programmed from 20° C. to 300° C. at a rate of 5° C.min$^{-1}$, and then maintained at 300° C. for 30 min (total run time=90 min.). The injector temperature was maintained at 300° C. and the FID temperature set at 310° C. Helium was used as carrier gas at a flow of 2.1 mL min$^{-1}$. Peak identifications and integrations were performed using Chemstation software Rev.A.10.02 [1757] (Agilent Tech. 1990-2003) supplied with the Agilent instrument.

Standard mixtures of hydrocarbons were analyzed in parallel by the WOGC method described above and by an Agilent 6890 GC equipped with a split/splitless injector, autosampler and mass selective detector (MS) under the same conditions. Identification of the hydrocarbon compounds was conducted by analysis of the mass spectrum of each peak from the GC-MS. Since conditions were identical for both instruments, peak identification conducted on the GC-MS could be transferred to the peaks obtained on the GC-FID. Using these data, a compound table relating retention time and peak identification was set up in the GC-FID Chemstation. This table was used for peak identification.

The gas chromatograms obtained on the liquid samples (FIGS. 4, 9 and 11) were analyzed using a pseudo-component technique. The convention used for identifying each pseudo-component was to integrate all contributions from normal alkane to next occurring normal alkane with the pseudo-component being named by the late eluting n-alkane. For example, the C-10 pseudo-component would be obtained from integration beginning just past normal-C9 and continue just through normal-C10. The carbon number weight % and mole % values for the pseudo-components obtained in this manner were assigned using correlations developed by Katz and Firoozabadi (Katz, D. L., and A. Firoozabadi, 1978. Predicting phase behavior of condensate/crude-oil systems using methane interaction coefficients, J. Petroleum Technology (November 1978), 1649-1655). Results of the pseudo-component analyses for Examples 1, 3 and 4 are shown in Tables 10, 11 and 12.

An exemplary pseudo component weight percent calculation is presented below with reference to Table 10 for the C10 pseudo component for Example 1 in order to illustrate the technique. First, the C-10 pseudo-component total area is obtained from integration of the area beginning just past normal-C9 and continued just through normal-C10 as described above. The total integration area for the C10 pseudo component is 10551.700 pico-ampere-seconds (pAs). The total C10 pseudo component integration area (10551.700 pAs) is then multiplied by the C10 pseudo component density (0.7780 g/ml) to yield an "area X density" of 8209.22 pAs g/ml. Similarly, the peak integration areas for each pseudo component and all lighter listed compounds (i.e., nC3, iC4, nC4, iC5 & nC5) are determined and multiplied by their respective densities to yield "area X density" numbers for each respective pseudo component and listed compound. The respective determined "area X density" numbers for each pseudo component and listed compound is then summed to determine a "total area X density" number. The "total area X density" number for Example 1 is 96266.96 pAs g/ml. The C10 pseudo component weight percentage is then obtained by dividing the C10 pseudo component "area X density" number (8209.22 pAs g/ml) by the "total area X density" number (96266.96 pAs g/ml) to obtain the C10 pseudo component weight percentage of 8.53 weight percent.

An exemplary pseudo component molar percent calculation is presented below with reference to Table 10 for the C10 pseudo component for Example 1 in order to further illustrate the pseudo component technique. First, the C-10 pseudo-component total area is obtained from integration of the area beginning just past normal-C9 and continued just through normal-C10 as described above. The total integration area for the C10 pseudo component is 10551.700 pico-ampere-seconds (pAs). The total C10 pseudo component integration area (10551.700 pAs) is then multiplied by the C10 pseudo component density (0.7780 g/ml) to yield an "area X density" of 8209.22 pAs g/ml. Similarly, the integration areas for each pseudo component and all lighter listed compounds (i.e., nC3, iC4, nC4, iC5 & nC5) are determined and multiplied by their respective densities to yield "area X density" numbers for each respective pseudo component and listed compound. The C10 pseudo component "area X density" number (8209.22 pAs g/ml) is then divided by the C10 pseudo component molecular weight (134.00 g/mol) to yield a C10 pseudo component "area X density/molecular weight" number of 61.26 pAs mol/ml. Similarly, the "area X density" number for each pseudo component and listed compound is then divided by such components or compounds respective molecular weight to yield an "area X density/molecular weight" number for each respective pseudo component and listed compound. The respective determined "area X density/molecular weight" numbers for each pseudo component and listed compound is then summed to determine a "total area X density/molecular weight" number. The total "total area X density/molecular weight" number for Example 1 is 665.28 pAs mol/ml. The C10 pseudo component molar percentage is then obtained by dividing the C10 pseudo component "area X density/molecular weight" number (61.26 pAs mol/ml) by the "total area X density/molecular weight" number (665.28 pAs mol/ml) to obtain the C10 pseudo component molar percentage of 9.21 molar percent.

TABLE 10

Pseudo-components for Example 1 - GC of liquid - 0 stress

| Component | Area (cts.) | Area % | Avg. Boiling Pt. (°F.) | Density (g/ml) | Molecular Wt. (g/mol) | Wt. % | Mol % |
|---|---|---|---|---|---|---|---|
| $nC_3$ | 41.881 | 0.03 | −43.73 | 0.5069 | 44.10 | 0.02 | 0.07 |
| $iC_4$ | 120.873 | 0.10 | 10.94 | 0.5628 | 58.12 | 0.07 | 0.18 |
| $nC_4$ | 805.690 | 0.66 | 31.10 | 0.5840 | 58.12 | 0.49 | 1.22 |
| $iC_5$ | 1092.699 | 0.89 | 82.13 | 0.6244 | 72.15 | 0.71 | 1.42 |
| $nC_5$ | 2801.815 | 2.29 | 96.93 | 0.6311 | 72.15 | 1.84 | 3.68 |
| Pseudo $C_6$ | 7150.533 | 5.84 | 147.00 | 0.6850 | 84.00 | 5.09 | 8.76 |
| Pseudo $C_7$ | 10372.800 | 8.47 | 197.50 | 0.7220 | 96.00 | 7.78 | 11.73 |
| Pseudo $C_8$ | 11703.500 | 9.56 | 242.00 | 0.7450 | 107.00 | 9.06 | 12.25 |
| Pseudo $C_9$ | 11776.200 | 9.61 | 288.00 | 0.7640 | 121.00 | 9.35 | 11.18 |
| Pseudo $C_{10}$ | 10551.700 | 8.61 | 330.50 | 0.7780 | 134.00 | 8.53 | 9.21 |
| Pseudo $C_{11}$ | 9274.333 | 7.57 | 369.00 | 0.7890 | 147.00 | 7.60 | 7.48 |
| Pseudo $C_{12}$ | 8709.231 | 7.11 | 407.00 | 0.8000 | 161.00 | 7.24 | 6.50 |
| Pseudo $C_{13}$ | 7494.549 | 6.12 | 441.00 | 0.8110 | 175.00 | 6.31 | 5.22 |
| Pseudo $C_{14}$ | 6223.394 | 5.08 | 475.50 | 0.8220 | 190.00 | 5.31 | 4.05 |
| Pseudo $C_{15}$ | 6000.179 | 4.90 | 511.00 | 0.8320 | 206.00 | 5.19 | 3.64 |
| Pseudo $C_{16}$ | 5345.791 | 4.36 | 542.00 | 0.8390 | 222.00 | 4.66 | 3.04 |
| Pseudo $C_{17}$ | 4051.886 | 3.31 | 572.00 | 0.8470 | 237.00 | 3.57 | 2.18 |
| Pseudo $C_{18}$ | 3398.586 | 2.77 | 595.00 | 0.8520 | 251.00 | 3.01 | 1.73 |
| Pseudo $C_{19}$ | 2812.101 | 2.30 | 617.00 | 0.8570 | 263.00 | 2.50 | 1.38 |
| Pseudo $C_{20}$ | 2304.651 | 1.88 | 640.50 | 0.8620 | 275.00 | 2.06 | 1.09 |
| Pseudo $C_{21}$ | 2038.925 | 1.66 | 664.00 | 0.8670 | 291.00 | 1.84 | 0.91 |
| Pseudo $C_{22}$ | 1497.726 | 1.22 | 686.00 | 0.8720 | 305.00 | 1.36 | 0.64 |
| Pseudo $C_{23}$ | 1173.834 | 0.96 | 707.00 | 0.8770 | 318.00 | 1.07 | 0.49 |
| Pseudo $C_{24}$ | 822.762 | 0.67 | 727.00 | 0.8810 | 331.00 | 0.75 | 0.33 |
| Pseudo $C_{25}$ | 677.938 | 0.55 | 747.00 | 0.8850 | 345.00 | 0.62 | 0.26 |
| Pseudo $C_{26}$ | 532.788 | 0.43 | 766.00 | 0.8890 | 359.00 | 0.49 | 0.20 |
| Pseudo $C_{27}$ | 459.465 | 0.38 | 784.00 | 0.8930 | 374.00 | 0.43 | 0.16 |
| Pseudo $C_{28}$ | 413.397 | 0.34 | 802.00 | 0.8960 | 388.00 | 0.38 | 0.14 |
| Pseudo $C_{29}$ | 522.898 | 0.43 | 817.00 | 0.8990 | 402.00 | 0.49 | 0.18 |
| Pseudo $C_{30}$ | 336.968 | 0.28 | 834.00 | 0.9020 | 416.00 | 0.32 | 0.11 |
| Pseudo $C_{31}$ | 322.495 | 0.26 | 850.00 | 0.9060 | 430.00 | 0.30 | 0.10 |
| Pseudo $C_{32}$ | 175.615 | 0.14 | 866.00 | 0.9090 | 444.00 | 0.17 | 0.05 |
| Pseudo $C_{33}$ | 165.912 | 0.14 | 881.00 | 0.9120 | 458.00 | 0.16 | 0.05 |
| Pseudo $C_{34}$ | 341.051 | 0.28 | 895.00 | 0.9140 | 472.00 | 0.32 | 0.10 |
| Pseudo $C_{35}$ | 286.861 | 0.23 | 908.00 | 0.9170 | 486.00 | 0.27 | 0.08 |
| Pseudo $C_{36}$ | 152.814 | 0.12 | 922.00 | 0.9190 | 500.00 | 0.15 | 0.04 |
| Pseudo $C_{37}$ | 356.947 | 0.29 | 934.00 | 0.9220 | 514.00 | 0.34 | 0.10 |
| Pseudo $C_{38}$ | 173.428 | 0.14 | 947.00 | 0.9240 | 528.00 | 0.17 | 0.05 |
| Totals | 122484.217 | 100.00 | | | | 100.00 | 100.00 |

TABLE 11

Pseudo-components for Example 3 - GC of liquid - 400 psi stress

| Component | Area | Area % | Avg. Boiling Pt. (°F.) | Density (g/ml) | Molecular Wt. (g/mol) | Wt. % | Mol % |
|---|---|---|---|---|---|---|---|
| $nC_3$ | 35.845 | 0.014 | −43.730 | 0.5069 | 44.10 | 0.01 | 0.03 |
| $iC_4$ | 103.065 | 0.041 | 10.940 | 0.5628 | 58.12 | 0.03 | 0.07 |
| $nC_4$ | 821.863 | 0.328 | 31.100 | 0.5840 | 58.12 | 0.24 | 0.62 |
| $iC_5$ | 1187.912 | 0.474 | 82.130 | 0.6244 | 72.15 | 0.37 | 0.77 |
| $nC_5$ | 3752.655 | 1.498 | 96.930 | 0.6311 | 72.15 | 1.20 | 2.45 |
| Pseudo $C_6$ | 12040.900 | 4.805 | 147.000 | 0.6850 | 84.00 | 4.17 | 7.34 |

TABLE 11-continued

Pseudo-components for Example 3 - GC of liquid - 400 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| Pseudo $C_7$ | 20038.600 | 7.997 | 197.500 | 0.7220 | 96.00 | 7.31 | 11.26 |
| Pseudo $C_8$ | 24531.500 | 9.790 | 242.000 | 0.7450 | 107.00 | 9.23 | 12.76 |
| Pseudo $C_9$ | 25315.000 | 10.103 | 288.000 | 0.7640 | 121.00 | 9.77 | 11.94 |
| Pseudo $C_{10}$ | 22640.400 | 9.035 | 330.500 | 0.7780 | 134.00 | 8.90 | 9.82 |
| Pseudo $C_{11}$ | 20268.100 | 8.089 | 369.000 | 0.7890 | 147.00 | 8.08 | 8.13 |
| Pseudo $C_{12}$ | 18675.600 | 7.453 | 407.000 | 0.8000 | 161.00 | 7.55 | 6.93 |
| Pseudo $C_{13}$ | 16591.100 | 6.621 | 441.000 | 0.8110 | 175.00 | 6.80 | 5.74 |
| Pseudo $C_{14}$ | 13654.000 | 5.449 | 475.500 | 0.8220 | 190.00 | 5.67 | 4.41 |
| Pseudo $C_{15}$ | 13006.300 | 5.191 | 511.000 | 0.8320 | 206.00 | 5.47 | 3.92 |
| Pseudo $C_{16}$ | 11962.200 | 4.774 | 542.000 | 0.8390 | 222.00 | 5.07 | 3.38 |
| Pseudo $C_{17}$ | 8851.622 | 3.533 | 572.000 | 0.8470 | 237.00 | 3.79 | 2.36 |
| Pseudo $C_{18}$ | 7251.438 | 2.894 | 595.000 | 0.8520 | 251.00 | 3.12 | 1.84 |
| Pseudo $C_{19}$ | 5946.166 | 2.373 | 617.000 | 0.8570 | 263.00 | 2.57 | 1.45 |
| Pseudo $C_{20}$ | 4645.178 | 1.854 | 640.500 | 0.8620 | 275.00 | 2.02 | 1.09 |
| Pseudo $C_{21}$ | 4188.168 | 1.671 | 664.000 | 0.8670 | 291.00 | 1.83 | 0.93 |
| Pseudo $C_{22}$ | 2868.636 | 1.145 | 686.000 | 0.8720 | 305.00 | 1.26 | 0.61 |
| Pseudo $C_{23}$ | 2188.895 | 0.874 | 707.000 | 0.8770 | 318.00 | 0.97 | 0.45 |
| Pseudo $C_{24}$ | 1466.162 | 0.585 | 727.000 | 0.8810 | 331.00 | 0.65 | 0.29 |
| Pseudo $C_{25}$ | 1181.133 | 0.471 | 747.000 | 0.8850 | 345.00 | 0.53 | 0.23 |
| Pseudo $C_{26}$ | 875.812 | 0.350 | 766.000 | 0.8890 | 359.00 | 0.39 | 0.16 |
| Pseudo $C_{27}$ | 617.103 | 0.246 | 784.000 | 0.8930 | 374.00 | 0.28 | 0.11 |
| Pseudo $C_{28}$ | 538.147 | 0.215 | 802.000 | 0.8960 | 388.00 | 0.24 | 0.09 |
| Pseudo $C_{29}$ | 659.027 | 0.263 | 817.000 | 0.8990 | 402.00 | 0.30 | 0.11 |
| Pseudo $C_{30}$ | 1013.942 | 0.405 | 834.000 | 0.9020 | 416.00 | 0.46 | 0.16 |
| Pseudo $C_{31}$ | 761.259 | 0.304 | 850.000 | 0.9060 | 430.00 | 0.35 | 0.12 |
| Pseudo $C_{32}$ | 416.031 | 0.166 | 866.000 | 0.9090 | 444.00 | 0.19 | 0.06 |
| Pseudo $C_{33}$ | 231.207 | 0.092 | 881.000 | 0.9120 | 458.00 | 0.11 | 0.03 |
| Pseudo $C_{34}$ | 566.926 | 0.226 | 895.000 | 0.9140 | 472.00 | 0.26 | 0.08 |
| Pseudo $C_{35}$ | 426.697 | 0.170 | 908.000 | 0.9170 | 486.00 | 0.20 | 0.06 |
| Pseudo $C_{36}$ | 191.626 | 0.076 | 922.000 | 0.9190 | 500.00 | 0.09 | 0.03 |
| Pseudo $C_{37}$ | 778.713 | 0.311 | 934.000 | 0.9220 | 514.00 | 0.36 | 0.10 |
| Pseudo $C_{38}$ | 285.217 | 0.114 | 947.000 | 0.9240 | 528.00 | 0.13 | 0.04 |
| Totals | 250574.144 | 100.000 | | | | 100.00 | 100.00 |

TABLE 12

Pseudo-components for Example 4 - GC of liquid - 1000 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| $nC_3$ | 44.761 | 0.023 | −43.730 | 0.5069 | 44.10 | 0.01 | 0.05 |
| $iC_4$ | 117.876 | 0.060 | 10.940 | 0.5628 | 58.12 | 0.04 | 0.11 |
| $nC_4$ | 927.866 | 0.472 | 31.100 | 0.5840 | 58.12 | 0.35 | 0.87 |
| $iC_5$ | 1082.570 | 0.550 | 82.130 | 0.6244 | 72.15 | 0.44 | 0.88 |
| $nC_5$ | 3346.533 | 1.701 | 96.930 | 0.6311 | 72.15 | 1.37 | 2.74 |
| Pseudo $C_6$ | 9579.443 | 4.870 | 147.000 | 0.6850 | 84.00 | 4.24 | 7.31 |
| Pseudo $C_7$ | 16046.200 | 8.158 | 197.500 | 0.7220 | 96.00 | 7.49 | 11.29 |
| Pseudo $C_8$ | 19693.300 | 10.012 | 242.000 | 0.7450 | 107.00 | 9.48 | 12.83 |
| Pseudo $C_9$ | 20326.300 | 10.334 | 288.000 | 0.7640 | 121.00 | 10.04 | 12.01 |
| Pseudo $C_{10}$ | 18297.600 | 9.302 | 330.500 | 0.7780 | 134.00 | 9.20 | 9.94 |
| Pseudo $C_{11}$ | 16385.600 | 8.330 | 369.000 | 0.7890 | 147.00 | 8.36 | 8.23 |
| Pseudo $C_{12}$ | 15349.000 | 7.803 | 407.000 | 0.8000 | 161.00 | 7.94 | 7.14 |
| Pseudo $C_{13}$ | 13116.500 | 6.668 | 441.000 | 0.8110 | 175.00 | 6.88 | 5.69 |
| Pseudo $C_{14}$ | 10816.100 | 5.499 | 475.500 | 0.8220 | 190.00 | 5.75 | 4.38 |
| Pseudo $C_{15}$ | 10276.900 | 5.225 | 511.000 | 0.8320 | 206.00 | 5.53 | 3.88 |
| Pseudo $C_{16}$ | 9537.818 | 4.849 | 542.000 | 0.8390 | 222.00 | 5.17 | 3.37 |
| Pseudo $C_{17}$ | 6930.611 | 3.523 | 572.000 | 0.8470 | 237.00 | 3.79 | 2.32 |
| Pseudo $C_{18}$ | 5549.802 | 2.821 | 595.000 | 0.8520 | 251.00 | 3.06 | 1.76 |
| Pseudo $C_{19}$ | 4440.457 | 2.257 | 617.000 | 0.8570 | 263.00 | 2.46 | 1.35 |
| Pseudo $C_{20}$ | 3451.250 | 1.755 | 640.500 | 0.8620 | 275.00 | 1.92 | 1.01 |
| Pseudo $C_{21}$ | 3133.251 | 1.593 | 664.000 | 0.8670 | 291.00 | 1.76 | 0.87 |
| Pseudo $C_{22}$ | 2088.036 | 1.062 | 686.000 | 0.8720 | 305.00 | 1.18 | 0.56 |
| Pseudo $C_{23}$ | 1519.460 | 0.772 | 707.000 | 0.8770 | 318.00 | 0.86 | 0.39 |
| Pseudo $C_{24}$ | 907.473 | 0.461 | 727.000 | 0.8810 | 331.00 | 0.52 | 0.23 |
| Pseudo $C_{25}$ | 683.205 | 0.347 | 747.000 | 0.8850 | 345.00 | 0.39 | 0.16 |
| Pseudo $C_{26}$ | 493.413 | 0.251 | 766.000 | 0.8890 | 359.00 | 0.28 | 0.11 |
| Pseudo $C_{27}$ | 326.831 | 0.166 | 784.000 | 0.8930 | 374.00 | 0.19 | 0.07 |
| Pseudo $C_{28}$ | 272.527 | 0.139 | 802.000 | 0.8960 | 388.00 | 0.16 | 0.06 |
| Pseudo $C_{29}$ | 291.862 | 0.148 | 817.000 | 0.8990 | 402.00 | 0.17 | 0.06 |

TABLE 12-continued

Pseudo-components for Example 4 - GC of liquid - 1000 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| Pseudo $C_{30}$ | 462.840 | 0.235 | 834.000 | 0.9020 | 416.00 | 0.27 | 0.09 |
| Pseudo $C_{31}$ | 352.886 | 0.179 | 850.000 | 0.9060 | 430.00 | 0.21 | 0.07 |
| Pseudo $C_{32}$ | 168.635 | 0.086 | 866.000 | 0.9090 | 444.00 | 0.10 | 0.03 |
| Pseudo $C_{33}$ | 67.575 | 0.034 | 881.000 | 0.9120 | 458.00 | 0.04 | 0.01 |
| Pseudo $C_{34}$ | 95.207 | 0.048 | 895.000 | 0.9140 | 472.00 | 0.06 | 0.02 |
| Pseudo $C_{35}$ | 226.660 | 0.115 | 908.000 | 0.9170 | 486.00 | 0.13 | 0.04 |
| Pseudo $C_{36}$ | 169.729 | 0.086 | 922.000 | 0.9190 | 500.00 | 0.10 | 0.03 |
| Pseudo $C_{37}$ | 80.976 | 0.041 | 934.000 | 0.9220 | 514.00 | 0.05 | 0.01 |
| Pseudo $C_{38}$ | 42.940 | 0.022 | 947.000 | 0.9240 | 528.00 | 0.03 | 0.01 |
| Totals | 196699.994 | 100.000 | | | | 100.00 | 100.00 |

TOC and Rock-eval tests were performed on specimens from oil shale block CM-1B taken at the same stratigraphic interval as the specimens tested by the Parr heating method described in Examples 1-5. These tests resulted in a TOC of 21% and a Rock-eval Hydrogen Index of 872 mg/g-toc.

The TOC and rock-eval procedures described below were performed on the oil shale specimens remaining after the Parr heating tests described in Examples 1-5. Results are shown in Table 13.

The Rock-Eval pyrolysis analyses described above were performed using the following procedures. Rock-Eval pyrolysis analyses were performed on calibration rock standards (IFP standard #55000), blanks, and samples using a Delsi Rock-Eval II instrument. Rock samples were crushed, micronized, and air-dried before loading into Rock-Eval crucibles. Between 25 and 100 mg of powdered-rock samples were loaded into the crucibles depending on the total organic carbon (TOC) content of the sample. Two or three blanks were run at the beginning of each day to purge the system and stabilize the temperature. Two or three samples of IFP calibration standard #55000 with weight of 100+/−1 mg were run to calibrate the system. If the Rock-Eval $T_{max}$ parameter was 419° C.+/−2° C. on these standards, analyses proceeded with samples. The standard was also run before and after every 10 samples to monitor the instrument's performance.

The Rock-Eval pyrolysis technique involves the rate-programmed heating of a powdered rock sample to a high temperature in an inert (helium) atmosphere and the characterization of products generated from the thermal breakdown of chemical bonds. After introduction of the sample the pyrolysis oven was held isothermally at 300° C. for three minutes. Hydrocarbons generated during this stage are detected by a flame-ionization detector (FID) yielding the $S_1$ peak. The pyrolysis-oven temperature was then increased at a gradient of 25° C./minute up to 550° C., where the oven was held isothermally for one minute. Hydrocarbons generated during this step were detected by the FED and yielded the $S_2$ peak.

Hydrogen Index (HI) is calculated by normalizing the $S_2$ peak (expressed as $mg_{hydrocarbons}/g_{rock}$) to weight % TOC (Total Organic Carbon determined independently) as follows:

$$HI=(S_2/TOC)*100$$

where HI is expressed as $mg_{hydrocarbons}/g_{TOC}$

Total Organic Carbon (TOC) was determined by well known methods suitable for geological samples—i.e., any carbonate rock present was removed by acid treatment followed by combustion of the remaining material to produce and measure organic based carbon in the form of $CO_2$.

TABLE 13

TOC and Rock-eval results on oil shale specimens after the Parr heating tests.

| | Example 1 | Example 2 | Example 3 | Example 4 | Example 5 |
|---|---|---|---|---|---|
| TOC (%) | 12.07 | 10.83 | 10.62 | 11.22 | 11.63 |
| HI (mg/g-toc) | 77 | 83 | 81 | 62 | 77 |

The API gravity of Examples 1-5 was estimated by estimating the room temperature specific gravity (SG) of the liquids collected and the results are reported in Table 14. The API gravity was estimated from the determined specific gravity by applying the following formula:

$$API\ gravity=(141.5/SG)-131.5$$

The specific gravity of each liquid sample was estimated using the following procedure. An empty 50 μl Hamilton Model 1705 gastight syringe was weighed on a Mettler AE 163 digital balance to determine the empty syringe weight. The syringe was then loaded by filling the syringe with a volume of liquid. The volume of liquid in the syringe was noted. The loaded syringe was then weighed. The liquid sample weight was then estimated by subtracting the loaded syringe measured weight from the measured empty syringe weight. The specific gravity was then estimated by dividing the liquid sample weight by the syringe volume occupied by the liquid sample.

TABLE 14

Estimated API Gravity of liquid samples from Examples 1-5

| Example | Example 1 | Example 2 | Example 3 | Example 4 | Example 5 |
|---|---|---|---|---|---|
| API Gravity | 29.92 | 30.00 | 27.13 | 32.70 | 30.00 |

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method for utilizing gas produced from an in situ conversion process, comprising:
   a) heating an organic-rich rock formation in situ, wherein the organic-rich rock formation is an oil shale formation;
   b) producing a production fluid from the organic-rich rock formation, the production fluid having been at least partially generated as a result of pyrolysis of formation hydrocarbons located in the organic-rich rock formation, the production fluid comprising hydrocarbon fluids;
   c) obtaining a gas stream from the production fluid, the gas stream comprising a combustible hydrocarbon fluid;
   d) separating the gas stream into a first composition gas stream and a second composition gas stream, wherein a composition of the first gas stream is maintained in a substantially constant condition, the first composition gas stream comprises methane and at least one inert gas and the first composition gas stream has a lower heating value less than 800 BTU/SCF; and
   e) passing the first composition gas stream through a first gas turbine to form a first gas turbine exhaust stream, the first gas turbine being configured to provide energy to a first electrical generator;
   f) feeding the second composition gas stream to a steam boiler;
   g) combusting the second composition gas stream to provide heat to the steam boiler;
   h) producing steam in the steam boiler; and
   i) passing the steam through a steam turbine to form a steam turbine exhaust stream, wherein the steam turbine is configured to provide energy to a second electrical generator, the steam turbine thereby providing energy to the second electrical generator.

2. The method of claim 1, wherein the first composition gas stream and the second composition gas stream both contain a hydrocarbon fluid.

3. The method of claim 1, wherein both the first composition gas stream and the second composition gas stream comprise combustible gases.

4. The method of claim 1, wherein the first composition gas stream and the second composition gas stream both have a lower heating value greater than 200 BTU/SCF.

5. The method of claim 4, wherein the first composition gas stream has a lower heating value less than 700 BTU/SCF.

6. The method of claim 1, wherein the first composition gas stream is greater than 15 mole percent methane.

7. The method of claim 1, wherein a $CO_2$ content of the first composition gas stream is greater than 30 mole percent.

8. The method of claim 1, wherein the first composition gas stream has a substantially constant $H_2$ to $CO_2$ molar ratio.

9. The method of claim 8, wherein the first composition gas stream has an $H_2$ to $CO_2$ molar ratio between 0.1 to 2.0.

10. The method of claim 1, wherein the first composition gas stream has a substantially constant ethane to $CO_2$ molar ratio.

11. The method of claim 1, wherein the steam boiler is a supercritical boiler.

12. The method of claim 1, wherein the steam boiler is equipped with catalytic combustors.

13. The method of claim 1, wherein at least a portion of the steam is delivered to the organic-rich rock formation.

14. The method of claim 1, wherein the first composition gas stream is greater than 90 mole percent hydrogen.

15. The method of claim 1, wherein the second composition gas stream is greater than 90 mole percent hydrogen.

16. The method of claim 1, wherein a Wobbe Index of the first composition gas stream on an averaged daily basis varies by less than 15 percent over a 7 day period.

17. The method of claim 1, wherein a total concentration of inert gas in the first composition gas stream on an averaged daily basis varies by less than 10 mole percent over a 7 day period.

18. The method of claim 1, wherein a concentration of $CO_2$ in the first composition gas stream on an averaged daily basis varies by less than 10 mole percent over a 7 day period.

19. The method of claim 1, wherein a concentration of methane in the first composition gas stream on an averaged daily basis varies by less than 10 mole percent over a 7 day period.

20. The method of claim 1, wherein the lower heating value of the first composition gas stream on an averaged daily basis varies by less than 10 percent over a 7 day period.

21. The method of claim 1, wherein a concentration of ethane in the first composition gas stream on an averaged daily basis varies by less than 10 mole percent over a 7 day period.

22. The method of claim 1, wherein a composition of the second composition gas stream is also maintained in a substantially constant condition.

23. A method for utilizing gas produced from an in situ conversion process, comprising:
   a) heating an organic-rich rock formation in situ, wherein the organic-rich rock formation is an oil shale formation;
   b) producing a production fluid from the organic-rich rock formation, the production fluid having been at least partially generated as a result of pyrolysis of formation hydrocarbons located in the organic-rich rock formation, the production fluid comprising hydrocarbon fluids;
   c) obtaining a gas stream from the production fluid, the gas stream comprising a combustible hydrocarbon fluid;
   d) separating the gas stream into a first composition gas stream and a second composition gas stream, wherein a composition of the first gas stream is maintained in a substantially constant condition, the first composition gas stream comprises methane and at least one inert gas and the first composition gas stream has a lower heating value less than 800 BTU/SCF;
   e) passing the first composition gas stream through a first gas turbine to form a first gas turbine exhaust stream, the first gas turbine being configured to provide energy to a first electrical generator;
   f) monitoring the first composition gas stream for one or more properties; and
   g) altering the composition of the first composition gas stream, thereby controlling one or more operating parameters of the first composition gas stream, wherein the first composition gas stream includes methane and wherein altering the composition of the first composition gas stream comprises reforming at least a portion of the methane in the first composition gas stream to generate hydrogen.

24. The method of claim 23, wherein the one or more properties is selected from gas composition, temperature, heating value, specific gravity, Wobbe index, Modified Wobbe Index, dew point, flammability limit, flame velocity, and combinations thereof.

25. The method of claim 23, wherein the operating parameter is a concentration of one or more $C_2$ and higher hydrocarbons, $C_3$ and higher hydrocarbons, carbon dioxide, inert gases, hydrogen gas, ethane, ethylene, propane, and combinations thereof.

26. The method of claim 23, wherein altering the composition of the first composition gas stream includes blending a blend gas stream with the first composition gas stream.

27. The method of claim 23, wherein at least a portion of the methane is removed from the first composition gas stream prior to the reforming, the removed methane is reformed, thereby generating the hydrogen, and the generated hydrogen is returned to the first composition gas stream prior to passing the first composition gas stream to the first gas turbine.

28. The method of claim 23, wherein at least a portion of the methane is reformed while in the first composition gas stream, thereby generating the hydrogen in the first composition gas stream from at least a portion of the methane present in the first composition gas stream.

29. The method of claim 23, wherein the portion of the methane reformed into hydrogen is controlled to maintain a substantially constant Wobbe Index value over time.

30. The method of claim 29, further comprising:
h) selling generated electricity from the first electrical generator to a third party.

31. The method of claim 30, further comprising:
i) buying electricity from an electricity supplier at selected off-peak demand times.

32. The method of claim 23, wherein the first composition gas stream includes inert gas and wherein altering the composition of the first composition gas stream includes adjusting the inert gas content of the first composition gas stream to maintain a substantially constant Wobbe Index value over time.

33. The method of claim 23, wherein altering the composition of the first composition gas stream includes adjusting a pressure or temperature of one or more oil-gas separators.

34. The method of claim 23, wherein altering the composition of the first composition gas stream comprises adding hydrogen, ethane, ethylene, or combinations thereof, thereby increasing a flame speed of the first composition gas stream, adjusting a burn rate of the first composition gas stream, stabilizing combustion in the first gas turbine, or combinations thereof.

35. The method of claim 23, further comprising:
h) adjusting a temperature of the first composition gas stream, thereby adjusting a Wobbe Index of the first composition gas stream.

36. The method of claim 23, wherein a composition of the second composition gas stream is also maintained in a substantially constant condition.

37. The method of claim 36, further comprising:
h) passing the second composition gas stream through a second gas turbine to form a second gas turbine exhaust stream, the second gas turbine being configured to provide energy to a second electrical generator.

38. The method of claim 23, wherein altering the composition of the first composition gas stream comprises reducing an inert gas content of the first composition gas stream and the first gas turbine is equipped with lean pre-mixed combustor(s), Dry Low $NO_x$ (DLN) combustor(s), or Dry Low Emissions (DLE) combustor(s).

39. The method of claim 23, wherein altering the composition of the first composition gas stream comprises increasing an inert gas content of the first composition gas stream, thereby reducing $NO_x$ generation in the first gas turbine.

40. The method of claim 39, wherein the inert gas content of the first composition gas stream is increased by increasing a $CO_2$ content of the first composition gas stream.

41. The method of claim 23, wherein a Wobbe Index of the first composition gas stream on an averaged daily basis varies by less than 15 percent over a 7 day period.

42. The method of claim 23, wherein a total concentration of inert gas in the first gas composition gas stream on an averaged daily basis varies by less than 10 mole percent over a 7 day period.

43. The method of claim 23, wherein a concentration of $CO_2$ in the first composition gas stream on an averaged daily basis varies by less than 10 mole percent over a 7 day period.

44. The method of claim 23, wherein a concentration of methane in the first composition gas stream on an averaged daily basis varies by less than 10 mole percent over a 7 day period.

45. The method of claim 23, wherein the lower heating value of the first composition gas stream on an averaged daily basis varies by less than 10 percent over a 7 day period.

46. The method of claim 23, wherein a concentration of ethane in the first composition gas stream on an averaged daily basis varies by less than 10 mole percent over a 7 day period.

47. A method for utilizing gas produced from an in situ conversion process, comprising:
a) heating an organic-rich rock formation in situ, wherein the organic-rich rock formation is an oil shale formation;
b) producing a production fluid from the organic-rich rock formation, the production fluid having been at least partially generated as a result of pyrolysis of formation hydrocarbons located in the organic-rich rock formation, the production fluid comprising hydrocarbon fluids;
c) obtaining a gas stream from the production fluid, the gas stream comprising a combustible hydrocarbon fluid;
d) separating the gas stream into a first composition gas stream and a second composition gas stream, wherein a composition of the first gas stream is maintained in a substantially constant condition, the first composition gas stream comprises methane and at least one inert gas and the first composition gas stream has a lower heating value less than 800 BTU/SCF;
e) passing the first composition gas stream through a first gas turbine to form a first gas turbine exhaust stream, the first gas turbine being configured to provide energy to a first electrical generator;
f) separating $NH_3$ from the production fluid to form an $NH_3$ treatment stream; and
g) injecting the $NH_3$ into the first gas turbine exhaust stream, thereby converting a portion of $NO_x$ components in the first gas turbine exhaust stream to $N_2$.

* * * * *